United States Patent [19]
Inoue et al.

[11] Patent Number: 5,450,894
[45] Date of Patent: Sep. 19, 1995

[54] AIR CONDITIONING APPARATUS FOR A VEHICLE

[75] Inventors: Yoshimitsu Inoue, Toyoake; Kazushi Shikata, Kariya; Yoshiaki Takano, Kariya; Masahiko Osuka, Kariya, all of Japan

[73] Assignee: Nippondenso Co., Ltd., Kariya, Japan

[21] Appl. No.: 975,342

[22] Filed: Nov. 13, 1992

[30] Foreign Application Priority Data

| Nov. 14, 1991 | [JP] | Japan | 3-299276 |
| Feb. 13, 1992 | [JP] | Japan | 4-026835 |
| May 11, 1992 | [JP] | Japan | 4-117678 |

[51] Int. Cl.⁶ .................. A47C 7/72; F25D 23/12
[52] U.S. Cl. ...................... 165/43; 62/261; 297/180.1; 454/907
[58] Field of Search ............ 454/120, 189, 907, 188, 454/137, 191, 99; 62/261, 244; 237/12, 3 A, 12 R, 12 A; 165/43; 297/180.16, 180.1

[56] References Cited

U.S. PATENT DOCUMENTS

| 1,590,934 | 6/1926 | Fetiner | 454/137 |
| 2,103,104 | 12/1937 | Young | 165/43 X |
| 2,430,335 | 11/1947 | Hart | 62/244 X |
| 2,807,153 | 9/1957 | Owen | 454/907 X |
| 3,112,002 | 11/1963 | Van der Lely | 454/907 X |
| 4,531,453 | 7/1985 | Warman et al. | 55/330 |
| 4,572,430 | 2/1986 | Takagi et al. | 237/2 A |
| 4,874,036 | 10/1989 | Masuda | 165/42 |
| 4,959,974 | 10/1990 | Kusakabe | 61/228.5 |
| 5,142,881 | 9/1992 | Nagayama | 62/228.5 |

FOREIGN PATENT DOCUMENTS

| 050473 | 4/1982 | European Pat. Off. |
| 125562 | 11/1984 | European Pat. Off. |
| WO8909143 | 10/1989 | European Pat. Off. |
| 2550738 | 2/1985 | France |
| 2239811 | 9/1990 | Japan |
| 3139415 | 6/1991 | Japan | 237/12.3 A |
| WO9112150 | 8/1991 | Japan |
| 2064758 | 7/1981 | United Kingdom |

*Primary Examiner*—William E. Wayner
*Attorney, Agent, or Firm*—Cushman, Darby & Cushman

[57] ABSTRACT

An air conditioning apparatus for a vehicle for air conditioning only a zone adjacent a person sitting on a seat. A bottom duct 62 has inlets 60 which are located laterally of a sitting part 50 of the seat, and a top duct 70 has an outlet 72 located above a head rest portion 58 of the seat. Arranged in the bottom duct 62 is a blower fan 74, evaporator 78 and heater 80. The rotation of the fan 74 causes the air to be sucked into the duct 62 via the inlets 60, and is subjected to the heat exchange with the evaporator 78 and the heater 80 to obtain a desired temperature of the air. The air is discharged downwardly from the top outlet 72 to the bottom inlet 60, so that air flows for air conditioning are crated along an area only around the person sitting on the seat.

22 Claims, 129 Drawing Sheets

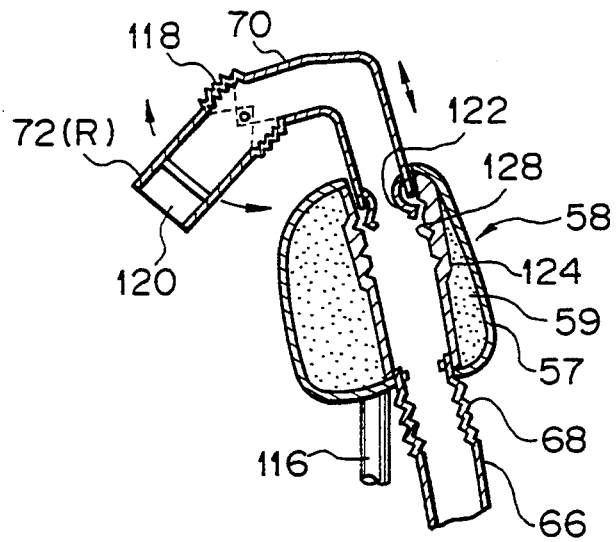
Fig. 2
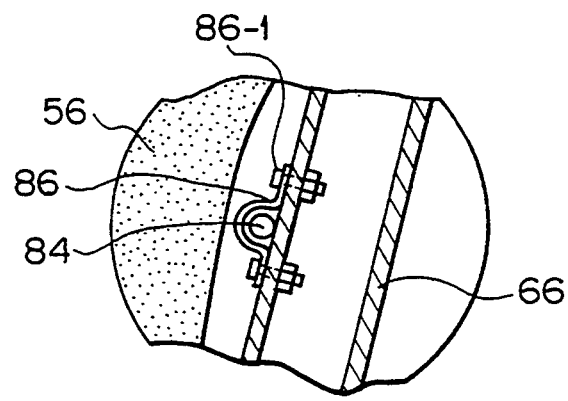
Fig. 3
Fig. 4(B)
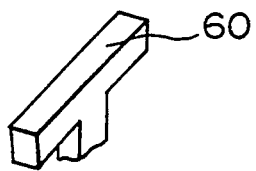
Fig. 4(A)
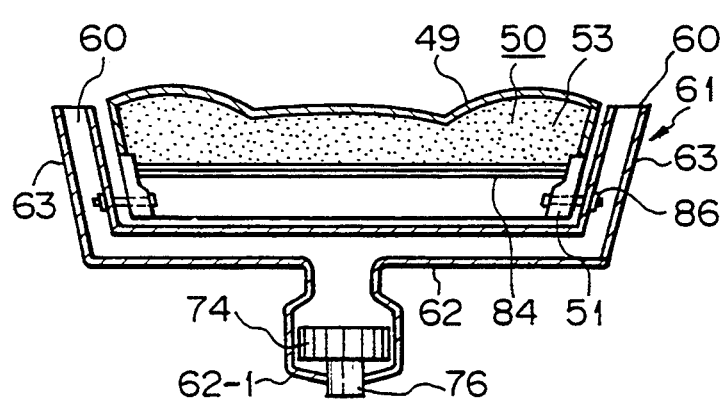

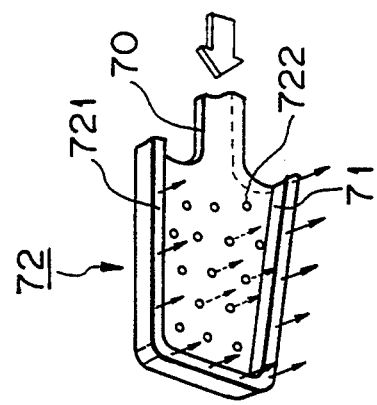
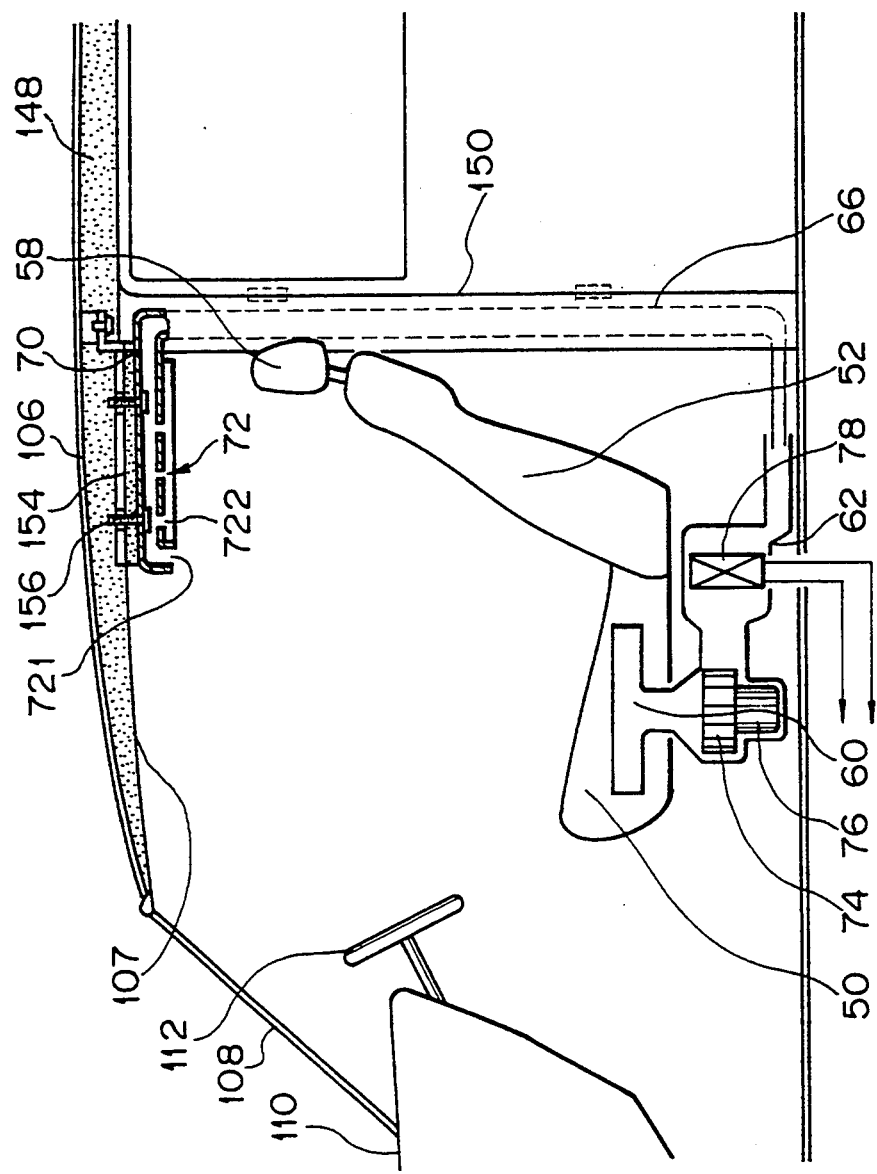
Fig. 30
Fig. 29

TO HEAT SORCE

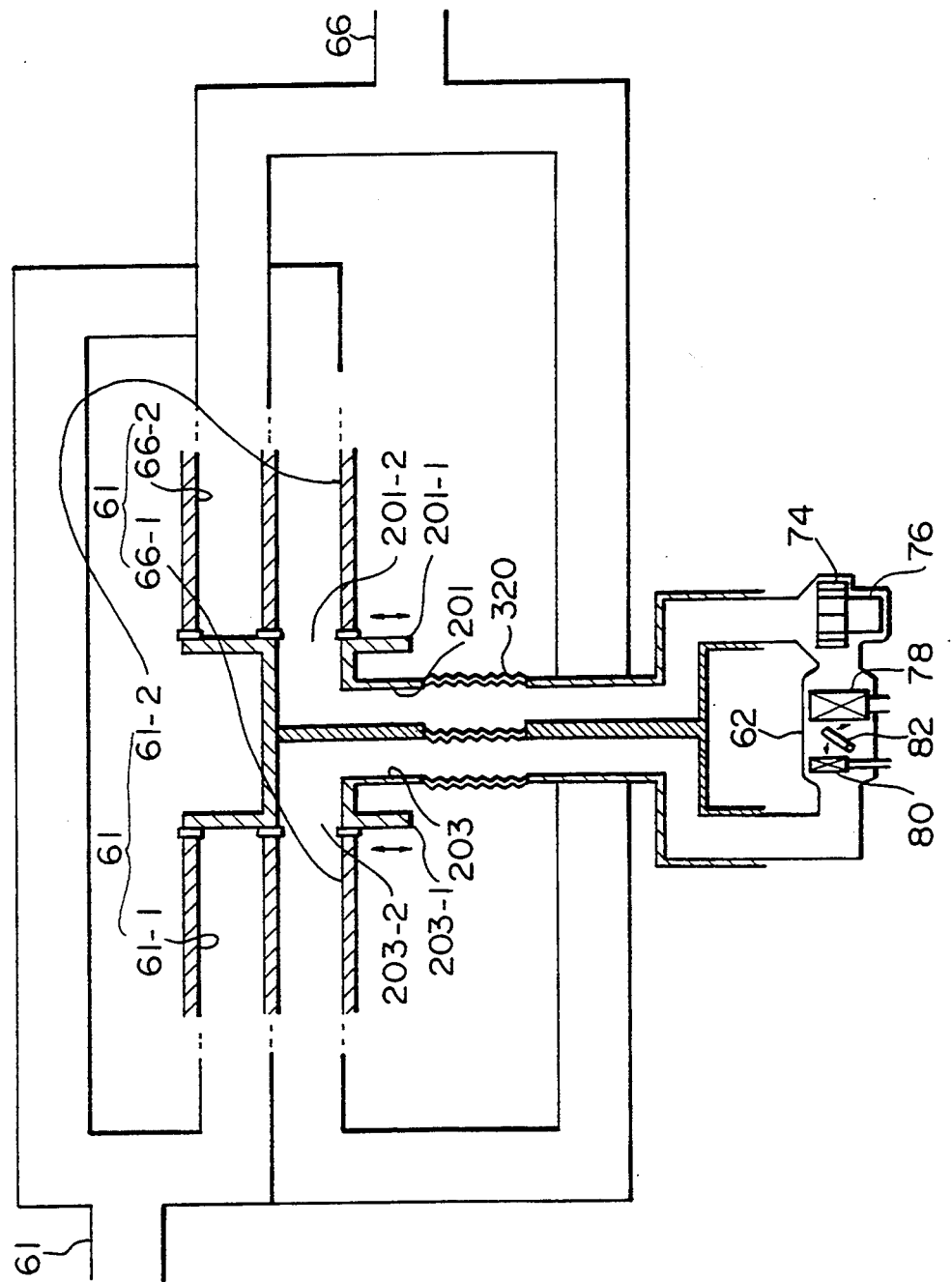

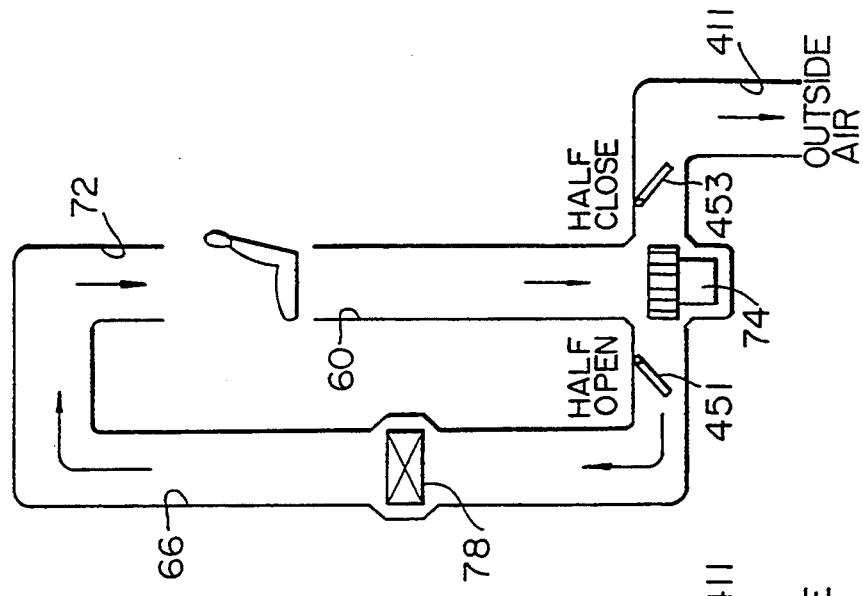
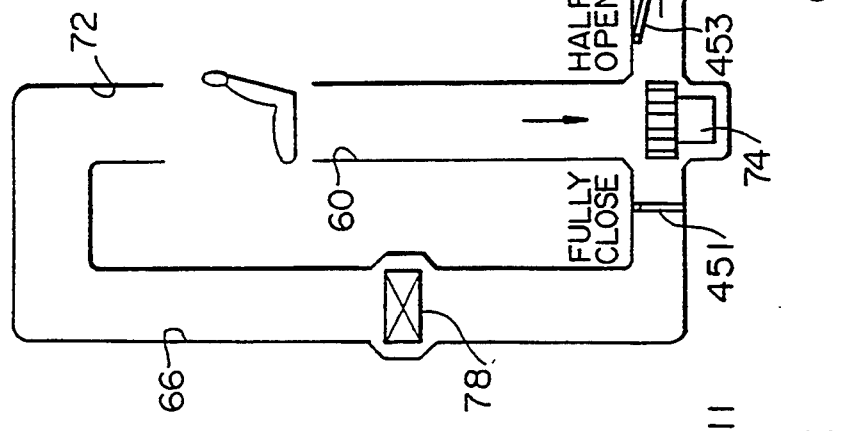
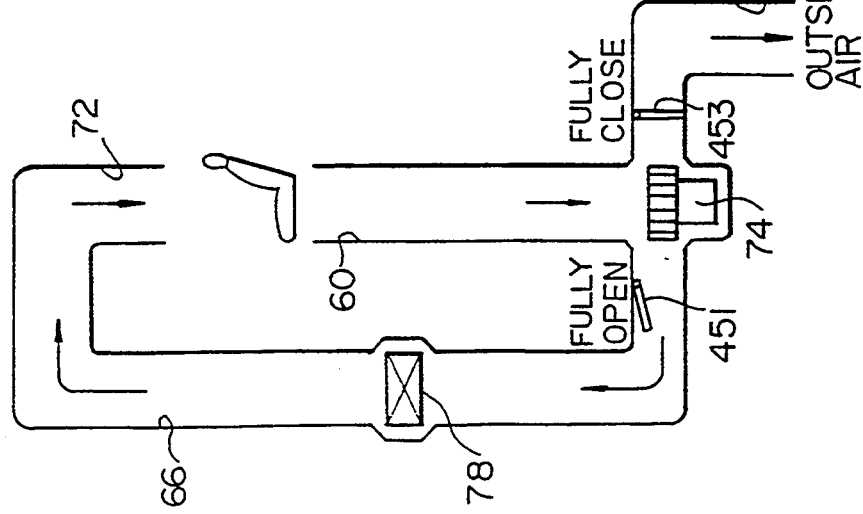

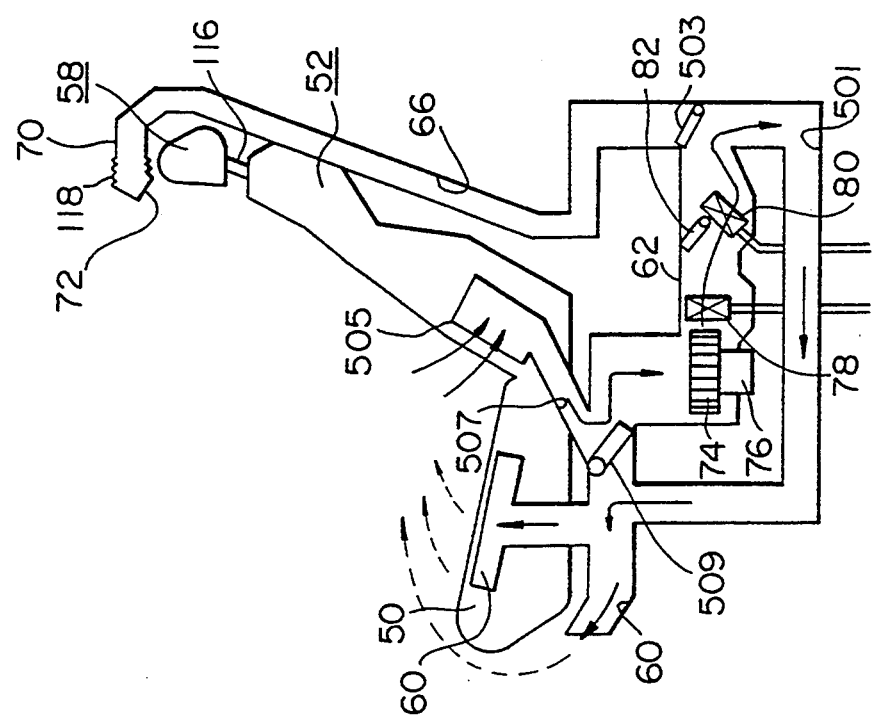
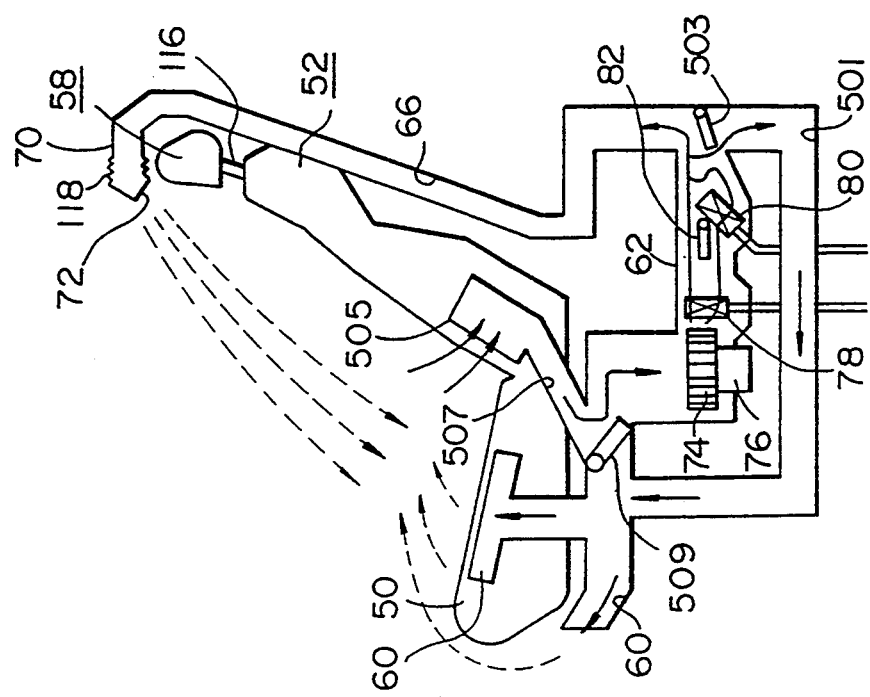

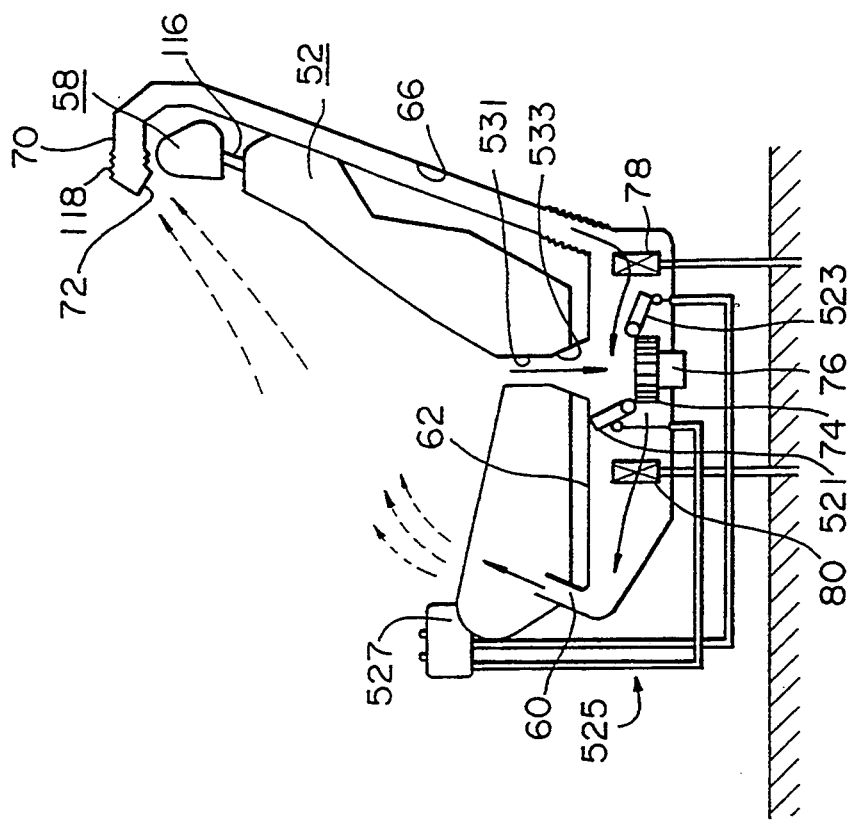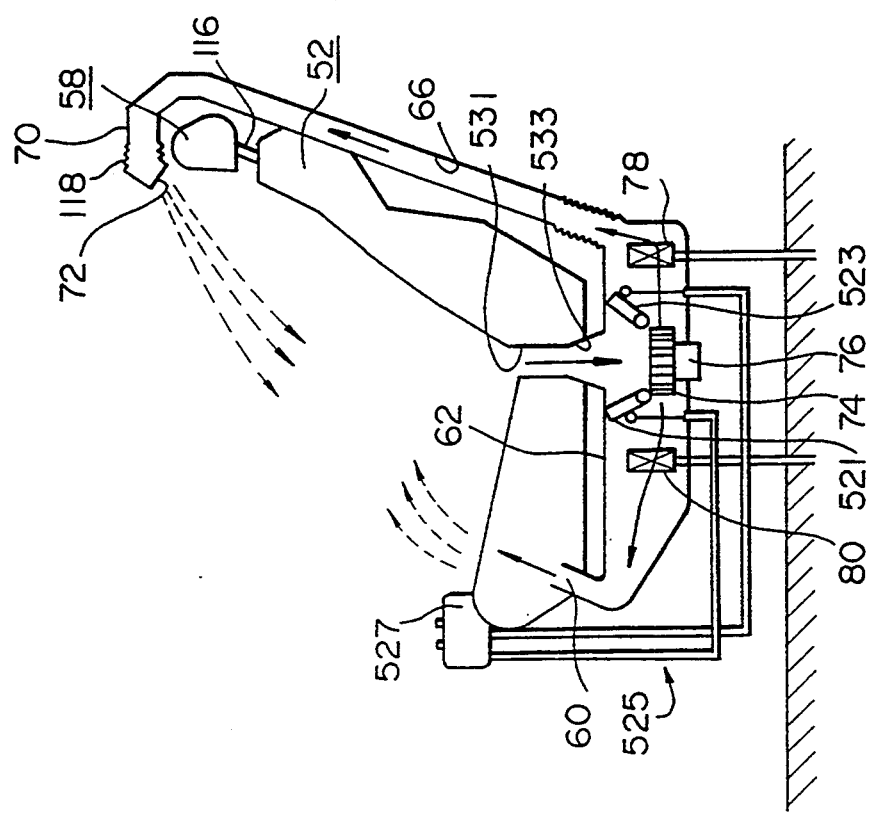

AIR CONDITIONING APPARATUS FOR A VEHICLE

BACKGROUND OF THE INVENTION

1. Field of the Invention

The present invention relates to a system for air conditioning a seat, and more particularly, to a device for air conditioning a space around a seat of an automobile.

2. Description of Related Art

Definition: The term "air conditioning" throughout this specification means to control the temperature of the air in a cabin for a vehicle by cooling or heating the air.

A system for air conditioning an automobile is known, wherein a provision is made for an outside air inlet that is opened to an engine room of the vehicle for introducing air outside the vehicle and an inside air inlet that is opened to a cabin at its front side for introduction of outside air into the cabin. Furthermore, the air conditioning system is provided with a heat exchanging device for cooling or heating the air from the outside air inlet or the inside air inlet, and with an air discharge outlet on the dash panel at the front of the cabin for discharging the air-conditioned air into the cabin. The air from the air discharge outlet is discharged so that it flows throughout the entire cabin area irrespective of passengers in the vehicle.

A Japanese Un-Examined Patent Publication 2-239811 discloses an air conditioning system that has a plurality of air discharge outlets on a seat for discharging air conditioned air from a surface of the seat. The introduction of an air flow to be subjected to the heat exchange is, similar to the prior art as mentioned above, carried out by way of the outside air inlet opened to the engine room or the inside air inlet opened to the cabin at the front thereof, and the air from the plurality of air discharge outlets is directed to the area around the respective seats for air conditioning, after which the air flows throughout the entire cabin area. The air flowing in the cabin is subjected to a heat exchange with portions of the cabin, such as the walls of the cabin. As a result of the heat exchange, the temperature of the air is increased, which is re-introduced into the air conditioning system and subjected to the heat exchange to be air conditioned, or is discharged to the outside of the automobile via an air outlet opening at the rear of the cabin.

The prior art air conditioning systems are disadvantageous in that extra power is consumed, which is sometimes greater than that required to make a driver and/or passenger(s) comfortable, which means that excessive power is consumed by the air conditioning system, thereby resulting in a reduction in the power consumption efficiency of the engine.

SUMMARY OF THE INVENTION

An object of the present invention is to provide an air conditioning system for an automobile, capable of increasing the power consumption efficiency of the engine.

According to the present invention, a system is provided for air conditioning a vehicle having a cabin in which at least one air conditioned seat is provided; said air conditioning system comprises:

a first duct having a first opening opened to the cabin at a location adjacent the seat portion of the seat;

a second duct having a second opening opened to the cabin at a location higher than the first opening;

means for creating, between said first opening and said second opening, a forced flow of air for air conditioning an area only around the seat, in such a manner that the air flow is discharged from one of the first and second openings and received by the other opening, and;

heat exchanging means for heat exchanging the air flow after the same passes through said area with an air conditioning medium for controlling the temperature of the air subjected to the air conditioning at said area.

According to the present invention only the area around the person sitting in the respective seat is subjected to air conditioning, resulting in increased efficiency because quick control of the target temperature can be attained. Furthermore, the cooling volume as desired can be reduced, thereby increasing the power efficiency.

BRIEF DESCRIPTION OF ATTACHED DRAWINGS

FIG. 2 is partial view of a portion of the head rest in FIG. 1.

FIG. 3 illustrates how an intermediate duct is mounted.

FIG. 4(A) is a cross sectional view taken along line IV—IV in FIG. 1.

FIG. 4(B) is a schematic view of the inlet port.

Figure 5:
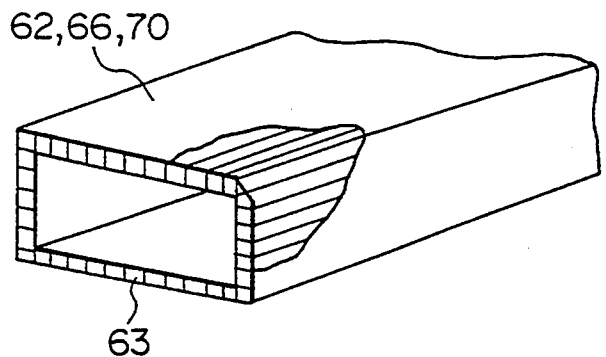

FIG. 5 schematically shows the construction of a duct.

Figure 6:
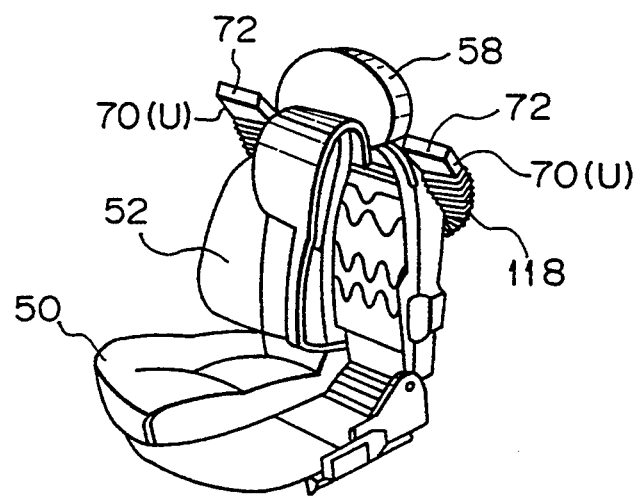

FIG. 6 is a perspective view of a seat illustrating an arrangement of a discharge outlet.

Figure 7:
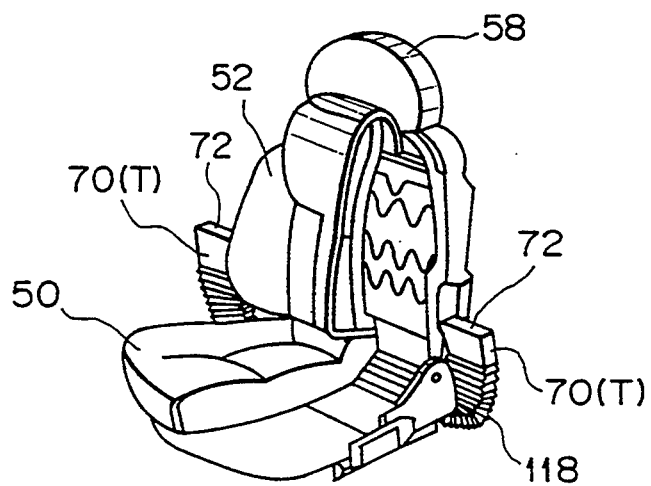
Figure 8:
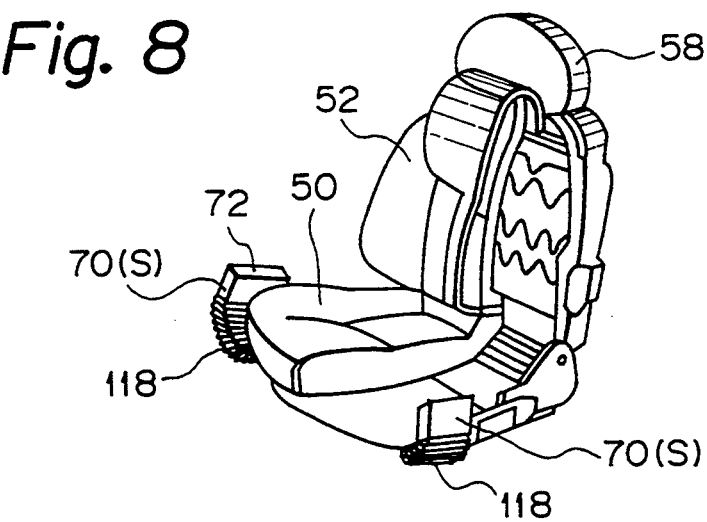
Figure 9A:
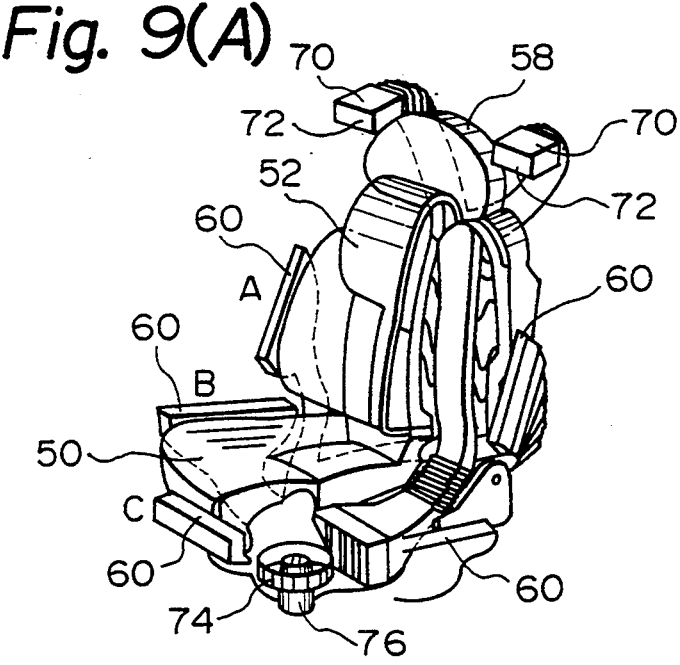

FIGS. 7, 8 and 9(A) are similar to FIG. 6, but are directed to other respective embodiments.

Figure 9B:
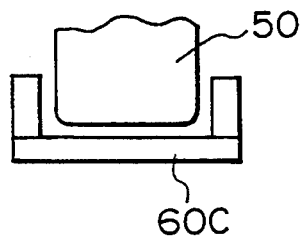

FIG. 9(B) is a schematic view of an outlet in FIG. 9(A).

Figure 10:
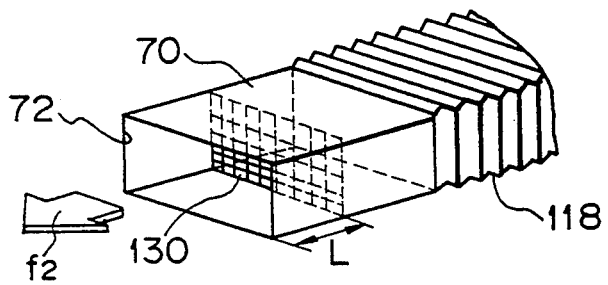

FIG. 10 is a schematic partial view of the top duct at a region near the discharge opening.

Figure 11:
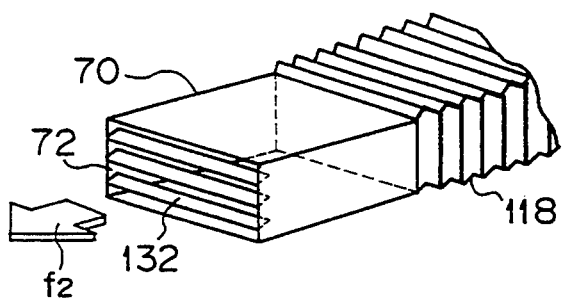
Figure 12:
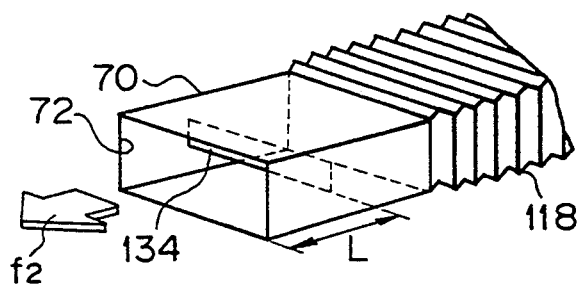

FIGS. 11 and 12 are similar to FIG. 10 but are directed to different embodiments.

Figure 13:
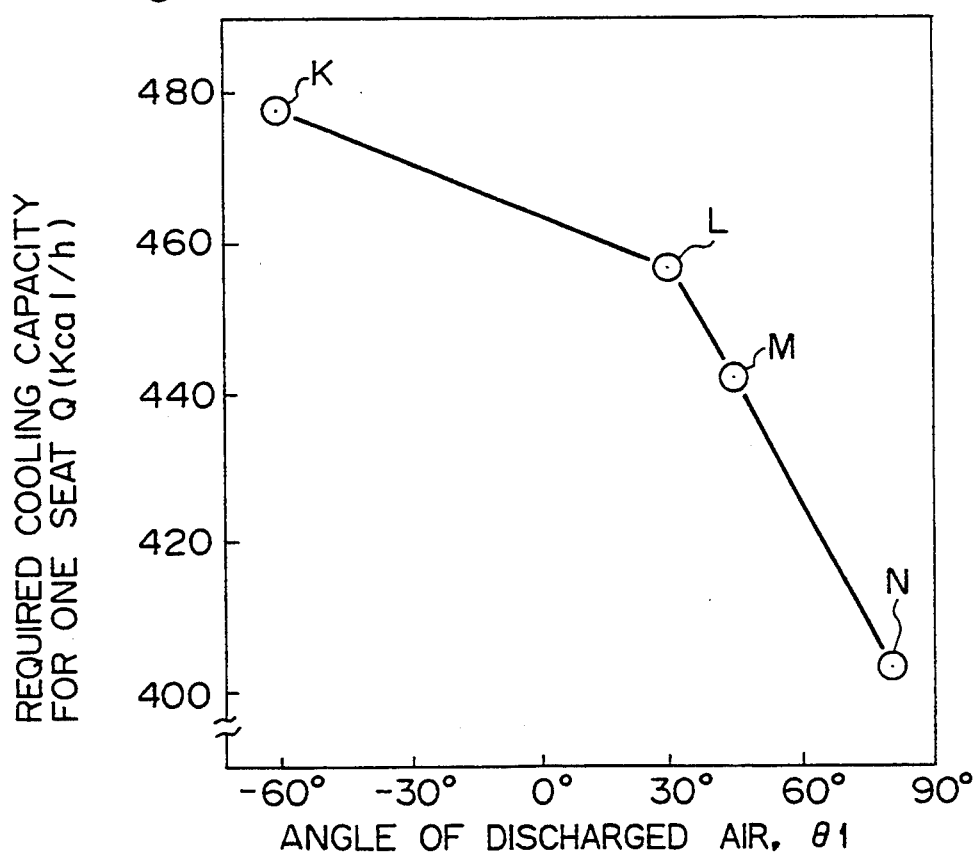

FIG. 13 shows a relationship between an angle of discharge of the air and a required cooling capacity for one seat.

Figure 14:
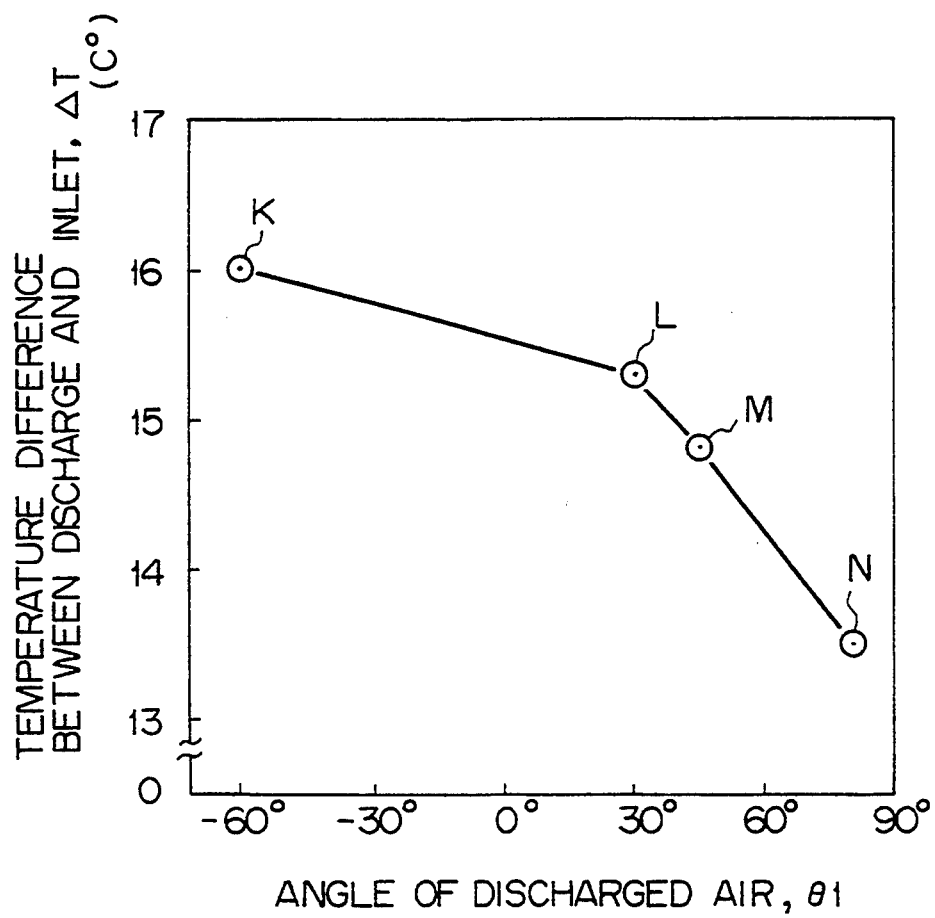

FIG. 14 shows a relationship between an angle of discharge of the air and a temperature difference between the outlet and the inlet.

Figure 15:
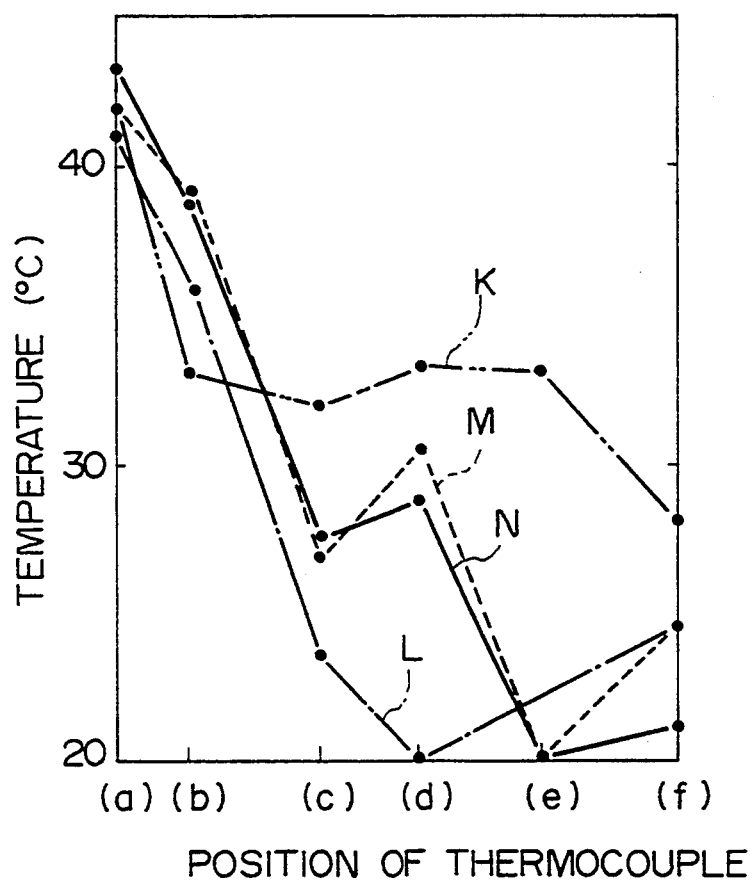

FIG. 15 shows a relationship between a position of a thermocouple in a horizontal direction and the detected temperature with respect to various values of a discharge air angle.

Figure 16:
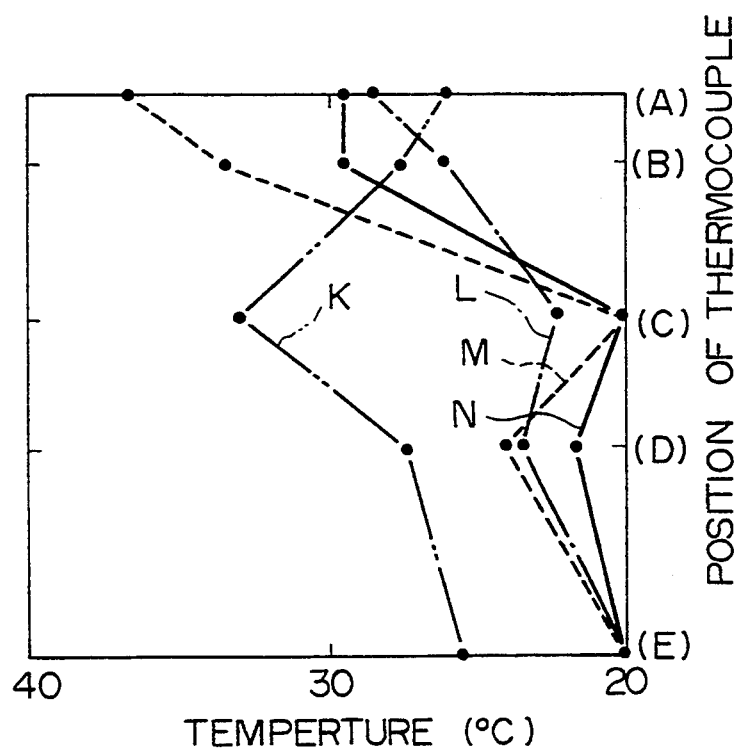

FIG. 16 shows the detected temperature in a vertical direction and a relationship between a position of a thermocouple with respect to various values of a discharge air angle.

Figure 17:
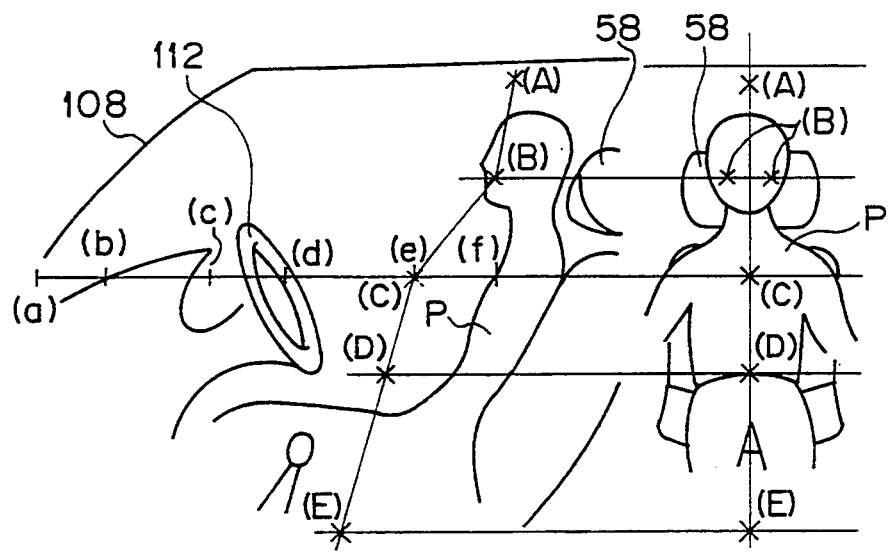

FIG. 17 illustrates a distribution of locations where temperature values are sampled.

Figure 18:
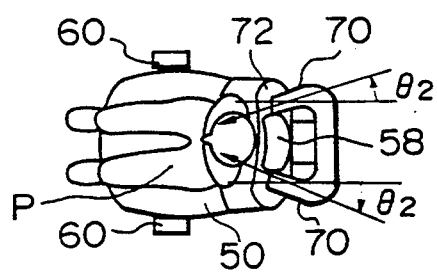

FIG. 18 shows a top view of a seat illustrating how the discharge angle is measured.

Figure 19:
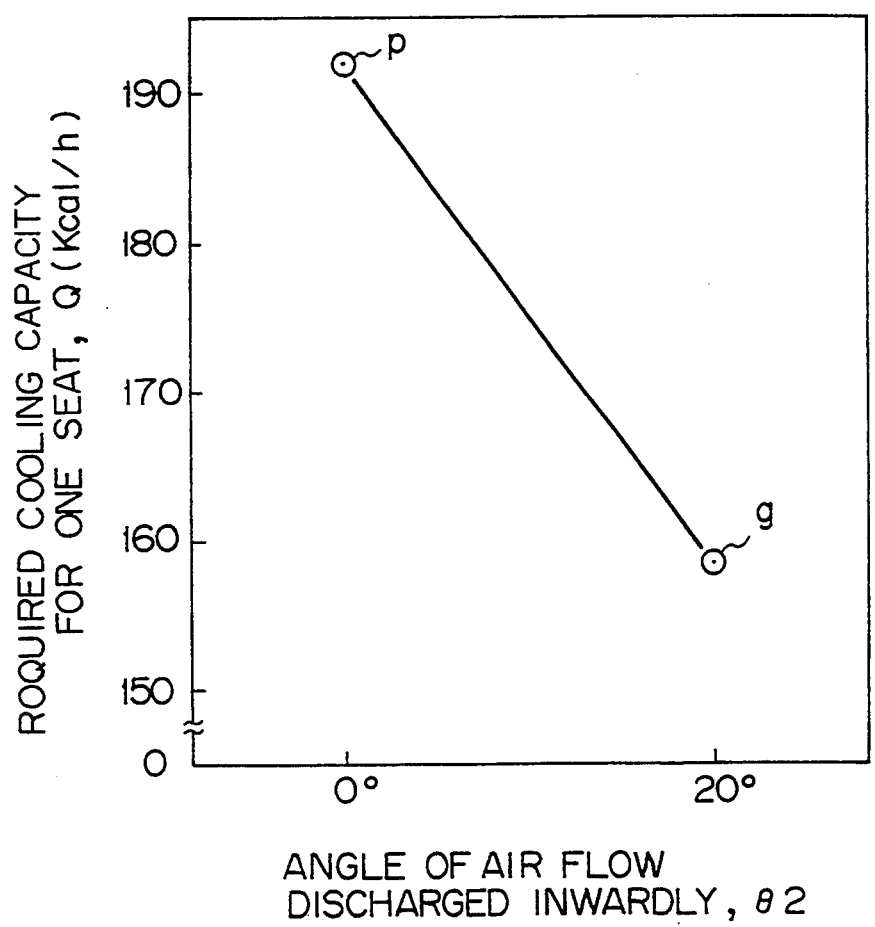

FIG. 19 shows a relationship between an inwardly directed angle of the discharge of air and a required cooling capacity for one seat.

Figure 20:
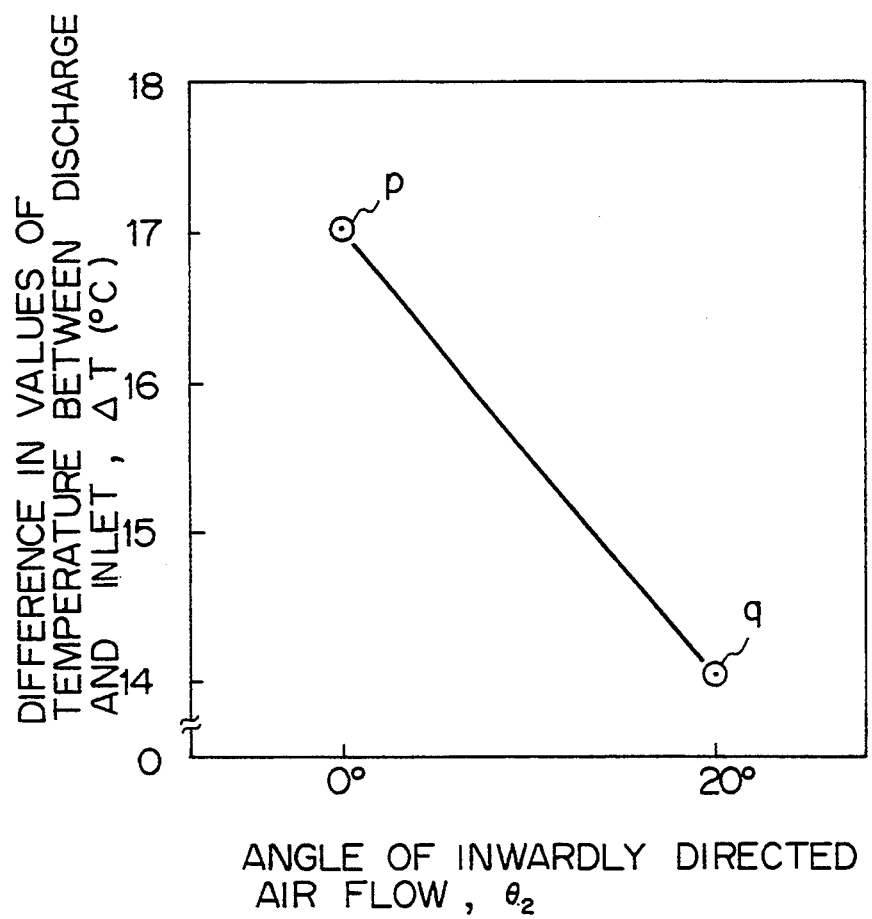

FIG. 20 shows a relationship between an inwardly directed angle of the discharge of air and a temperature difference between the outlet and the inlet.

Figure 21:
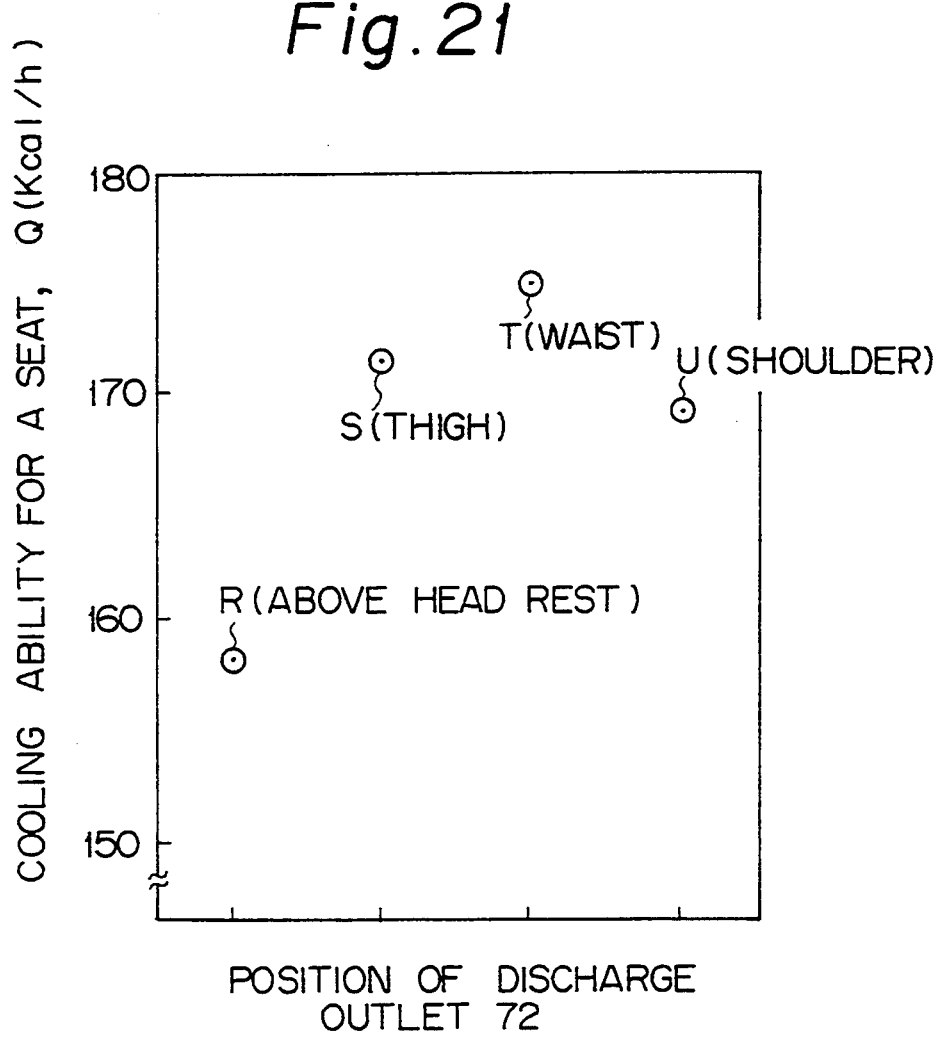

FIG. 21 shows a relationship between the position of the discharge outlet and a required cooling capacity at a seat.

Figure 22:
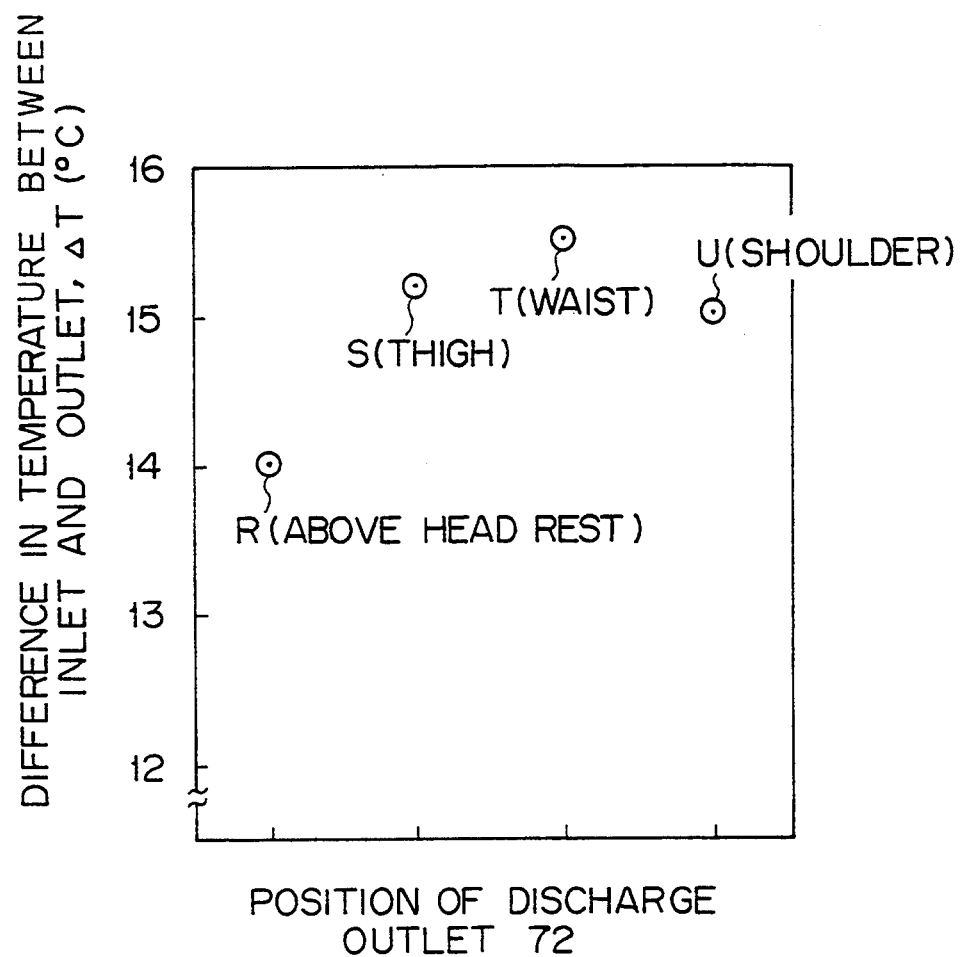

FIG. 22 shows a relationship between the position of the discharge outlet and a temperature difference between the outlet and the inlet.

Figure 23:
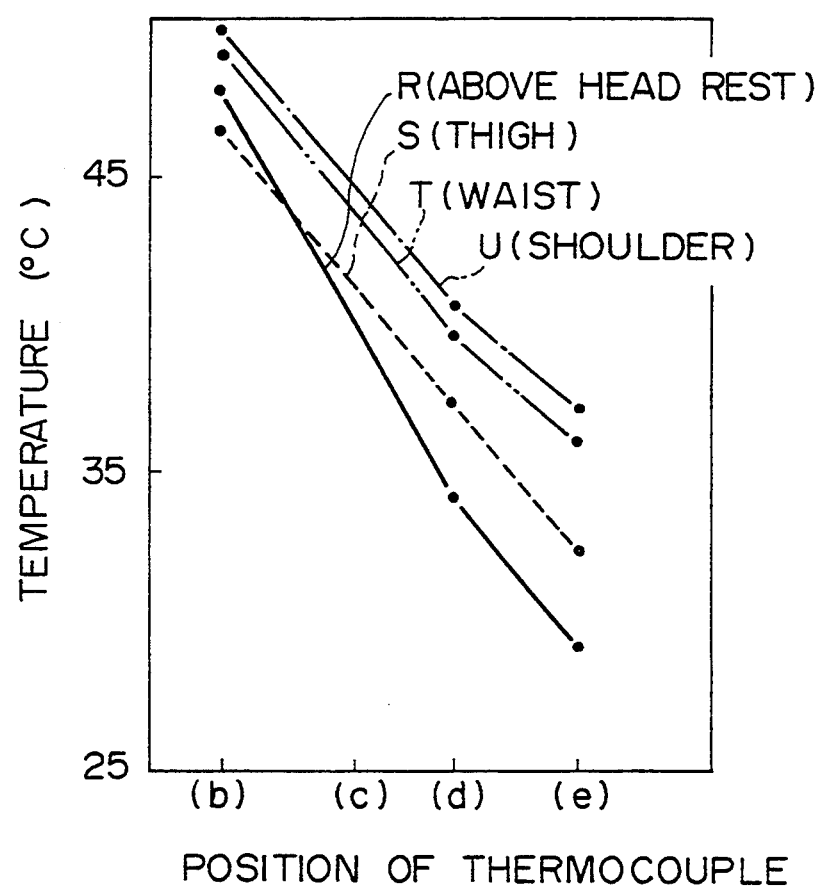

FIG. 23 shows a relationship between the position of the thermocouple in a horizontal direction and the detected temperature with respect to various positions of the discharge outlet.

Figure 24:
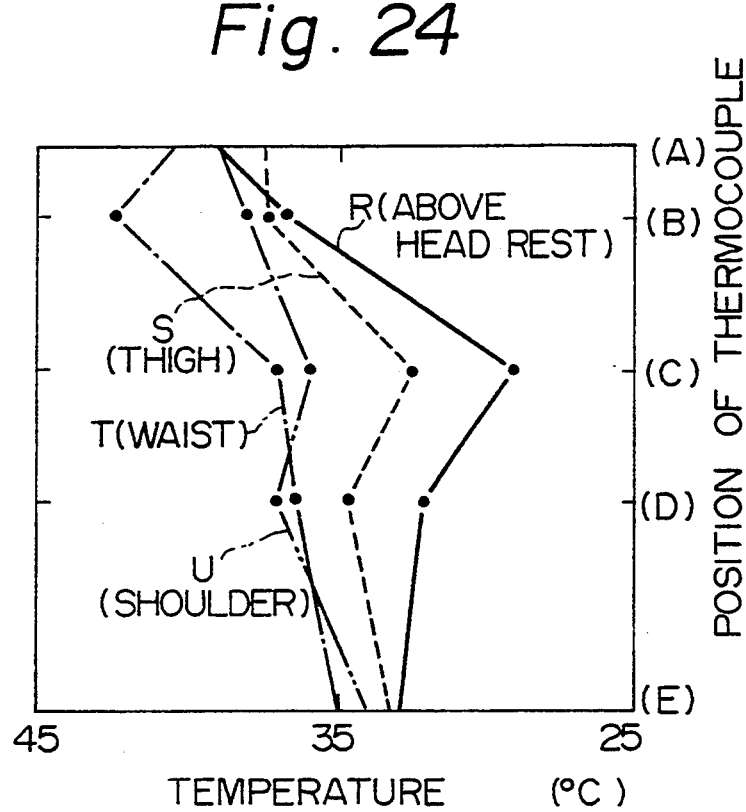

FIG. 24 shows a relationship between the position of the thermocouple in a vertical direction and the detected temperature with respect to various positions of the discharge outlet and the inlet.

Figure 25:
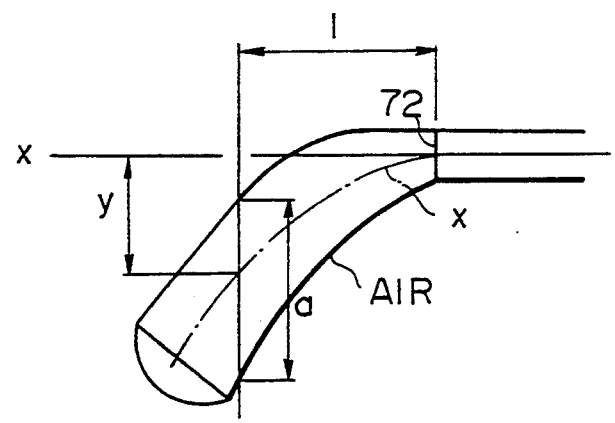

FIG. 25 shows schematically how the discharge air flow is directed.

Figure 26:
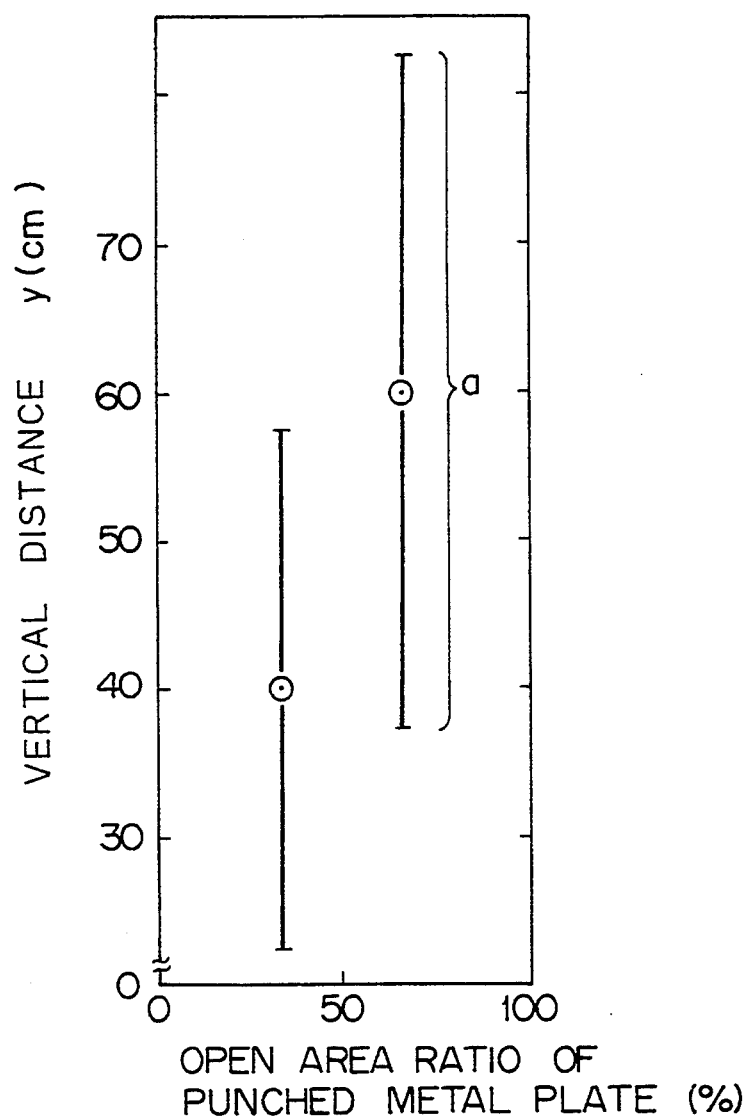

FIG. 26 shows the relationship between the open area ratio of the punched plate provided at the discharge outlet and the vertical displacement of the air flow from the discharge outlet.

Figure 27:
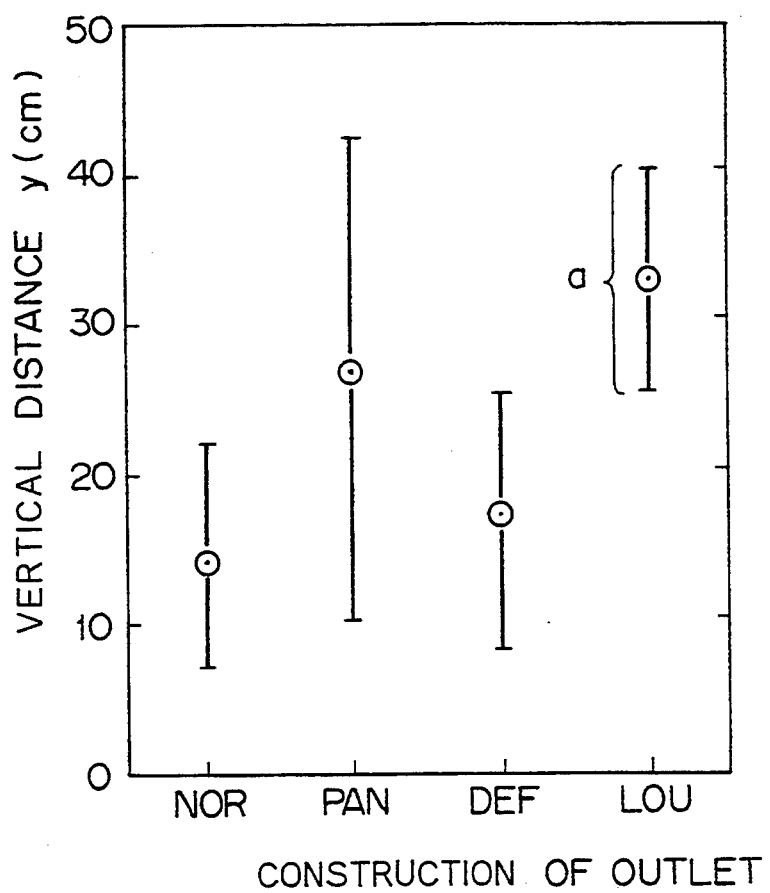

FIG. 27 shows the relationship between the shape of the discharge outlet and the vertical displacement of the air flow from the discharge outlet.

Figure 28:
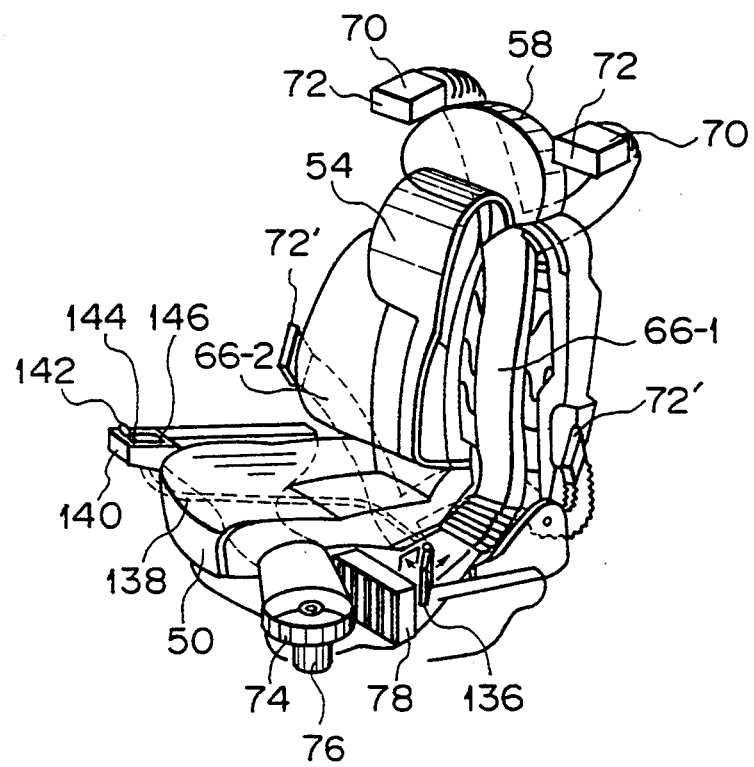

FIG. 28 shows a seat in a second embodiment.

FIG. 29 shows a third embodiment.

FIG. 30 shows the construction of the outlet opening in the third embodiment.

Figure 31:
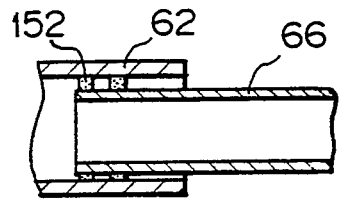

FIG. 31 shows a telescopic construction of the intermediate duct.

Figure 32:
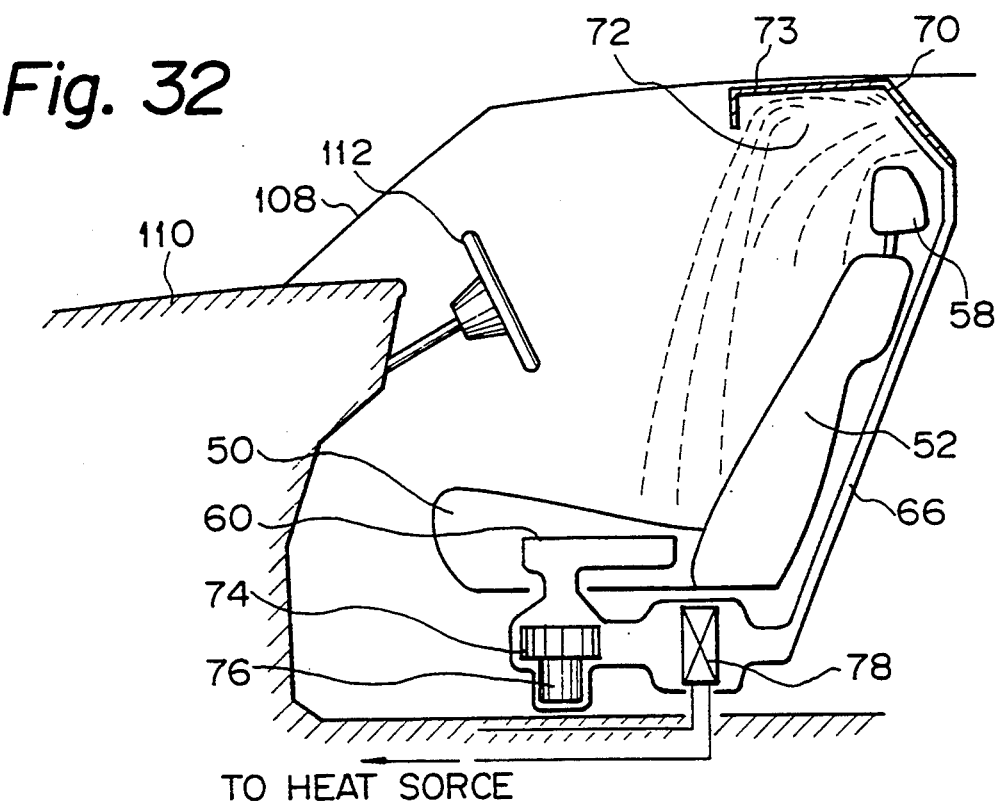

FIG. 32 shows a fourth embodiment.

Figure 33:
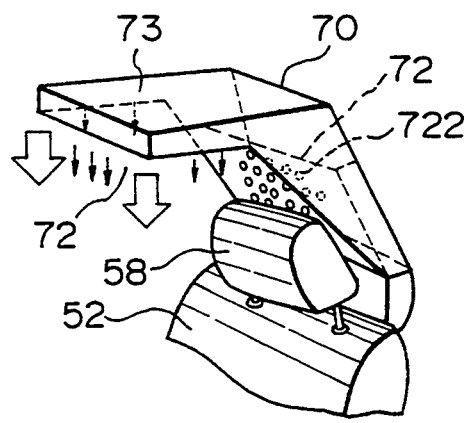

FIG. 33 shows the construction of the discharge outlet in the embodiment in FIG. 32.

Figure 34:
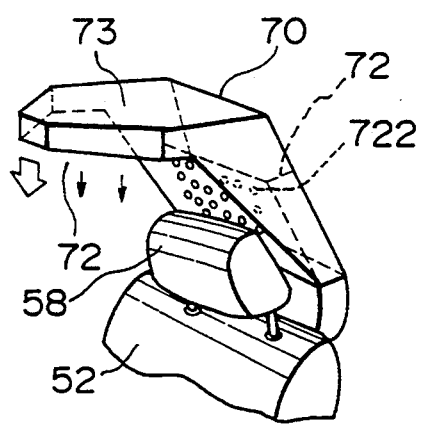
Figure 35:
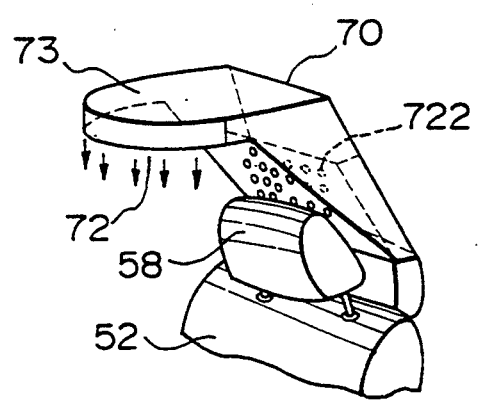

FIGS. 34 and 35 are similar to FIG. 33, but show respective modifications.

Figure 36:
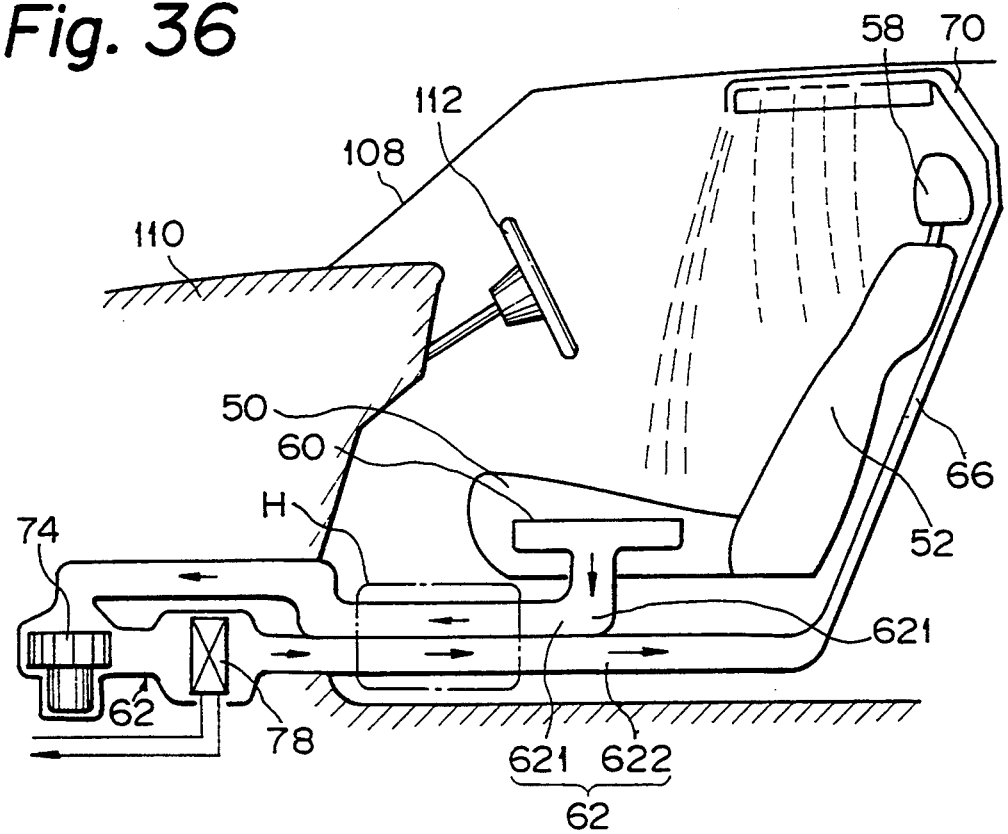

FIG. 36 shows a fifth embodiment.

Figure 37:
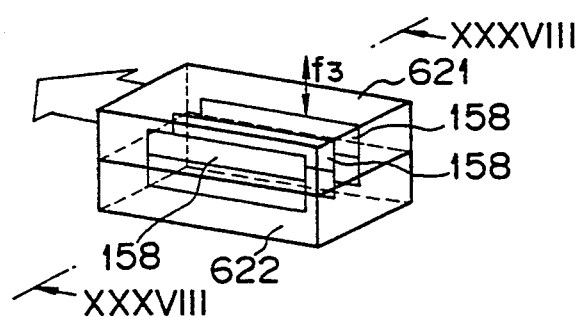

FIG. 37 is a detailed view of a portion in FIG. 36 designated by H.

Figure 38:
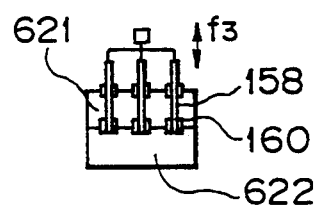

FIG. 38 is a cross sectional view taken along line XXXVIII—XXXVIII in FIG. 37.

Figure 39:
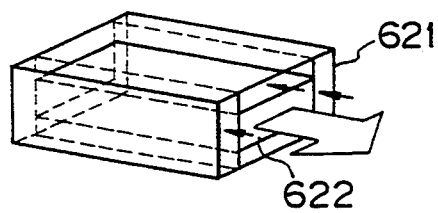

FIG. 39 is similar to FIG. 37 but is directed to a thereof.

Figure 40:
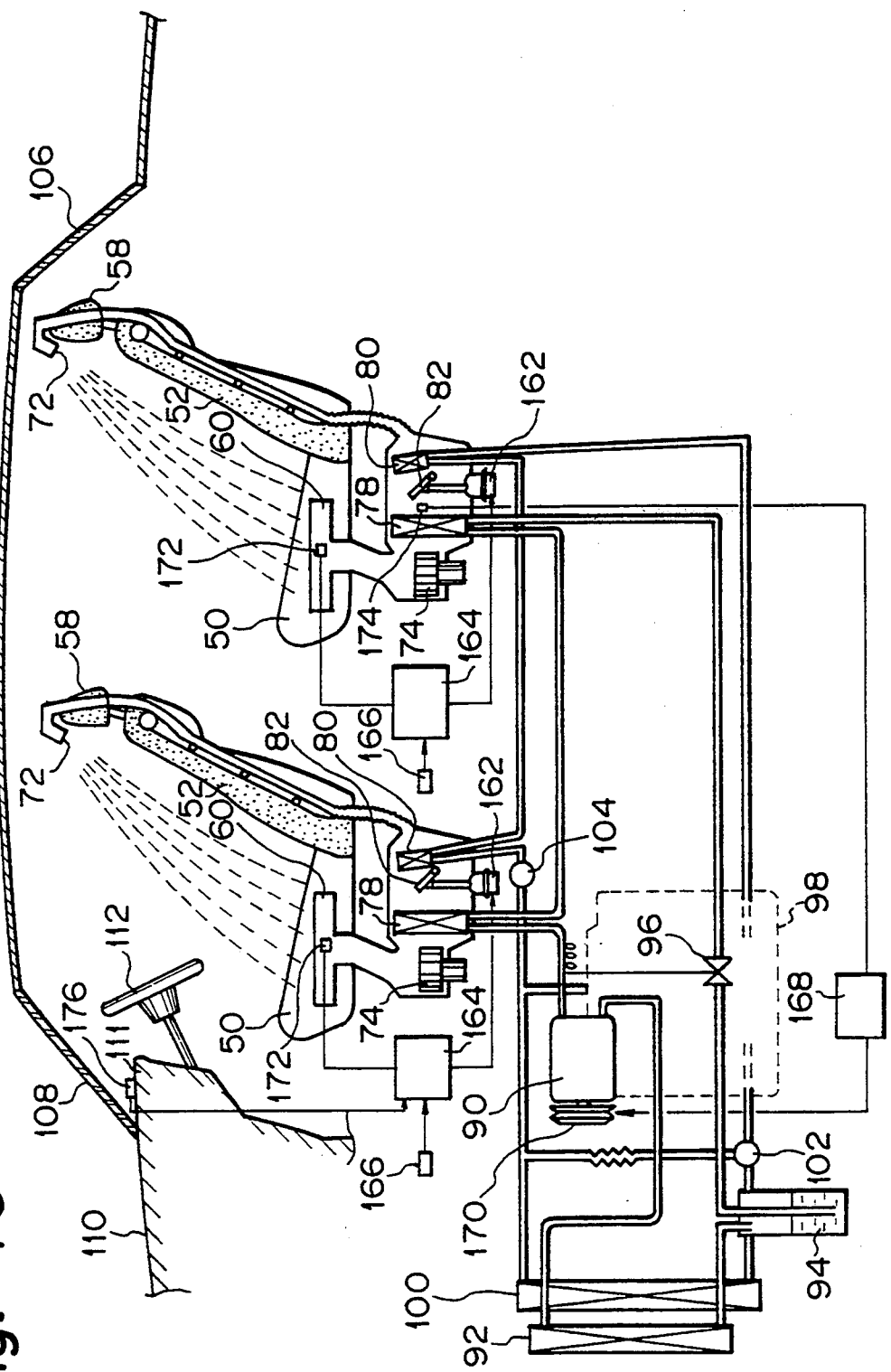

FIG. 40 shows a sixth embodiment.

Figure 41:
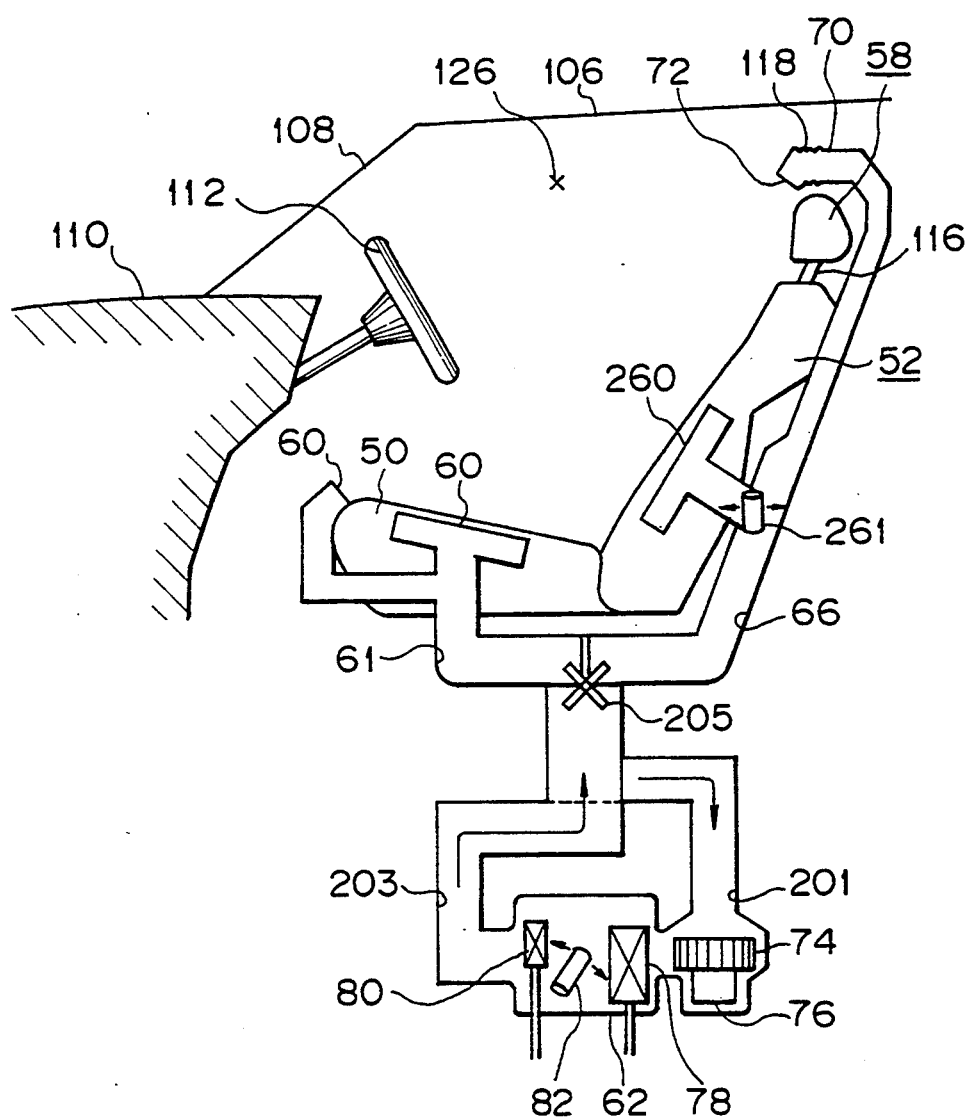

FIG. 41 shows a seventh embodiment.

Figure 42A:
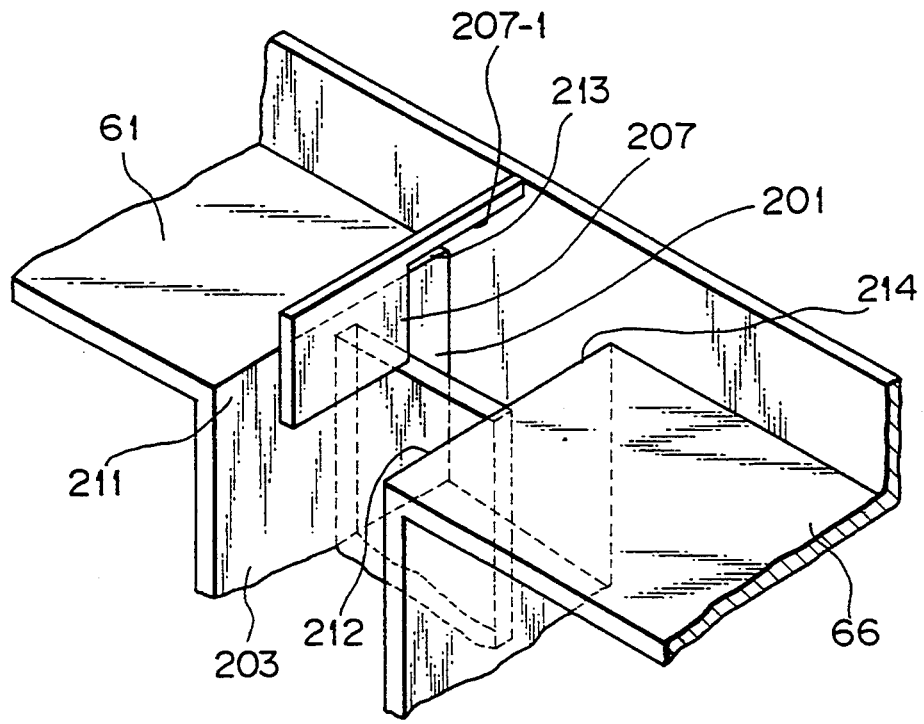

FIGS. 42(A) and (B) are schematic views of a duct and a valve member, respectively, forming a switching valve in FIG. 41.

Figure 43:
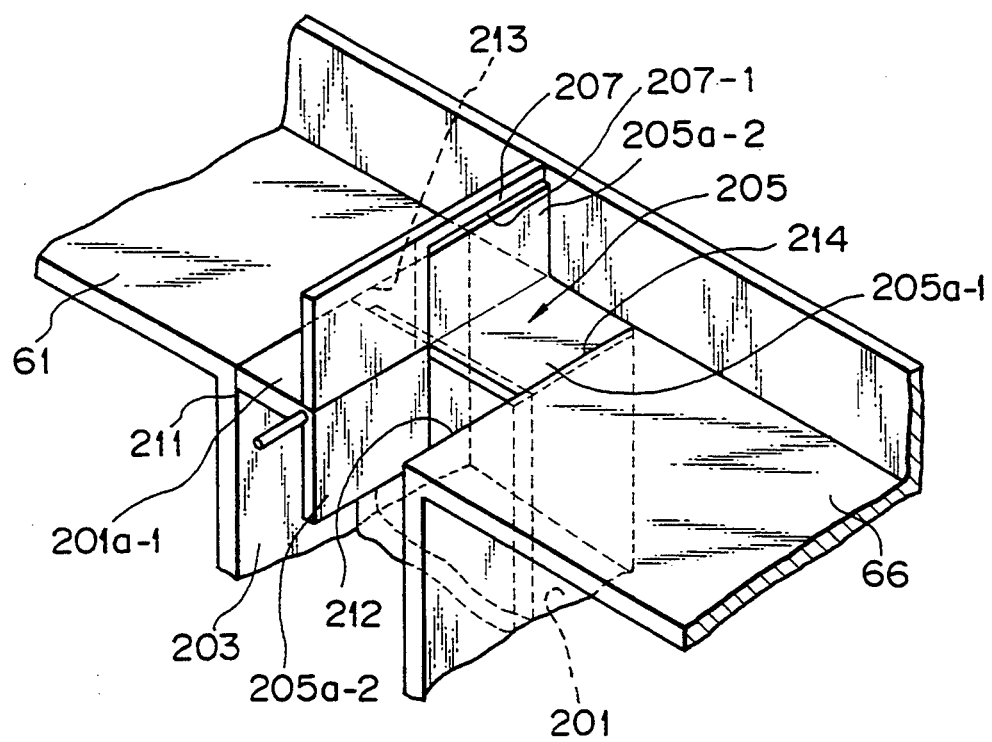

FIG. 43 is a perspective view of the switching valve in FIG. 41 in an assembled state.

Figure 44A:
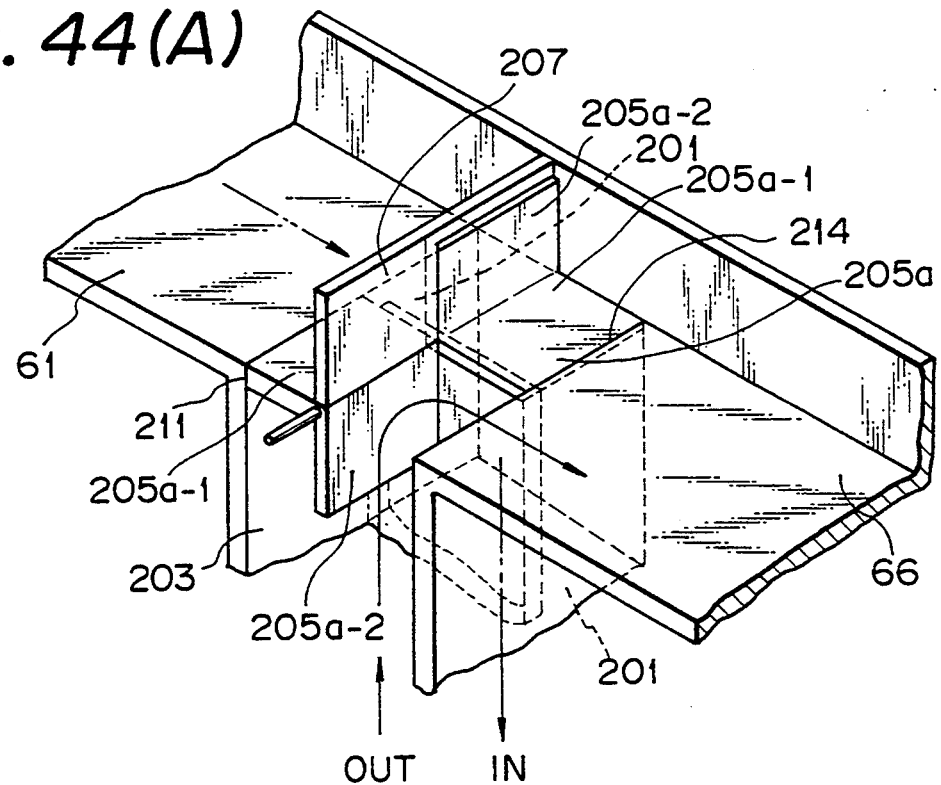

FIGS. 44(A) and (B) show first and second positions, respectively of the valve in FIG. 43.

Figure 45:
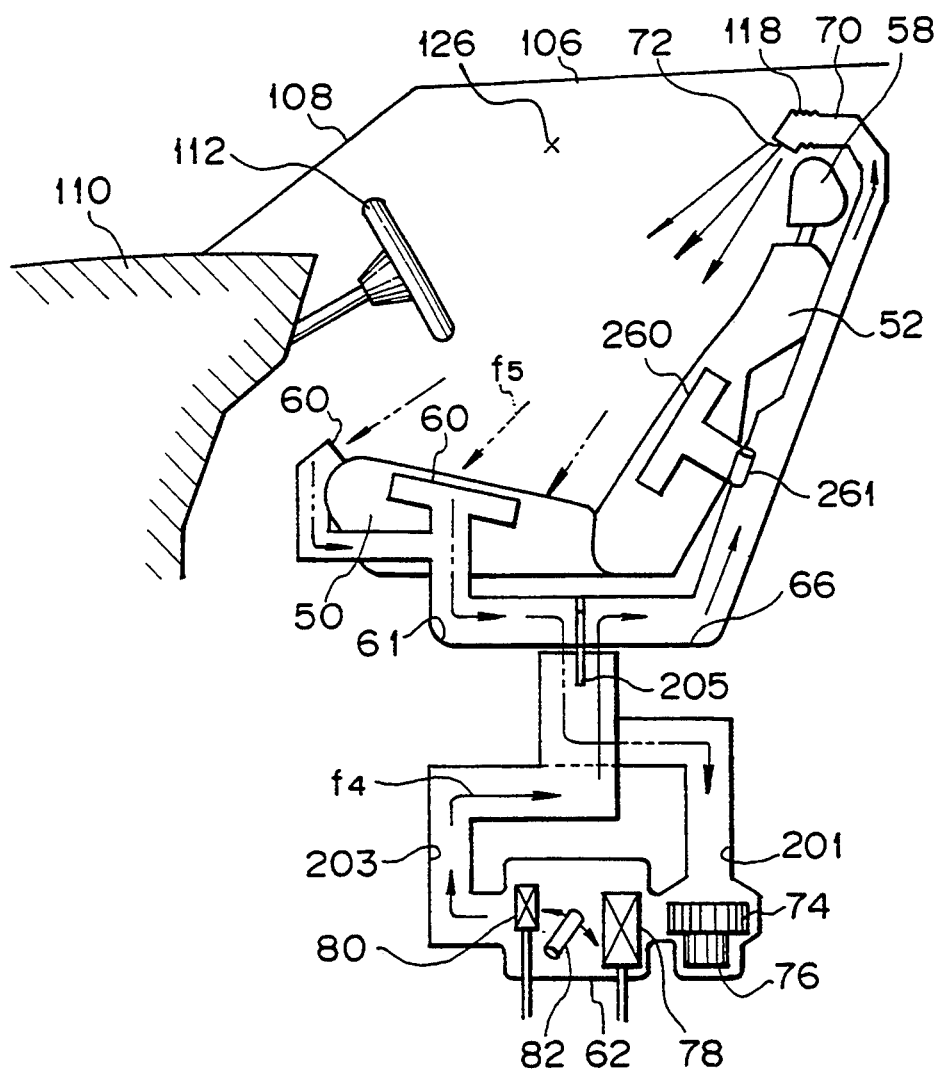
Figure 46:
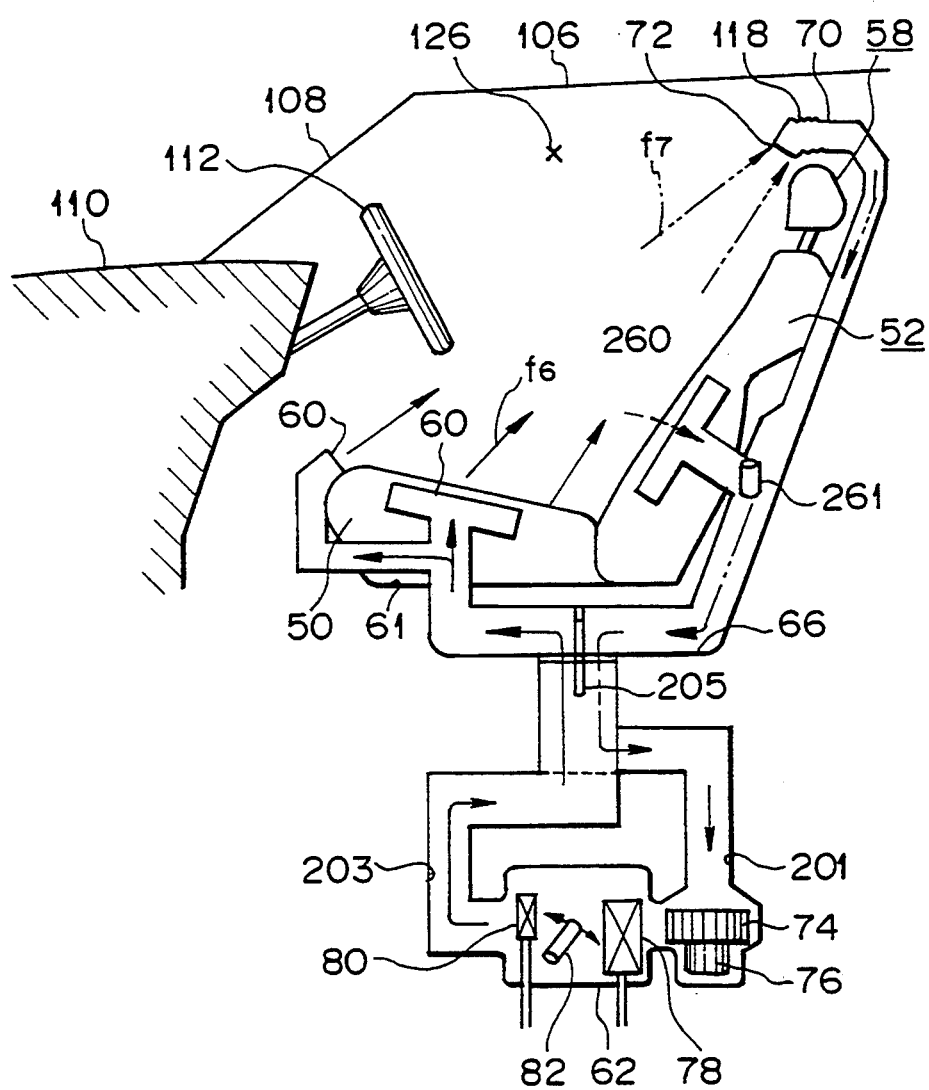

FIGS. 45 and 46 are similar to FIG. 41 but is explanatory of its operation under different conditions, respectively.

Figure 47A:
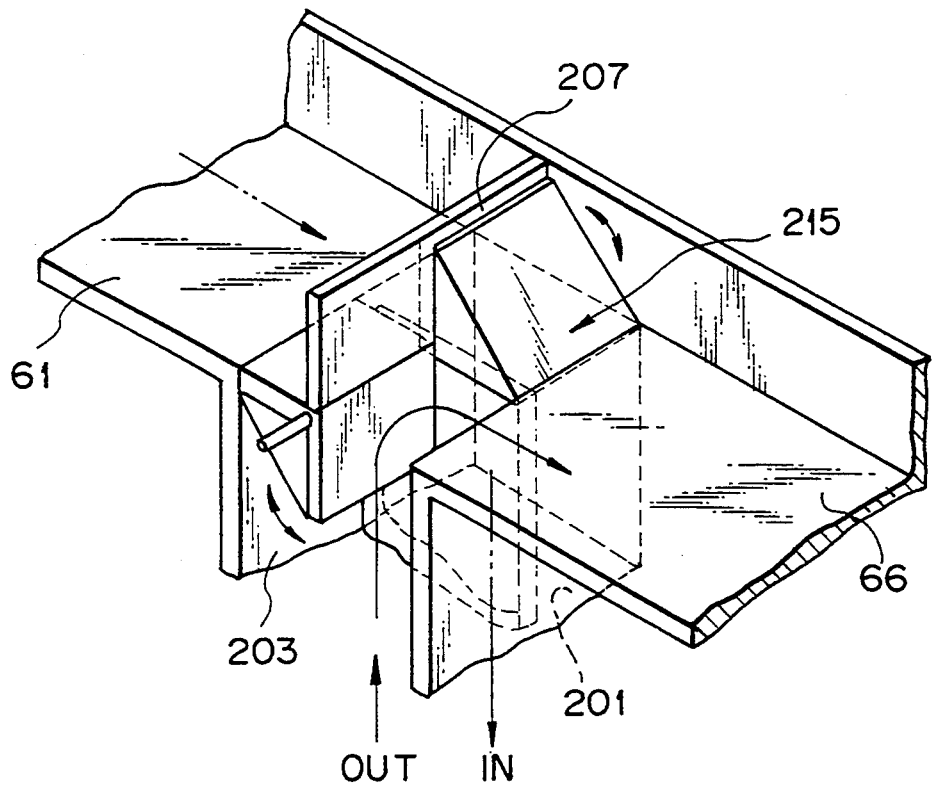

FIGS. 47(A) and (B) are schematic perspective views of a switching device and its valve member, respectively in the 8th embodiment.

Figure 48A:
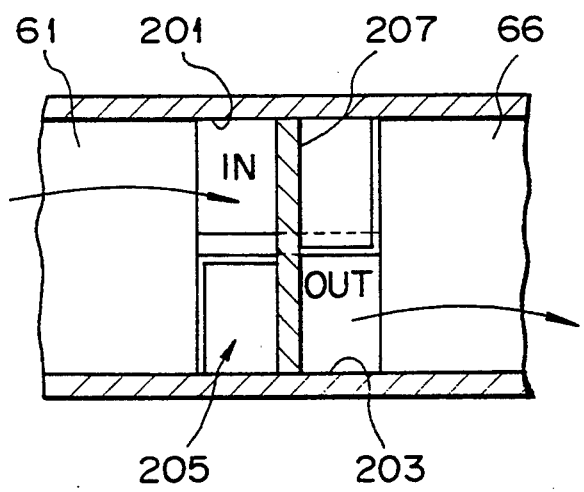

FIGS. 48(A) and (B) show top views of the switching valve in FIG. 48 under different positions, respectively.

Figure 49A:
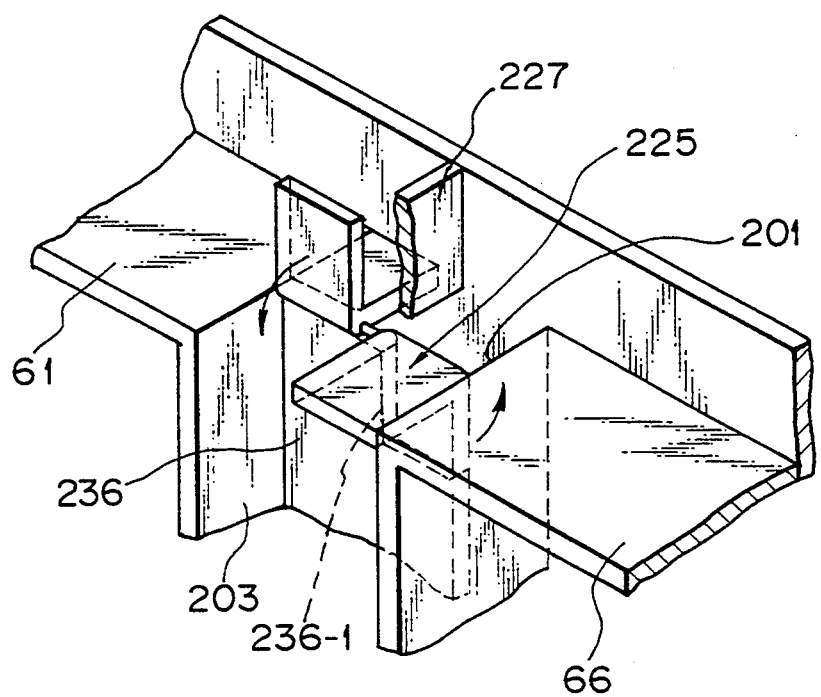

FIGS. 49(A) and (B) are schematic perspective views of a switching valve and its valve member, respectively, in the 9th embodiment.

Figure 49B:
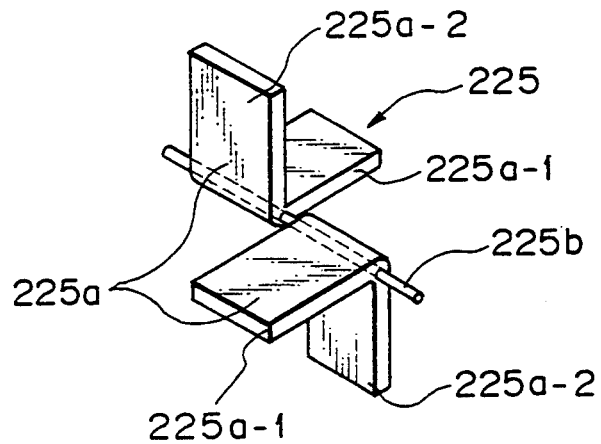
Figure 50A:
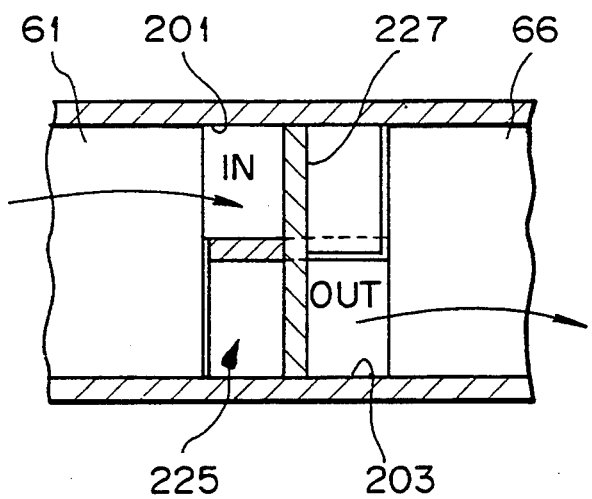

FIGS. 50(A) and (B) show top views of the switching valve in FIG. 49 under different positions, respectively.

Figure 51A:
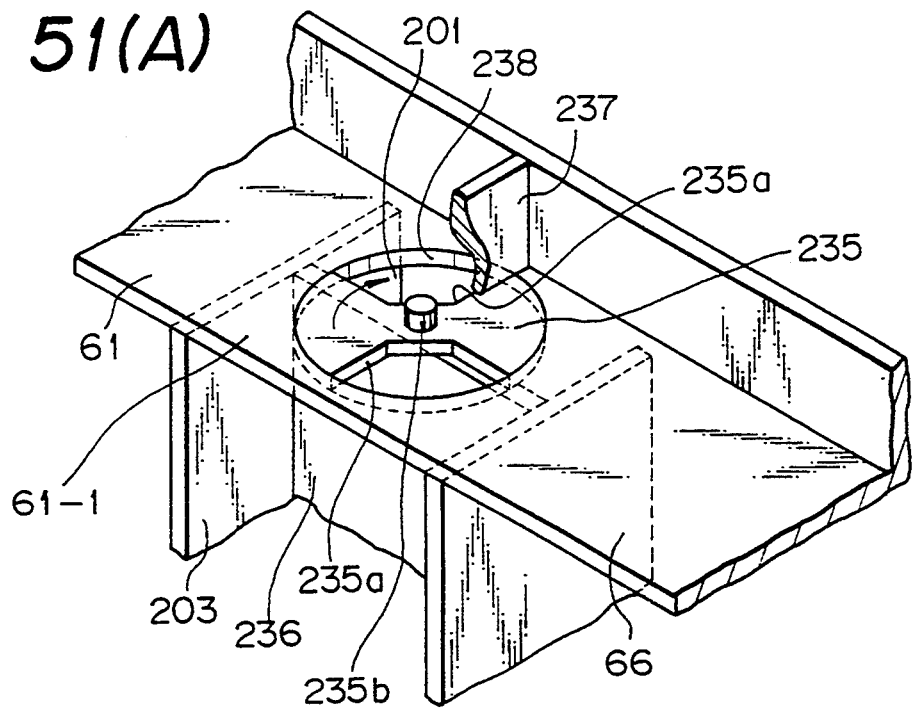

FIG. 51(A) is a schematic perspective view of the switching valve of the 10th embodiment.

Figure 51B:
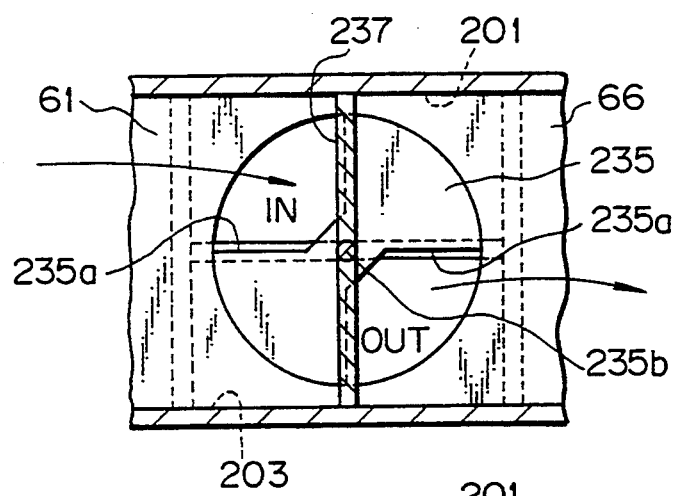

FIGS. 51(B) and (C) show top views of the switching valve in FIG. 51(A).

Figure 52A:
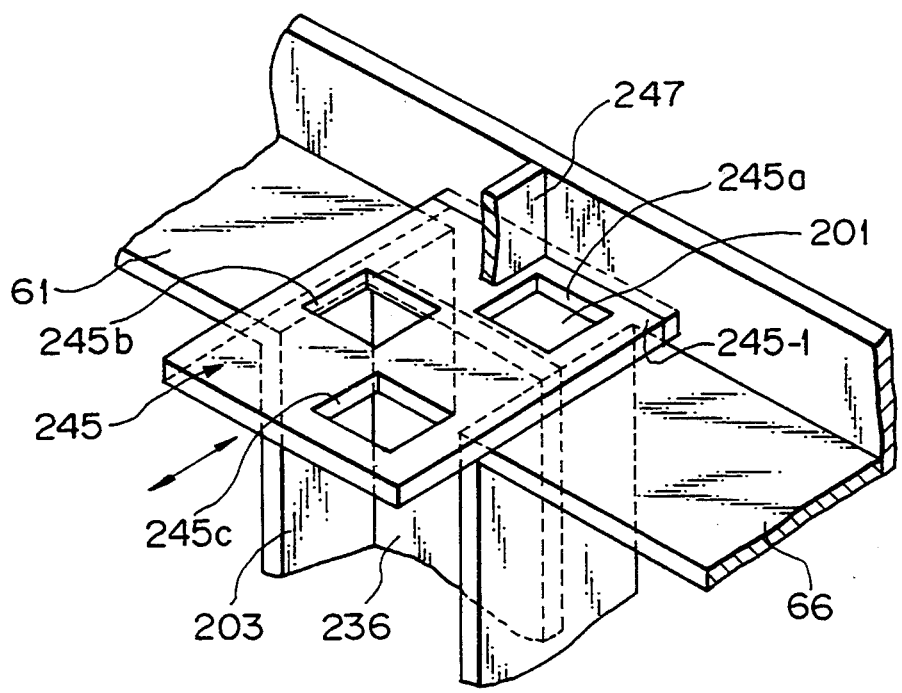

FIGS. 52(A) and (B) are schematic perspective views of a switching valve and its valve member, respectively, in the 11th embodiment.

Figure 52B:
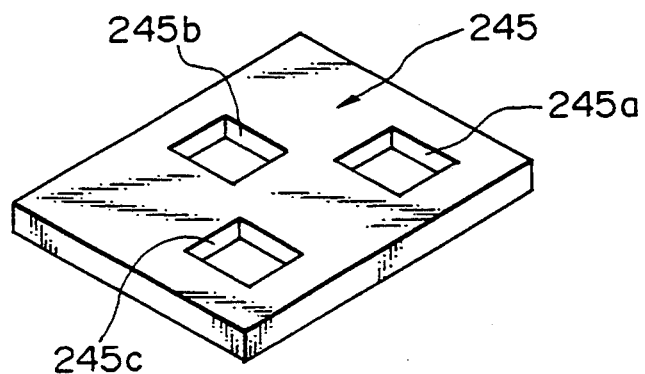
Figure 53A:
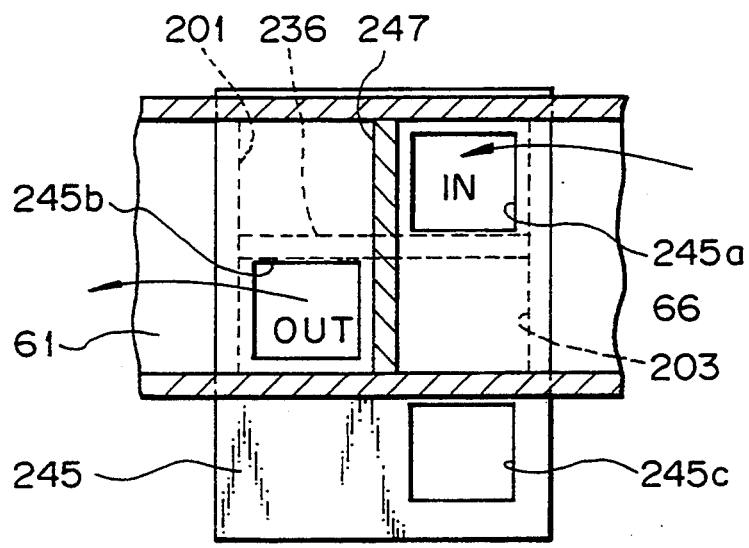

FIGS. 53(A) and (B) show top views of the switching valve in FIG. 52 under different positions, respectively.

Figure 54A:
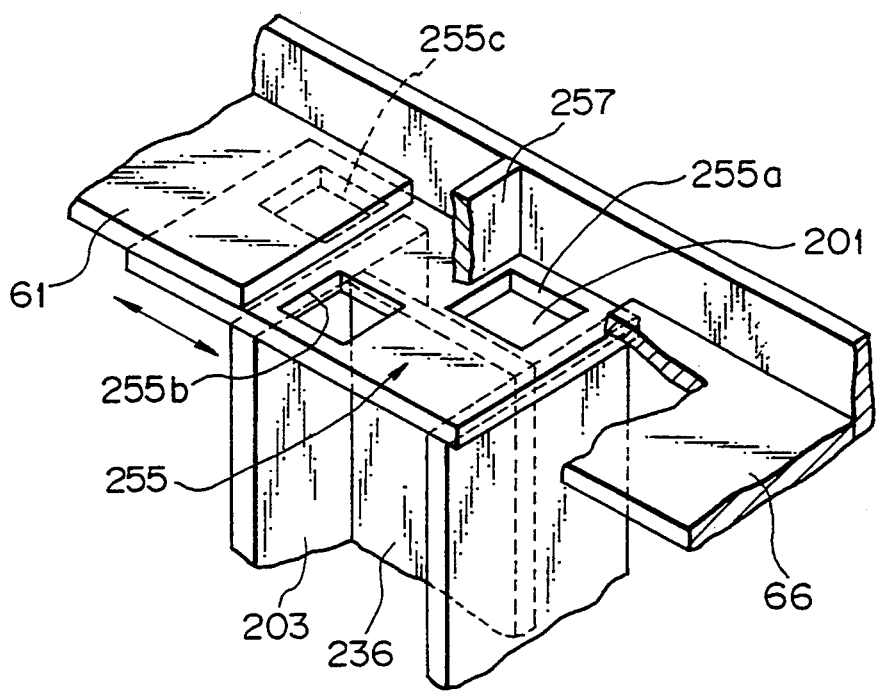

FIGS. 54(A) and (B) are schematic perspective views of a switching valve and its valve member, respectively, in the 12th embodiment.

Figure 54B:
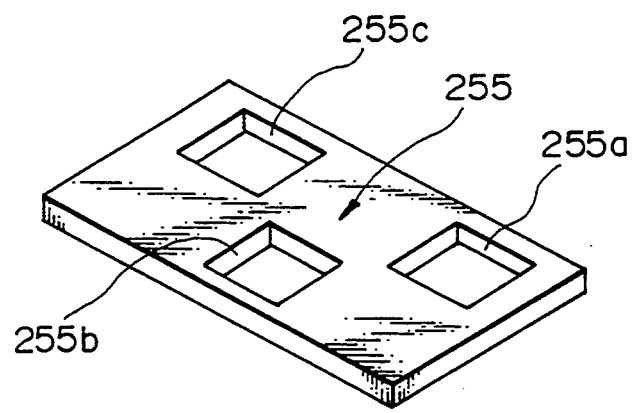
Figure 55A:
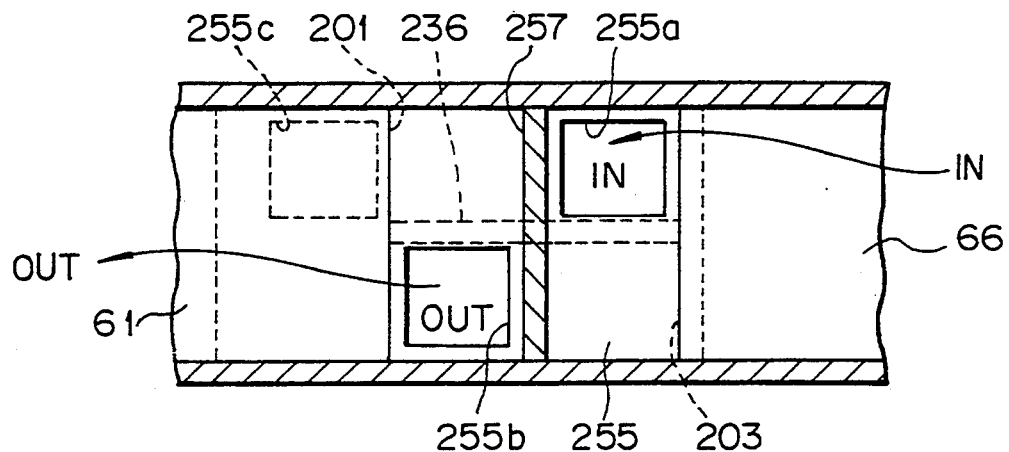

FIGS. 55(A) and (B) show top views of the switching valve in FIG. 54 in different positions, respectively.

Figure 56A:
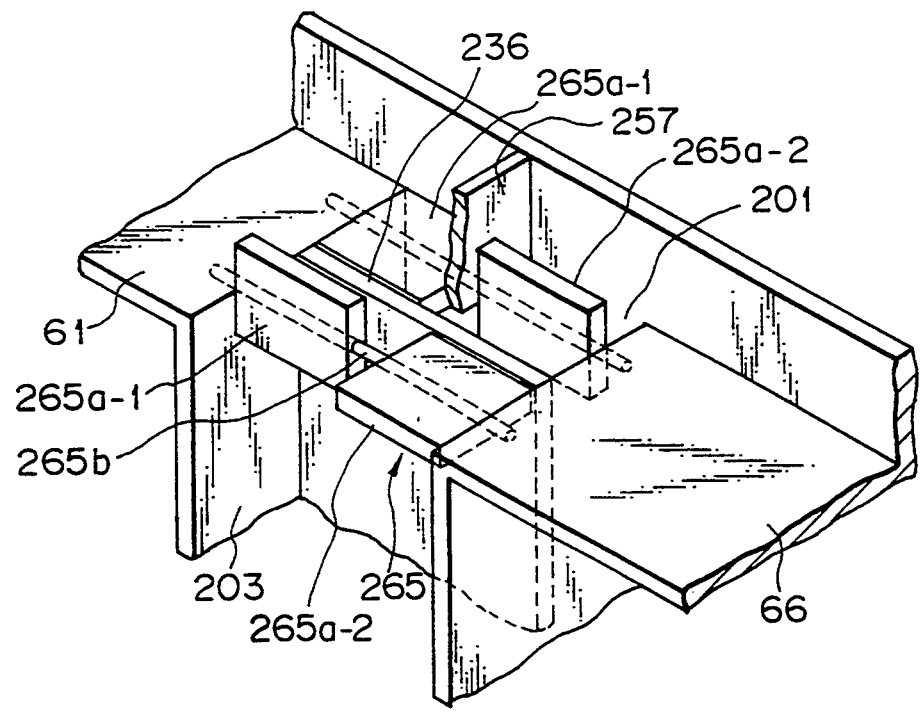

FIGS. 56(A) and (B) are schematic perspective views of a switching valve and its valve member, respectively, in the 13th embodiment.

Figure 56B:
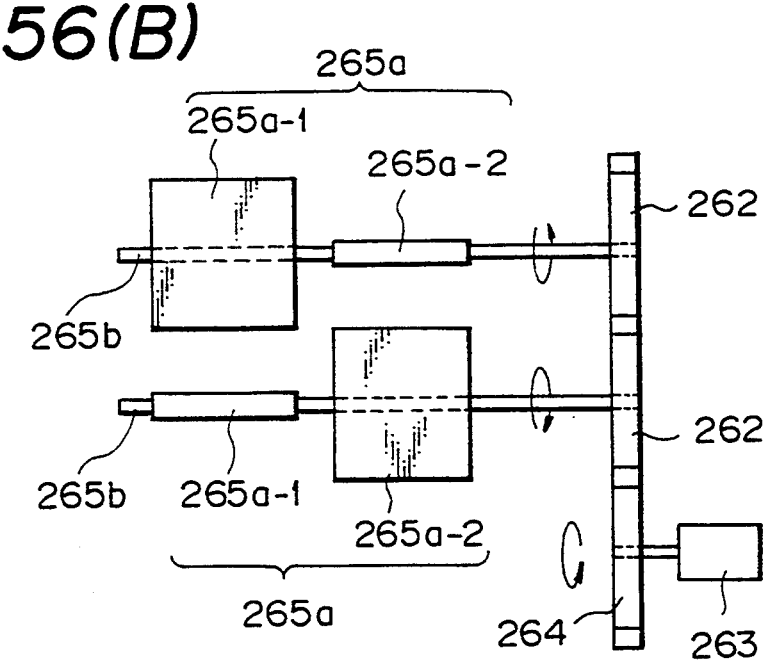
Figure 57A:
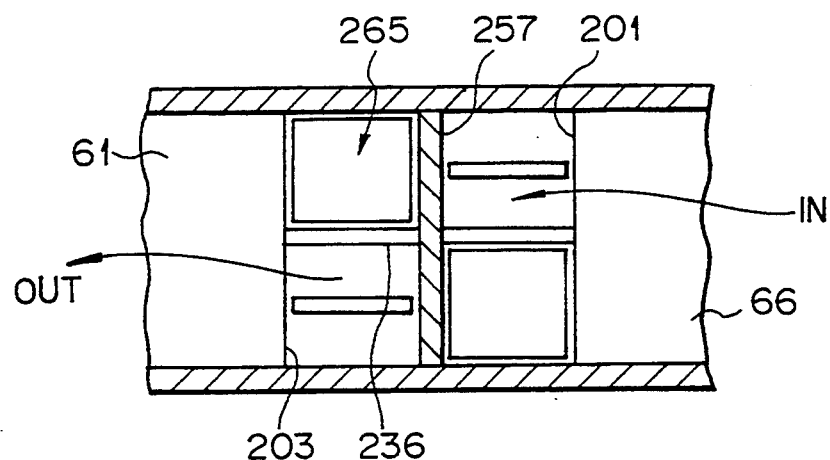

FIGS. 57(A) and (B) show top views of the switching valve in FIG. 56 in different positions, respectively.

Figure 58A:
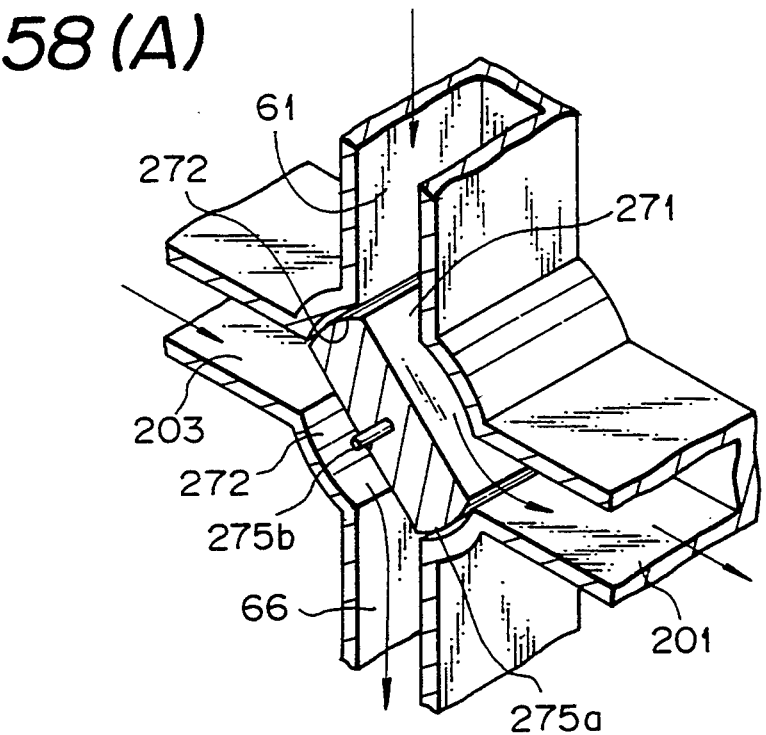

FIGS. 58(A) and (B) are schematic perspective views a of a switching valve in the 14th embodiment in different positions, respectively.

Figure 59A:
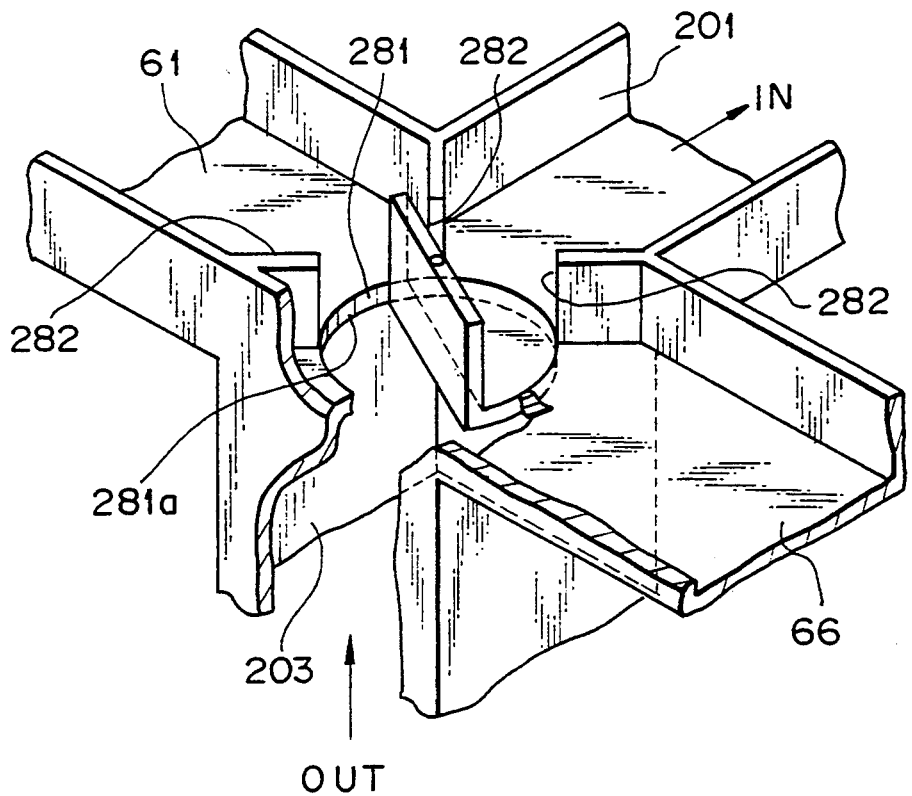

FIGS. 59(A) and (B) are schematic perspective views of a switching valve and its valve member, respectively, in the 15th embodiment.

Figure 59B:
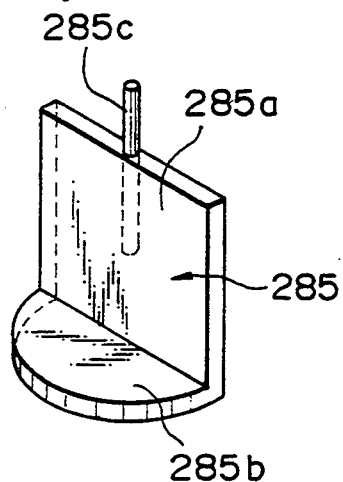
Figure 60A:
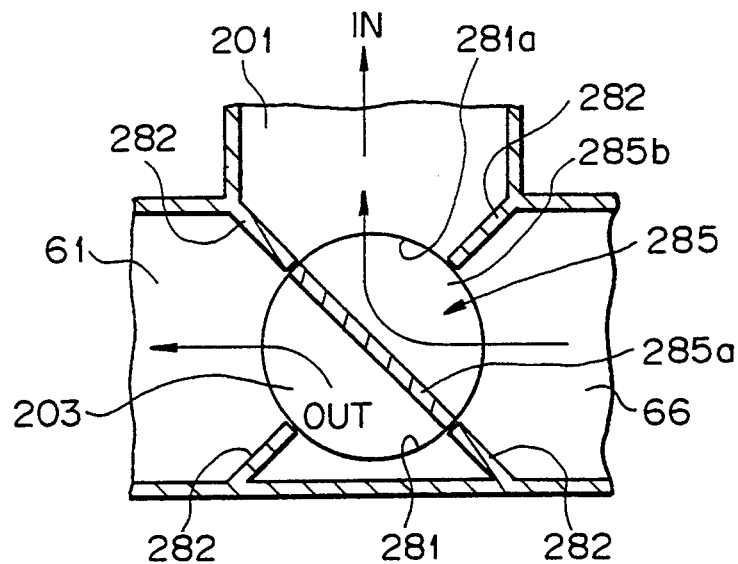

FIGS. 60(A) and (B) show top views of the switching valve in FIG. 59 in different positions, respectively.

Figure 61:
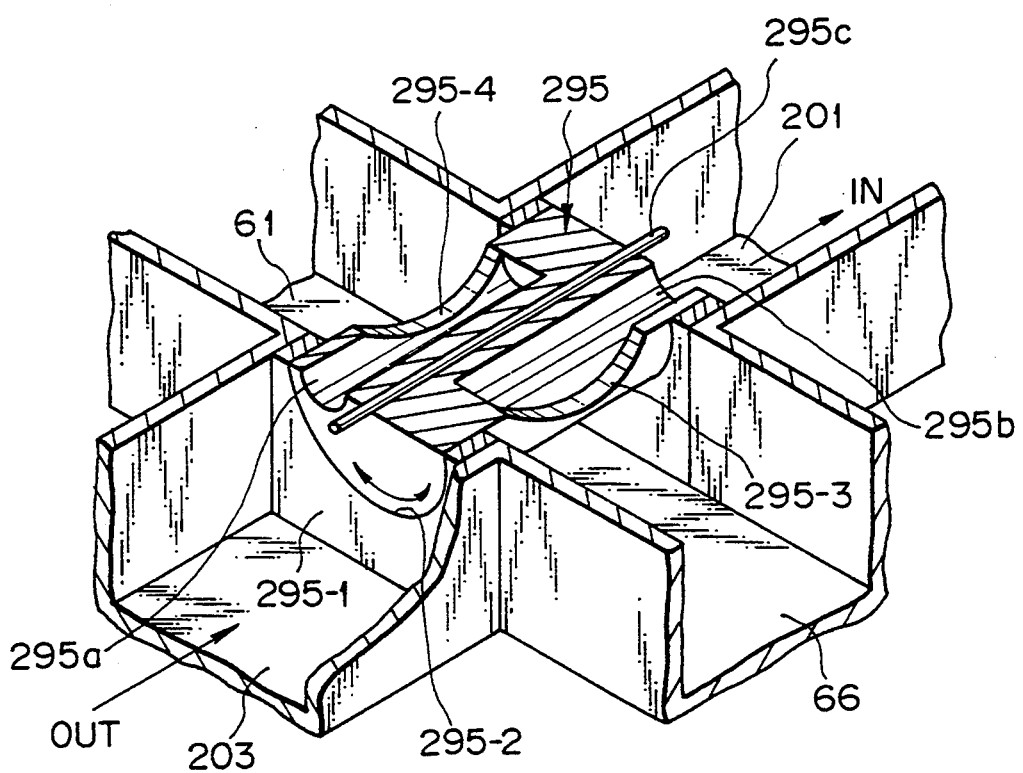

FIG. 61 is a schematic perspective view, partly sectioned, of a switching valve in the 16th embodiment.

Figure 62A:
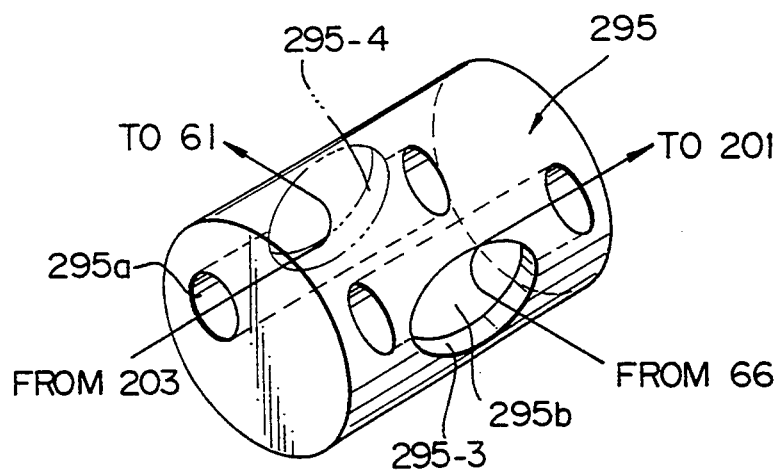

FIGS. 62(A) and (B) are a schematic perspective views of a valve member of the switching valve in the embodiment in FIG. 61 in different positions, respectively.

Figure 63A:
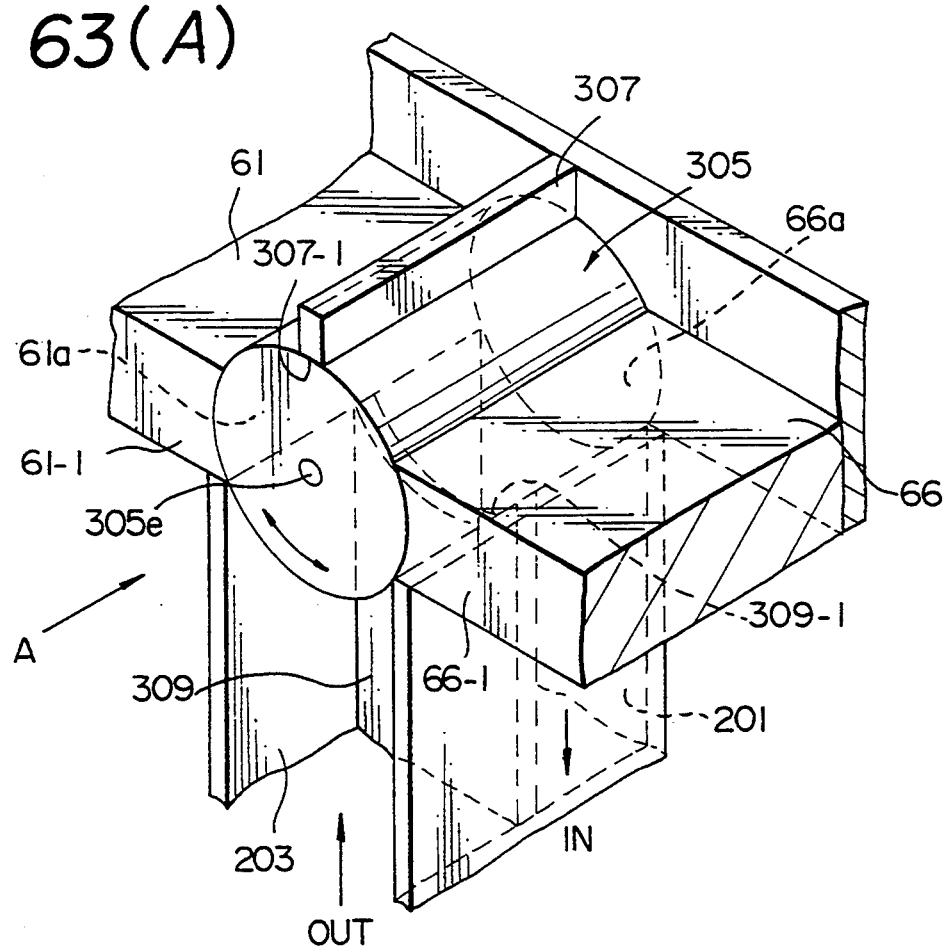

FIGS. 63(A) and (B) are schematic perspective views of a switching valve and its valve member, respectively, in the 17th embodiment.

Figure 63B:
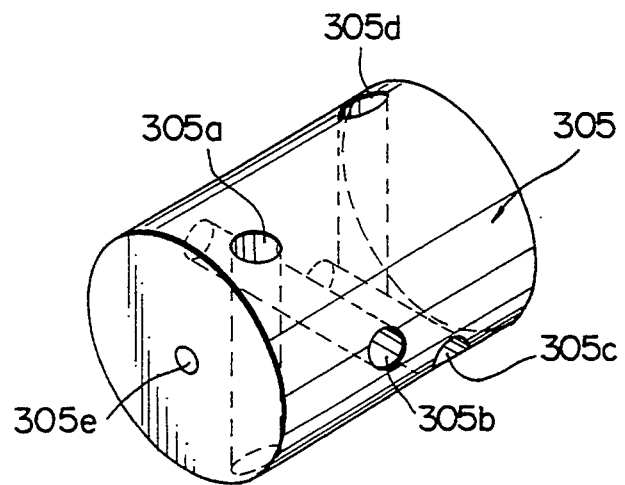
Figure 64A:
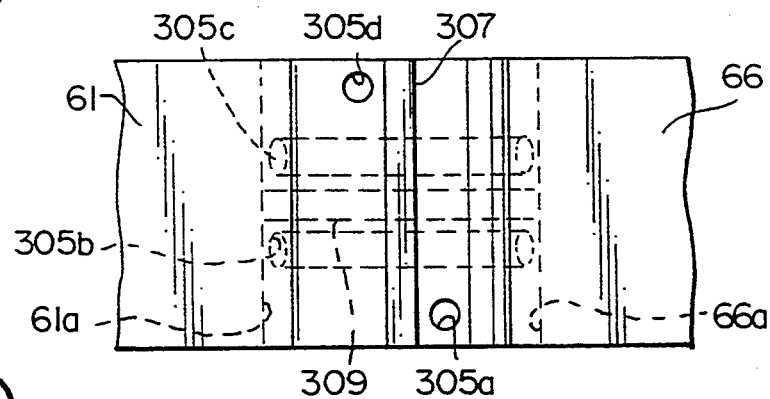

FIGS. 64(A) and (B) show top and side views, respectively of the switching valve in FIG. 63.

Figure 64B:
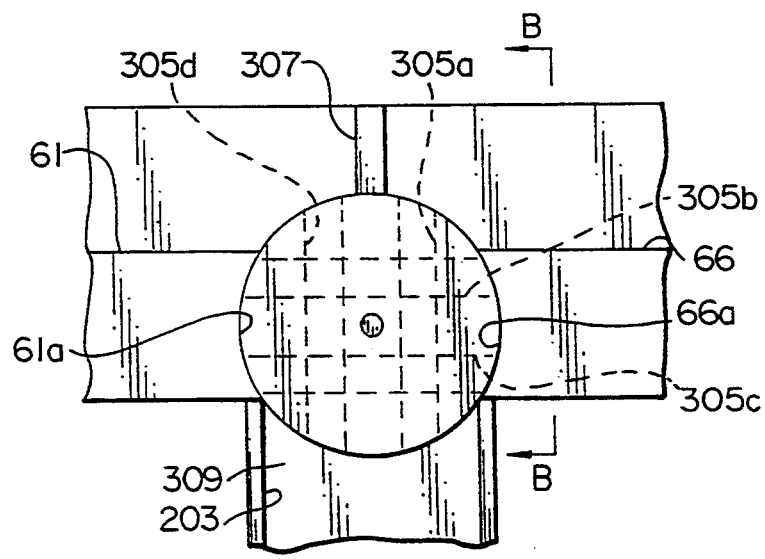
Figure 64C:
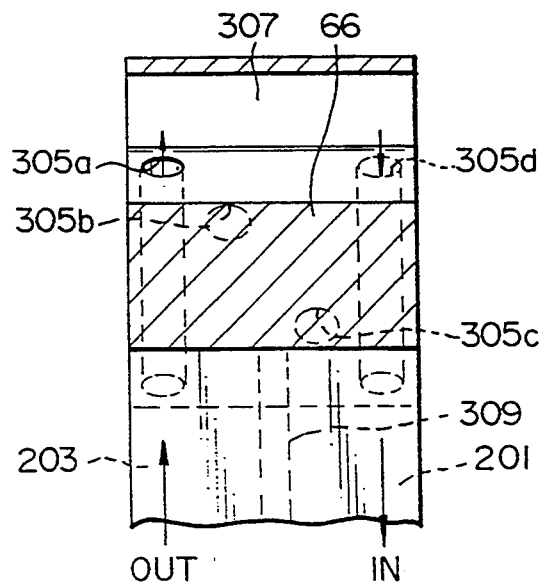

FIG. 64(C) is a cross sectional view taken along line B—B in FIG. 64(B).

Figure 65:
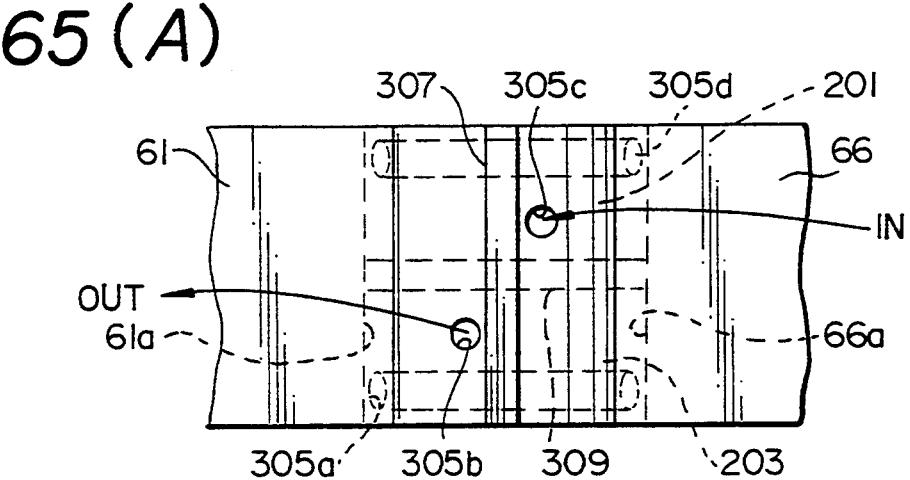
Figure 65:
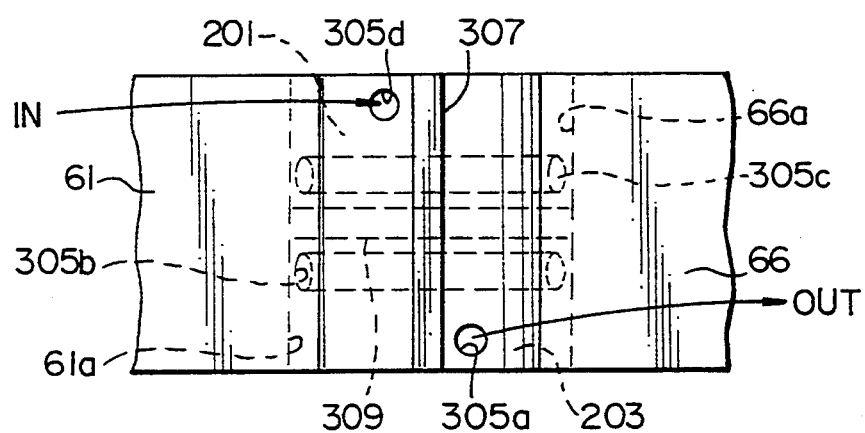

FIGS. 65(A) and (B) are similar to FIG. 64(A) but show an operation of the switching valve having different positions, respectively.

Figure 66:
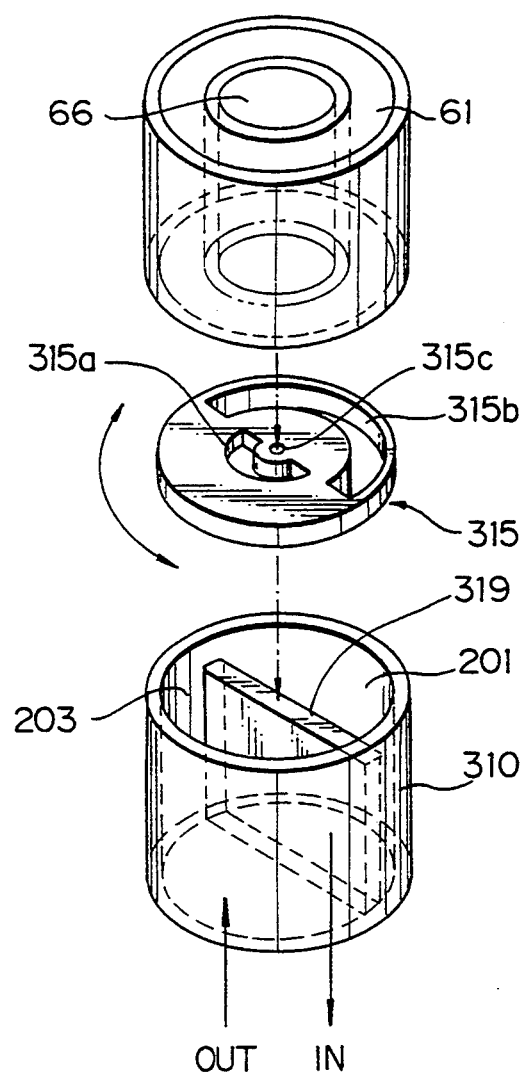

FIG. 66 is perspective view of a switching valve in the 18th embodiment.

Figure 67A:
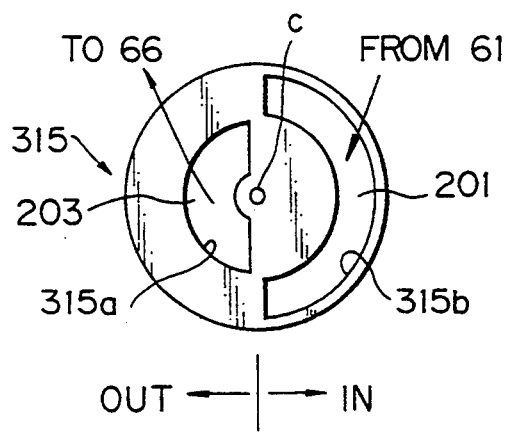

FIGS. 67(A) and (B) show top views of the switching valve in FIG. 66 under different positions, respectively.

FIG. 68 is a schematic view of a switching valve in the 19th embodiment.

Figure 69A:
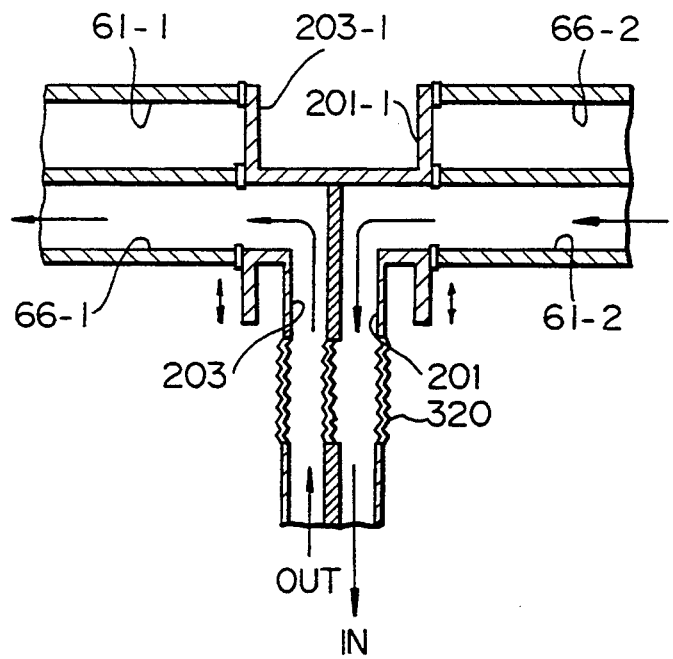

FIGS. 69(A) and (B) show top views of the switching valve in FIG. 68 in different positions, respectively.

Figure 70:
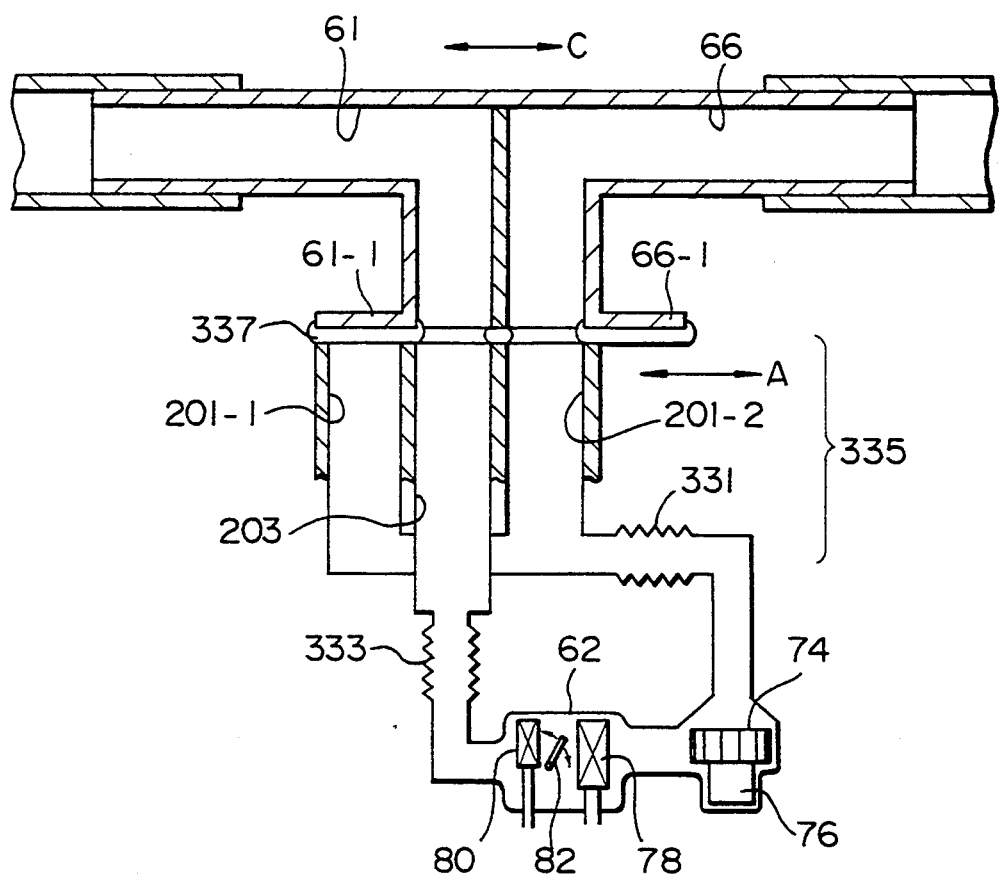

FIG. 70 is a schematic view of a switching valve in the 20th embodiment.

Figure 71A:
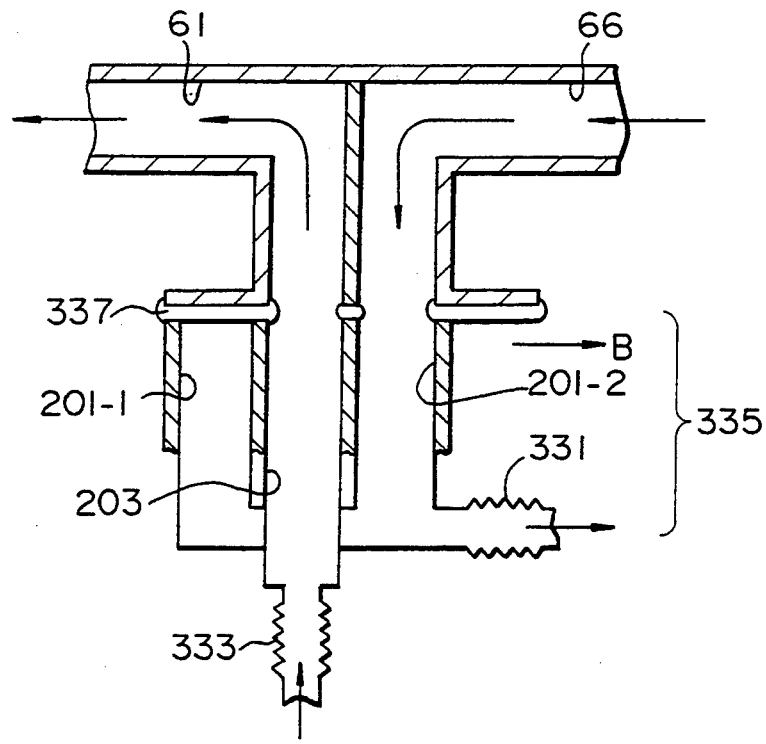

FIGS. 71(A) and (B) show top views of the switching valve in FIG. 70 in different positions, respectively.

Figure 72:
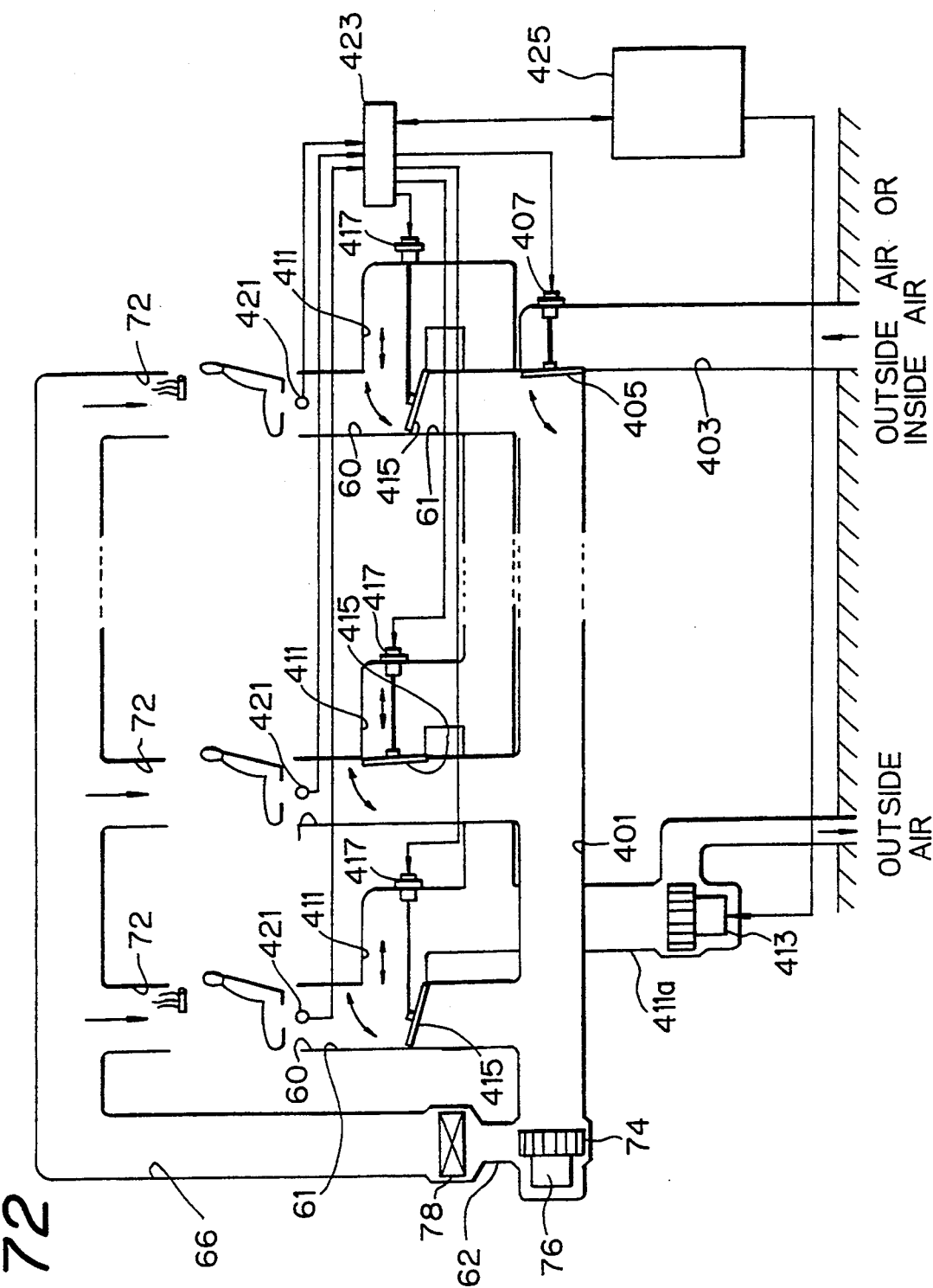

FIG. 72 is a schematic general view of an air conditioning apparatus in the 21st embodiment.

Figure 73A:
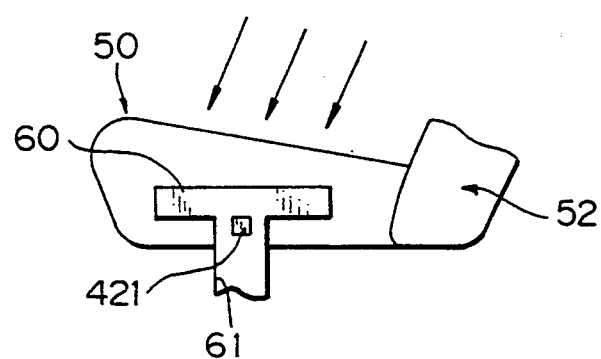

FIG. 73(A) is a side view illustrating the location of a sensor.

Figure 73B:
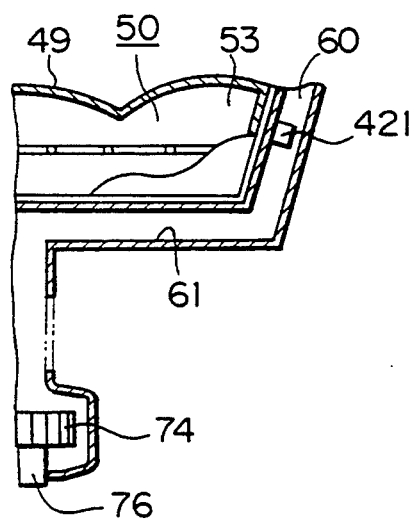

FIG. 73(B) is a cross sectional view illustrating the location of a sensor.

Figure 74:
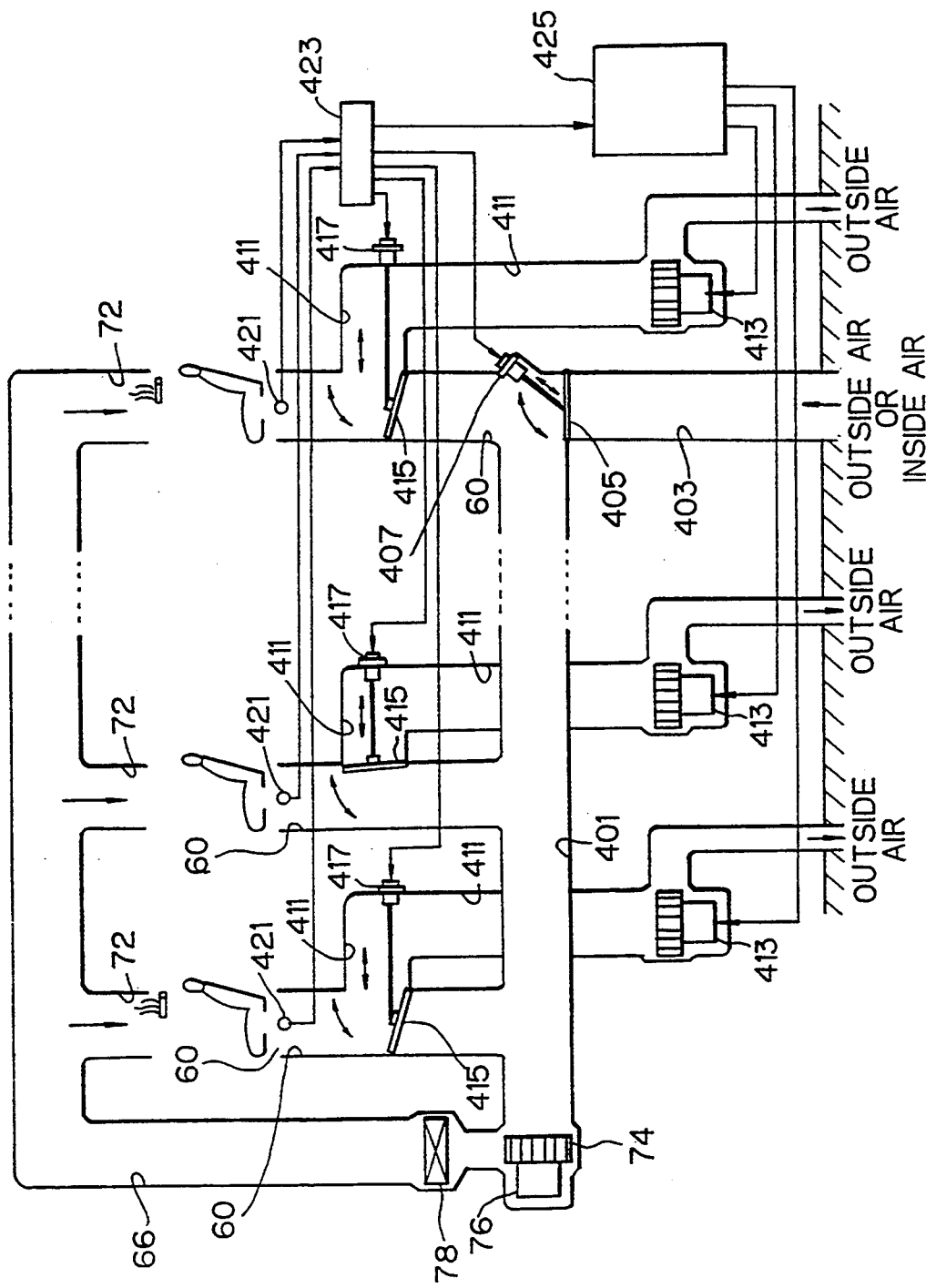

FIG. 74 is a schematic view of the 22nd embodiment.

Figure 75:
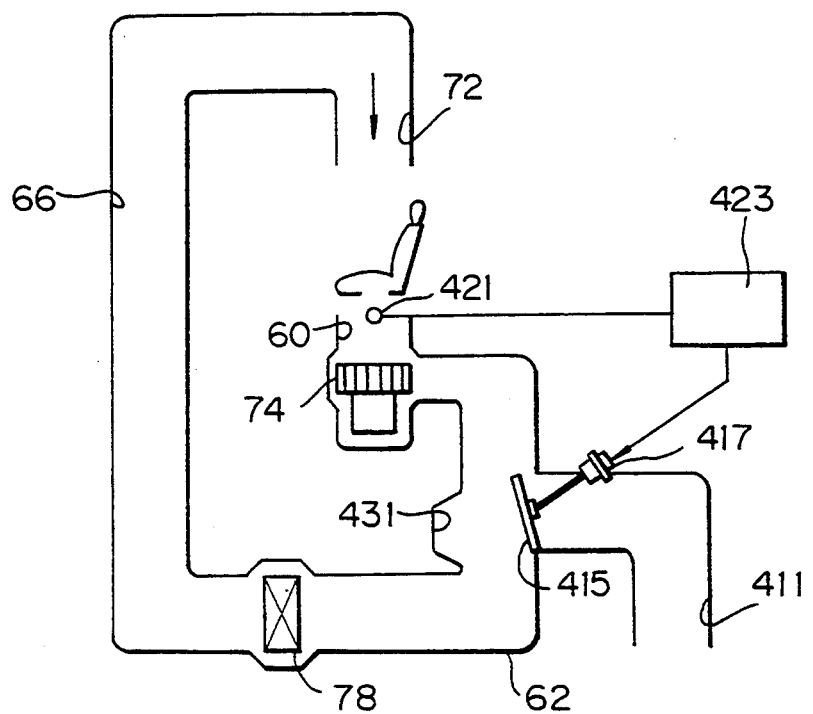

FIG. 75 is a schematic view of the 23rd embodiment.

Figure 76A:
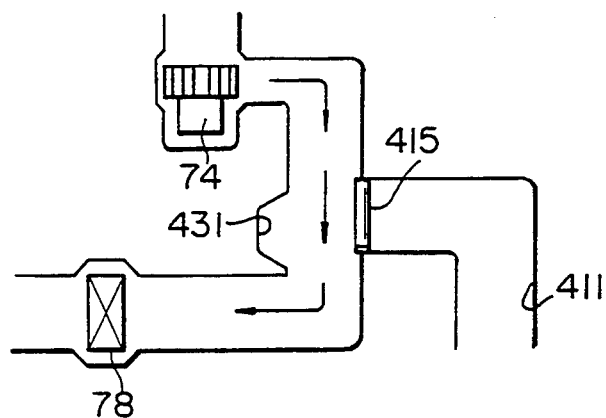

FIGS. 76(A), (B) and (C) illustrate an operation of the 23rd embodiment in FIG. 75.

Figure 77A:
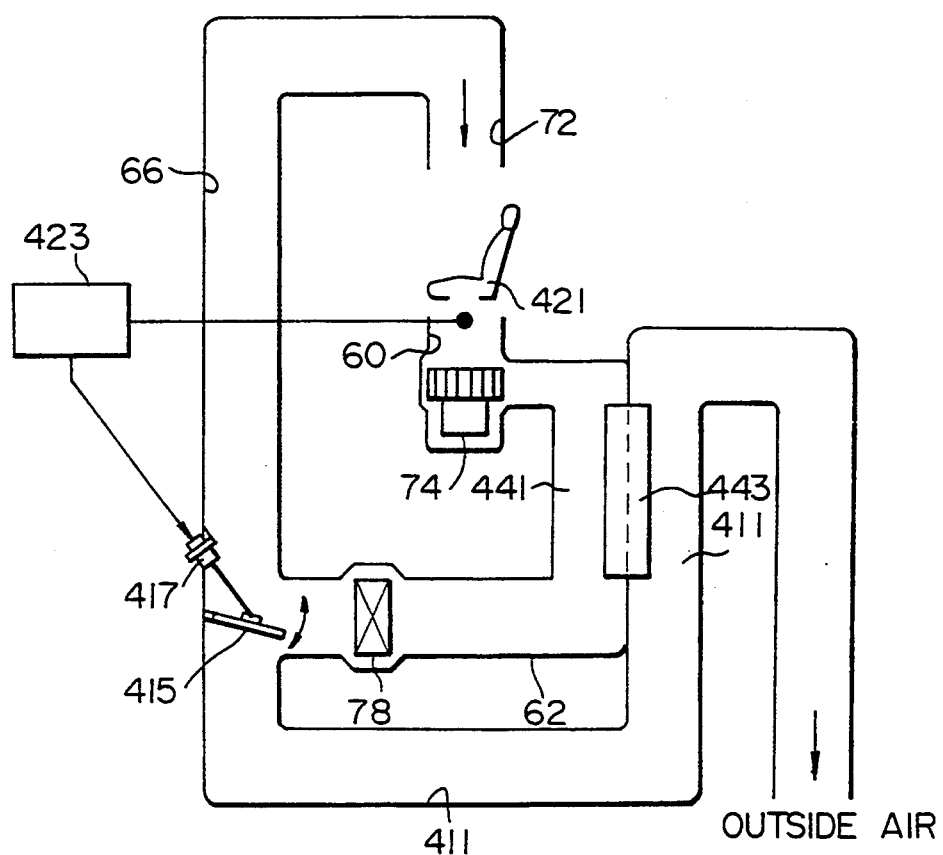

FIG. 77(A) is a schematic view of the 24th embodiment.

Figure 77B:
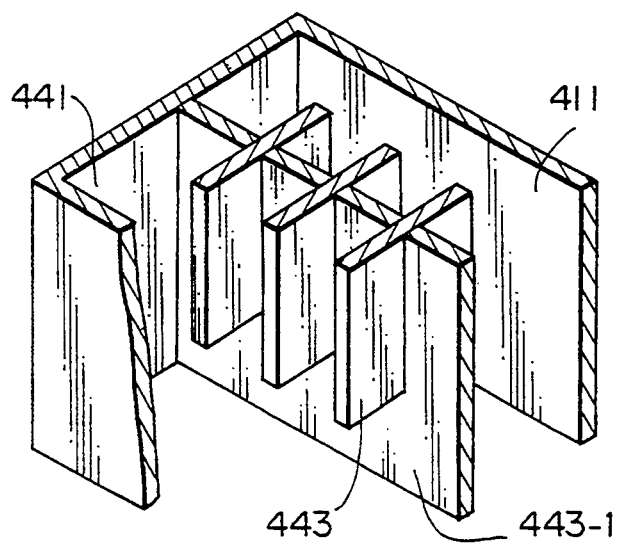

FIG. 77(B) illustrates a perspective view of a heat exchanging part in FIG. 77(A).

Figure 78:
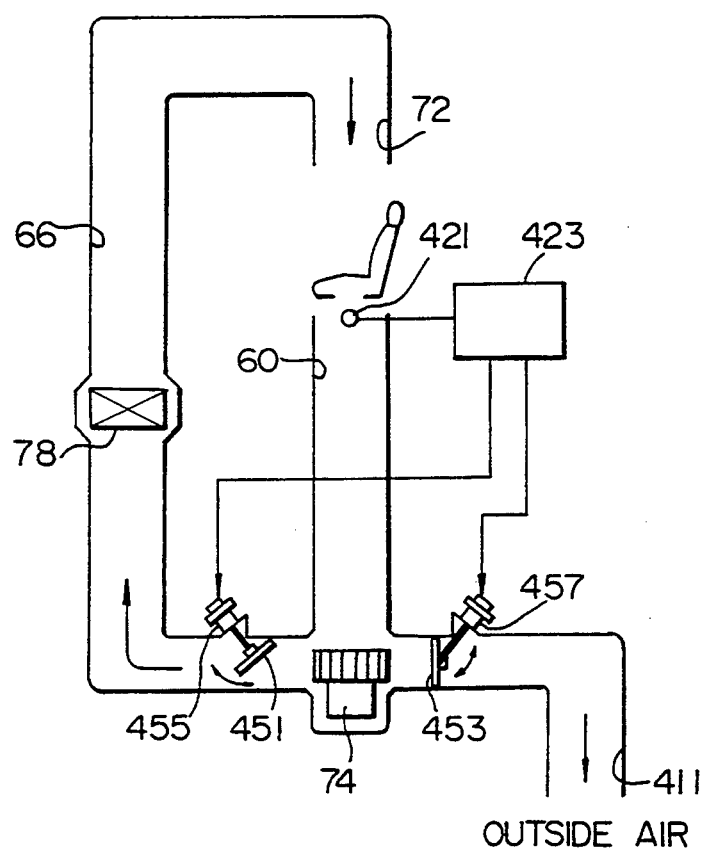

FIG. 78 is a schematic view of the 25th embodiment.

Figure 79:
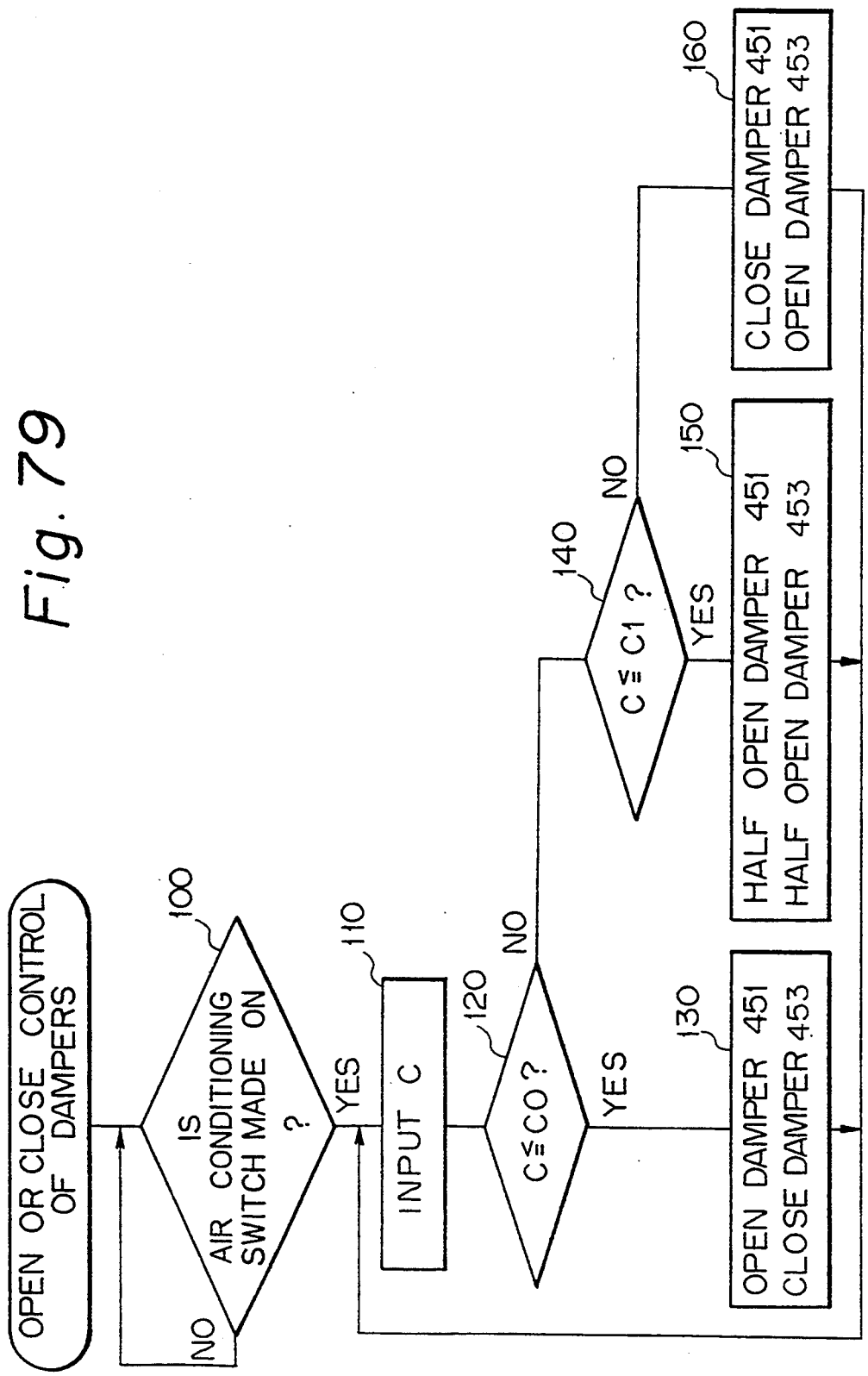

FIG. 79 is a flowchart illustrating the operation of the embodiment in FIG. 78.

FIGS. 80(A), (B) and (C) show an operation of the 23rd embodiment.

Figure 81:
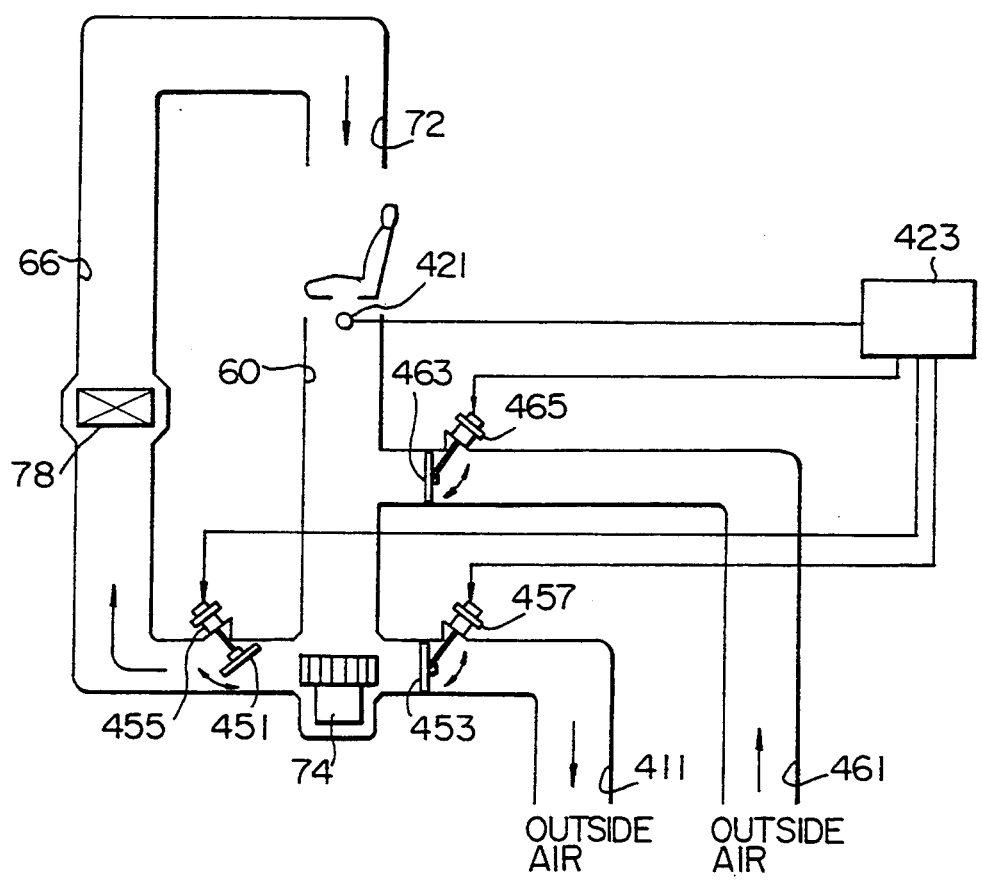

FIG. 81 is a schematic view of the 26th embodiment.

Figure 82:
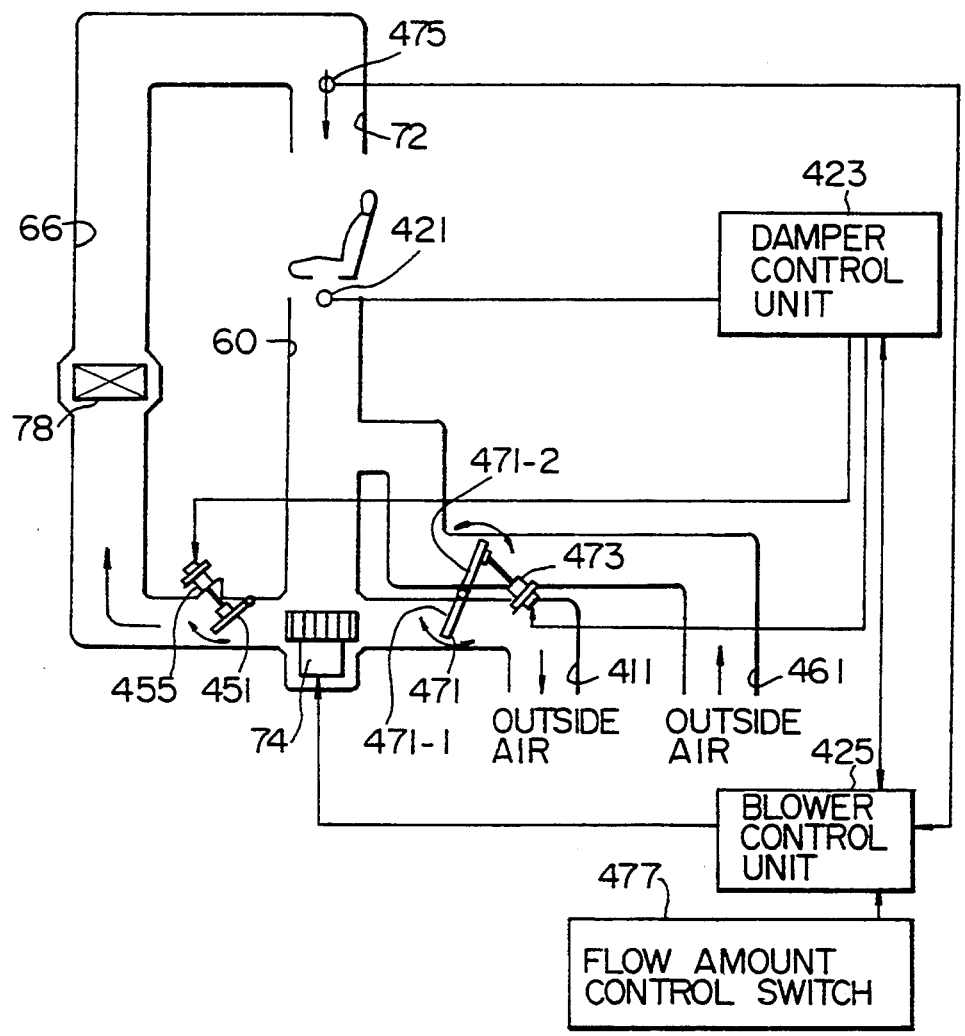

FIG. 82 is a schematic view of the 27th embodiment.

Figure 83:
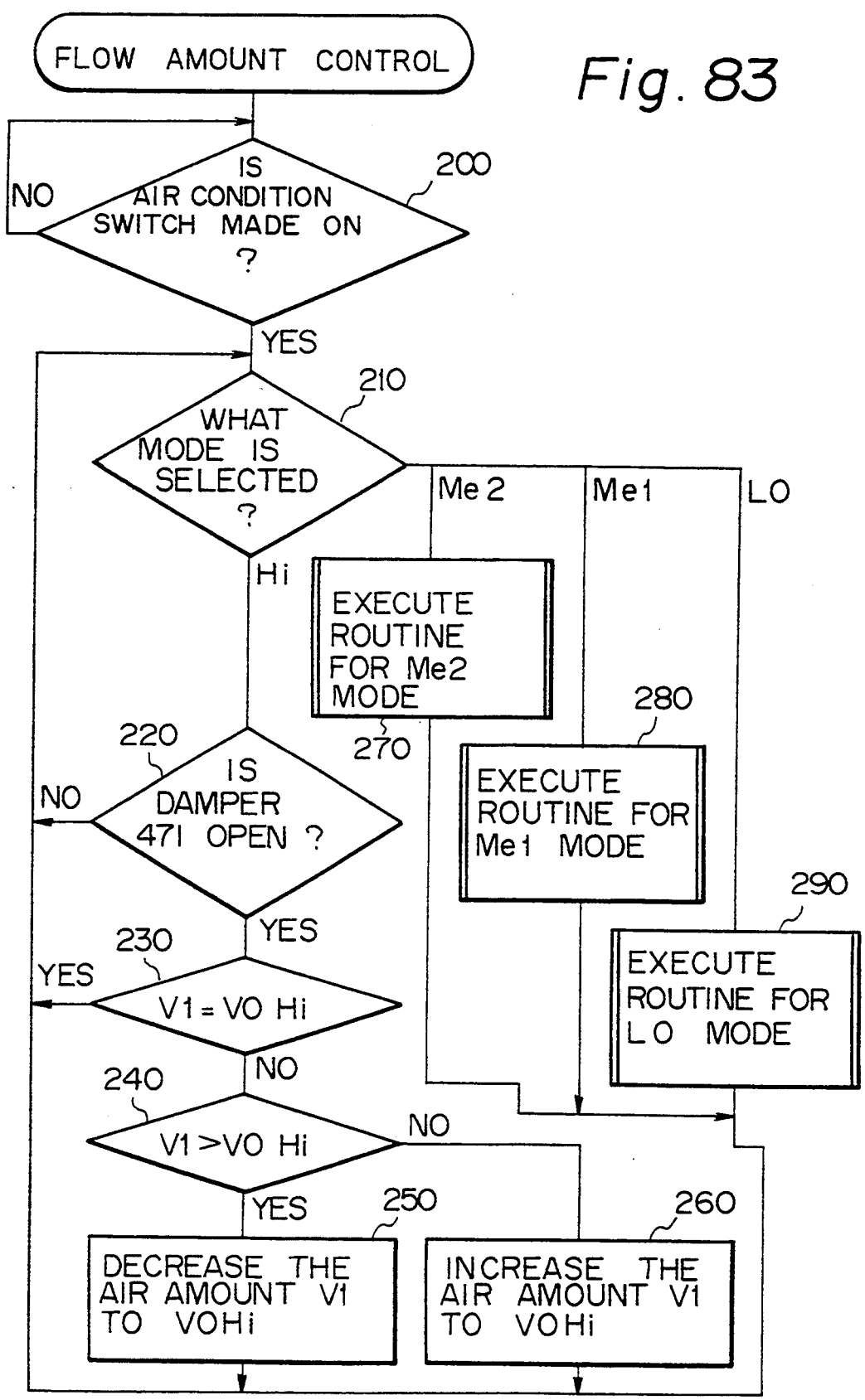

FIG. 83 is a flowchart illustrating an operation of the 27th embodiment, wherein a wind speed sensor is utilized.

Figure 84:
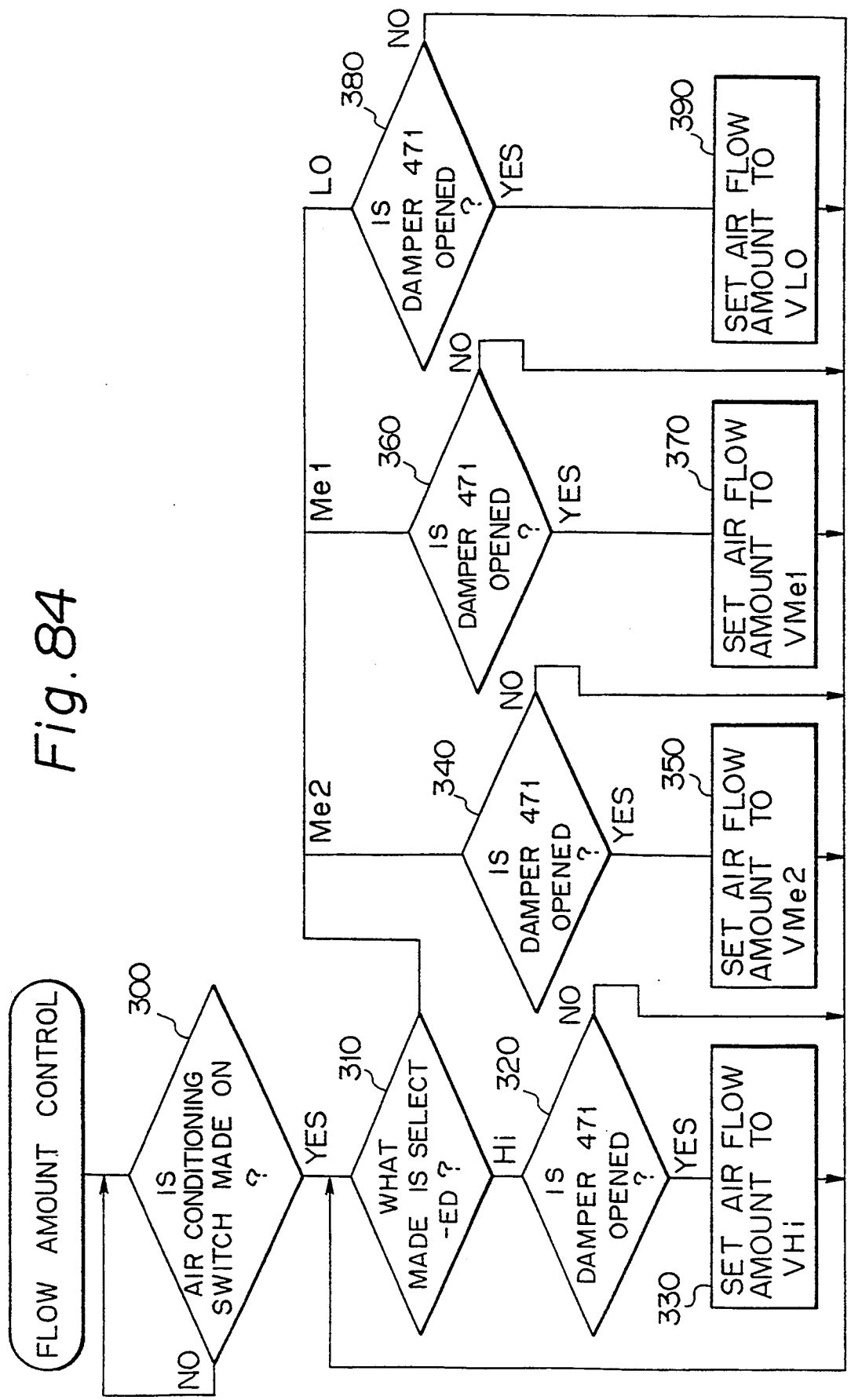

FIG. 84 is a flowchart illustrating an operation of the 27th embodiment, wherein no wind speed sensor is utilized.

Figure 85:
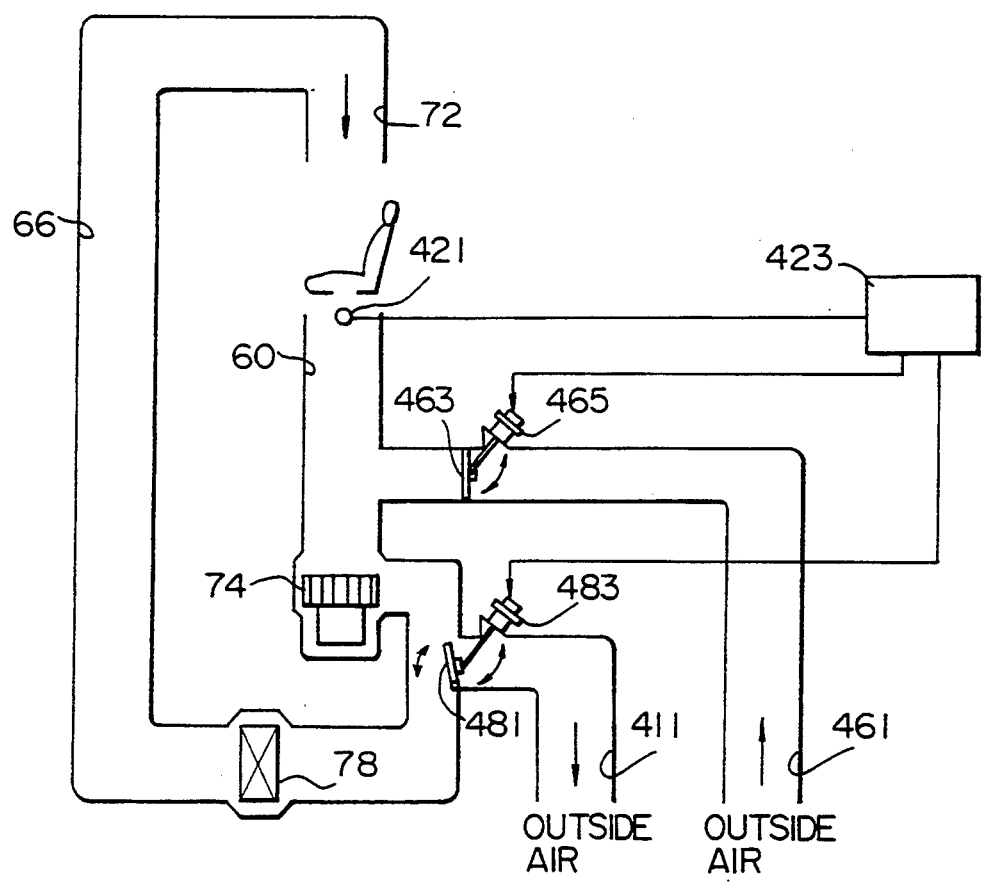

FIG. 85 is a schematic view of the 28th embodiment.

Figure 86:
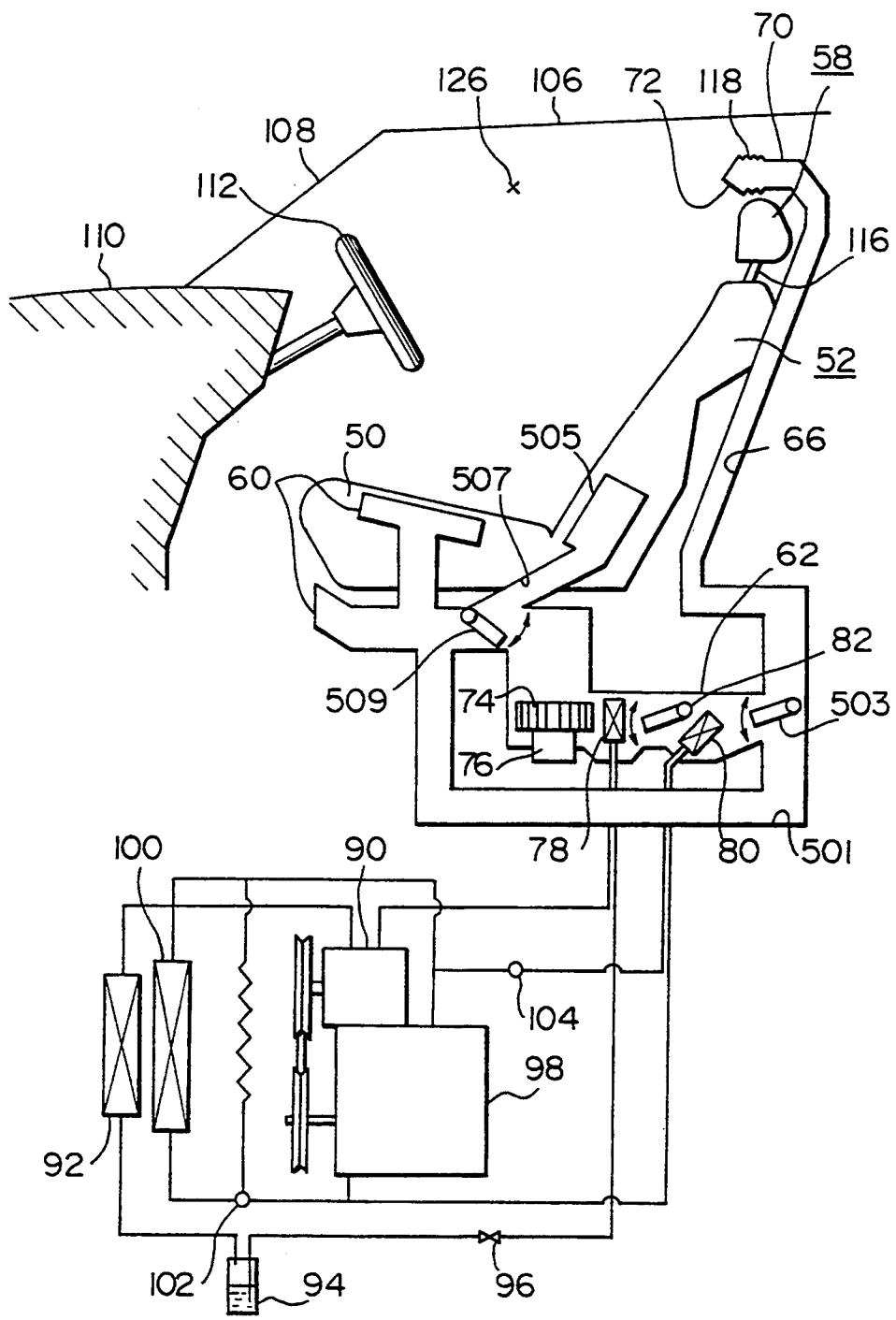

FIG. 86 is a schematic view of the 29th embodiment.

Figure 87A:
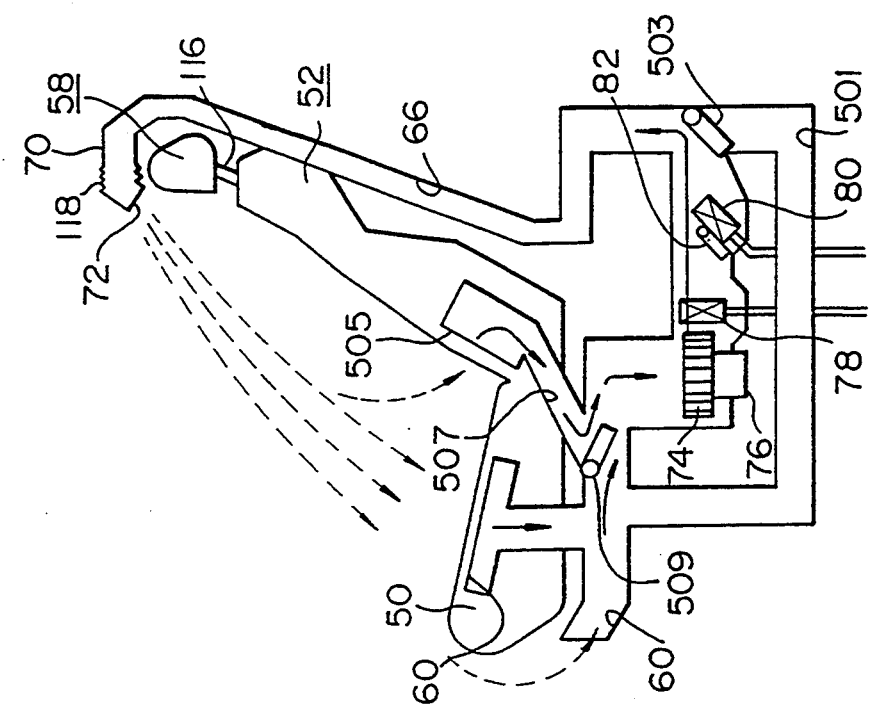

FIGS. 87(A) and (B) illustrate operations of the 29th embodiment when it is in a cooling mode.

FIGS. 88(A) and (B) illustrate operations of the 29th embodiment when it is in a bi-level mode and a heating mode, respectively.

Figure 89:
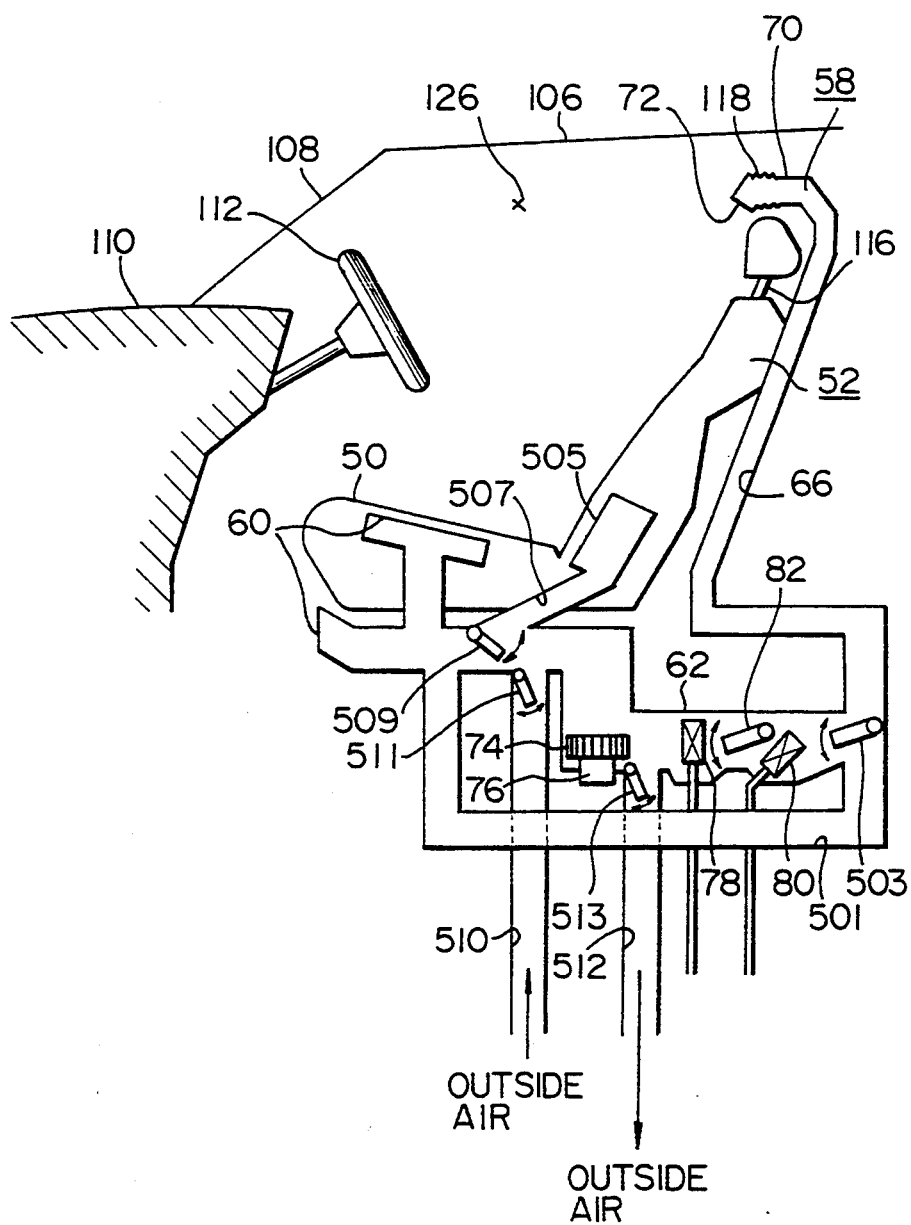

FIG. 89 is a schematic view of the 30th embodiment.

Figure 90:
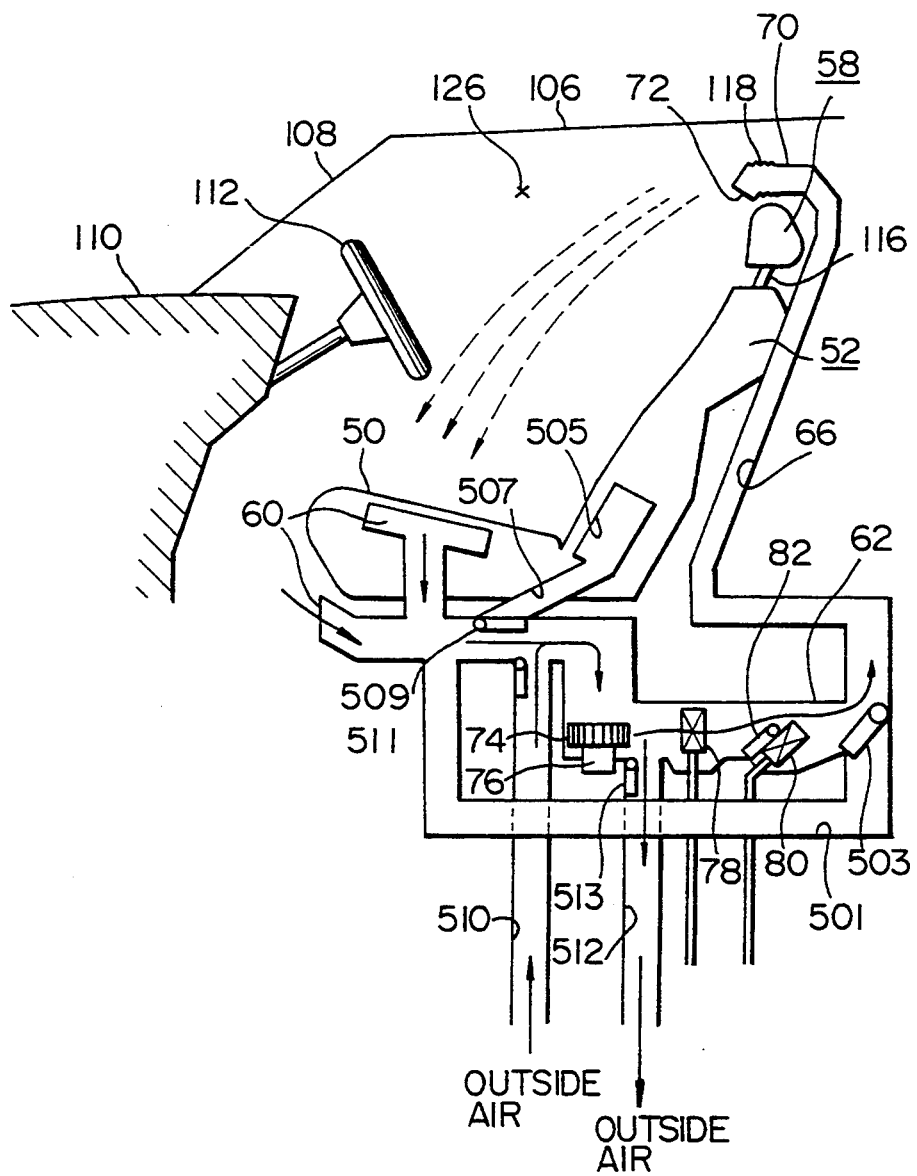
Figure 91:
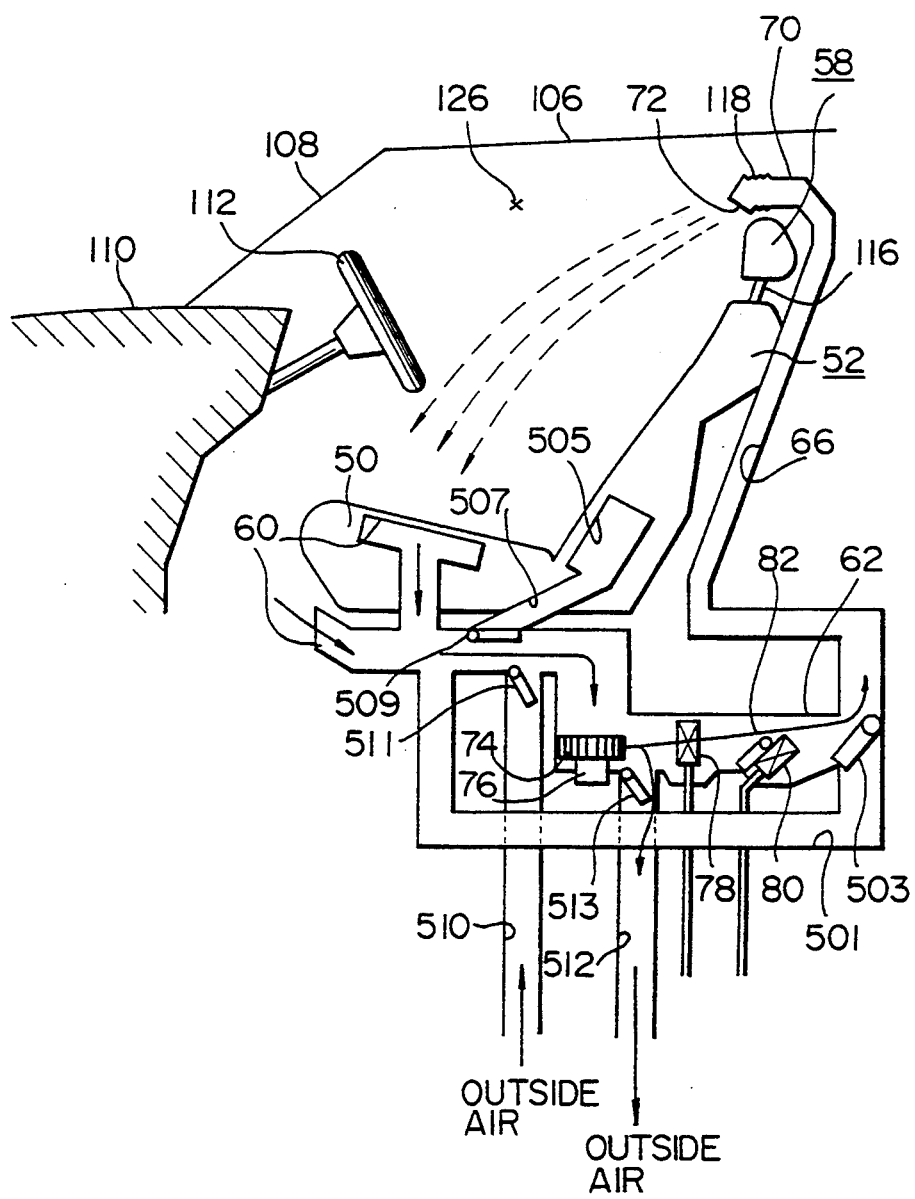

FIGS. 90 and 91 show an operation of the 30th embodiment in FIG. 89 under different conditions, respectively.

Figure 92:
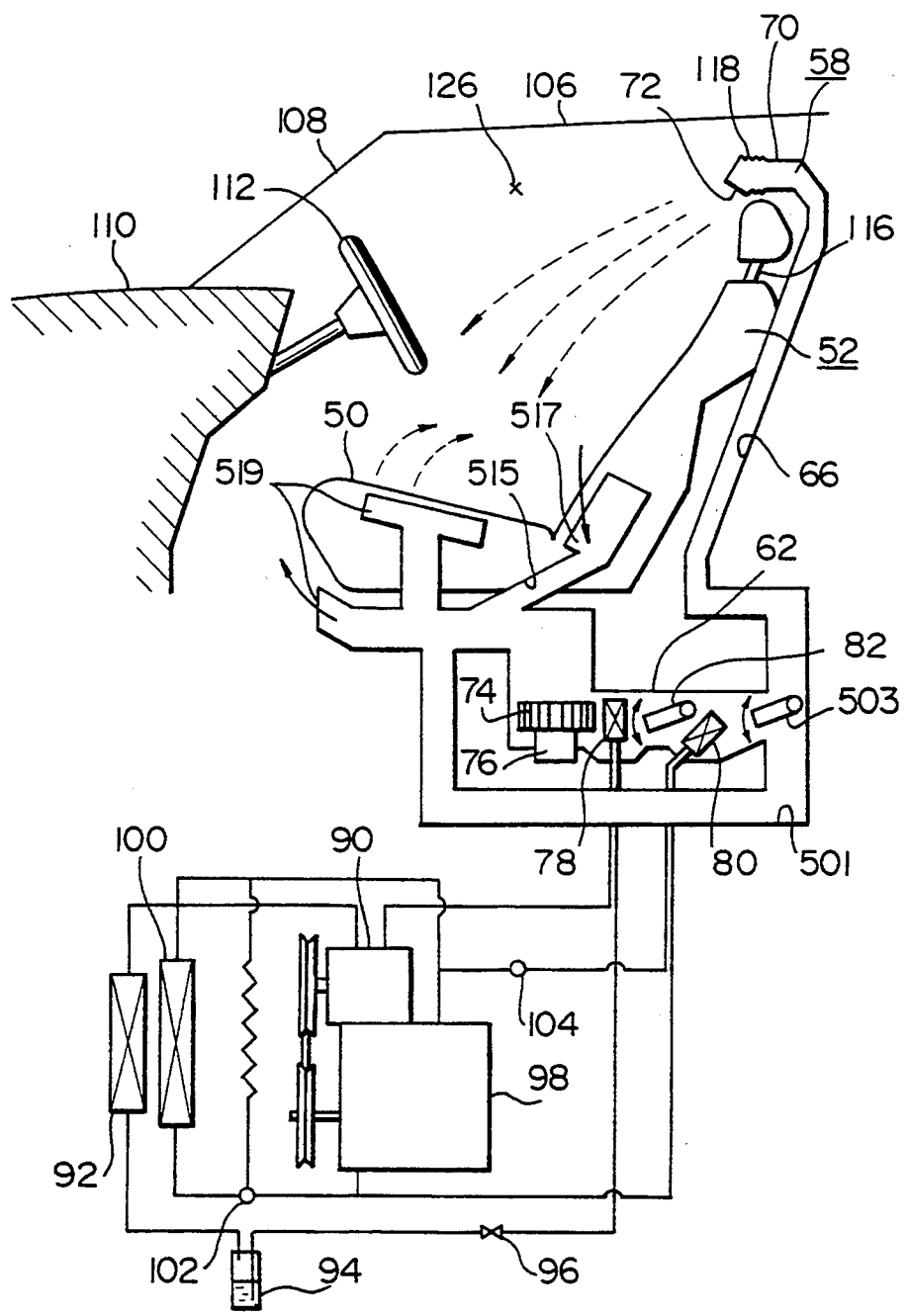

FIG. 92 is a schematic view of the 31st embodiment.

Figure 93:
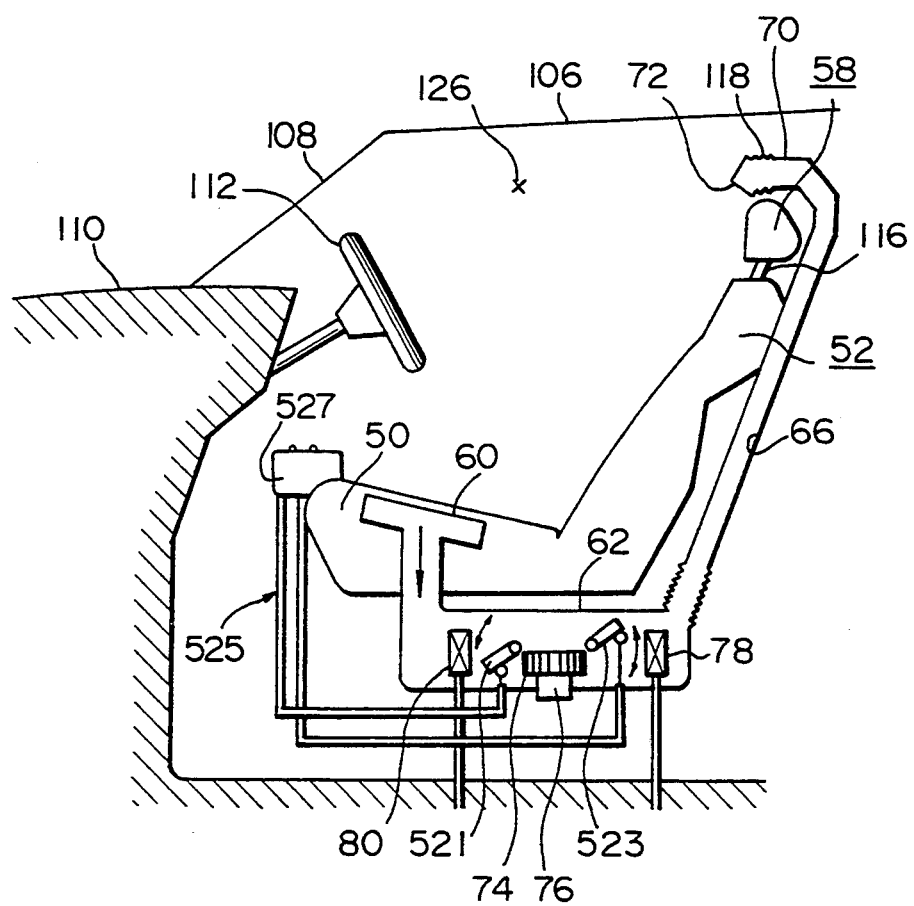

FIG. 93 is a schematic view of the 32nd embodiment.

Figure 94:
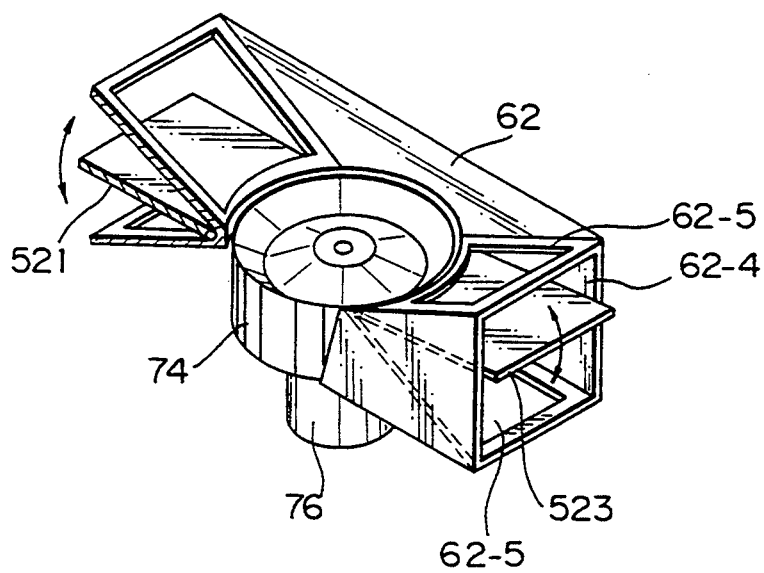

FIG. 94 shows a unit structure of a fan with a duct in the 32nd embodiment in FIG. 93.

Figure 95A:
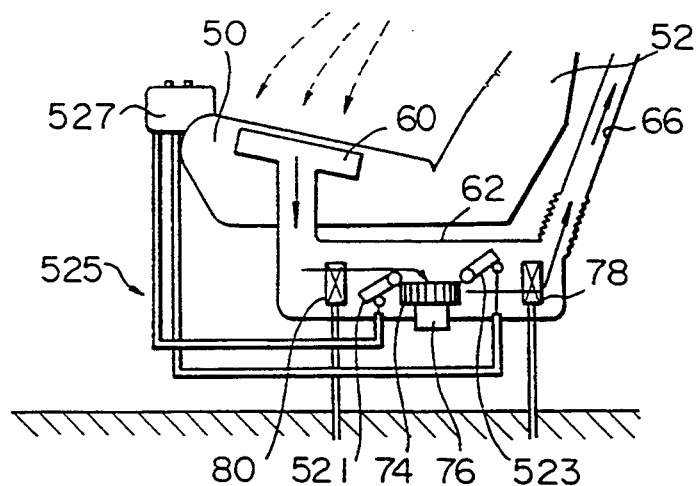

FIGS. 95(A), (B) and (C) illustrate an operation of the 32nd embodiment in FIG. 93 under various conditions, respectively.

Figure 96:
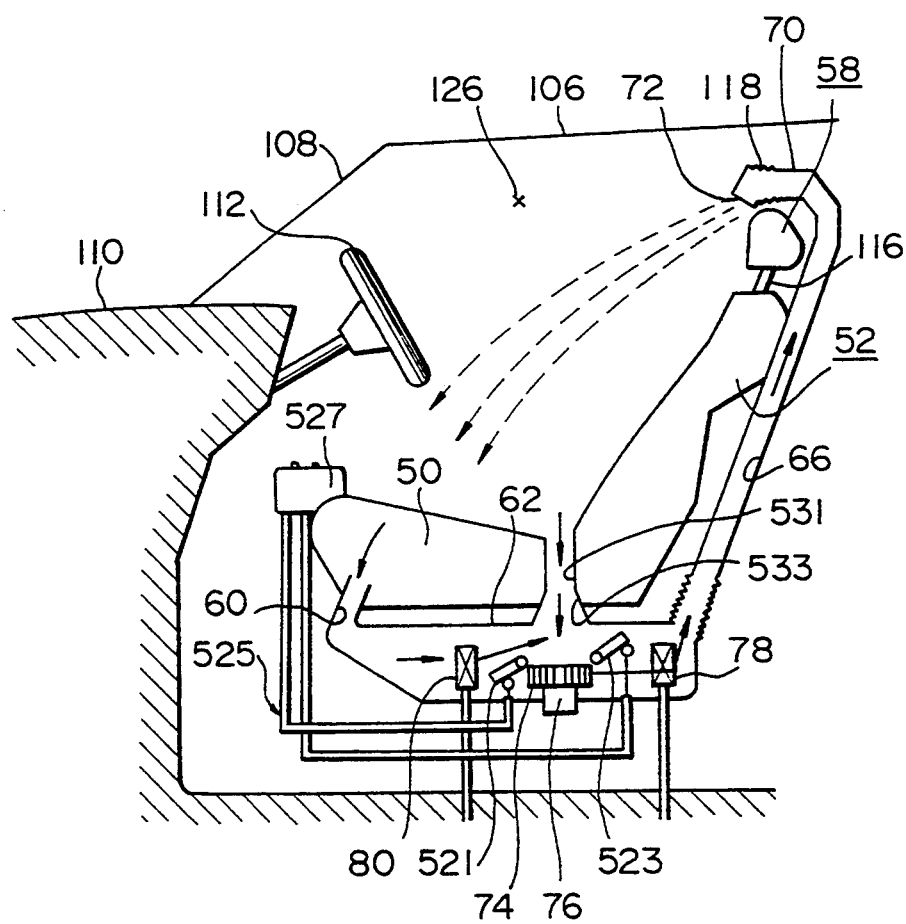

FIG. 96 is a schematic view of the 33rd embodiment.

FIGS. 97(A) and (B) illustrate an operation of the 33rd embodiment in FIG. 96 under different conditions, respectively.

Figure 98:
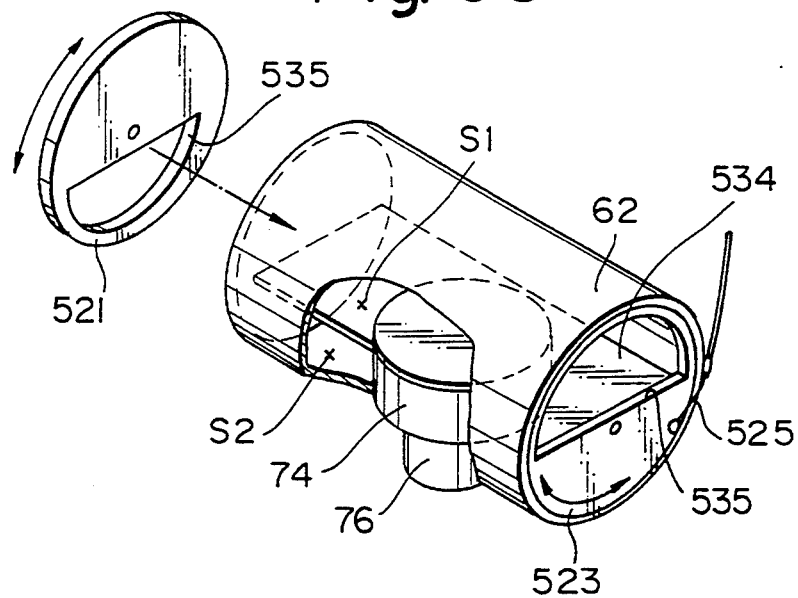
Figure 99:
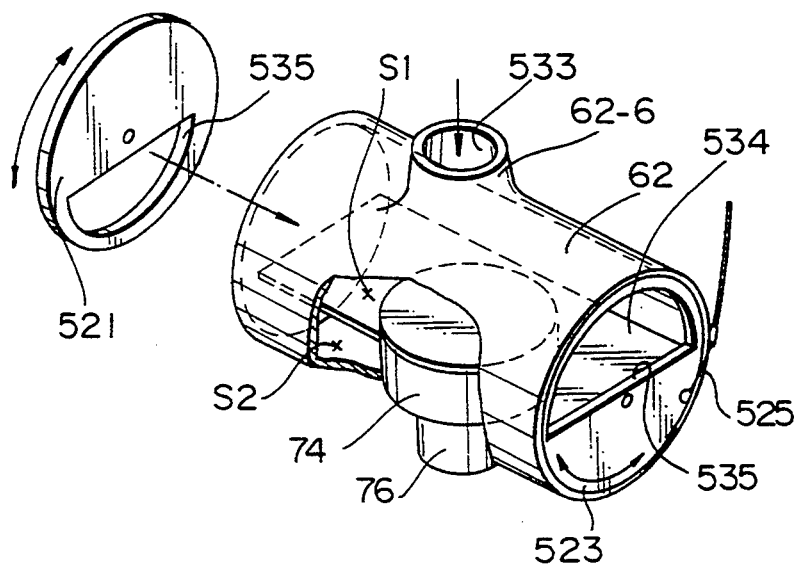
Figure 100:
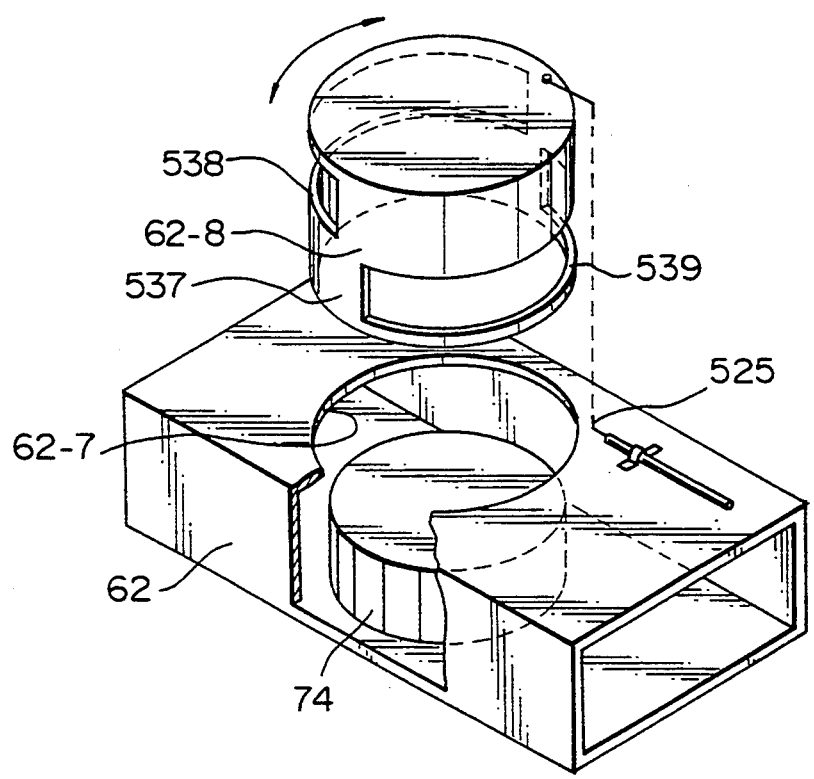

FIGS. 98, 99 and 100 illustrate perspective views of a unit structure with different modifications, respectively.

Figure 101:
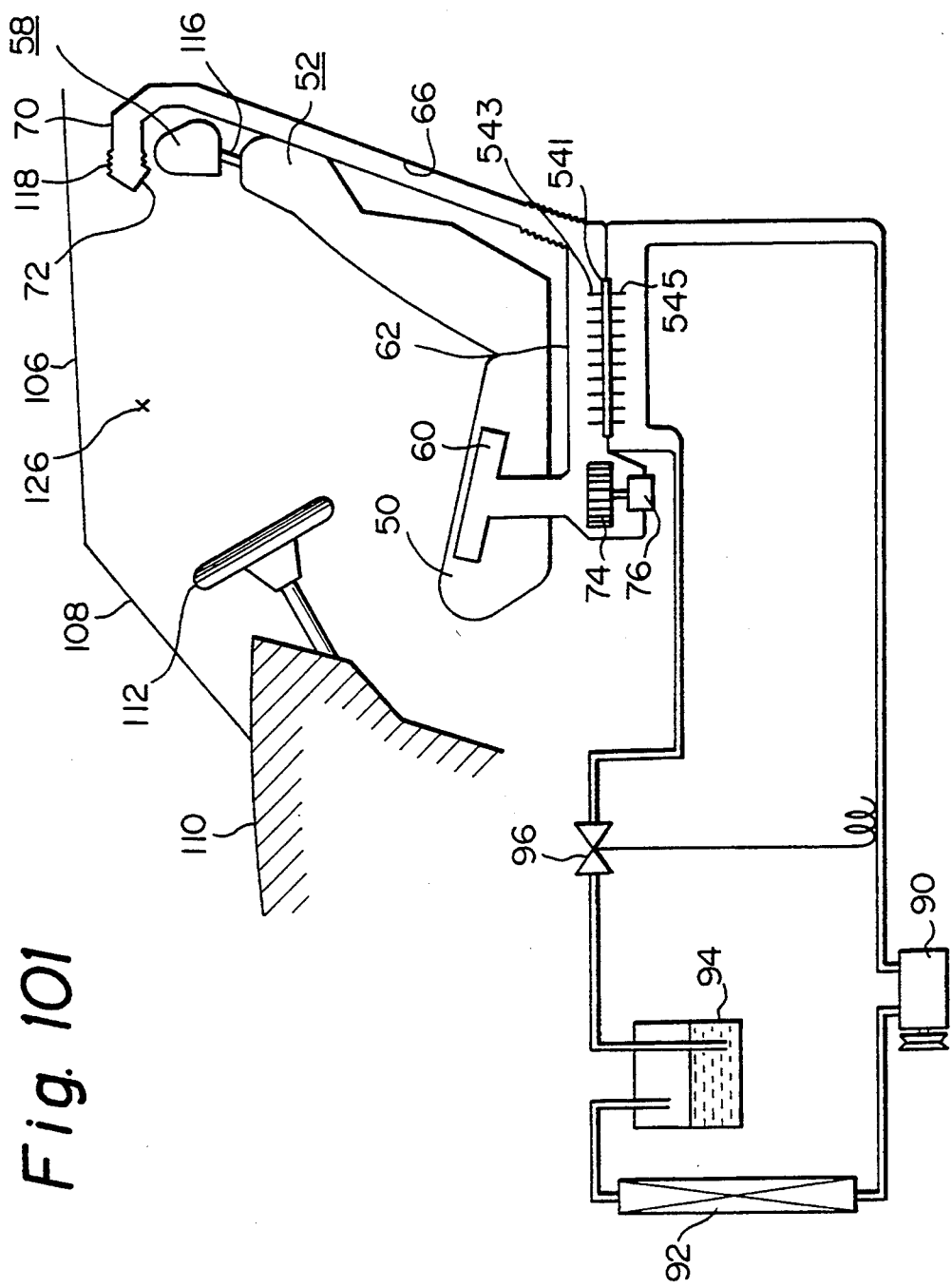

FIG. 101 is a schematic view of the 34th embodiment.

Figure 102:
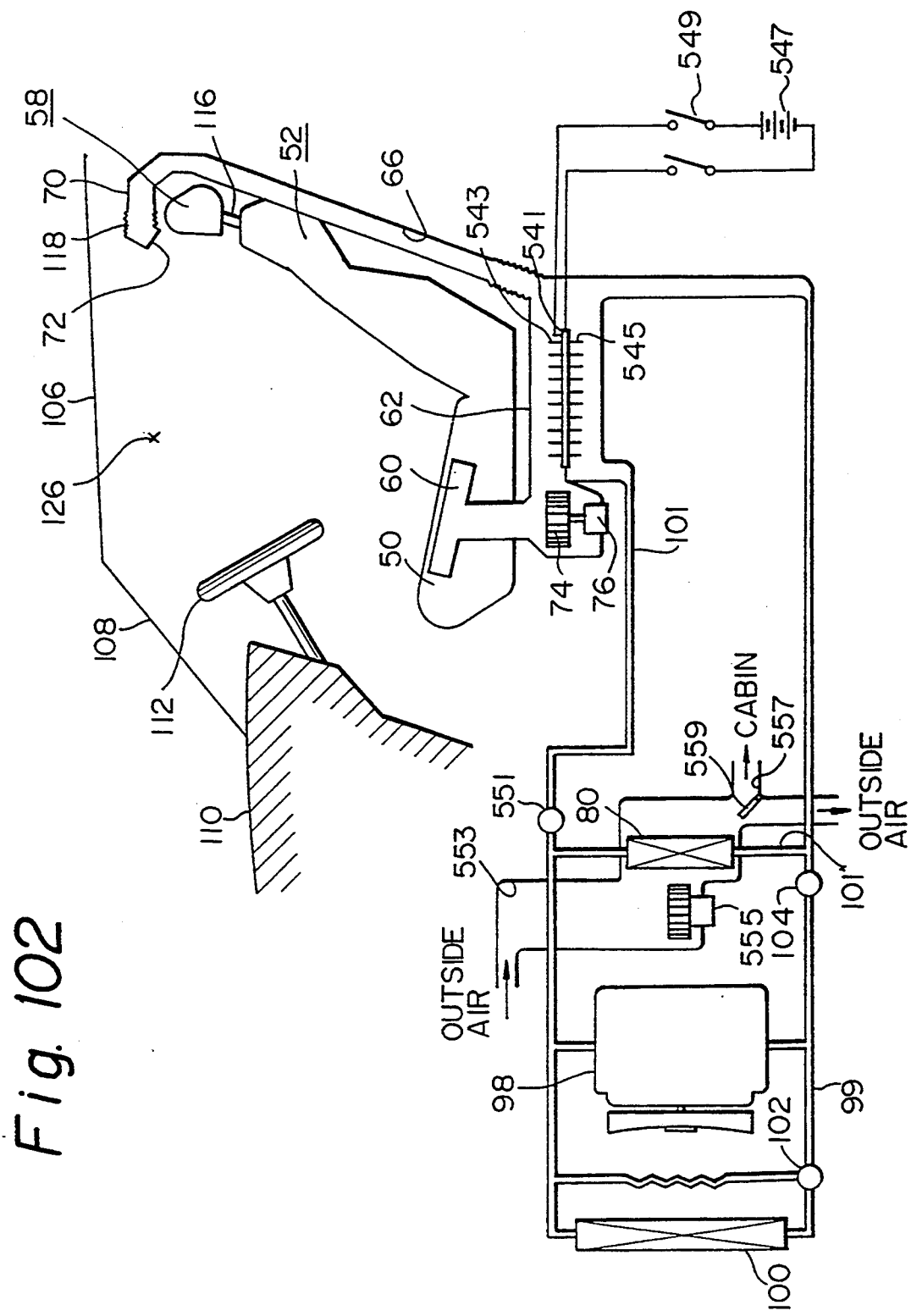

FIG. 102 is a schematic view of the 35th embodiment.

Figure 103:
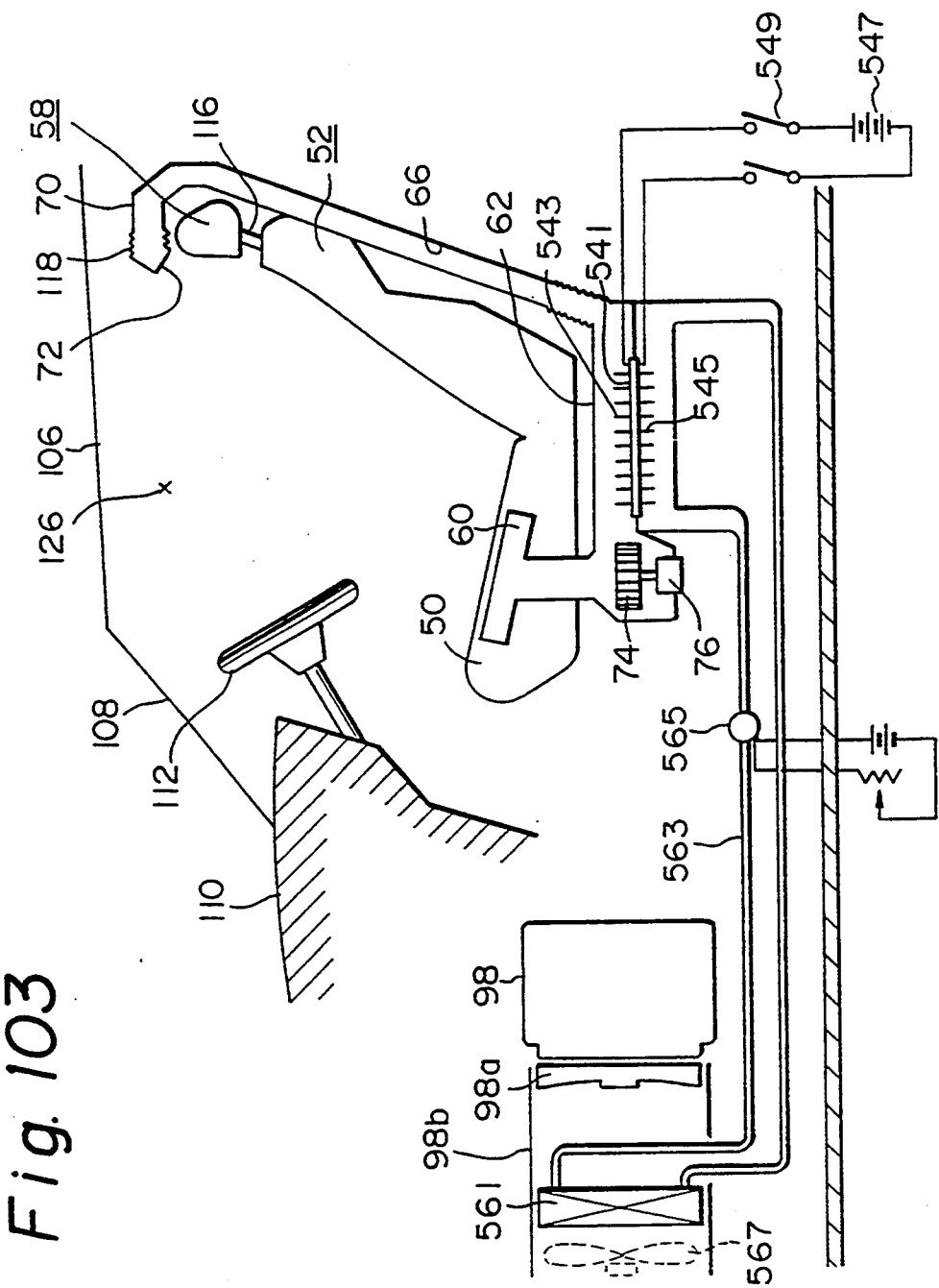

FIG. 103 is a schematic view of the 36th embodiment.

Figure 104A:
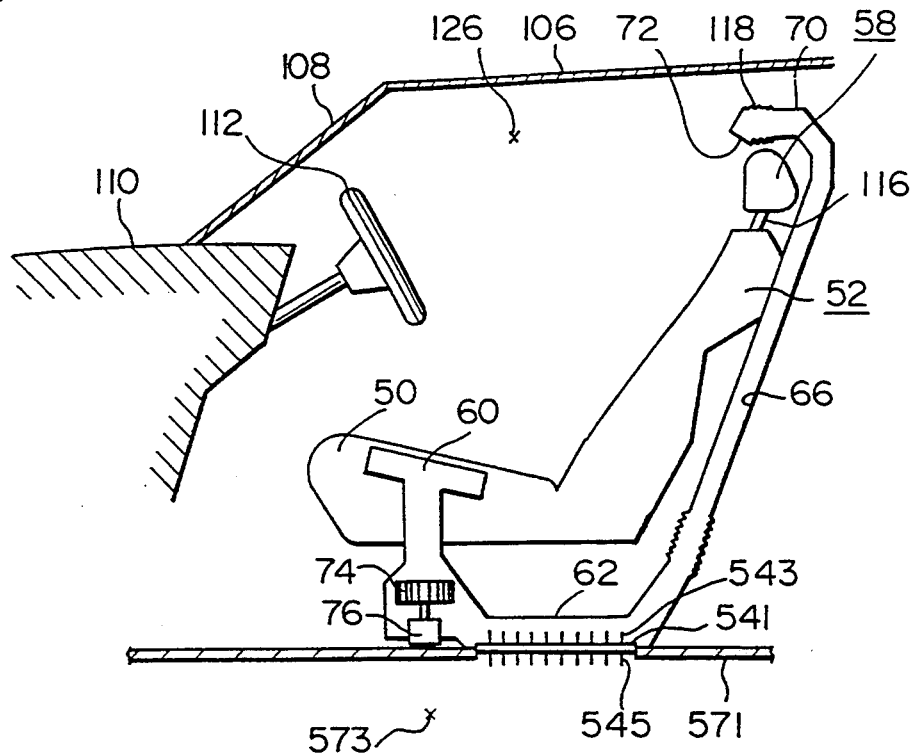

FIG. 104(A) is a schematic view of the 37th embodiment.

Figure 104B:
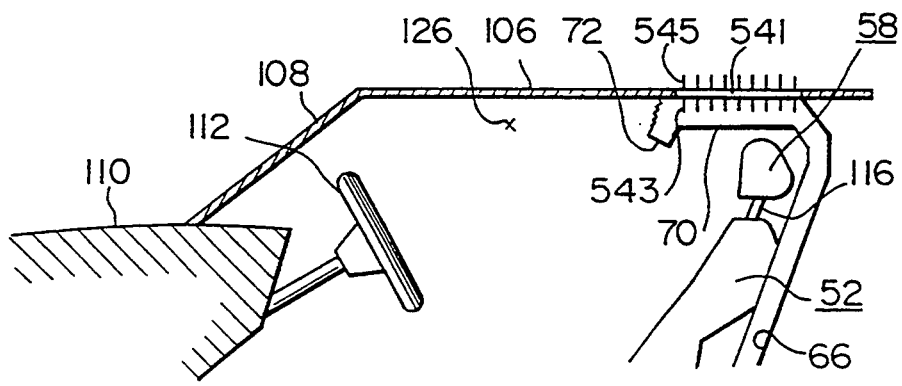

FIG. 104(B) is a modification of the 37th embodiment in FIG. 104(A).

Figure 105:
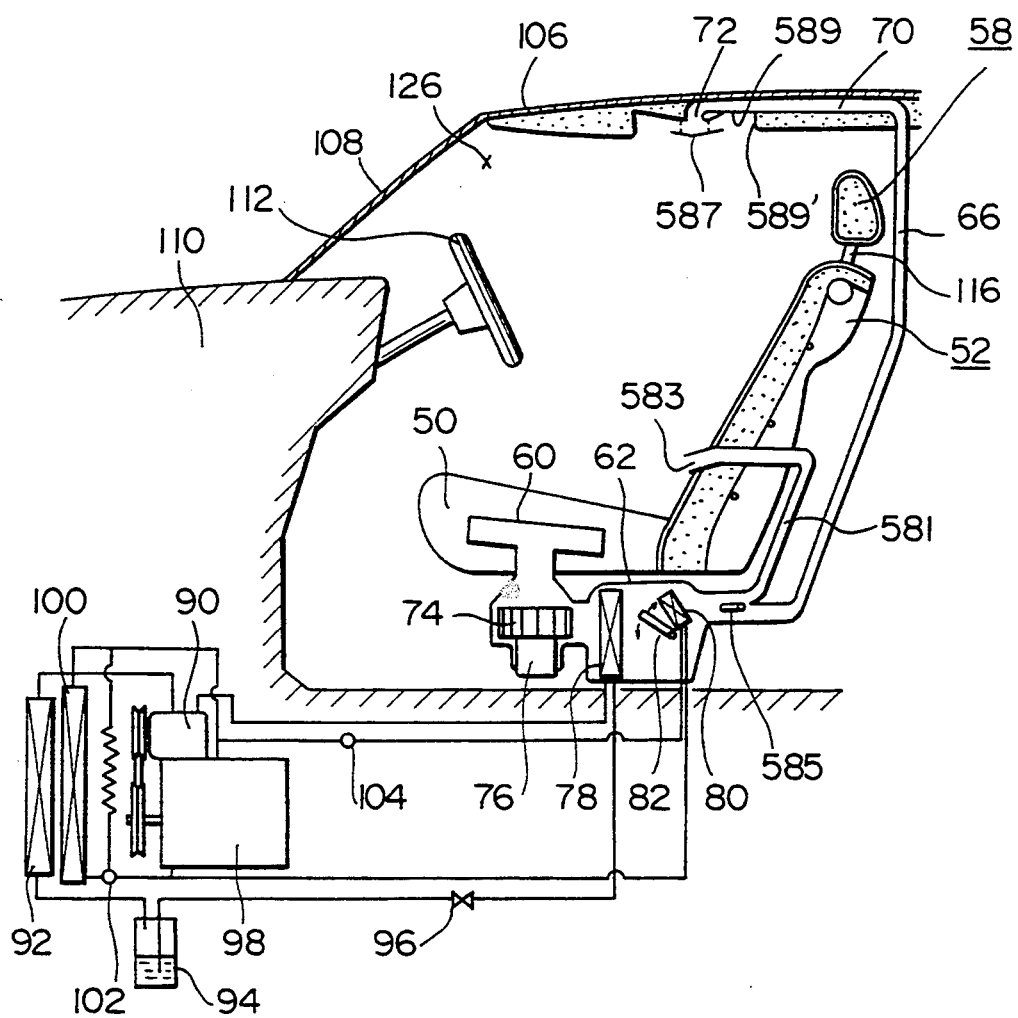

FIG. 105 is schematic view of the 38th embodiment.

Figure 106:
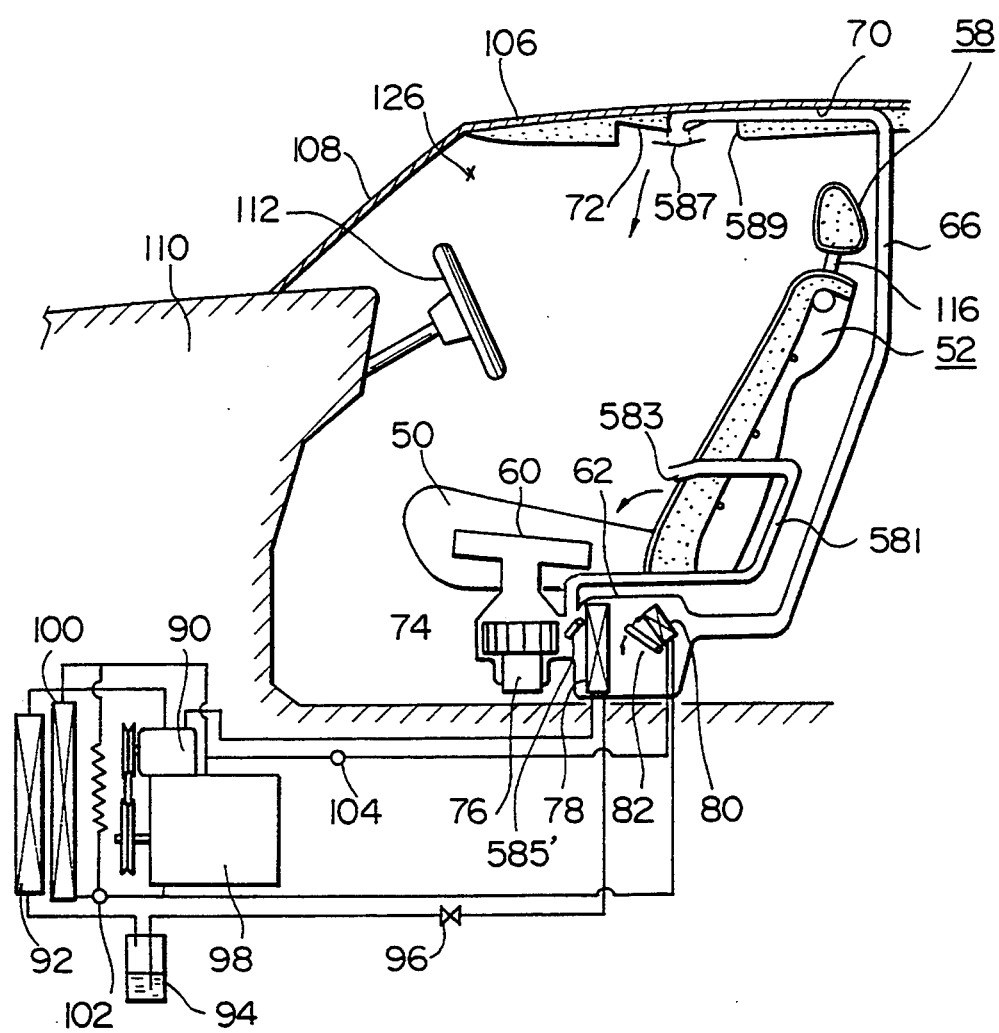

FIG. 106 is a modification of the 38th embodiment in FIG. 105.

Figure 107A:
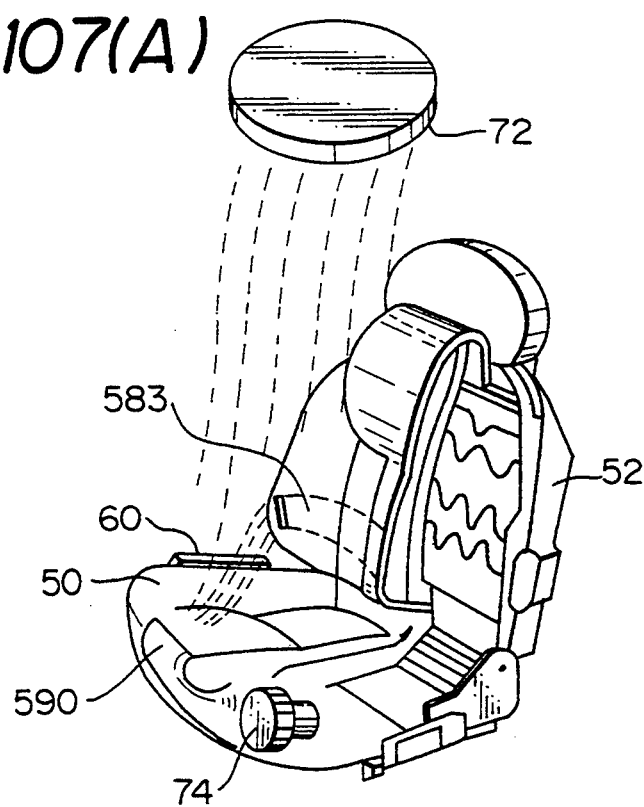

FIG. 107(A) is a schematic perspective view illustrating an arrangement of the top duct with respect to a seat in the 38th embodiment.

Figure 107B:
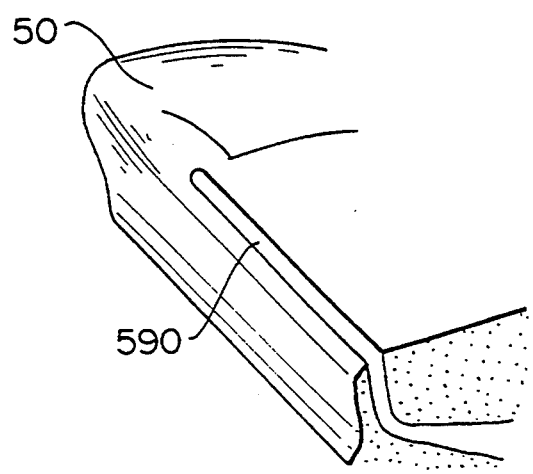

FIG. 107(B) is a perspective view of a front portion of a seat provided with air inlet port.

Figure 108:
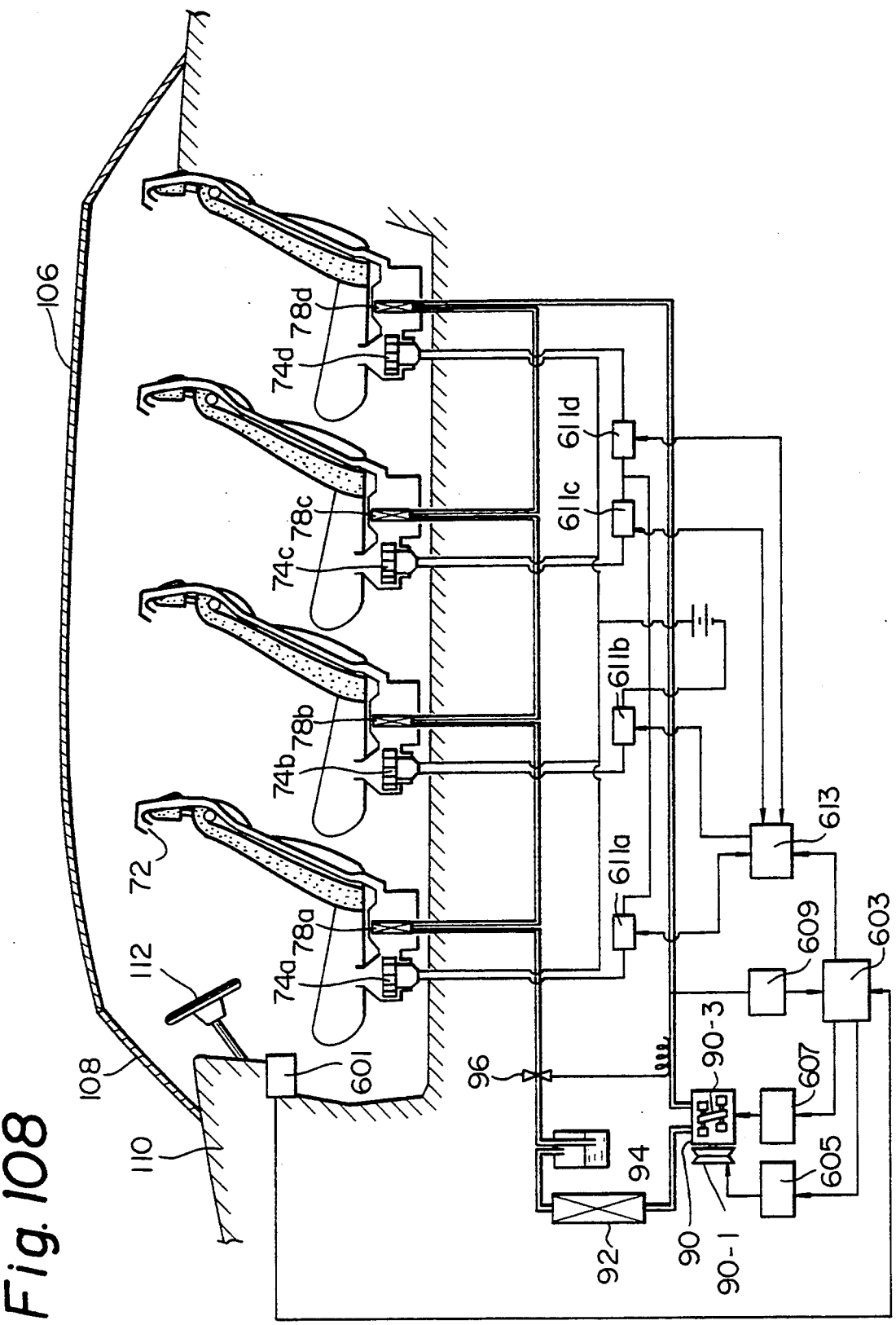

FIG. 108 is schematic view of the 39th embodiment.

Figure 109:
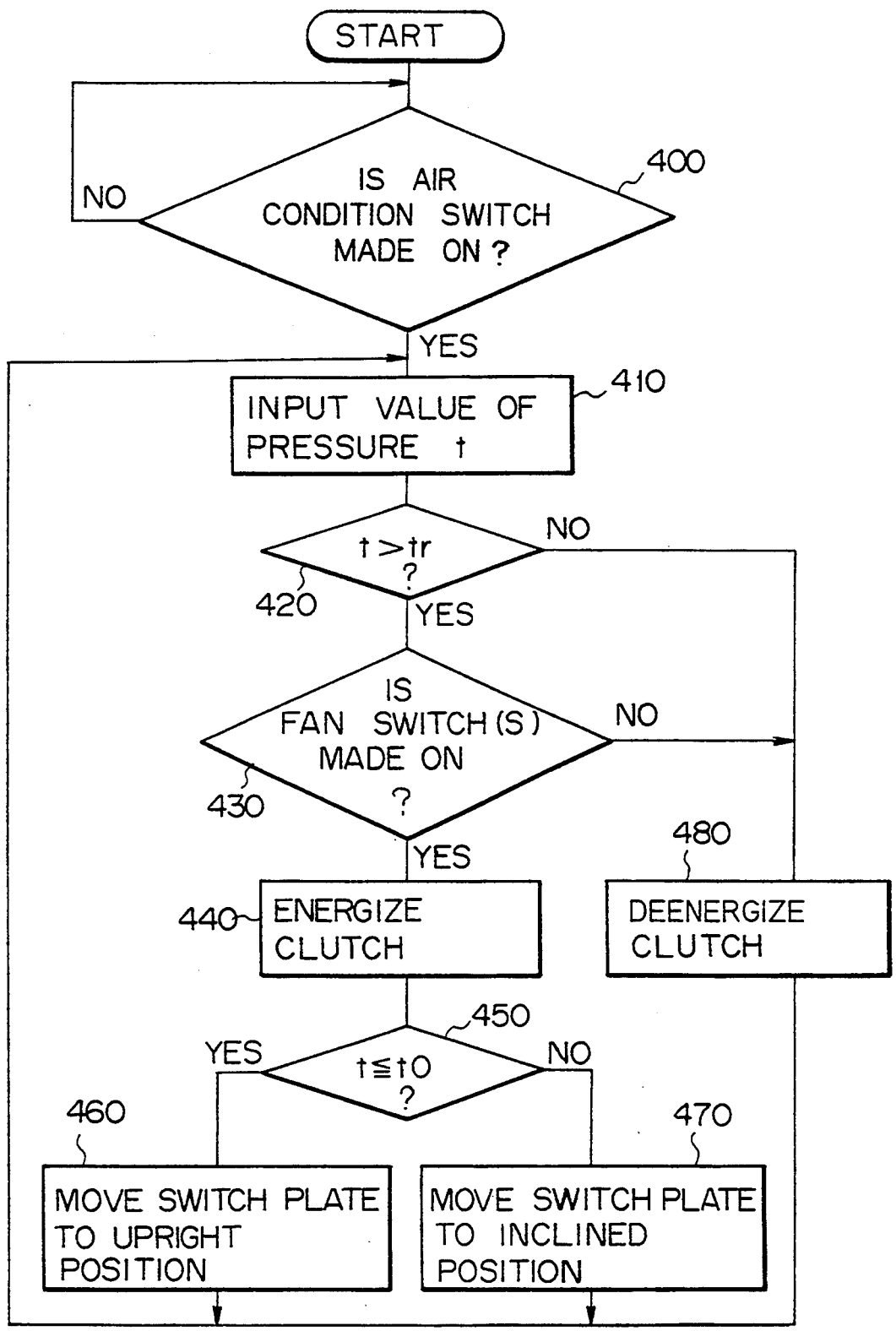

FIG. 109 is a flowchart illustrating an operation of the 39th embodiment in FIG. 108.

Figure 110:
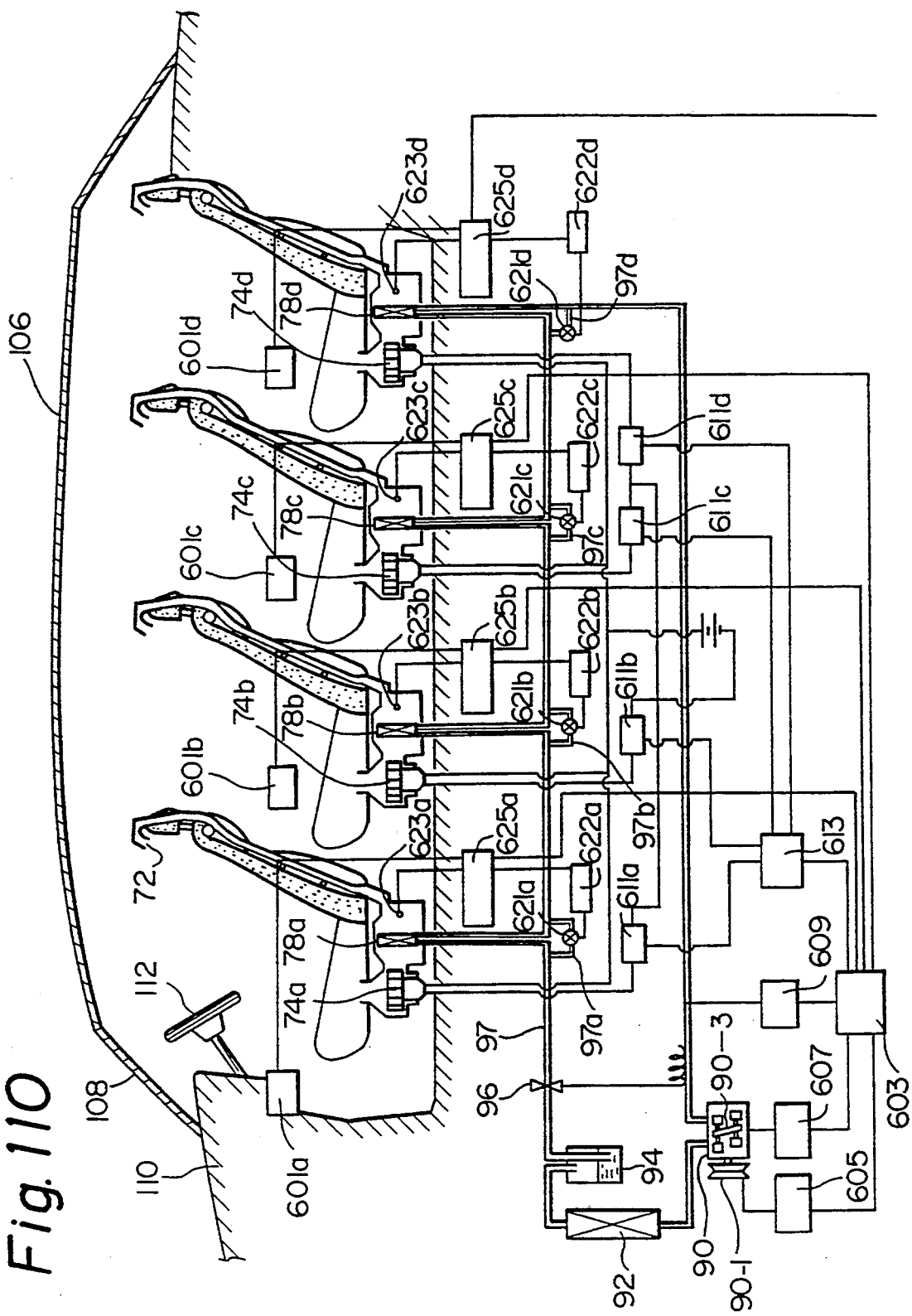

FIG. 110 is schematic view of the 40th embodiment.

Figure 111:
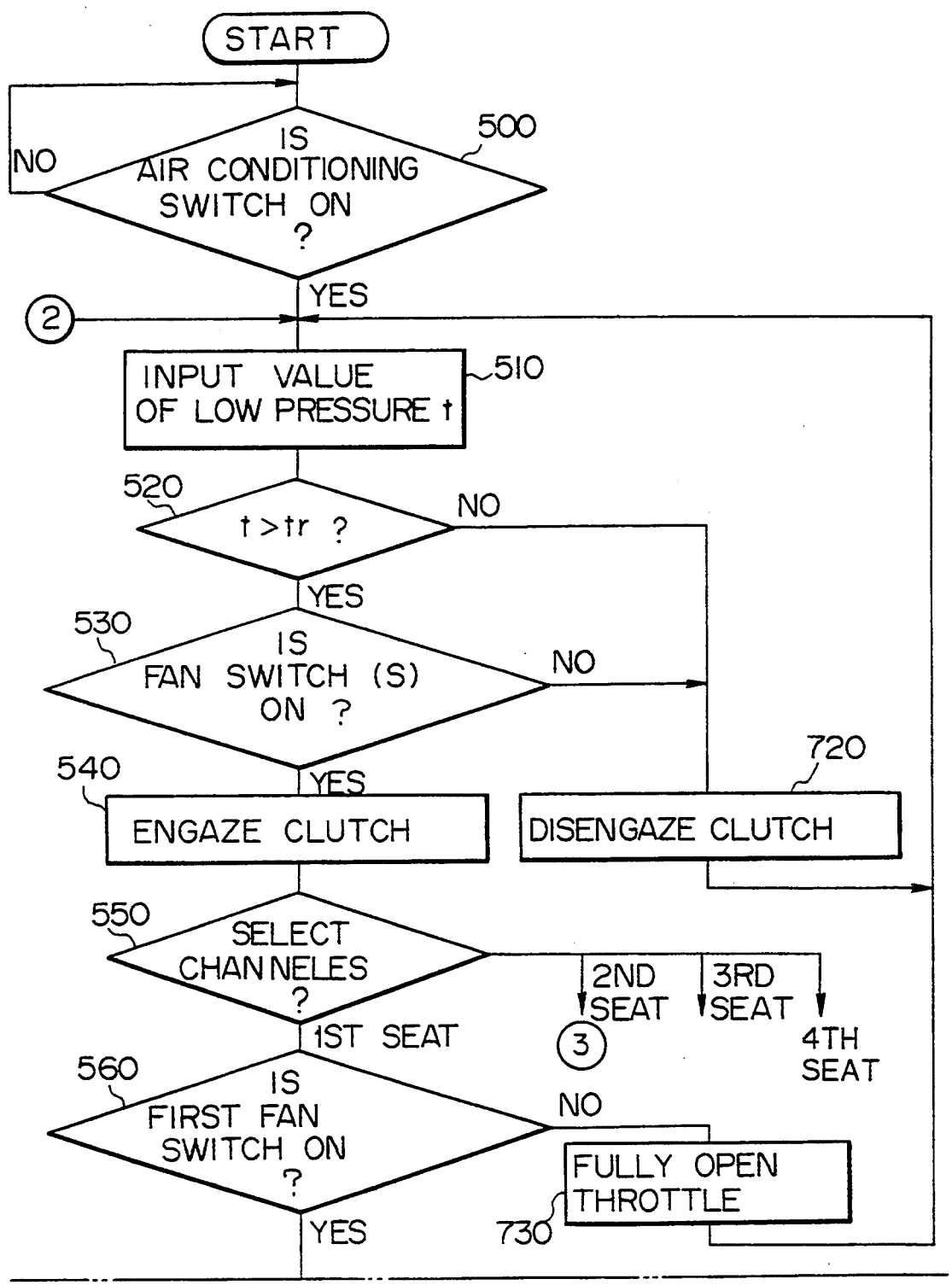
Figure 112:
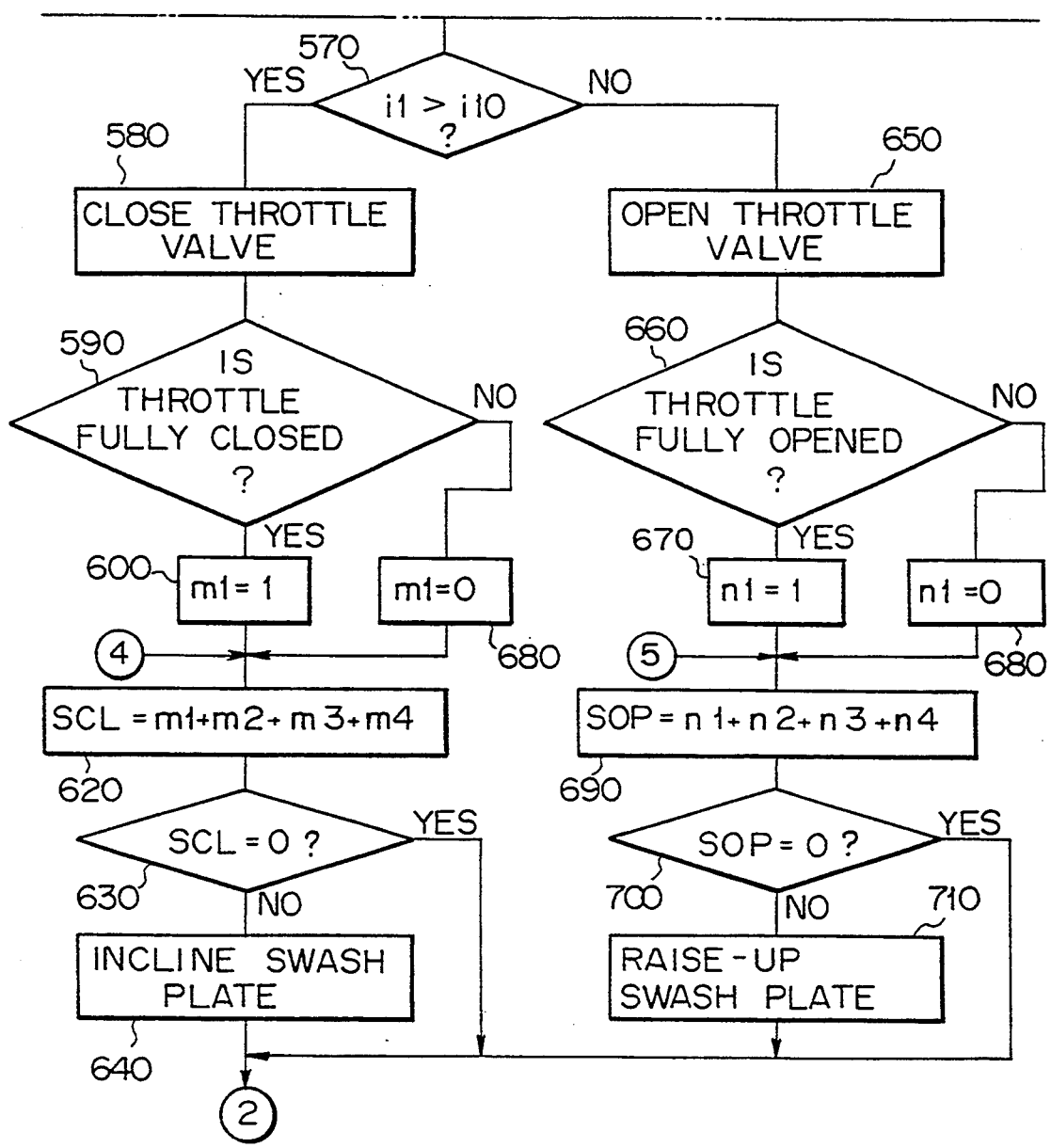
Figure 113:
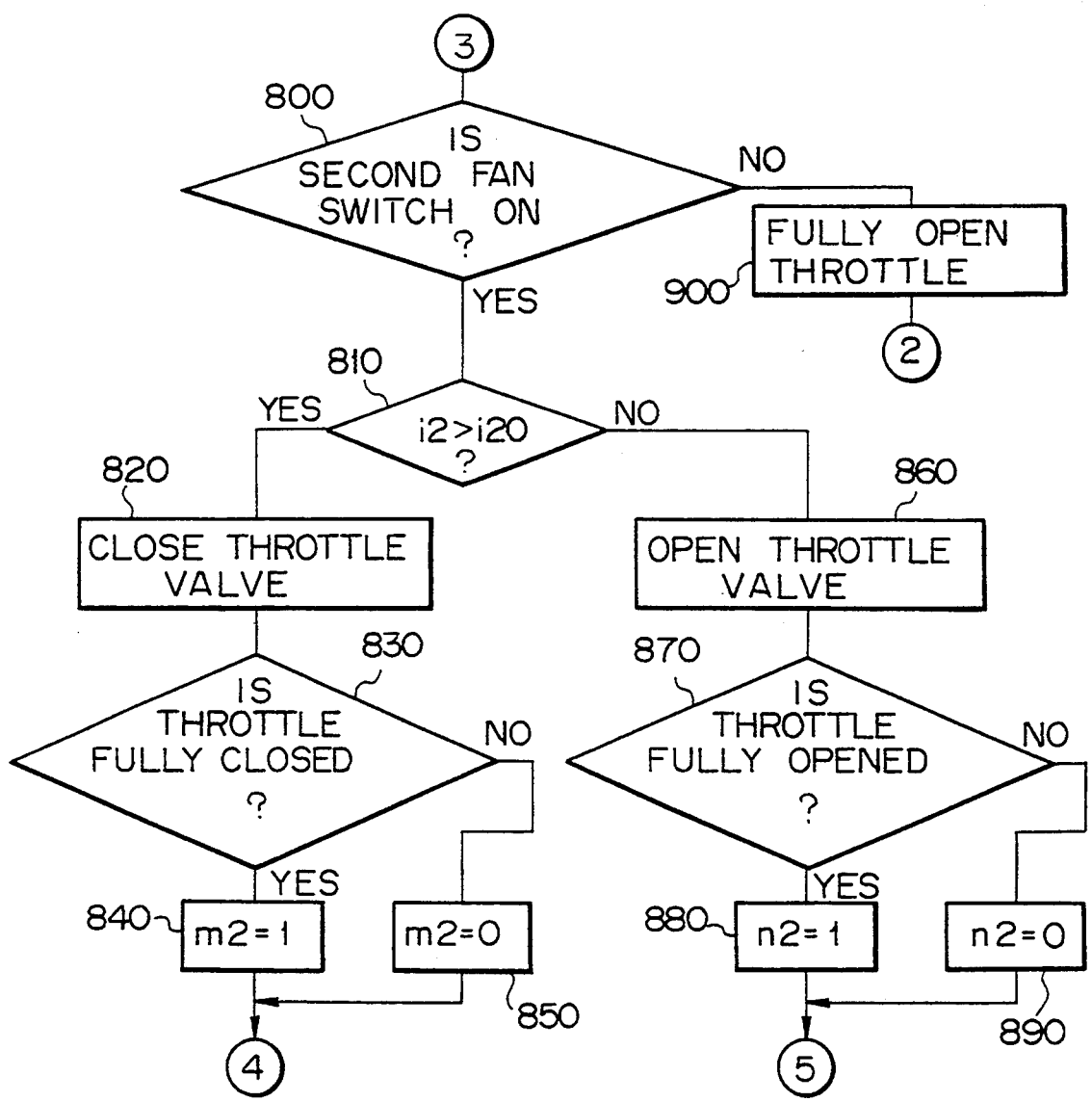

FIGS. 111 to 113 are flowcharts illustrating an operation of the 40th embodiment in FIG. 110.

Figure 114:
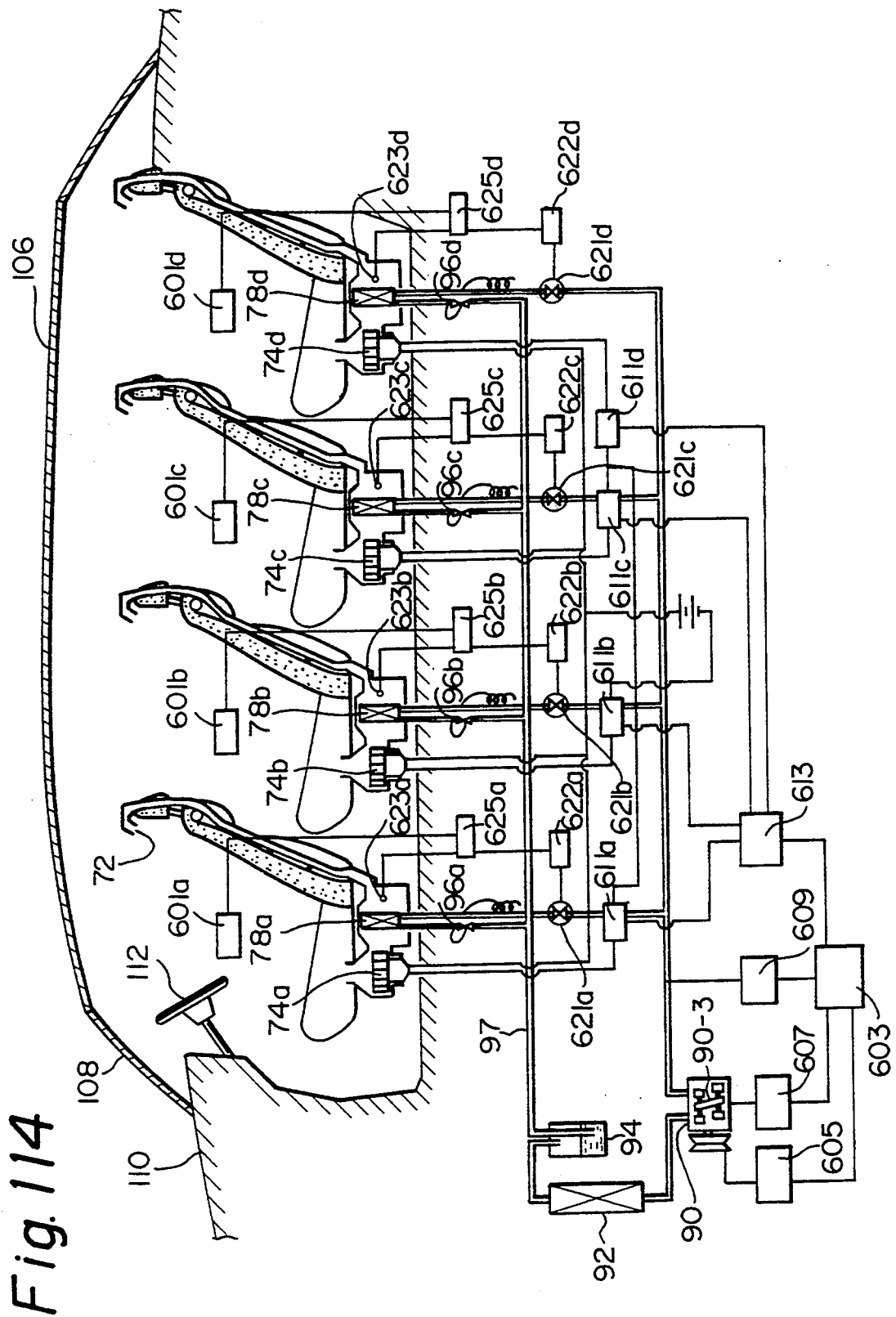

FIG. 114 is schematic view of the 41st embodiment.

Figure 115:
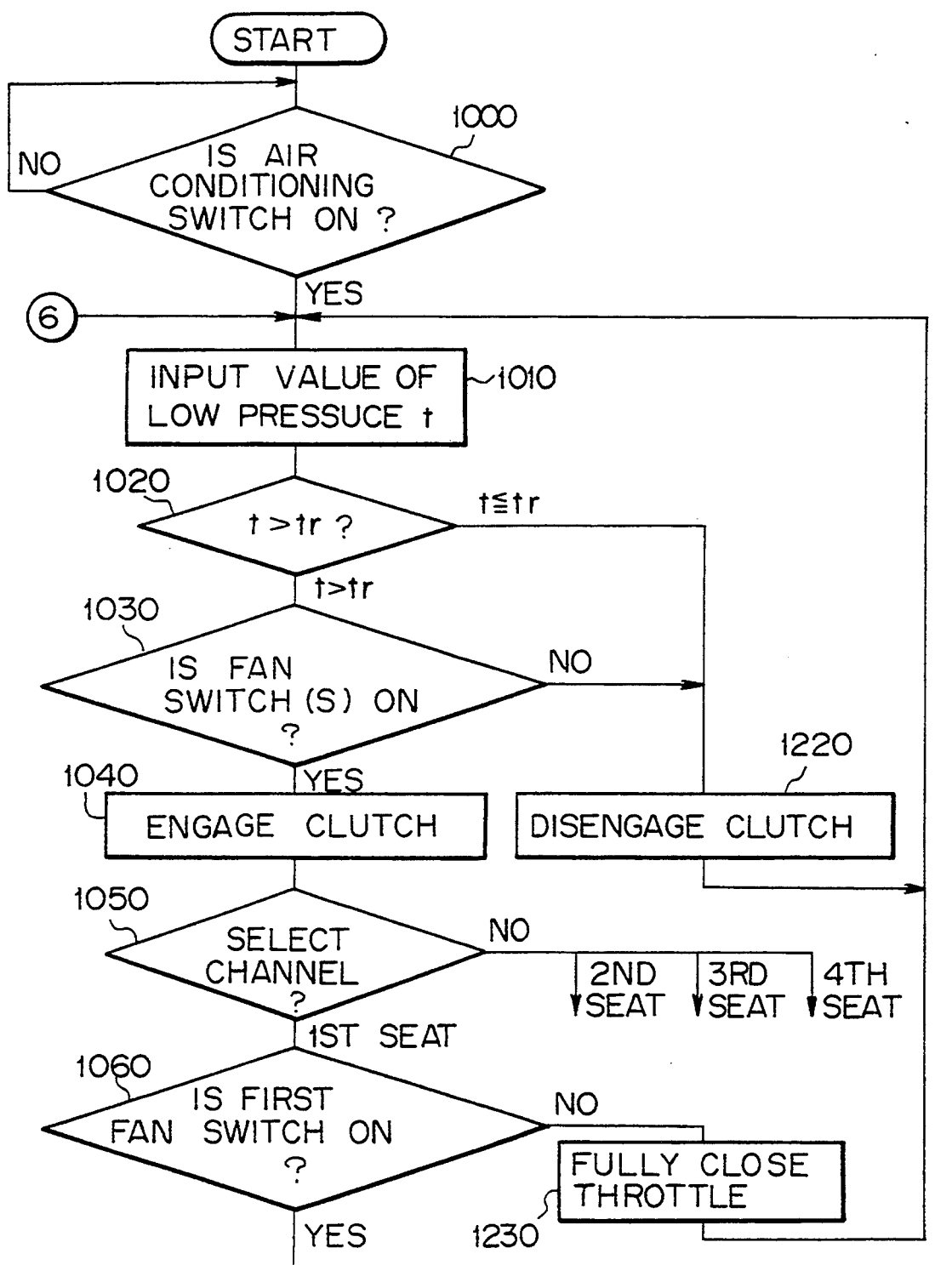
Figure 116:
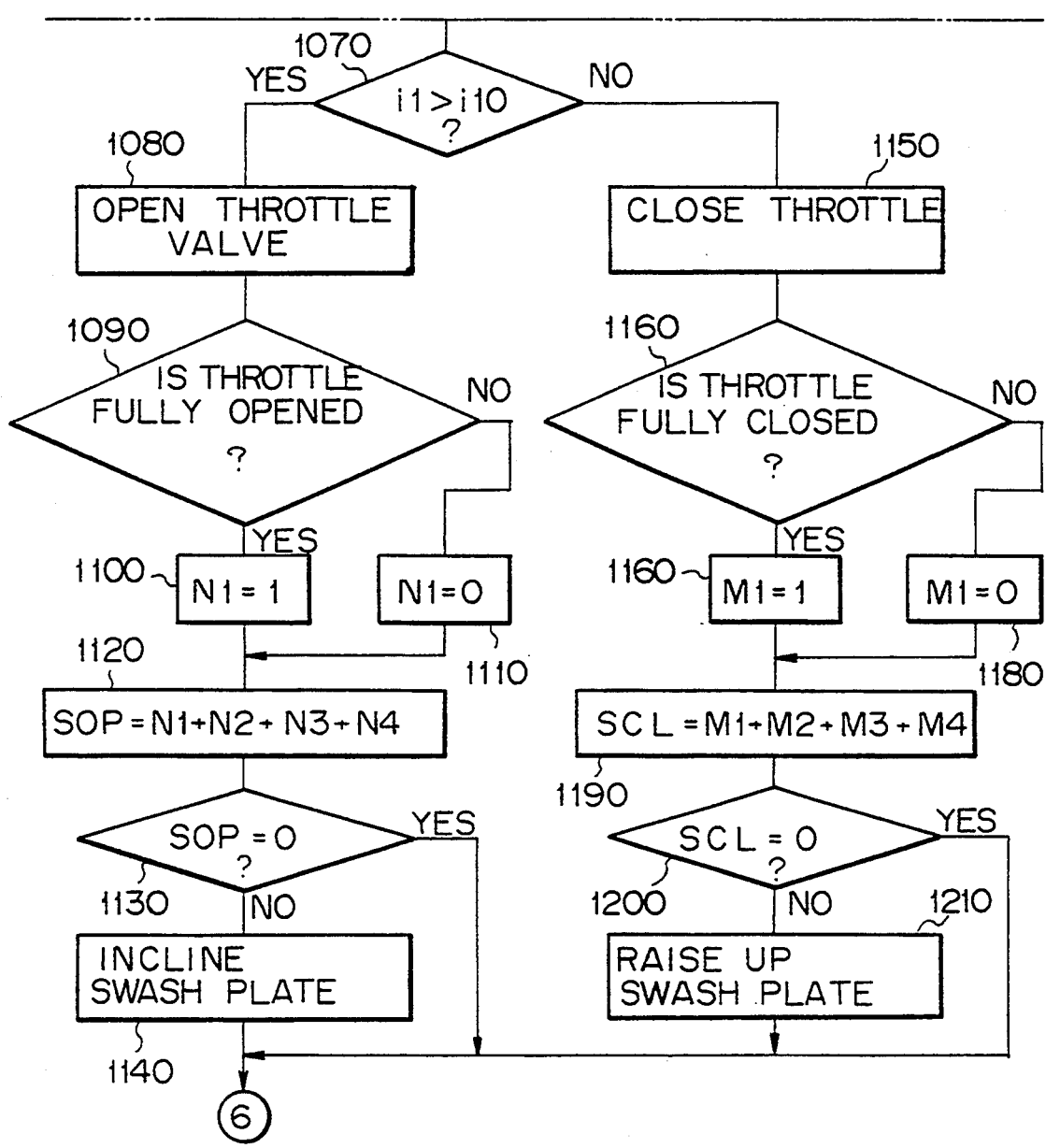

FIGS. 115 and 116 are flowcharts illustrating an operation of the 41st embodiment in FIG. 114.

Figure 117:
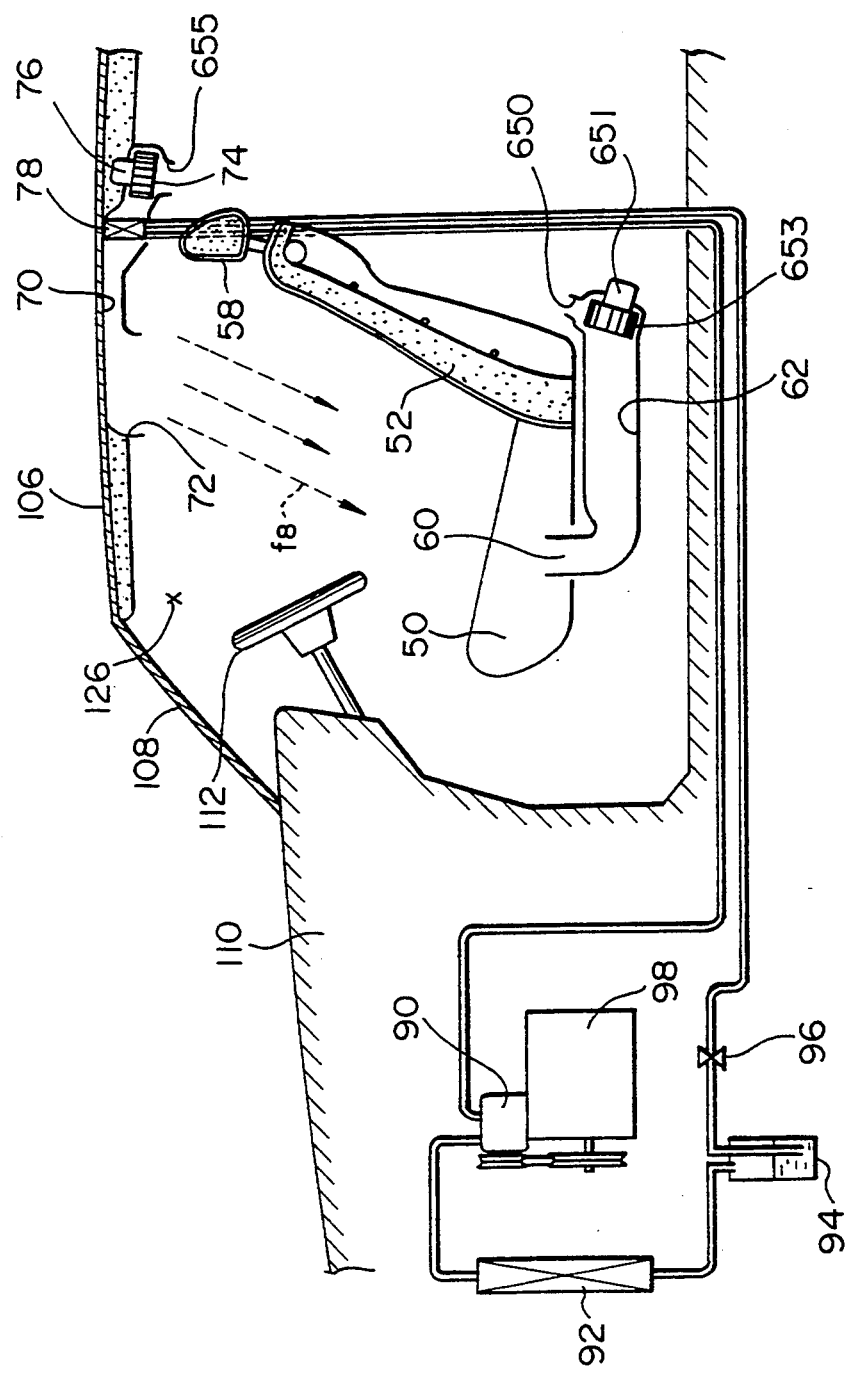

FIG. 117 is schematic cross sectional view of the 42nd embodiment.

Figure 118:
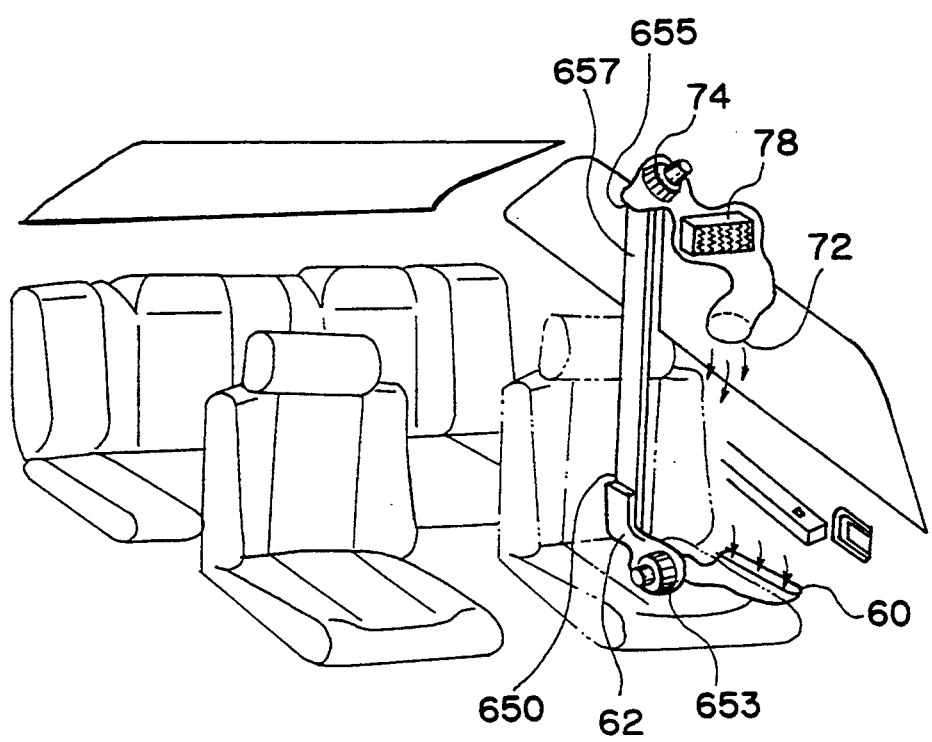

FIG. 118 is a schematic perspective illustration of an arrangement of units in the 42nd embodiment in FIG. 117.

Figures 119A, 119B, 119C, 119D:
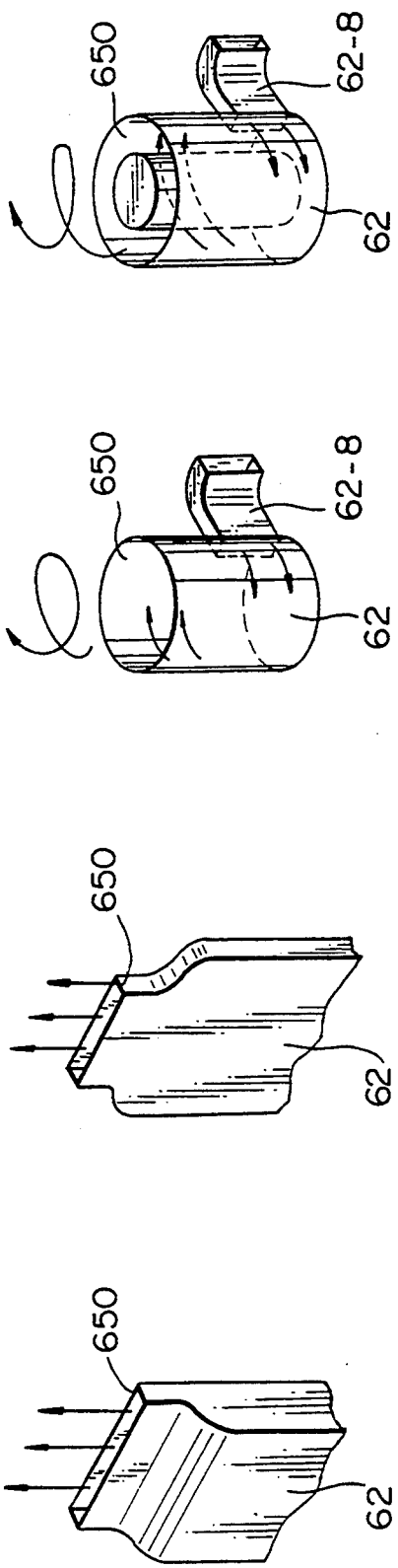

FIGS. 119(A), (B), (C) and (D) illustrate various constructions of a discharge outlet in the embodiment in FIG. 117.

Figure 120:
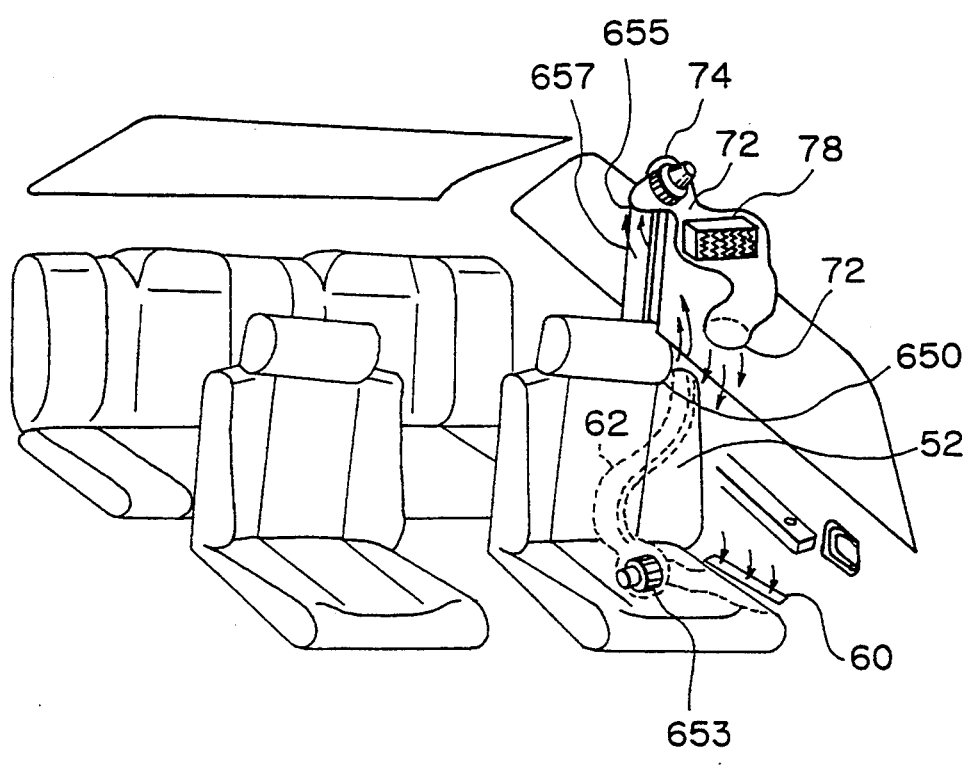

FIG. 120 is a schematic perspective illustration of a modified arrangement of units in the 42nd embodiment in FIG. 117.

Figure 121A:
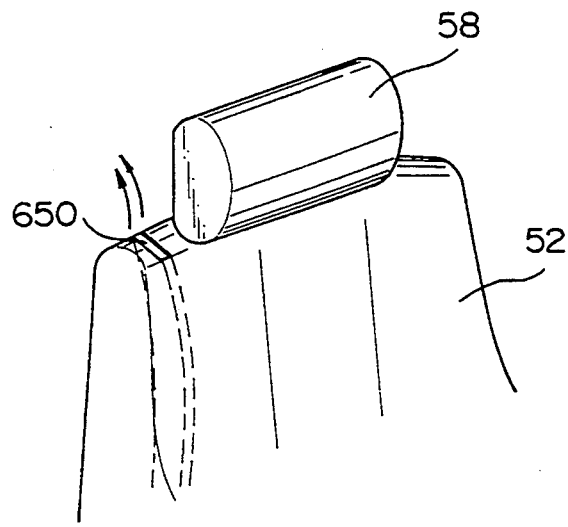
Figure 121B:
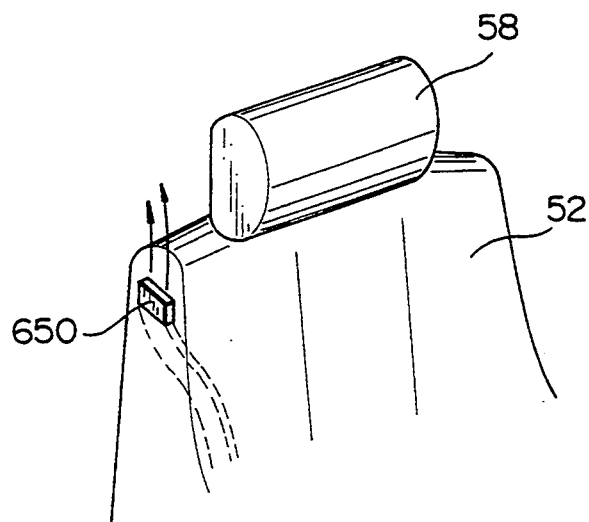

FIGS. 121(A) and (B) are partial perspective view a of examples of arrangements of a discharge outlet in the 42nd embodiment in FIG. 117.

Figure 122:
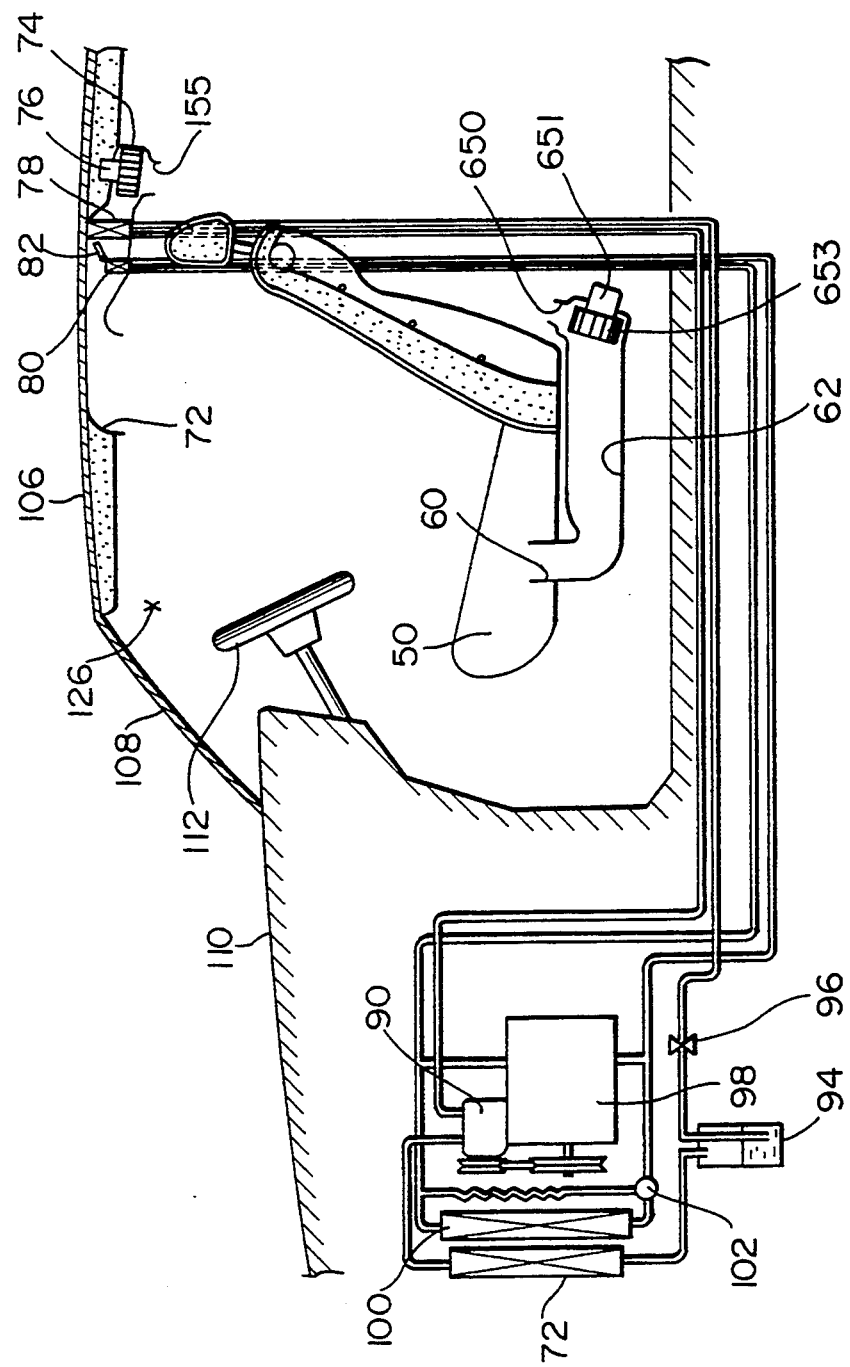

FIG. 122 is a schematic cross sectional view of the 43rd embodiment.

Figure 123:
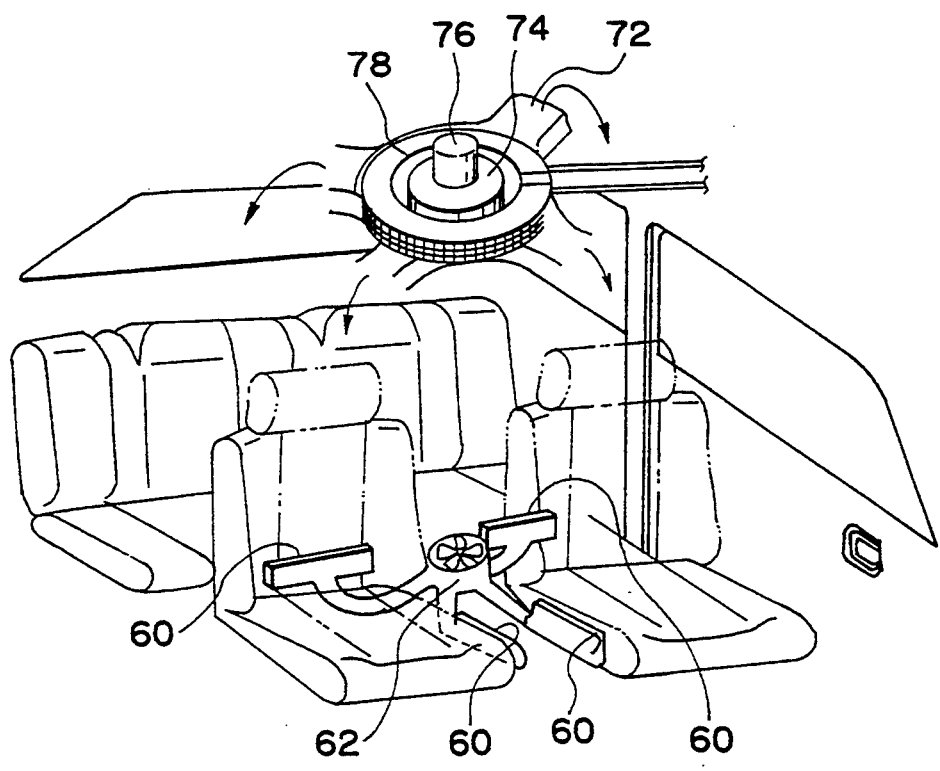

FIG. 123 is a schematic perspective view of the 44th embodiment.

Figure 124:
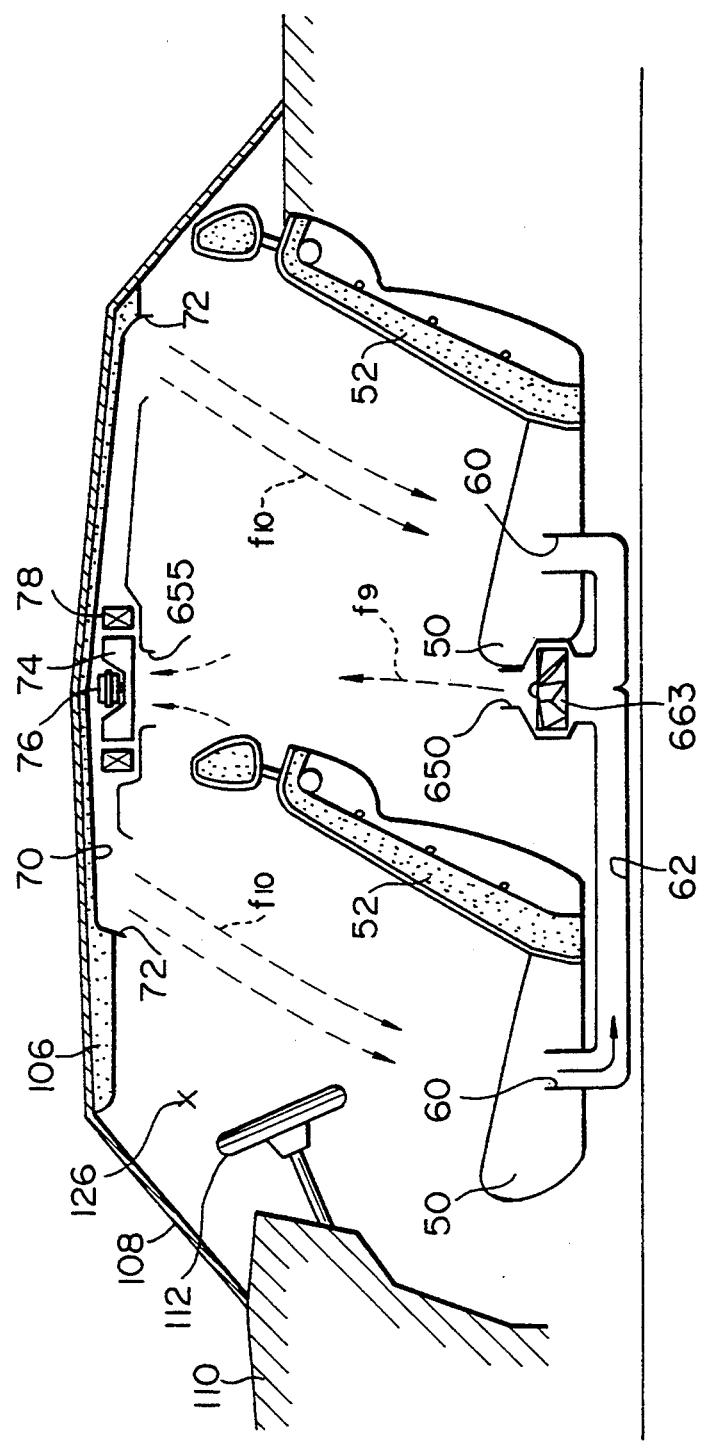

FIG. 124 is a schematic cross sectional view of the 44th embodiment in FIG. 123.

Figure 125:
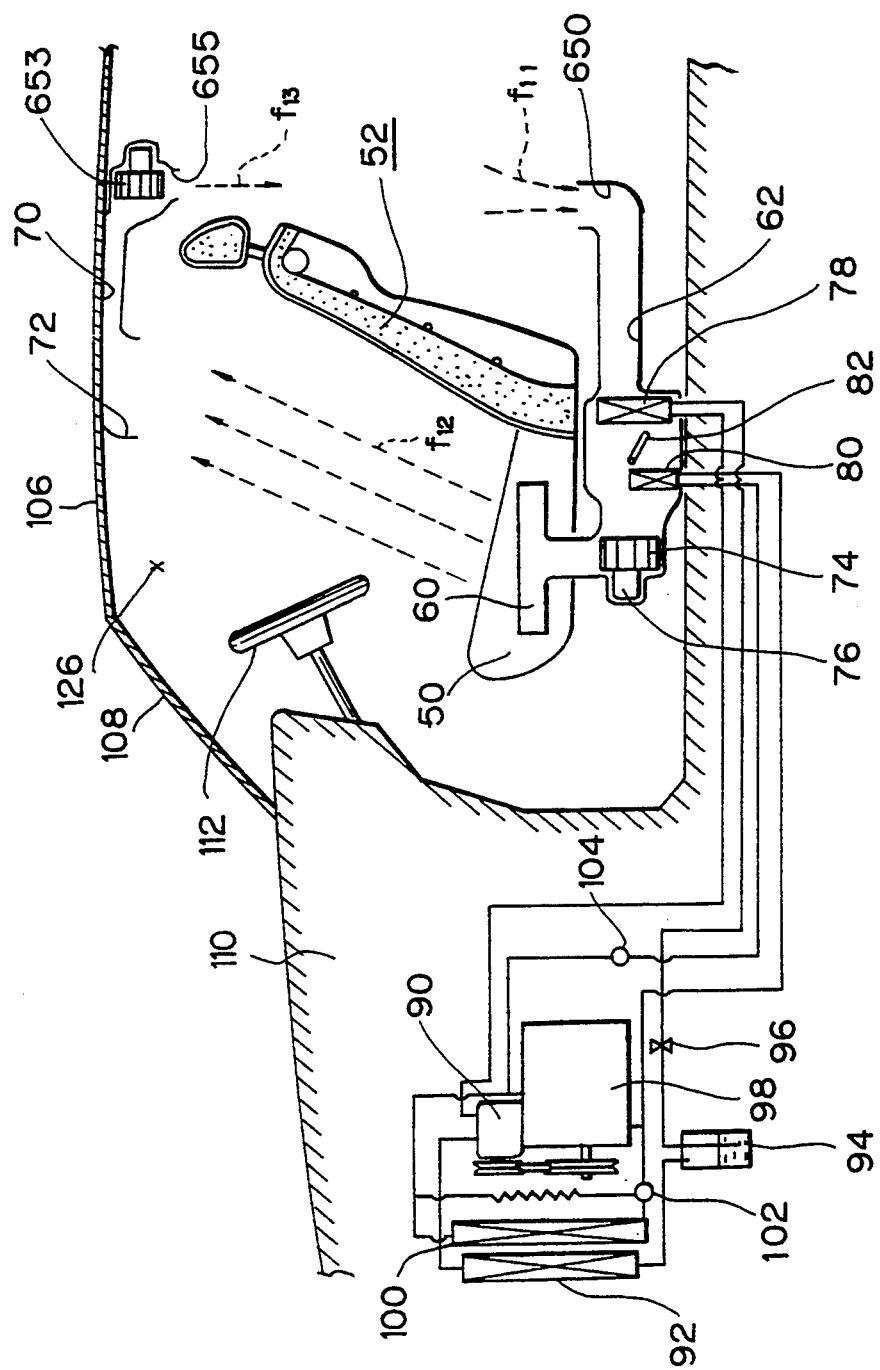

FIG. 125 is a schematic cross sectional view of the 45th embodiment.

Figure 126:
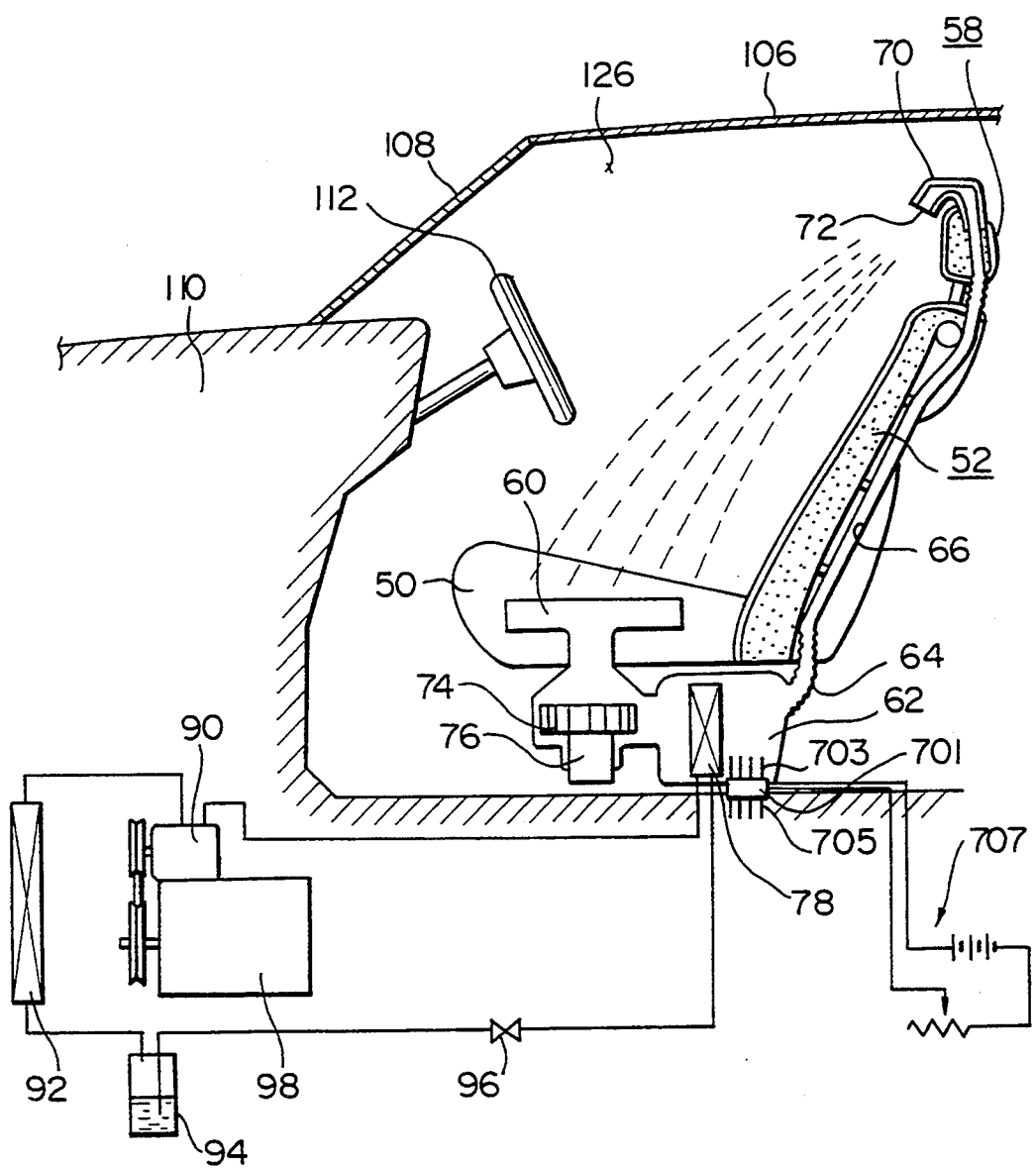

FIG. 126 is a schematic cross sectional view of the 46th embodiment.

Figure 127A:
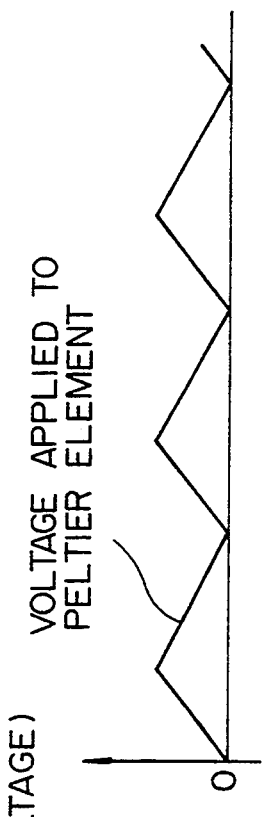

FIGS. 127(A), (B) and (C) are time charts illustrating how the Peltier element is controlled in the 46th embodiment in FIG. 126.

Figure 128:
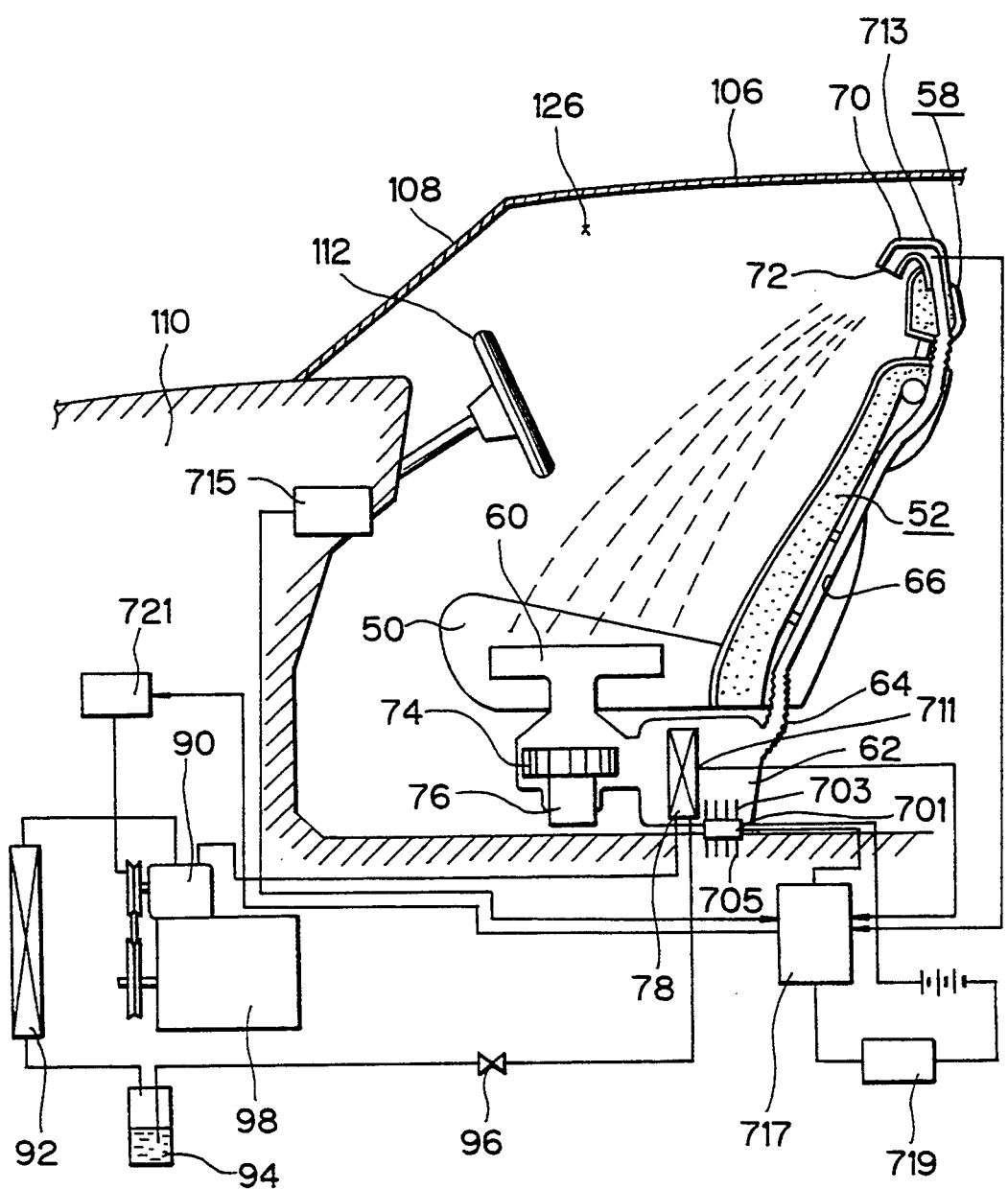

FIG. 128 is a schematic cross sectional view of the 47th embodiment.

Figure 129:
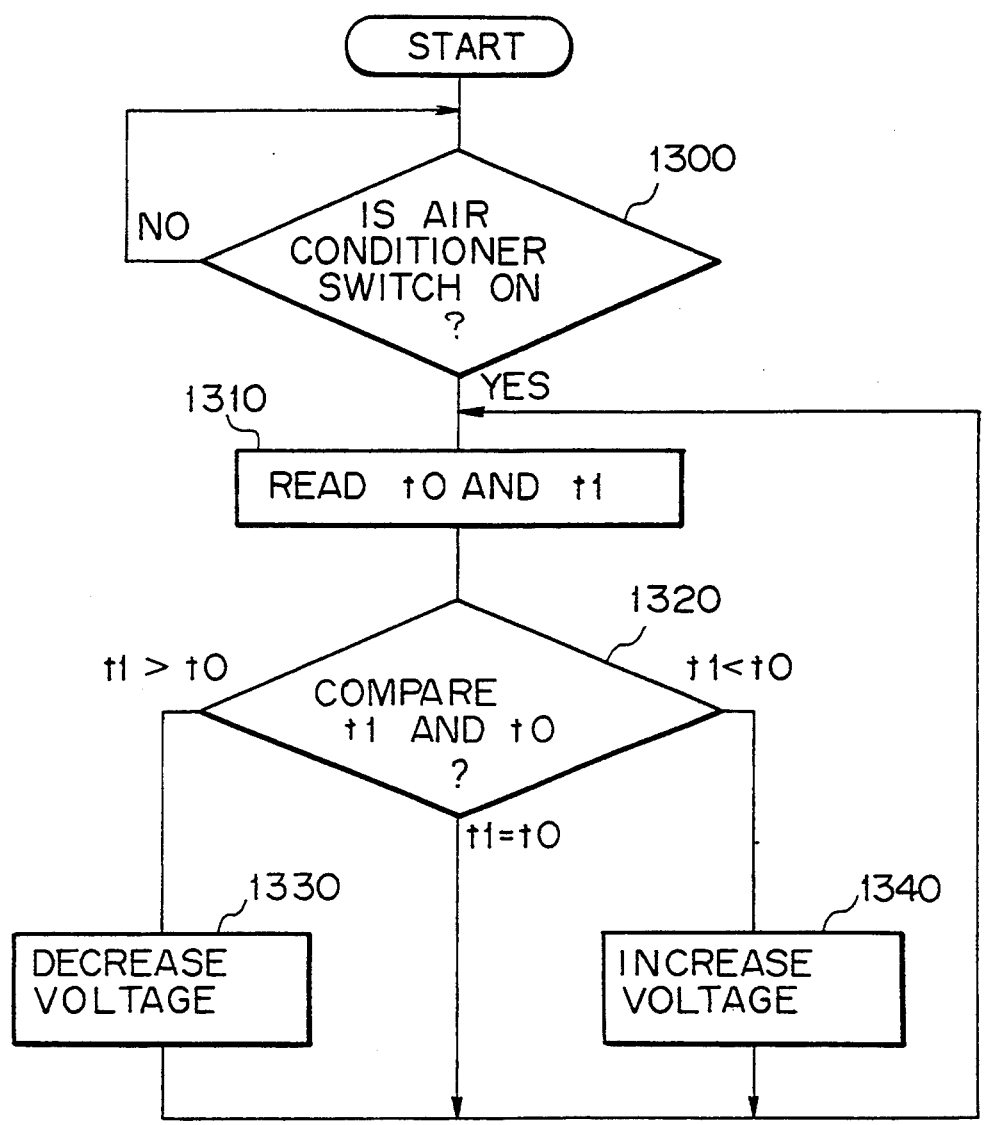

FIG. 129 is a flowchart illustrating how an electric voltage control is carried out in the 47th embodiment in FIG. 128.

Figure 130:
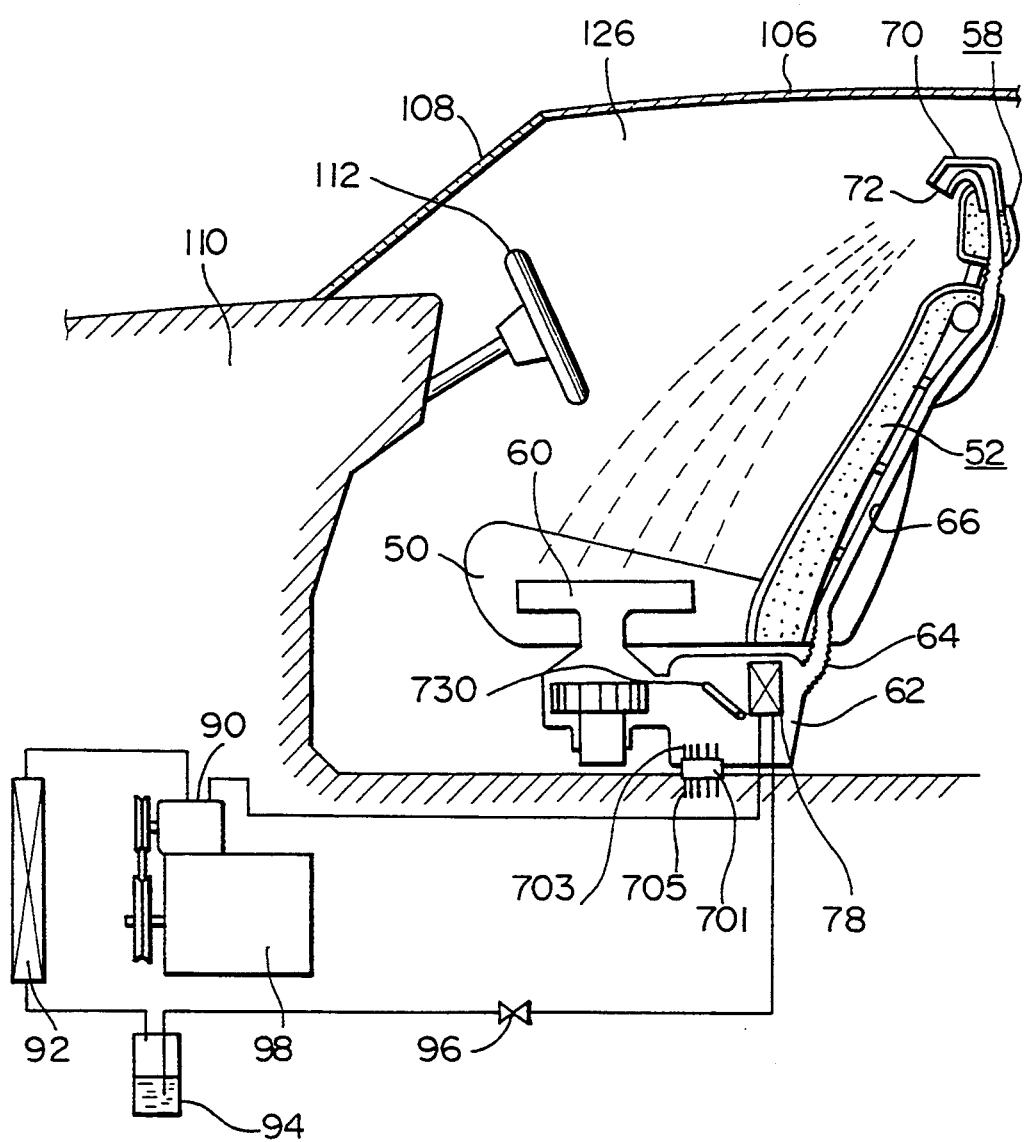

FIG. 130 is a schematic cross sectional view of the 48th embodiment.

Figure 131:
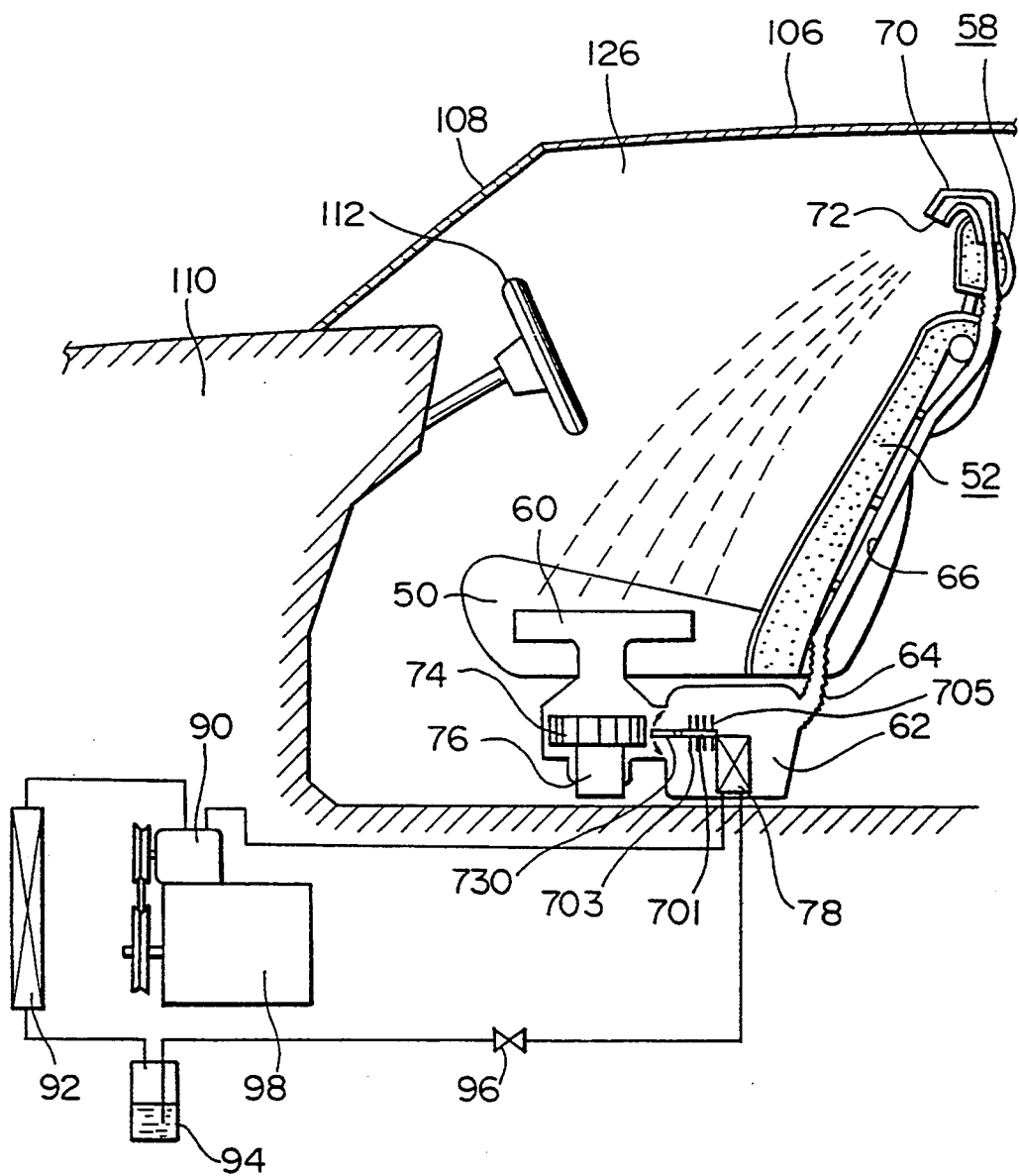

FIG. 131 is a schematic cross sectional view of the 49th embodiment.

Figure 132:
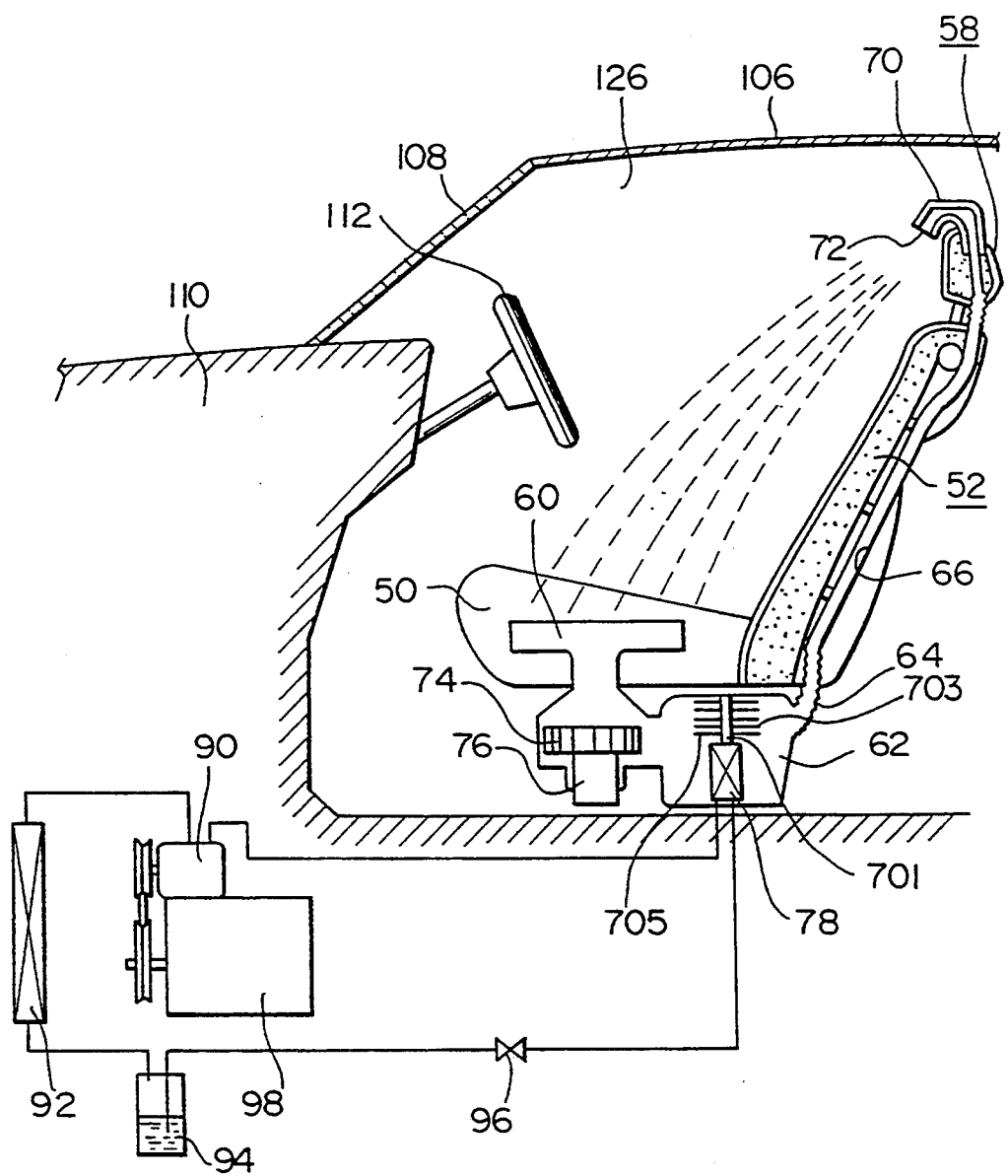

FIG. 132 is a schematic cross sectional view of the 50th embodiment.

Figure 133:
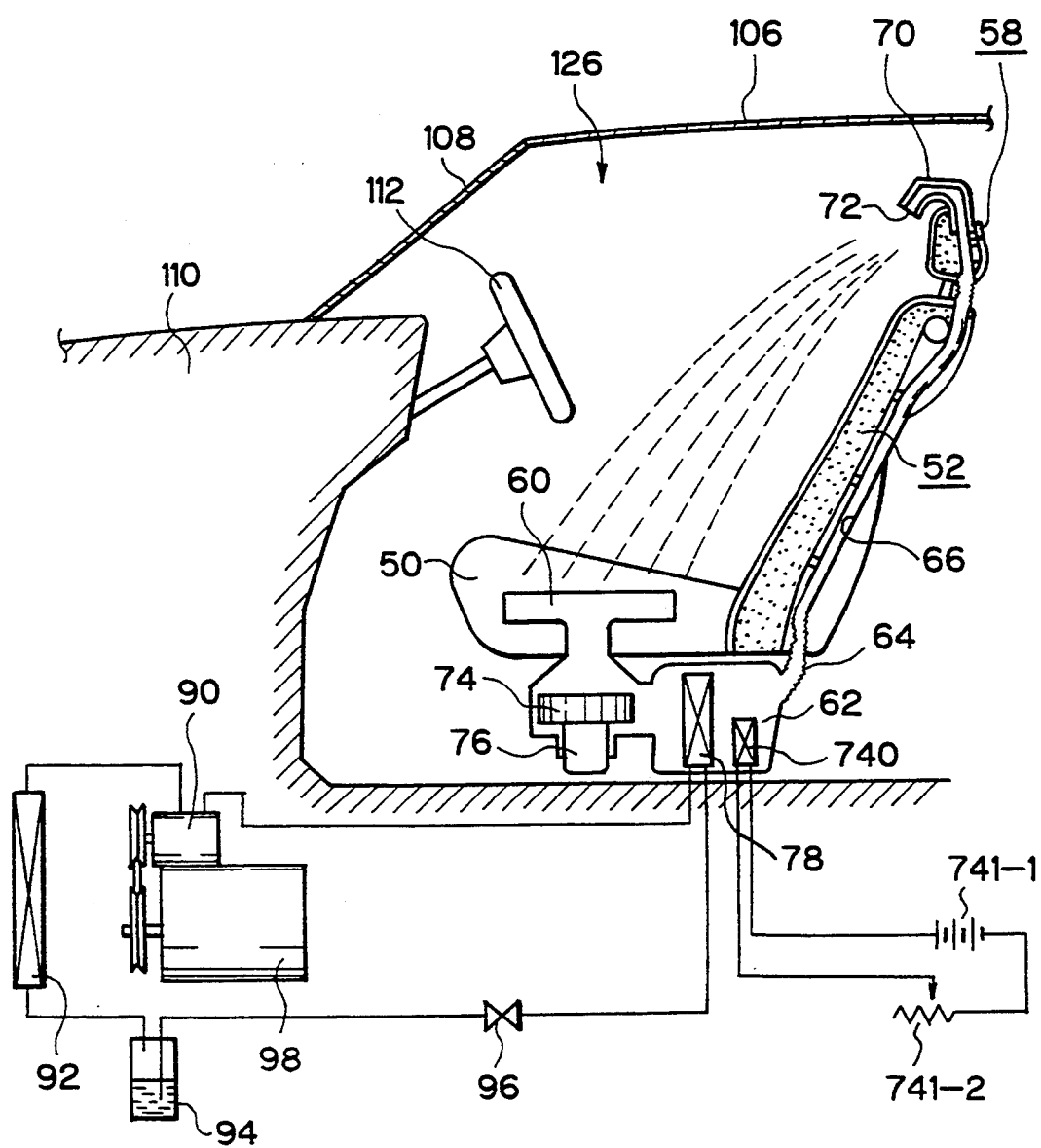

FIG. 133 is a schematic cross sectional view of the 51st embodiment.

Figure 134:
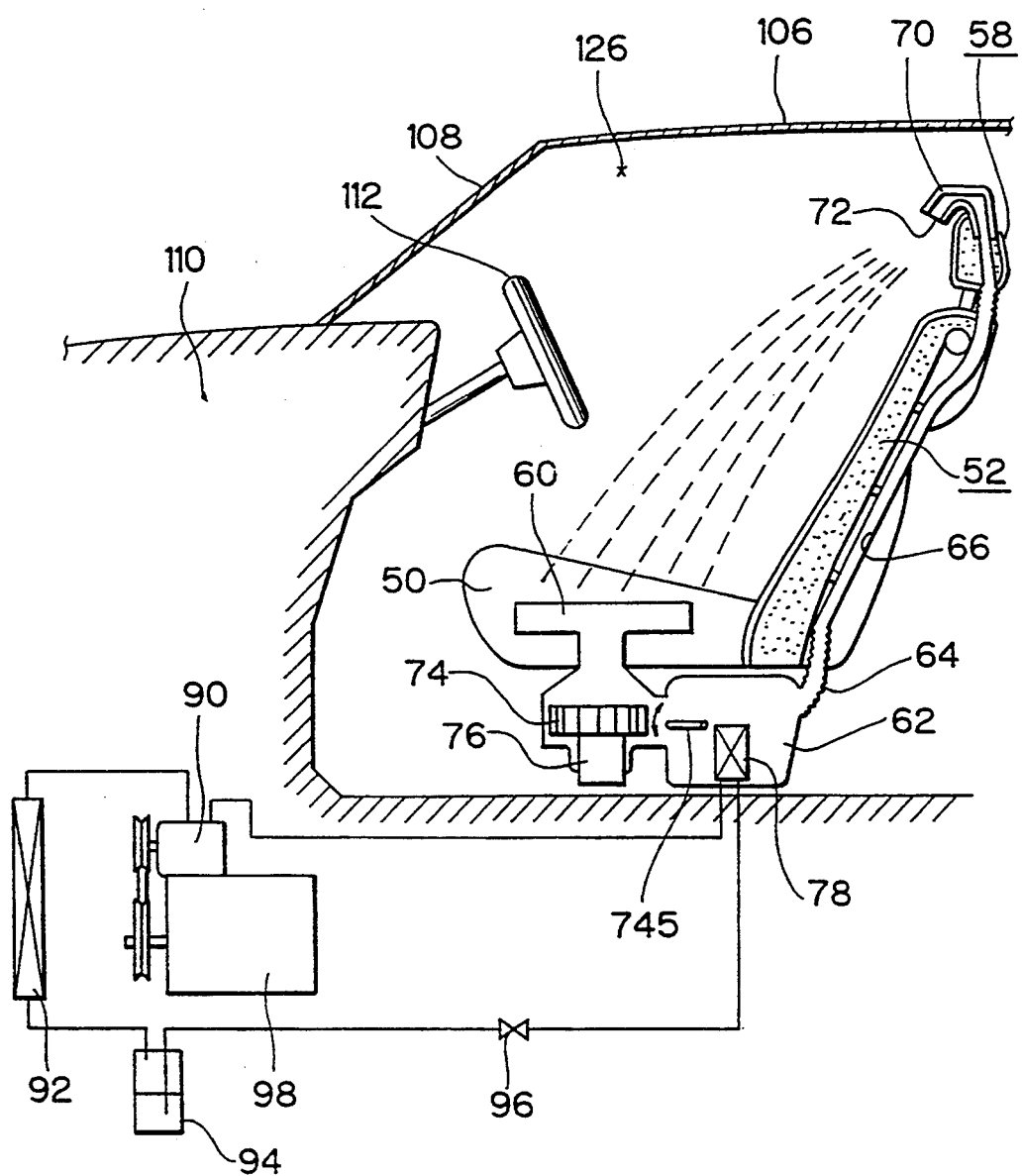

FIG. 134 is a schematic cross sectional view of the 52nd embodiment.

Figure 135:
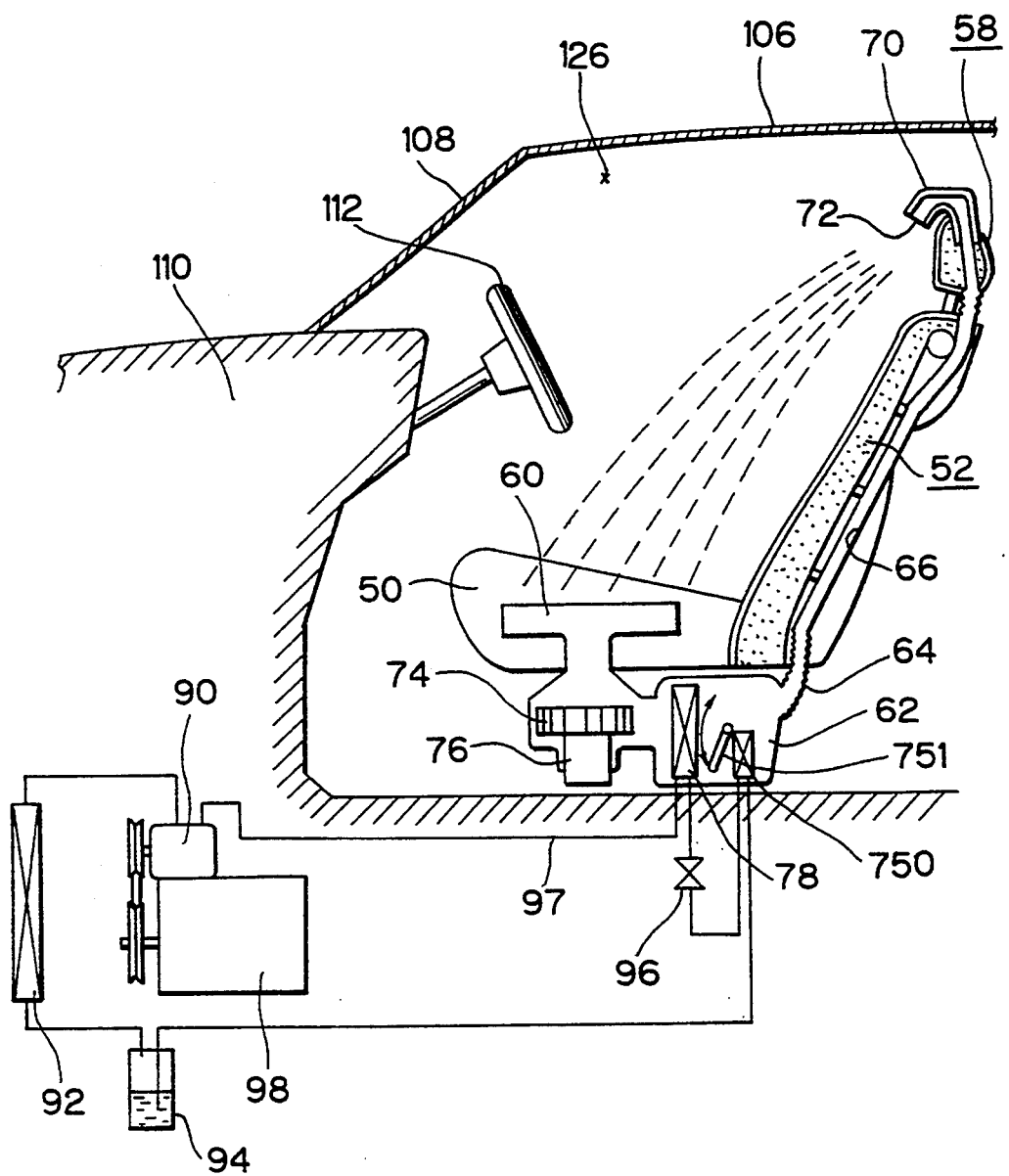

FIG. 135 is a schematic cross sectional view of the 53rd embodiment.

Figure 136:
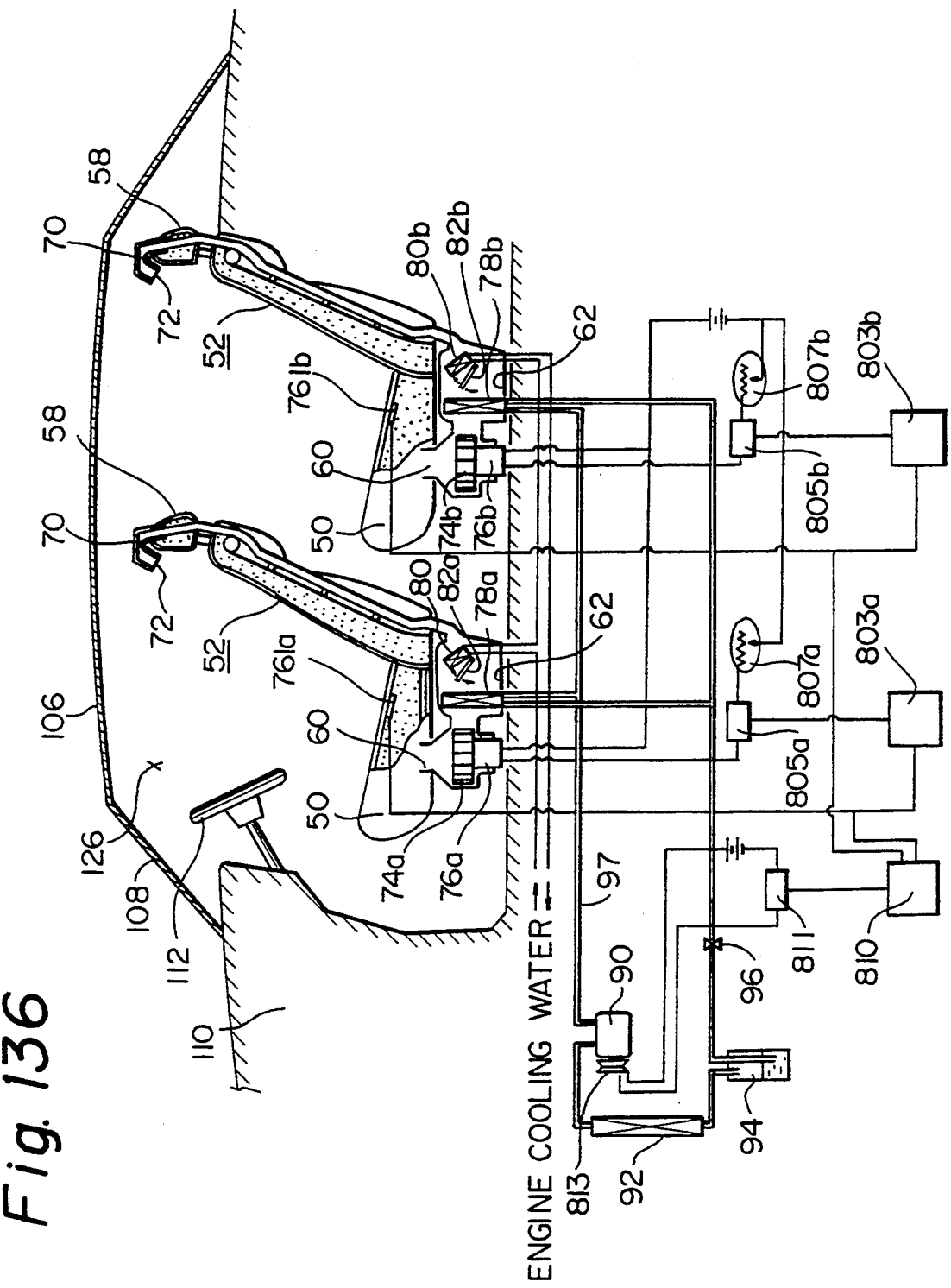

FIG. 136 is a schematic cross sectional view of the 54th embodiment.

Figure 137:
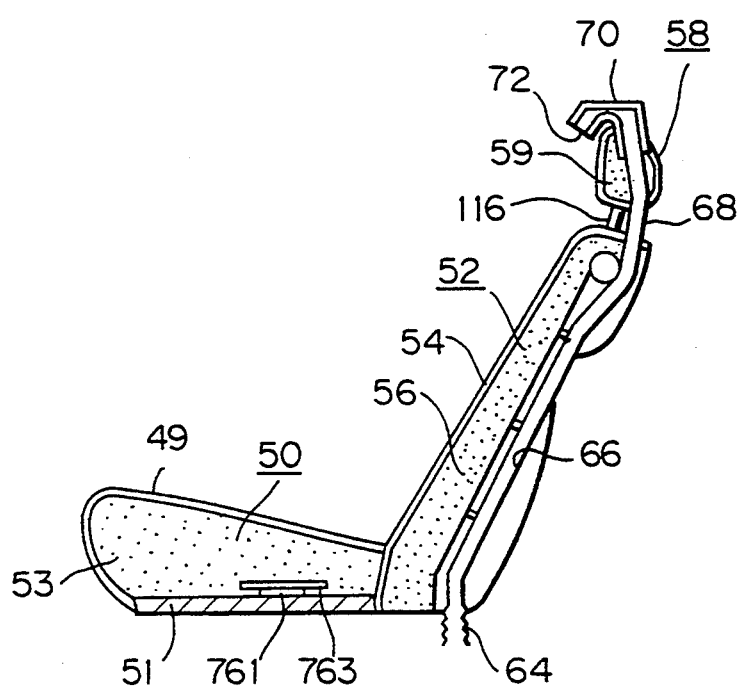

FIG. 137 illustrates an example of an arrangement of a sitting sensor in a seat.

Figure 138:
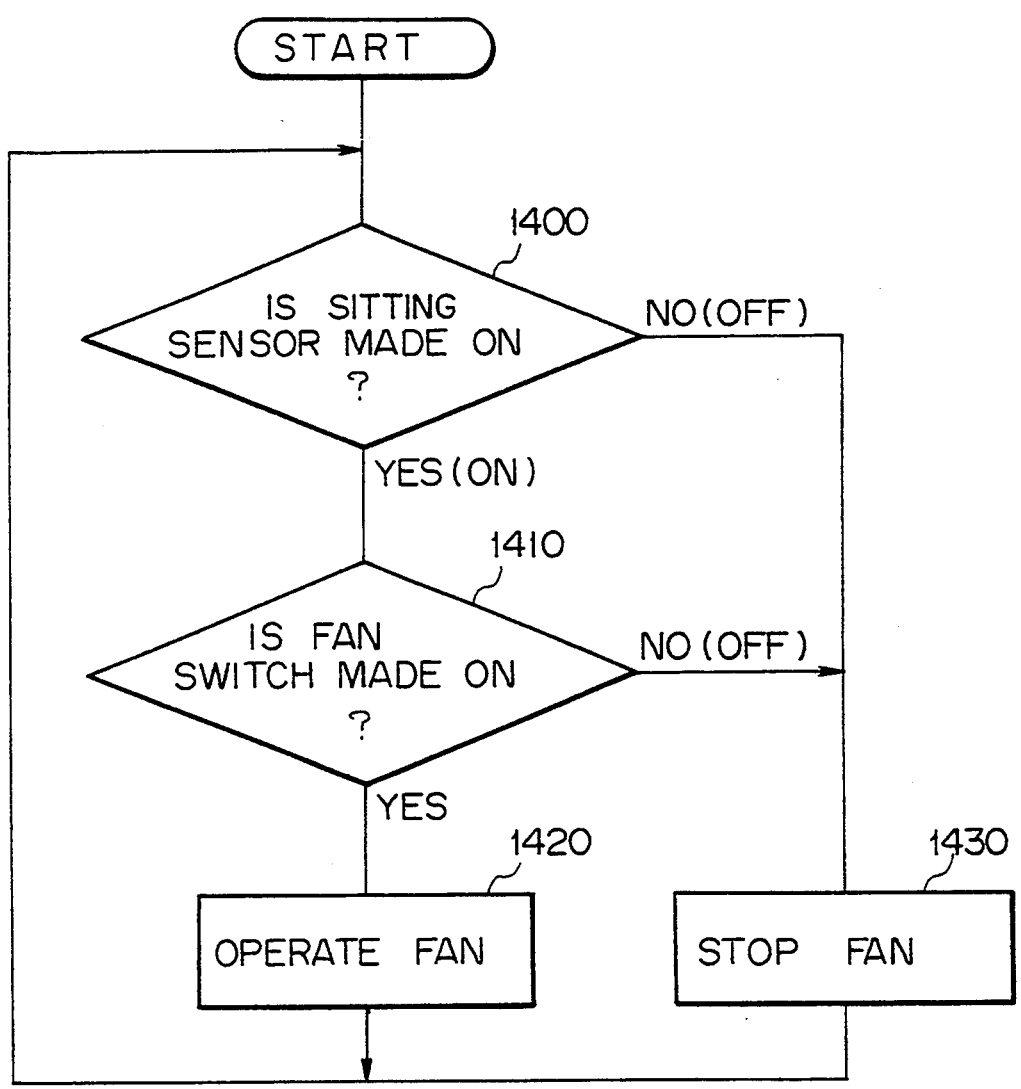

FIG. 138 is a flowchart illustrating how an ON-OFF control of a fan in the 54th embodiment is carried out.

Figure 139:
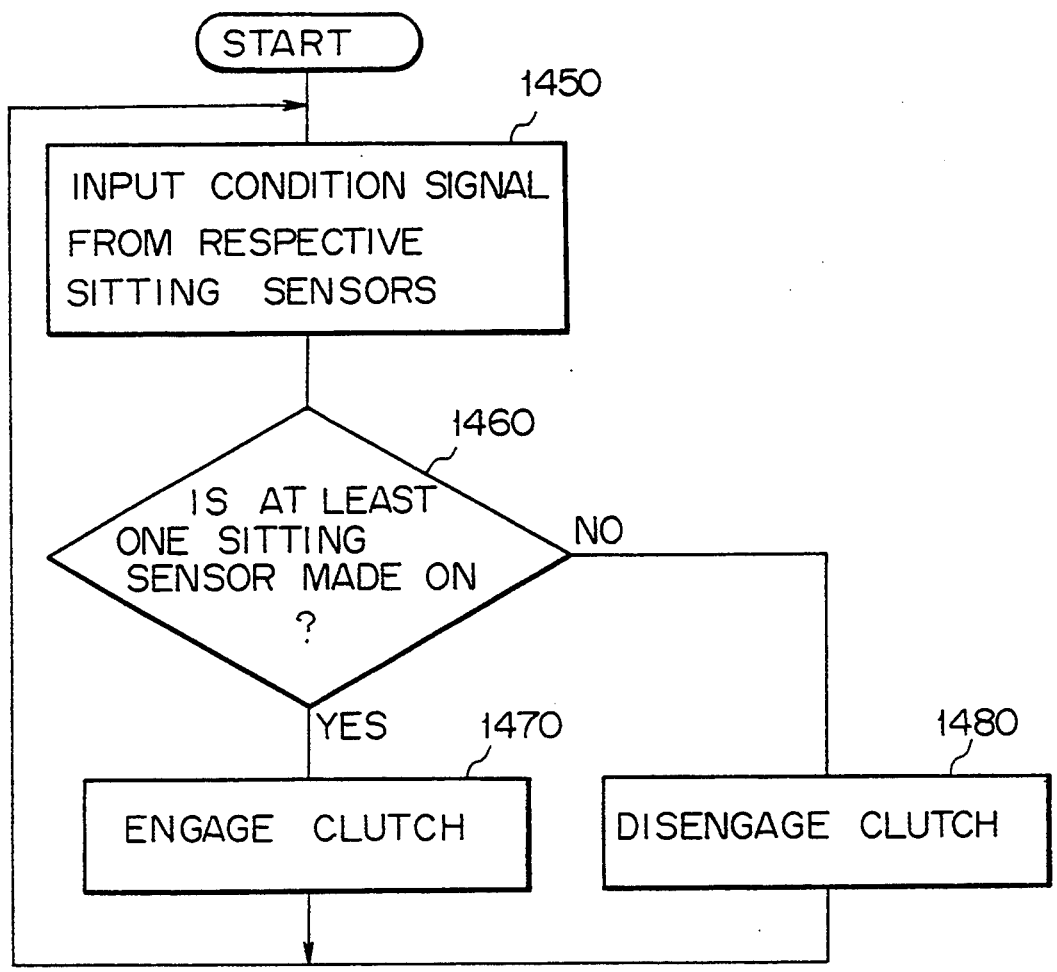

FIG. 139 is a flowchart illustrating how an ON-OFF control of an electromagnetic clutch in the 54th embodiment is carried out.

Figure 140:
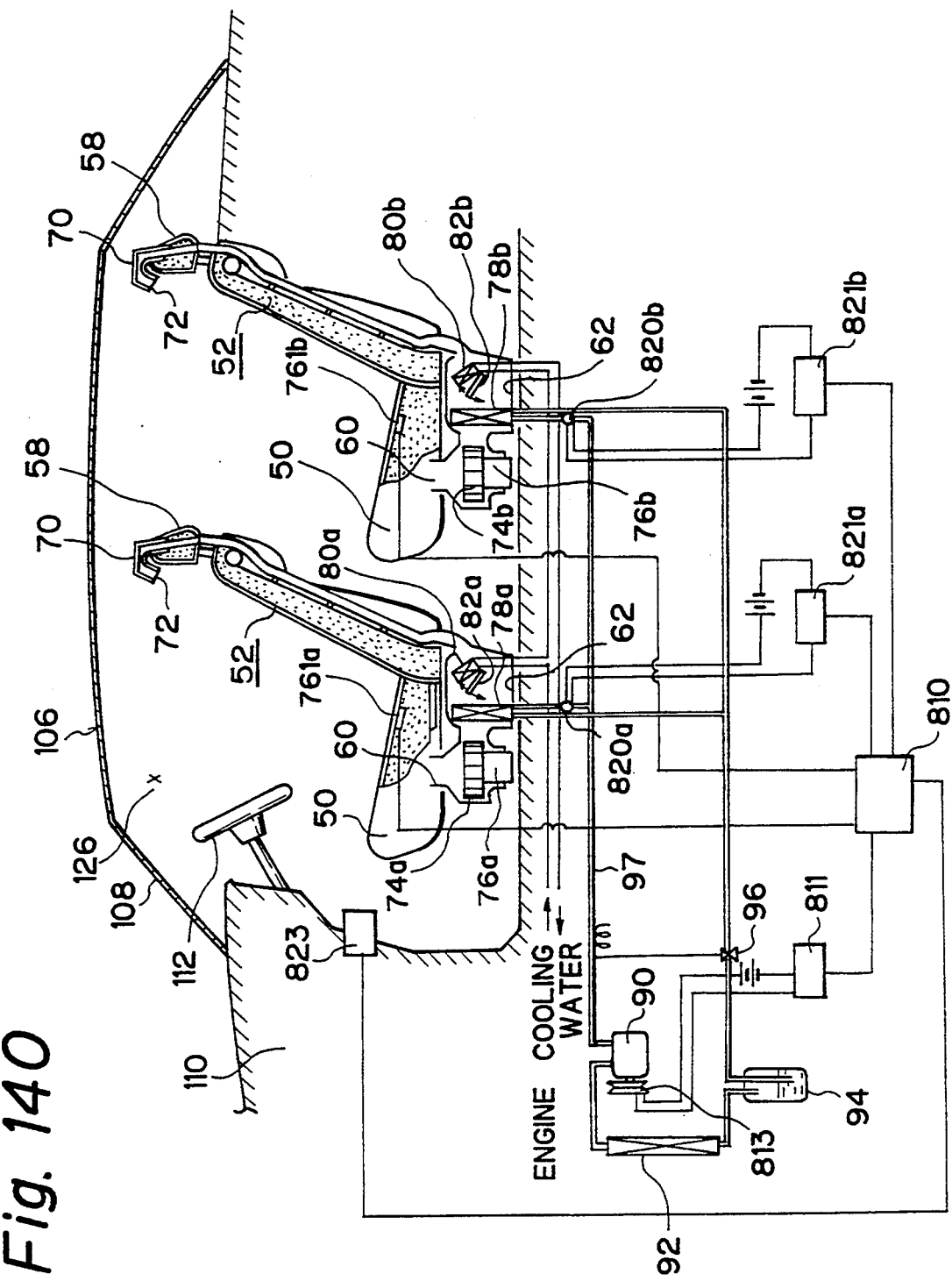

FIG. 140 is a schematic cross sectional view of the 55th embodiment.

Figure 141:
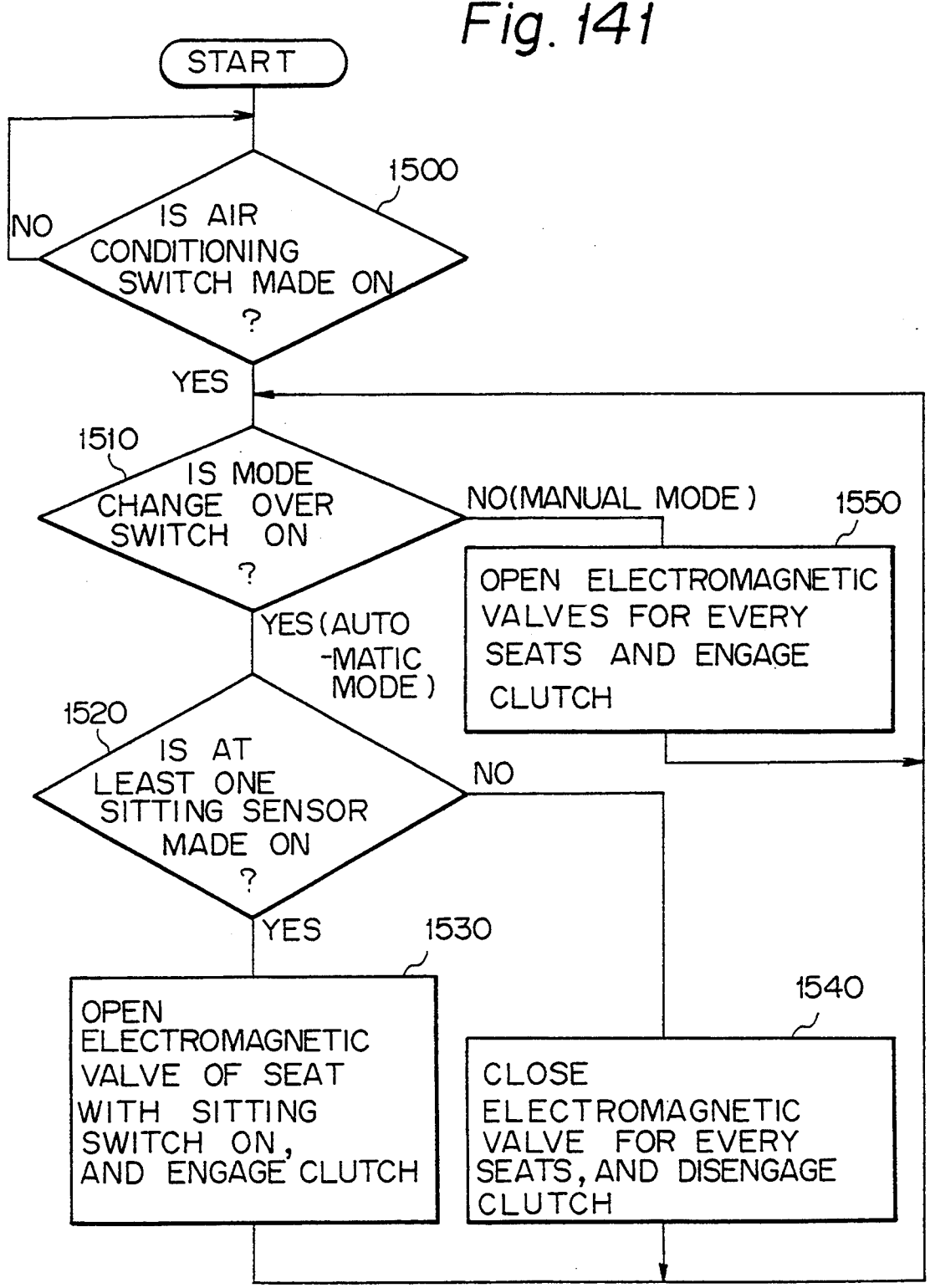

FIG. 141 is a flowchart illustrating an operation of the 55th embodiment in FIG. 140.

Figure 142:
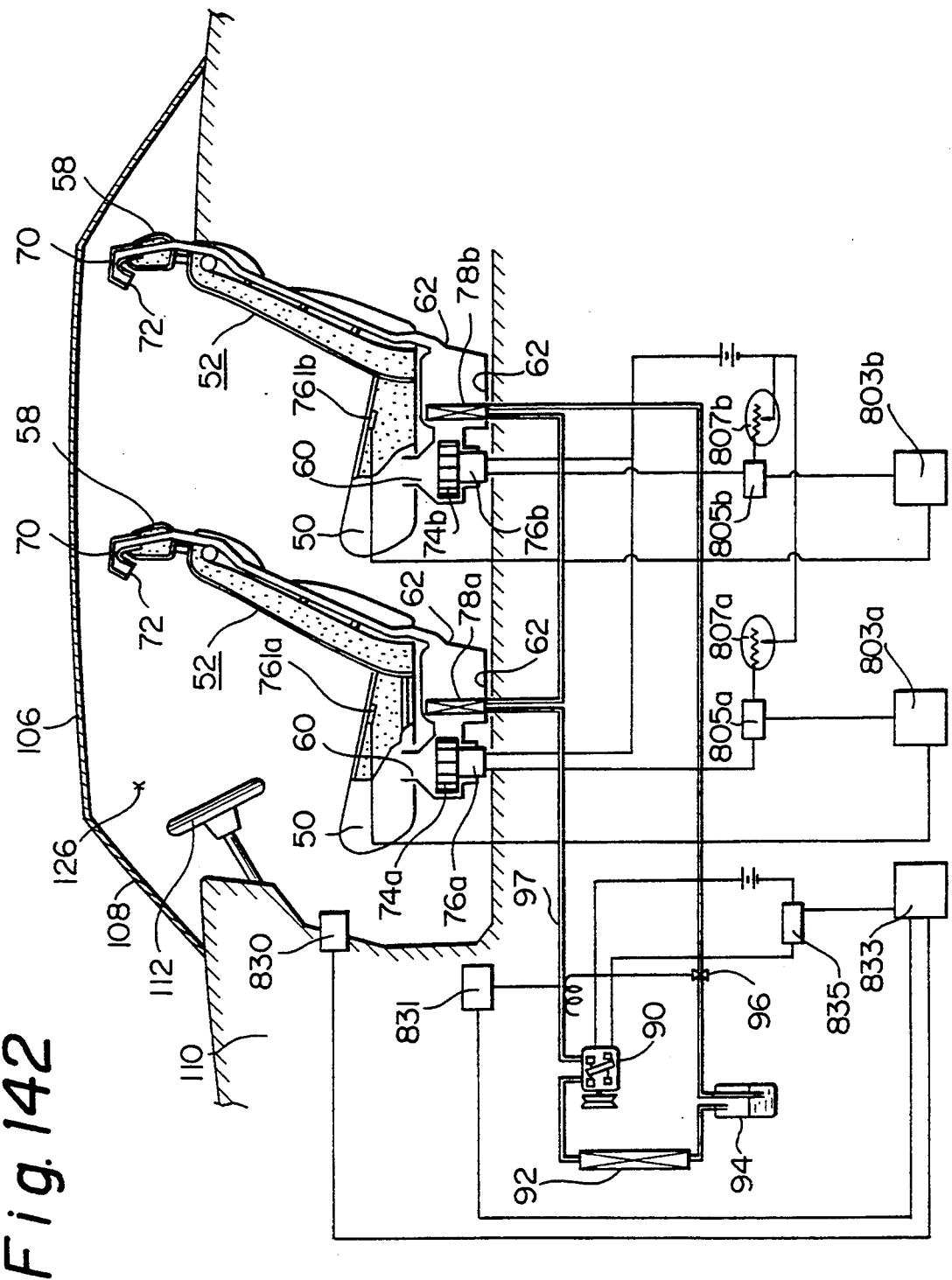

FIG. 142 is a schematic cross sectional view of the 56th embodiment.

Figure 143:
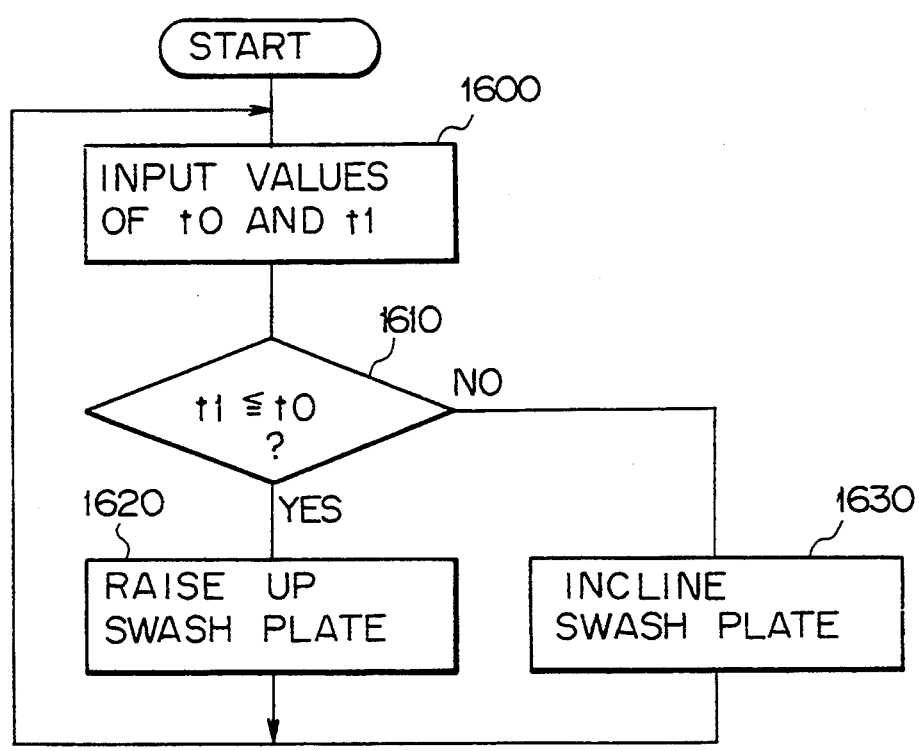

FIG. 143 is a flowchart illustrating how an ON-OFF control of an electromagnetic clutch in the 56th embodiment in FIG. 142 is carried out.

Figure 144:
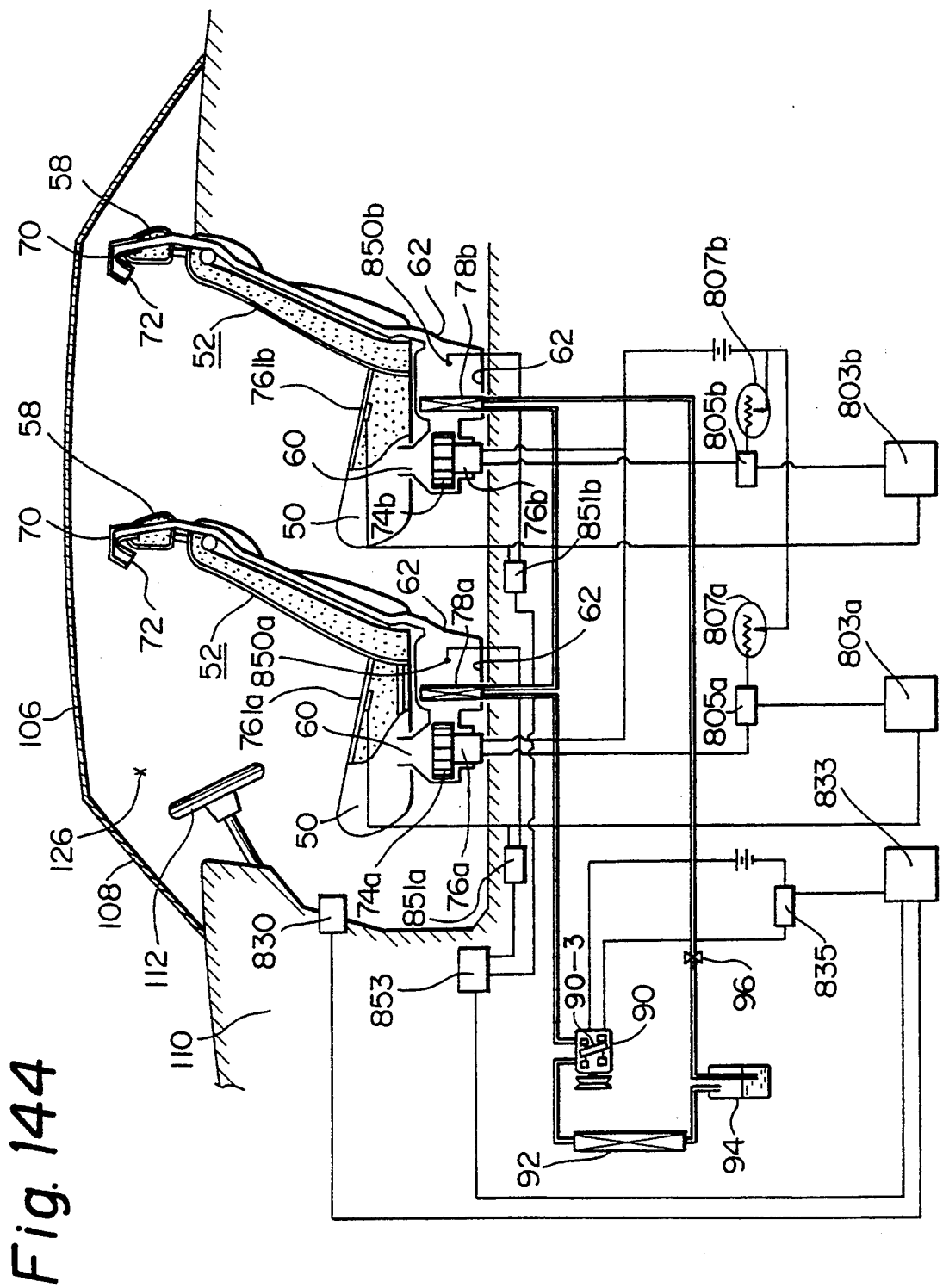

FIG. 144 is a schematic cross sectional view of the 57th embodiment.

Figure 145:
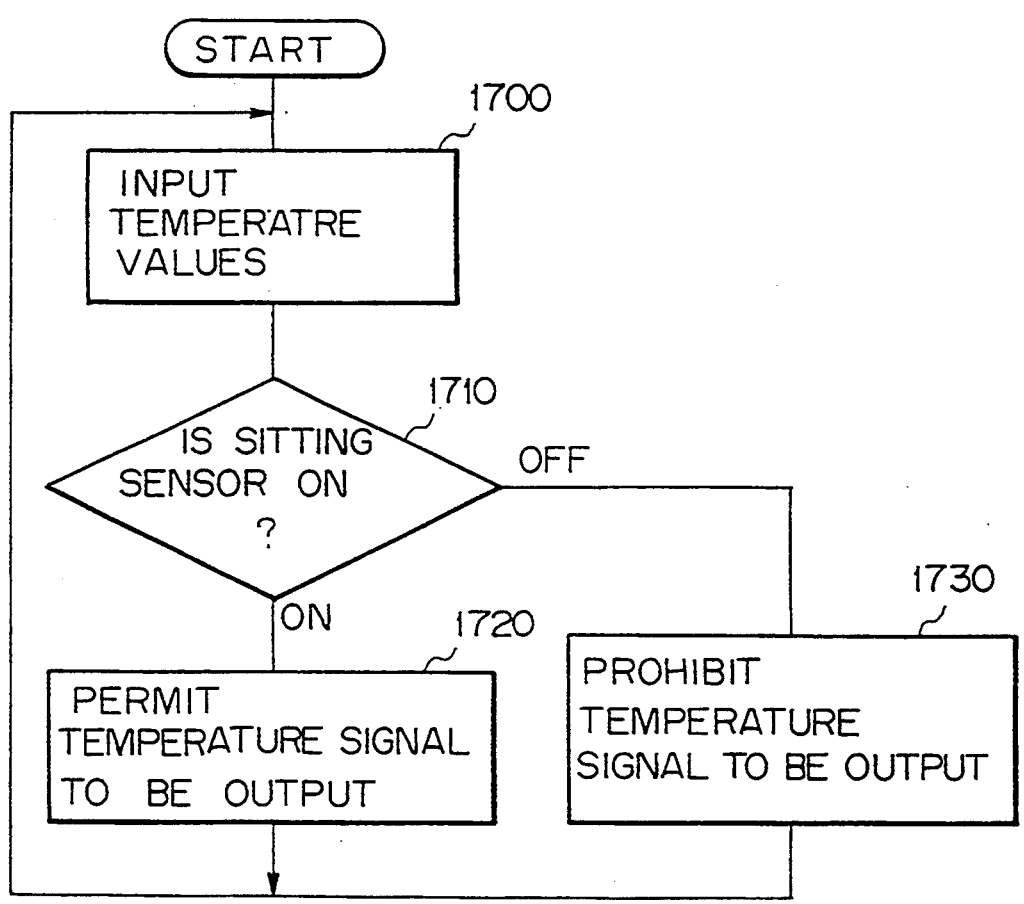

FIG. 145 is a flowchart of compressor volume control in the 57th embodiment in FIG. 144.

Figure 146:
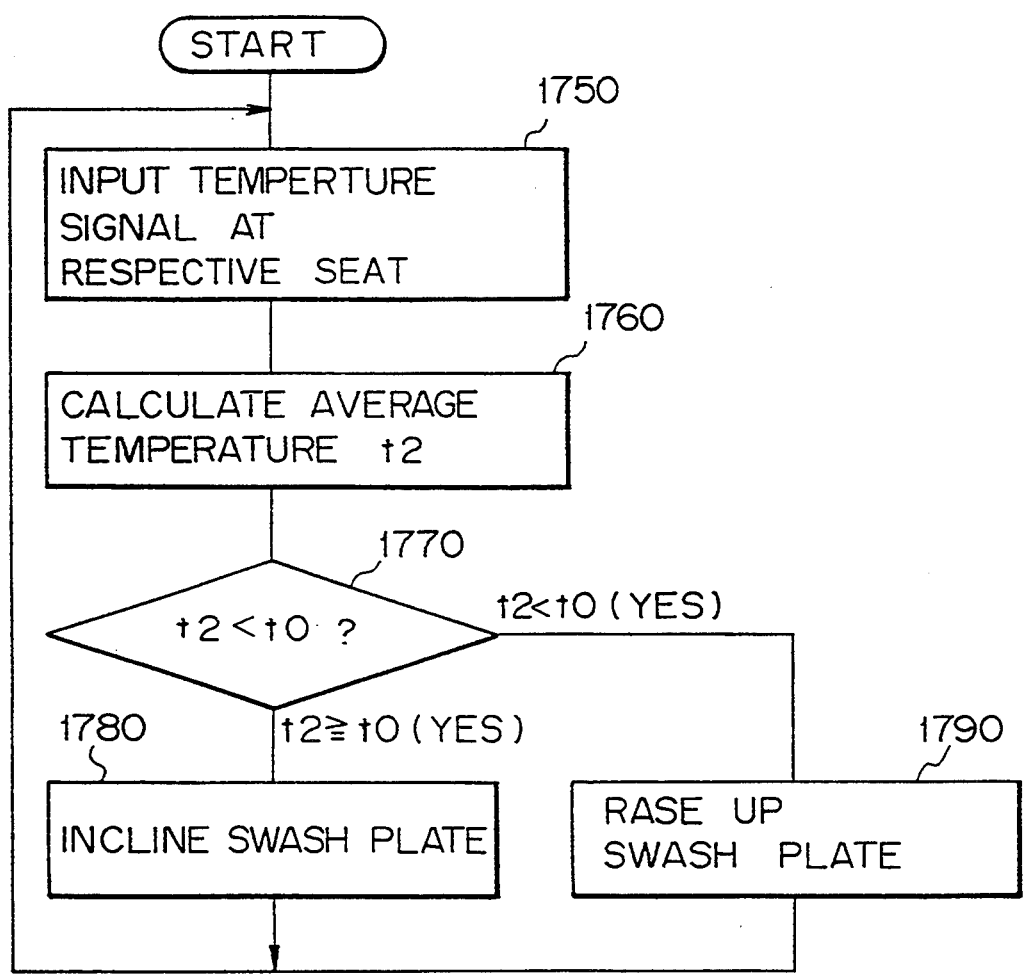

FIG. 146 is flowchart illustrating have an operation of volume control of a compressor in the 57th embodiment in FIG. 142 is carried out.

DESCRIPTION OF PREFERRED EMBODIMENTS

Figure 1:
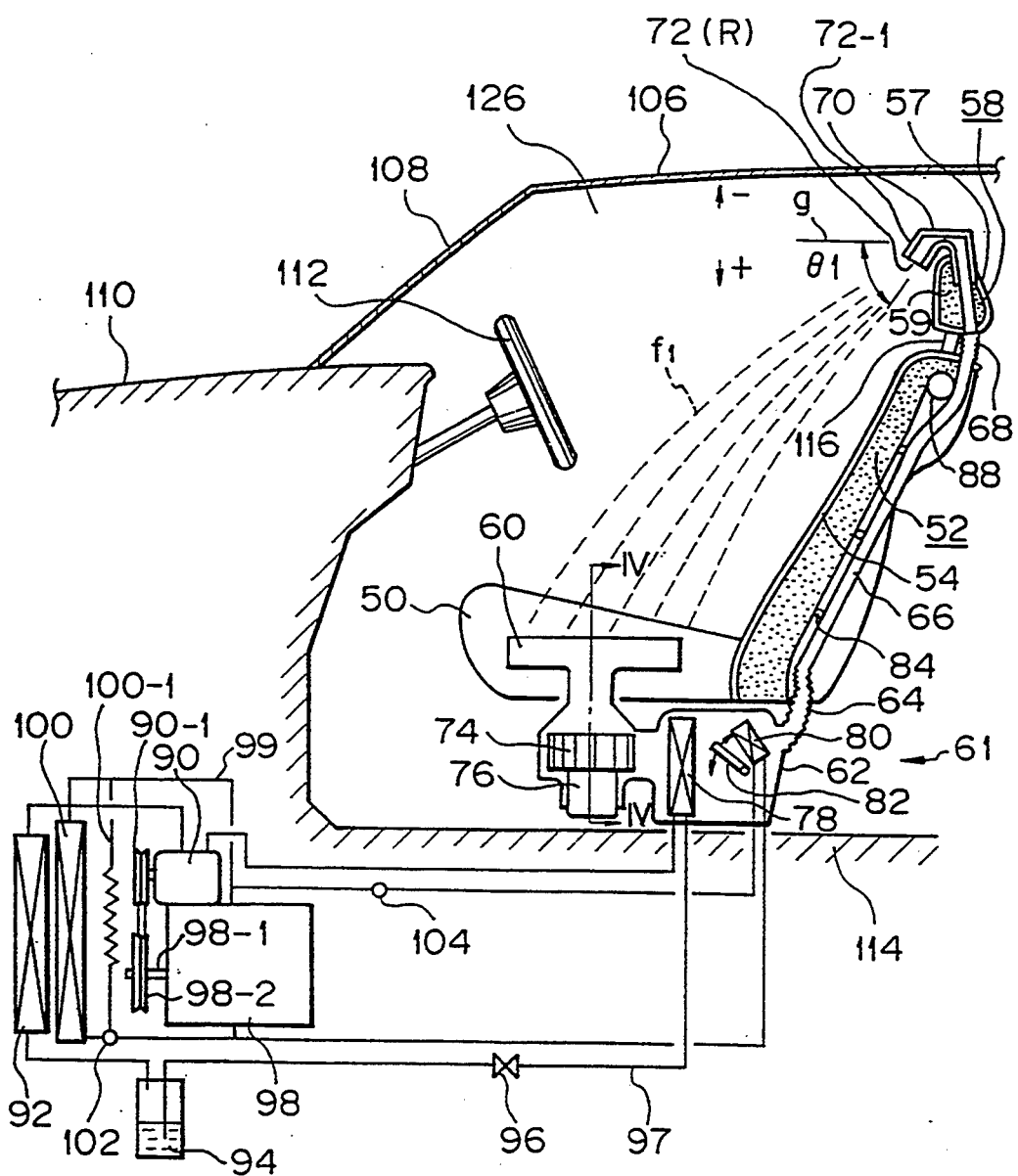
FIG. 1 is a schematic longitudinal cross-sectional view of a front part of an automobile provided with an air conditioning apparatus according to the present invention.

Now, embodiments of the present invention will be explained with reference to attached drawings. FIG. 1 shows a first embodiment that is directed to an air conditioning system for an automobile. In FIG. 1 a reference numeral 110 shows an engine hood 110, 112 a steering wheel, 106 a ceiling of the cabin, and 114 the floor of the cabin. FIG. 1, also schematically illustrates a front portion of a cabin 126 of the automobile when viewed from the lateral side. A driver's seat assembly is mounted on a blower 114 of the vehicle; the assembly of which is constructed by a seat part 50, a back rest 52 and a head rest 58. As is well known, means is provided for connecting the back rest 52 to the seat portion 50 in such a manner that an angular position of the back rest 52 to the seat 50 is desirably adjustable. The back rest 52 includes, in order to obtain a desired a profile of the seat, a frame 88 made of a metal material, and a plurality of spring members 84 that are connected to the frame member 88 so that the springs 84 extend transversely and horizontally. Arranged around the frame 88 is a block of a cushion material 56, which is, at its outer surface, covered by upholstery 54 made of leather or a fabric material. The head rest 58 includes at its bottom connecting rods 116 that are inserted into respective holes formed at the top end of the back rest 52 for adjustably connecting the head rest 58 to the back rest 52. Similar to the back rest 52, the head rest 58 includes upholstery 57 in which a cushion material 58 is filled.

In FIG. 4(A), which is a cross sectional view taken along line IV—IV in FIG. 1, similar to the back rest 52, the seat 50 includes a frame 51 for obtaining a profile of the seat and upholstery 49 for filling therein a cushion material 53. In FIG. 4(A), a reference numeral 61 generally denotes an air conditioning unit for obtaining a cool flow of air. FIG. 4(A) also shows how the air conditioning unit 61 is arranged with respect to the seat part 50 of the seat assembly. Namely, the air conditioning unit 61 includes a bottom duct 62 located below the seat 50 and extending horizontally and laterally, and a pair of spaced apart branch ducts 63 located on the opposite sides of the seat part 50. The branch ducts 63 are branched from respective ends of the bottom duct 62, and have at the respective free or outer end, suction ports 60 which draws in air after it has been subjected to the air conditioning in chamber 126. As will be easily seen from FIG. 4(B), each suction inlet 60 forms an elongated rectangular shape that is long in the longitudinal axis of the vehicle, while the width thereof in the transverse direction of the vehicle is small, which can prevent the suction inlets 60 from becoming an obstacle when the passenger takes a seat.

As shown in FIG. 1, the bottom duct 62 is located between the floor 114 and the seat part 50, and has a part 62-1 (FIG. 4(A)) in which a blower 74 is housed so that the blower 74 is located at the center along the width (transverse direction of the vehicle) of the bottom duct 62. As shown in FIG. 1, the blower 74 is connected to an electric motor 76 for imparting a rotational movement from the motor 76 to the blower 74, thereby creating an aerodynamic force for drawing air in the cabin into the intake ports 60. The blower 74 is of a type having an axial inlet for introducing an air flow and a radial outlet, circumferentially extending, for discharging an air flow.

In FIG. 1, inside the bottom duct 62 and downstream from the blower 74, a system for controlling the temperature of the drawn air, which is known, is arranged, which includes an evaporator 78 for reducing the temperature of the air, an air mix damper 82 downstream from the evaporator 78 and a heater core 80 downstream from the air mix damper 82. As is well known, the air mix damper 82 is for controlling the ratio of the amount directed to the heater core 80 to the total amount of air flow created by the rotation of the blower 74 so that the temperature of the air after mixing the heated air with the air by-passing the heater core 80 is controlled in accordance with the degree of opening of the air mix damper 82. In a well known manner, the evaporator 78 together with a compressor 90, a condenser 92, a receiver 94 and an expansion valve 96 located on a recirculating line 97 construct a refrigerating cycle. Namely, the refrigerant after the heat exchange at the evaporator 78 for cooling the air flow in the bottom duct 62 is, via the compressor 90, forced into the condenser 92 for condensing the refrigerant. The condensed refrigerant is then introduced into the receiver 94 for separating the condensed refrigerant into a liquid state. The thus obtained liquid state refrigerant is introduced into the expansion valve 96 for reducing the pressure of the refrigerant that is supplied to the evaporator 78 for subjecting same to the heat exchange thereat. It should be noted that an internal combustion engine 98 has a crankshaft 98-1 on which a crank pulley 98-2 is mounted, which is connected to a pulley with a clutch 90-1 by a belt; the pulley 90-1 which is connected to a rotating shaft of the compressor. As a result, a rotational movement from the crankshaft 98-1 of the engine 98 is transmitted to the compressor 90 for imparting the rotational movement from the engine to the compressor 90.

As is also well known, the heater core 80 is, via a water flow amount control valve 104, connected to an engine cooling water recirculation system 99 that is constructed by a radiator 100 and a thermostat 102. As is well known, the engine 98 is formed therein with a cooling water jacket (not shown) connected to the radiator 100 via the thermostat 102 that is closed during a low temperature of the engine cooling water for by-passing the flow of the cooling water via a by-pass passageway 100-1, and is opened during a high temperature of the engine cooling water for allowing the introduction of water cooled at the radiator into the engine water jacket for cooling the engine. The heater core 80 is, on its one end, connected via the control valve 104 to an outlet side of the engine water jacket for receiving an amount of hot engine cooling water and is, on the other end, connected to an inlet side of the engine cooling water flowing to the engine water jacket for returning the engine cooling water into the engine cooling water recirculation system. It should be noted that the control valve 104 controls the amount of hot water introduced into the heater core 80 of the air conditioning system for controlling the temperature of the heater core 80.

A well known technique can be employed for obtaining a desired temperature of the air introduced into the duct 62 via the suction inlet 60 by means of the evaporator 78 and the heater 80, a detailed explanation of which is not provided. Furthermore, means for cooling or heating the air is, of course, not limited to the above mentioned evaporator 78 or the heater core 80, and other equivalent elements, such as an electric heat exchanging device, including a Peltier element et al, can be employed.

As shown in FIG. 1, arranged inside the back rest is an intermediate duct 66 that is connected, via a bellows tube 64, to the bottom duct 62 at a position downstream from the heater core 80. The intermediate duct 66 extends from the bottom to the top portions of the back rest 52, and is supported to the spring members 84 of the back rest 52 by means of a plurality of brackets 86 as shown in FIG. 3. As shown in FIG. 3, the bracket 86 forms, substantially, a U-shape having end portions connected to the wall of the duct 65 by means of bolt and nut assemblies 86-1, that allows the intermediate duct 65 to be supported by means of the spring member 84. The bellows shaped duct 64 is for providing a "flexible" connection of the intermediate duct 66 with respect to the bottom duct 62, thereby maintaining communication therebetween irrespective of a change in the angle of the back rest 52 with respect to the seat portion 50.

As shown in FIG. 2, the head rest 58 is provided therein with a tubular core member 124 that extends substantially vertically through the head rest 58. The tubular core member 128 has a bottom end connected, via a bellows shaped duct 68, to the top end of the intermediate duct 66, so that a flexible connection between the core member 128 and the intermediate duct 66 is obtained irrespective of an adjustment of the position of the head rest 58 with respect to the back rest 52.

The air conditioning system in the first embodiment is further provided with a top duct 70 that has, at its bottom portion, hook shaped leaf springs 122, while the top portion of the core member has, at its inner wall, a vertically spaced plurality of notches 128, so that a desired vertical position of the top duct 70, with respect to the head rest 58, is obtained by selecting notches with which the spring members 122 engage. As clearly shown in FIG. 2, the top duct is bent forward, i.e., toward the front of the vehicle, for obtaining substantially, an L shape. The end of the top duct 70 remote from the spring member 122 forms, integrally, in series, a bellows portion 118 and an outlet port 72 that is opened to the cabin. The flexible bellows portion 118 allows the outlet port 72 to assume a desired orientation with respect to the top duct 70 so that the direction of the air flow from the outlet port 72 can be adjusted as desired between a "downwardly inclined" position, where the air flow from the port 72 is directed toward the head of a passenger, and an "upwardly inclined" position where the air flow from the port 72 is directed to the ceiling of the cabin.

FIG. 5 schematically illustrates how the first, second and top ducts 62, 66 and 70 are constructed. As will be easily seen, these ducts are constructed as a honeycomb structure having a plurality of partitioned perforations for defining partitioned spaces 63 that extend parallel along the length of the ducts. Such spaces provided by the honeycomb structure can decrease heat mass of these ducts, which can shorten the required cooling time during the maximum cooling power mode. Furthermore, the spaces 63 provided by the ducts can obtain a thermal insulation function to the air flow flowing in the ducts. The intermediate duct 66 arranged in the back rest portion 52 is, in particular, effective as a thermal insulator to heat caused by solar radiation or heat generated by the passenger.

The operation of the first embodiment in FIGS. 1 to 5 will now be explained. When a fan switch (not shown) and an air conditioner switch (not shown) are turned ON by a person in the seat, an application of the rotational movement from the electric motor 76 to the blower 74 as well as an application of the rotational movement of the crankshaft 98-1 to the compressor 90 are obtained. The rotation of the blower 74 causes the air in the cabin 126 to be sucked into the bottom duct 62 via the inlet openings 60, which is subjected to a heat exchange with a refrigerant at the evaporator 78, which is located in the refrigeration cycle, so that the temperature of the air passing the evaporator 78 is lowered. The operation of the refrigeration cycle constructed by the evaporator 78, the condenser 92, the receiver 94 and the expansion valve 96 is well known, a detailed explanation of which is therefore eliminated. The air cooled at the evaporator 78 is divided at the air mix damper into a first flow that passes the heater core 80 and a second flow by-passing the heater core 80. At the heater core, the air from the evaporator 78 is, as well known, subjected to a heat exchange with the hot engine cooling water from the cooling water recirculating line in the engine 98, so that the temperature of the air passing the heater core 80 is increased. The air passing through the heater core 80 is mixed with the cold air by-passing the heater core 80 and leaves the bottom duct 62 toward the intermediate duct 66 via the bellows shaped connector 64. The temperature of the mixed air at the outlet of the bottom duct 62 is determined in accordance with the ratio of the amount of air passing through the heater core 80 to the total amount of air in the bottom duct 62, which corresponds to a degree of the opening of the air mix damper 82. The air from the intermediate duct 66 is directed to the top duct 70, and is discharged into the cabin from the air outlet opening 72, so that a flow of air for air conditioning is obtained that flows along a direction that is determined by the orientation of the outlet pipe 72. Namely, the outlet port 72 as shown in FIG. 1 causes the air flow to be directed downward along the back rest i.e., from the head portion to the leg portion of the person in the seat, as shown by dotted arrows $f_1$ in FIG. 1. The air at the leg portions is caught and sucked into the inlet or suction ports 60, so that the above mentioned process is repeated.

As will be easily seen, unlike the prior art where an air conditioning operation of an entire part of the cabin is intended, the above embodiment makes it possible for only a limited, partial zone of the cabin to be subjected to the air conditioning operation.

In the first embodiment in FIG. 1, the top duct 70 for discharging the before conditioning is projected from the top of the head rest 58. In place of such a construction, as shown in FIG. 6, a pair of top ducts 72 are provided, which are taken out from the rear side of the back rest 52, and a pair of outlet ports 72 are provided so that they are respectively connected to the top ducts 70, so that the outlet ports 72 opened to the cabin at locations corresponding to portions slightly above the shoulder and laterally of the face of a person in the seat. The direction of the flow from the outlet ports 72 is controlled by respective flexible connections 118.

In a modification shown in FIG. 7, similar to the modification in FIG. 6, a pair of ducts 70 are provided, but extend only to the lower portions of the back rest 52, and a pair of outlet ports 72 are provided so that they are opened to a position of the cabin corresponding to both sides of a waist of a person so that air flows from the outlet ports 72 are obtained that are directed to a zone of the cabin between the waist and the face of a person in the seat in accordance with the orientation of the discharge ports 70 controlled by flexible connection 118.

In a modification shown in FIG. 8, a pair of top ducts 70 are also provided, but are located at positions lateral to the front portions of the seat 50 of the seat assembly. The ducts 70 have respective discharge ports 70 for obtaining flows directed to a zone of the cabin between the waist and the face of the person in the seat in accordance with the orientation of the discharge ports 70 as adjusted by respective flexible connection 118.

In an embodiment shown in FIG. 9(A), the inlet openings 60 are, similar to the first embodiment in FIG. 4, located on both sides of the seat part 50 as shown in B. However, as shown in FIG. 9(A), an inlet opening 60 may be adjustably arranged at the front of the seat part 50 as shown by C. Furthermore, a pair of additional inlet openings 60 may be arranged on both sides of the back rest 52 at its lower portion as illustrated by A. The single type can be selected from these inlet openings A, B and C. Two types of inlet openings B and C may be combined independently, or these types B and C may be formed as a single piece to form, substantially, a C shape as shown in FIG. 9(B). Furthermore, all of these three types A, B and C are combined, or only two types A and B, or B and C may be combined. Although, in these embodiments, the inlet openings 60 are shown to be located lateral to the seat part 50 or the back rest 52, they may be arranged so that they are opened at the surfaces of the seat part 50 or back rest part 52.

According to the result of the inventor's test, a large number or area of the inlet openings 60 and uniformity of the speed of the air flow as drawn may allow a large amount of air not used for the air conditioning operation to be drawn by the inlet openings 60, which is effective in decreasing a difference in the temperature of the air discharged from the air conditioning system and the air drawn into the air conditioning device, resulting in a reduction of required air conditioning capacity per seat, which is advantageous from the viewpoint of saving power consumed by the air conditioning system according to the present invention. It may be advantageous for the suction port 60 to have at its outer edge a rip portion for obtaining a trumpet shape thereof for increasing the air drawing efficiency. Furthermore, in order to obtain the same kind of effect, a punched metal can be provided at the suction opening 60.

The embodiment in FIG. 9 shows a pair of top ducts 70 and the respective discharge openings 72 located on the lateral side of the head rest 58. However, this construction of the top ducts and the discharge openings are only for illustrative purposes, and the constructions as shown in FIGS. 1 to 8 may also be employed.

FIGS. 10 to 12 illustrate various possibilities of the detailed construction of the top duct 70 for defining discharge outlet 72. In FIG. 10, the top duct 70 having an elongated rectangular cross sectional shape is provided therein with a grating plate (punched metal plate) 130 extending transverse to the direction of the flow of the air in the duct at a position of distance L from the discharge outlet 72. This grating plate 130 is for obtaining a uniform distribution of the air flow amount discharged from the outlet 72 as shown by an arrow $f_2$.

In another modification shown in FIG. 11, the top duct 70 is provided, at the discharge opening 72 with, a plurality of louvers 132 that extend parallel to each other. These louvers 132 are for controlling the direction of the air flow from the discharge opening 72 as shown by an arrow $f_2$.

In still another modification shown in FIG. 12, the duct 70 is provided therein with a deflector plate 134 at a distance L from the discharge opening 72 as shown by an arrow $f_2$.

Next, in the first embodiment shown in FIG. 1, a result of the test done by the inventor is shown for illustrating the effect of an angle $\theta_1$ of the discharge pipe 72-1 for defining the discharge outlet 72 when the angle $\theta_1$ is changed in a vertical plane. The value of the angle $\theta_1$ is equal to zero when the outlet pipe 72-1 extends parallel to the direction g corresponding to a direction of the movement of the vehicle. The value of the angle has a sign of minus (−) when the discharge pipe 72-1 is bent toward the ceiling 106 so that the pipe 72-1 is upwardly away from the line, and the value of the angle has a sign of plus (+) when the the discharge pipe 72-1 is bent toward the floor 114 so that the pipe 72-1 is downwardly away from the line g. FIG. 13 illustrates a relationship between an angle of the outlet pipe 72-1, i.e., the direction of the discharge flow, $\theta_1$ (degree) and the required cooling capacity for one seat Q (Kcal/h). FIG. 14 illustrates a relationship between the direction of the discharge flow, $\theta_1$ (degree) and the difference of the temperature (°C.) of the air as issued and the temperature of the air as drawn, $\Delta T$. In FIGS. 13 and 14, a point K corresponds to the angle $\theta_1 = -60°$, a point L corresponds to the angle $\theta_1 = +30°$, a point M corresponds to the angle $\theta_1 = +45°$, and a point N corresponds to the angle $\theta_1 = +80°$. Note that the above test was done when the temperature of the outer air was 35° C., relative humidity was 60%, the amount of sun radiation was 430 Kcal/m$^2$×h, the temperature of the cold air as obtained at the outlet of the evaporator 78 was 9° C., the speed of the air flow as issued was 4.5 m/sec, and the speed of the air flow in front of the condenser 92, corresponding to the vehicle speed, was 40 km/h.

As is easily seen from FIG. 13, the larger the positive value of the discharged air angle $\theta_1$, the smaller the required cooling capacity. Namely, the nearer the orientation of the discharge outlet 72 is to the suction inlets 60 located on the lateral sides of the seat part 50, the smaller the required cooling capacity. The result in FIG. 14 shows that, under the same cooling effect, the larger the positive value of the discharged air angle $\theta_1$, the higher the efficiency for recovering the cooled air.

FIG. 15 shows relationships between horizontally spaced positions (a) to (f) in the cabin for placing a thermocouple and the temperature of the air °C. thereat for various values of an air discharging angle $\theta_1$. FIG. 16 shows relationships between vertically spaced positions (A) to (E) in the cabin for placing a thermocouple and the temperature of the air °C. thereat for various values of an air discharging angle $\theta_1$. The value of the air discharge angle $\theta_1$ designated by K, L, M and N correspond to those designated in FIGS. 13 and 14. The positions (a) to (f) and (A) to (E) for placing the thermocouple are shown in FIG. 17. Along the vertical direction, the detection point (A) is located slightly above the head of the sitting person, the points (B) are symmetric locations on the face of a person, the point (C) corresponds to a location slightly in front of the chest of a person, the point (D) corresponds to a location slightly above the knees of a person, and the point (E) corresponds to a location near the foot of a person. Along the horizontal or longitudinal direction of the vehicle, the point (a) corresponds to a location near the bottom of the front window 108 of the vehicle; the point (b) corresponds to a location slightly above the front panel (not shown); the point (c) corresponds to a location between the dash board (not shown) and the steering wheel 112; the point (d) corresponds to a location slightly above the steering wheel 112; the point (e) corresponds to a location slightly in front of the chest portion of the passenger, and the point (f) corresponds to a location on the surface of the chest of a sitting person. As shown in FIG. 17, the point (e) in the horizontal direction and the point (C) in the vertical direction coincide with each other.

FIG. 15 shows a relationship between the positions (a) to (f) in the longitudinal direction and the temperature at respective positions. At the points (e) and (f), which is very near the sitting person, the larger the positive value of the discharge air angle $\theta_1$, the lower the temperature at the respective points (e) and (f). Furthermore, it can also be concluded that the larger the value of $\theta_1$, the lower the temperature at the areas near the the sitting person P. Namely, these results clearly show that a substantial part of the cooling air as discharged from the discharge opening 72 can be used for cooling the area of the cabin adjacent the sitting person, and the amount of discharged cooled air that is used for the remaining area of the cabin is relatively small.

FIG. 16 shows the temperature distribution along the direction of the height, and it concludes generally that the larger the positive value of the discharge air angle $\theta_1$, the higher the temperature of the air at locations adjacent the seating person. Furthermore, it will also be seen that the temperature is relatively high at the area adjacent the head part of the sitting person, because, according to this test, the air as discharged was not directly directed to the head part of the person. An idealized setting of the orientation of the discharge port will, therefore, make it possible to obtain a substantially uniform temperature from the head to the legs of the passenger.

In short, it will be clear from the above that the larger the positive value of the discharge angle $\theta_1$, the more the discharged air is concentrated on area around the passenger, which is effective for increasing the air conditioning efficiency in the cabin.

Now, an effect of the orientation of the opening of the outlet port 72 will be discussed. FIG. 18 shows the seat taken by a person P, wherein a pair of discharge ports 72 are arranged so that they are located laterally above the head rest 58, so that an air flow from the discharge port 72 of the top duct 70 is directed inwardly in a direction of an angle $\theta_2$ with respect to the longitudinal axis of the vehicle. FIG. 19 shows a relationship between the value of the angle $\theta_2$ of the air flow inwardly directed from the discharge port 72 and a value of required cooling volume Q (Kcal per hours) for one seat. FIG. 20 shows a relationship between the value of the angle $\theta_2$ of the inwardly directed air flow from the discharge port 72 and a value of a difference in the temperature of the air between the air discharged from the outlet port 72 and the air introduced at the inlet port 60, $\Delta T$. These results were obtained when the outside air temperature was 35° C., a relative humidity was 60%, the amount of solar radiation was 430 Kcal/m$^2$, the temperature of the air discharged was 20° C., the speed of the discharged air was 1.7 m/second, and the speed of the flow of the wind at the front side of the condenser 92 was 40 km/hour. It should also be noted that the angle $\theta_1$ (FIG. 1) of the discharged air from the outlet 72 in the vertical plane is +30°.

As will be easily seen from FIGS. 19 and 20, so long as a constant value of the temperature of the air at an area adjacent the sitting person P is maintained, the larger the value of the angle $\theta_2$ of the air discharged (i.e., nearer the air as directed to the person), and the smaller the value of the temperature difference $\Delta T$, on one hand, and the smaller the value of the cooling ability Q as required, on the other hand, the cooling energy recovery efficiency will be increased. According to the inventor's test it is understood that the inwardly directed air arrangement from the discharge ports 72 causes the cooled air streams as discharged from the port 72 to contact each other, which causes such intersecting air to stay in the region adjacent the passenger P.

Now, the affect of the position of the discharge opening 72 on the cooling ability will be discussed. The discharge outlet 72 is located at a position R above the head rest 58 in the embodiment in FIG. 2, at position U adjacent the shoulder of the passenger in the embodiment in FIG. 6, at position T adjacent the waist of the passenger as shown in FIG. 7, and at a position S adjacent the thigh of the passenger as shown in FIG. 8. FIG. 21 shows the relationship between the positions and the required cooling ability for one seat, Q (Kcal/hour), and FIG. 22 shows the relationship between positions of the discharge outlet and the difference in the temperature between the inlet 60 and the outlet 72. The same test conditions as described with reference to FIGS. 19 and 20 were used, and the value of the angle $\theta_1$ of the air flow as discharged in the vertical plane is 30°, and the value of the inwardly directed angle $\theta_2$ of the air flow as discharged in the horizontal plane is 20°. FIG. 23 shows the relationship between the position of the thermocouple to detect the temperature in the longitudinal direction of the vehicle (FIG. 17) and the values of the temperature with respect various positions R (above head rest), S (thigh), T (waist) and U (shoulder) of the discharge outlet 72, while FIG. 24 shows the relationship between the position of the thermocouple in the vertical plane in FIG. 17 and the temperature of the air as detected with respect to various positions of the discharge outlet 72. As will be easily seen from FIGS. 21, 22, 23 and 24, the position R of the discharge outlet 72 located above the head rest 58 is more effective in decreasing the temperature of the air around the passenger and decreasing the required cooling ability.

A test was also be done by the inventors involving distribution of the temperature and the speed of the air as discharged from the outlet 72. The speed of the air from the discharge outlet was changed between 2.7, 4.5, and 6.5 m/s, and the temperature of the air at locations (a) to (f) in the longitudinal direction, and locations (A) to (E) in the vertical direction. It was affirmed quite naturally that the higher the speed of the air discharged from the outlet 72, the lower the temperature of the air detected at the respective points (a) to (f), and (A) to (E). Furthermore, it was also affirmed quite naturally that the higher the speed of the air discharged from the outlet 72 the larger the difference $\Delta T$ of the temperature between the inlet 60 and the outlet 72, and the the higher the speed of the air discharged from the outlet 72 higher the required cooling ability for one seat.

Now, the affect of the construction of the discharge outlet 72 to the characteristic of the air discharged will be explained. FIG. 25 is a model that schematically illustrates how the flow of the cooling air is created from the discharge outlet 72. In FIG. 25, x is a horizontal line corresponding to the axis of the discharge outlet 72, and y is a distance of an axis x of the air flow from the outlet 72 at a location distance l (=60 cm) from the outlet 72. A vertical extrapolation of the cool air flow is illustrated by the letter A. As explained in reference to FIG. 10, the top duct 70 may be provided with the punched metal plate 130 at the location distance L from the outlet 72. An open area ratio of the punched metal plate is a ratio of the total area of the openings of the plate 130 to the area of the plate 130. FIG. 26 is a relationship between the value of the open area ratio and the value of the distance y as lowered from the axis of the outlet 72 at a distance of 60 cm therefrom. The test was done under conditions such that the room temperature was 30° C., the temperature of the air discharged from the outlet 72 was 15° C., and the outlet 72 had a rectangular cross-sectional shape with a length of 5 cm and a width of 10 cm. As will be seen from FIG. 26, the lower the value of the ratio, the larger the value of the distance y as lowered, which means that the cooled air flow is less widened, so that the flow of the cooled air can be blown over a longer distance.

FIG. 27 shows how the lowered distance y and the width a of the cooled air change in accordance with a difference in the construction of the air discharge outlet 72. In FIG. 27, NOR illustrates a mere rectangular shape construction of the outlet 72, PAN corresponds to the construction as shown in FIG. 10 where the punched plate 130 is provided, DEF corresponds to a construction as shown in FIG. 12 where the deflector plate 134 is arranged inside the duct 70, and LOU corresponds to a construction where together with the punched plate 130, the louvers 132 are provided as shown in FIG. 11. As will be understood from FIG. 27, the provision of the punching metal 130 (PAN) can provide a large flow down distance of the cooled air flow AIR. Contrary to this, the provision of the louver 132 (LOU) can reduce the degree of the width of the air flow due to the controlled flow of the air. Thus, a flow of cooled air directed downwardly along and adjacent the passenger can be obtained, which is effective in providing uniform cooling and can assist the louver 132 in attaining its designated function.

Furthermore, according to the results of the test by the inventors, and according to a comparison of the construction of the discharge outlet with the punched plate 130 with that of the discharge outlet without the punched plate, it was found that the construction with the punched metal can provide a temperature at a region adjacent the passenger P in FIG. 17, which is lower than that obtained by the discharge outlet without the punching plate.

FIG. 28 shows a perspective view of a second embodiment of the present invention that features a construction such that the intermediate duct 66 located downstream from the evaporator 78 is divided into two parts 61-1 and 66-1, one of which (61-1) is connected to the top ducts 70 having an discharge outlet 72 located lateral to the lateral sides of the head rest 58, and the other part 66-2 is connected to the additional discharge outlet 72' located lateral to the sides of the back rest part 52, so that the cooled air from the outlets 72 and 72' are discharged not only at the head but also at the body parts of the passenger. It should further be noted that, where the intermediate duct is divided into the portions 66-1 and 66-2, a switching damper 136 is provided for controlling the ratio of the air flows between these portions 66-1 and 66-2 in a continuous manner.

As shown in FIG. 28, a door (not shown) in accordance with this embodiment is provided with an arm rest provided with an arm rest on which a switch panel 140 is provided in accordance with a known manner. A wire 136 is provided, which has one end connected to the switching damper 136 and a second end connected to a control lever 144 that is provided at the switch panel 140. The control lever 144 is operable so that the continuous movement of the damper between the intermediate duct portions 66-1 and 66-2 can be carried out. The switch panel is also provided with a fan switch 142 for starting or stopping the blower 74 selectively for controlling the air flow amount, and an air conditioner switch 146 for starting or stopping the compressor 90 (FIG. 1) selectively. The other construction and the operation are substantially similar to that of the first embodiment as explained.

In the previously explained embodiments, the air outlet 72 is located above the air inlet 60 so that a flow of cool air directed downwardly is obtained. However, in place of this arrangement, the functions of the inlet 60 and outlet 72 can be reversed. Namely, in FIG. 1, a cooled air flow may be obtained from an outlet located at a position that is occupied by the inlet 60 in FIG. 1, and the air flow will be drawn by an inlet located at a position that is occupied by the outlet 70 in FIG. 1. In such a case, the arrangement of the blower fan 74, the evaporator 78 and the heater 80 will be reverse to that actually shown in FIG. 1.

FIG. 29 shows schematically a construction in the third embodiment, where the vehicle is further provided a center pillar 150 that extends vertically inside the cabin. Arranged in the center pillar 150 is the intermediate duct 66, and the top duct 70 is fixedly mounted to the ceiling of the cabin. Namely, the top portion of the vehicle includes a top plate 106 and and an inner plate 107 slightly spaced from the top plate 106 to create a space therebetween, in which a heat insulating material 148 is filled. The top duct 70 is fixedly connected to a supporting frame 154 fixed to the top inner plate 107 by means of bolts 156. FIG. 30 illustrates the shape of the open end (a discharge outlet) of the top duct 70 in this embodiment. As will be easily understood, the open end portion 72 of top duct 70 forms, viewed from the bottom, a trapezoidal shape of enlarged width over that of the top duct 70 itself. The trapezoidal shaped portion 72 at its three sides (a front and lateral sides) extend downwardly below a general bottom plane of the top duct to form an outlet 721 having substantially a C shape when viewed from the bottom. Furthermore, the end portion 72 has at its bottom wall, a plurality of evenly distributed circular shaped openings 722 of relatively small diameter.

FIG. 31 shows, in the third embodiment of FIG. 29, a connection of the bottom duct 62 with the intermediate duct 66 for obtaining a relative adjustment therebetween. The intermediate duct 66 is inserted into the bottom duct 62 via a pair of spaced apart annular seal members 152 made of an elastic material. The seal members 152 are fixed on the outer surface of the intermediate duct 66 and are in contact with the inner surface of the bottom duct 62. As a result, an adjustment of the position of the seat in the back and forth direction causes the bottom duct 62 to be relatively displaced with respect to the intermediate duct 66 in a telescopic manner while a sealing of the air is maintained due to the fact that the seals 152 are arranged between the first and the intermediate ducts 62 and 66.

According to this embodiment, the discharge outlet 721 having substantially a C shape with a large aspect ratio (ratio between length and the width of the outlet 721) can provide a cooled air flow surrounding the passenger. As a result, a so called "air curtain" is created around the person in the seat. Furthermore, inwardly of the air curtain formed by the flow of the C shaped outlet 721, a small amount of air is also issued at a low speed via the circular openings 722 having a small diameter. Preferably, the sucking port 60 also forms a C shape so as to correspond to the shape of the outlet 721 in such a manner that the outlet 721 is opened at the area where the air flow constructing the "air curtain" comes. Such an air curtain structure can prevent the air outside thereof from being taken into the cooled air flow, which is effective for obtaining a concentrated cooling effect for the passenger, which results in a reduction in the power consumption efficiency during the air conditioning operation, a reduction in time until the desired temperature is obtained, and an increase in the so-called "cool down" performance. It should be noted that the shape of the top end of the top duct 72 is not necessarily limited to the trapezoidal shape as shown in FIG. 30, and a different shape can be employed so long as an air flow functioning as air curtain is obtained.

FIG. 32 shows a fourth embodiment, wherein, similar to the third embodiment, the air curtain principle is also employed. A construction of the top duct 70 including the discharge outlet 72 is different from that in the third embodiment. Namely, the top duct 70 includes, upstream from the outlet 72, a plurality of outlet openings 722 that are opened to a position located rearwardly of and slightly above the head rest 58. Furthermore, a cover portion 73 is provided that overhangs the upper part of the sitting person. The overhang portion 73 is not constructed as a duct but is a plate that is merely recessed to provide an outer vertical guide plate for guiding the flow from the discharge outlet 72. The vertical plate of the cover portion 73 may be rectangular in shape as shown in FIG. 33, or substantially hexagonal in shape as shown in FIG. 34, or arc shaped as shown in FIG. 35. The rectangular shape as shown in FIG. 33 may cause the air flows as discharged to be concentrated at the corners of the rectangular shape, and the hexagonal shape as shown in FIG. 34 may causes the air flows as discharged to be concentrated at its front corner portions thereof, so that a relatively flattened air flow as discharged can be obtained. The arc shape in FIG. 35 is preferable for obtaining a uniformly distributed air curtain around the passenger together with a small air flow of low speed from the circular discharge opening 722 inside the air curtain.

FIG. 36 shows a fifth embodiment, wherein the bottom duct 62 is divided into a first section 621 upstream from the the blower 74 and a second section 622 downstream from the evaporator 76, and the first and second sections 621 and 622 are at an area designated by H in FIG. 36 arranged in parallel formation to contact each other. FIG. 37 shows the portion H in detail. As will be easily seen, the first and second sections 621 and 622 have side walls that are in face to face contact. Furthermore, spaced heat exchanging plates 158 extend through these side walls into the spaces inside the first and second sections 621 and 622. The heat exchanging plates 158 are made slidable in a direction as shown by a double arrow f₃ between a first position where the heat exchanging plates 158 are located only in the first section 621 and a second position where the heat exchanging plates 158 are located only in the second section 622. FIG. 38 illustrate schematically how the heat exchanging plates 158 are made slidable with respect to the first and second sections 621 and 622. Seal members 160 made as a sealing material such as rubber are arranged at a position where the sliding movement of the heat exchanging plates 158 takes place so that an air tight connection of the plates 158 to the sections 621 and 622 is maintained. The longer the length of the heat exchanging plates 158 located in the second section (air outlet side) 622 the higher the heat exchanging amount that takes place between the air passing through the first section (air inlet side) 621 and the second section (air outlet side) 622. A careful adjustment of the position of the sliding plates 158 extending into the second section 622 can obtain a precise temperature control, which can not be obtained merely by the evaporator 78.

FIG. 39 shows, in perspective view, another modification of means for obtaining a mutual contact of the inlet side duct 621 and the outlet side duct 622. In this modification, inside the inlet side duct 621, an outlet side duct 622 is arranged. Such an arrangement allows the air passing through the inlet side duct to 621 act as a heat insulating material, which is advantageous in that the air passing through the outlet side duct 622 is prevented from being thermally affected by the air inside the cabin.

FIG. 40 is a schismatical cross-sectional view illustrating a sixth embodiment of the present invention. Unlike the preceding embodiments directed to air conditioning for a single seat, this embodiment is directed to air conditioning for two seats. According to this embodiment, for each of the seats, a blower 74, an evaporator 78, an air mix damper 82 and a heater core 80 are provided. However, a compressor 90, condenser 92, a gas-liquid separator 94 and an expansion valve 96 are common to both air conditioning systems for the two seats so that respective cooling cycles are created. The heater cores 80 for the air conditioning systems for the respective seats are connected in series to a radiator 100 along a recirculating line for an engine cooling water. The air mix dampers 82 are connected to respective servo motors 162, which receive signals from the control circuit 164 for obtaining respective desired degrees of openings thereof for obtaining respective desired temperatures of the air for air conditioning the respective seats.

A sensor 176 for detection of the solar radiation amount is arranged on a dash board 111. A sensor 172 is arranged in the air induction duct 60 for detecting the temperature of the air as taken into the duct 60. Furthermore, a sensor 174 is arranged, at the rear side of the evaporator 78 in the cooling cycle for air conditioning the rear seat, for detecting the temperature of the air as cooled. The solar radiation sensor 176, the room temperature sensor 172 and a temperature setter 166 for obtaining a desired setting of the temperature are connected to the front seat control circuit 164 for inputting respective signals. The front seat control circuit 164 calculates, based on these signals, the degree of the opening of the air mix damper 82, so that a signal is supplied to the servo motor 162 for obtaining the calculated degree of the opening of the air mix damper 82. The room temperature sensor 172 and a temperature setter 166 for obtaining a desired setting of the temperature are connected to the rear seat control circuit 164 for inputting respective signals. The rear seat control circuit 164 calculates, based on these signals, the degree of the opening of the air mix damper 82, so that a signal is supplied to the servo motor 162 for obtaining the calculated degree of the opening of the air mix damper 82. The evaporator downstream sensor 174 is connected to a control circuit 168 for inputting a signal used for disconnecting the electromagnetic clutch 170 when the refrigerating operation proceeds to a point where the evaporator 78 freezes. In this embodiment, the evaporator downstream sensor 174 is arranged downstream from the evaporator 78 for the rear seat. Preferably, this sensor 174 is arranged downstream from an evaporator 78 located nearest an intake port to the compressor 90 among a plurality of evaporators. Other constructions of the sixth embodiment in FIG. 40 are substantially the same as in the previous (first to fifth) embodiments. Furthermore, the inner cabin temperature sensor 172 can be alternatively arranged in the area adjacent the passenger, such as a seat belt (not shown), the back rest 52, and the head rest 58.

Similar to the sixth embodiment, the constructions in the first to fifth embodiments can also be provided with a solar radiation sensor 176, the inner temperature sensor 172 and the temperature setter 166, which provides signals directed to the controlling circuit 164, which allows it to calculate the degree of the opening of the air mix damper 82, thereby resulting in the production of a drive signal applied to the servomotor 168, and allows the controlling circuit 164 to issue a signal for disconnecting the electromagnetic clutch 170 for the compressor 90 when the evaporator 78 is subjected to a cooling operation and freezes.

In reference to the explanation of the second embodiment, the inventor has also raised the possibility that the discharge of the air is done via the outlet positioned at the location of the inlet 60 in FIG. 1, and the induction of the air is done via the inlet positioned at the location of the outlet 72 in FIG. 1, by the arrangement of the blower 74, the evaporator 78 and the heater core 80 in the order reversed as shown in FIG. 1. However, embodiments herein after described make it possible for the order of the arrangement of the blower 74, the evaporator 78 and the heater core 80 to remain unchanged, while a change in the exchange of functions between the bottom and the top outlets 60 and 72 is possible. In the description of these embodiments, the same reference numerals are used for similar functions as in the first embodiment.

Figure 42B:
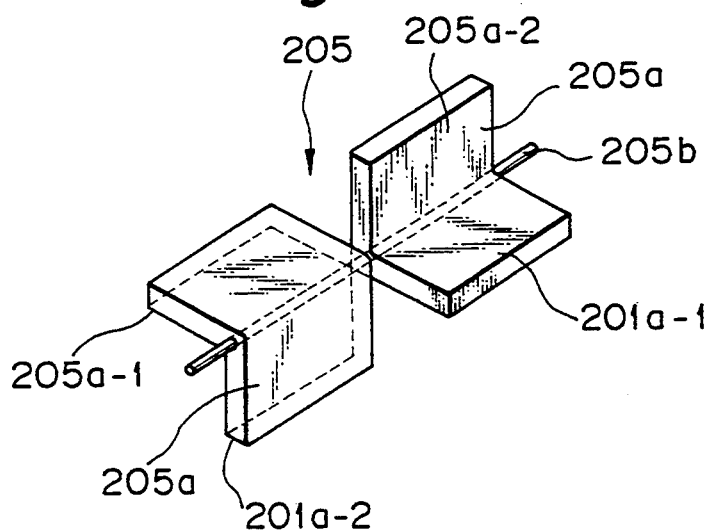

FIG. 41 shows a seventh embodiment, wherein the bottom duct 62 is branched to an induction duct 201 and a discharge duct 203 that have ends arranged parallel to each other. Furthermore, a damper valve 205 for exchanging the function between the inlet and the outlet is provided. The valve 205 is connected to an intermediate duct 66 connected to the top opening 72 and the connection duct 61 connected to the bottom opening 60. FIG. 42(A) illustrates how the four ducts 61, 66, 201 and 203 are arranged with each other, while FIG. 42(B) shows a configuration of the switching valve 205. Furthermore, FIG. 43 shows the switching valve 205 mounted in position with respect to the ducts 61, 66, 201 and 203. As will be easily seen, the intermediate duct 66 to the top duct 70 is arranged along a straight line with respect to the connection duct 61 to the bottom opening 60, and a partition wall 207 is situated at a location where the intermediate duct 66 is connected with the connection duct 61. The induction duct 201 and the discharge duct 203 are arranged parallel along their length and are positioned in a side by side formation. A partition 207 is arranged to separate the ducts 66 and 61 from each other.

As shown in FIG. 42(B), the switching damper 205 includes a shaft 205b and a pair of axially separated valve members 205a each constructed by plate portions 205a-1 and 205a-2 connected, at their inner ends, to the shaft 205b so that the plate portions 205a-1 and 205b-2 form an angle of 90°. The valve members 205a are arranged so that they are angularly spaced at an angle of 180°, so that the plate portions 205a-1 form a first common plane, while the plate portions 205a-2 form a second common plane that is transverse to the first common plane. The drive shaft 205b is connected to an electric motor (not shown), receiving an electric signal from a control circuit not shown in FIG. 42(B) for imparting a rotating movement to the shaft 205b at an angle of 90°. As shown in FIG. 43, the switching damper 205 is shown in its first position where the plate portion 205a-1 of one the valve members 205 contacts with a top shoulder portion 211 between the connection duct 61 and the outlet duct 203, and the plate portion 205a-1 of the other valve member contacts with the top shoulder portion 214 between the intermediate duct 66 and the induction duct 201. At this first position (see also FIG. 44(A)), the second plate portion 205a-2 of one of the valve members 205a extends downwardly toward the discharge duct 203, and the second plate portion 205a-2 of the other valve member 205a is fitted to a cut out portion 207-1 in the partition plate 207. The rotation through an angle of 90° of the shaft 205b causes the switching damper 205 to be switched to a second position (FIG. 44(B)) where the plate portion 205a-2 of one of the valve members 205 contacts with a top shoulder portion 212 between the intermediate duct 66 and the inlet duct 203, and the second plate portion 205a-2 of the other valve member contacts with the top shoulder portion 213 between the connection duct 61 and the induction duct 201. At this second position, the first plate portion 205a-1 of one of the valve members 205a extends toward the duct 203, and the first plate portion 205a-1 of the other valve member 205a is fitted to the cutout portion 207-1 in the partition wall 207.

The operation of this seventh embodiment will now be explained with reference to FIGS. 44 to 46. When the switching damper 205 is in its first position as shown in FIG. 44(A), the plate portion 205a-1 of one of the valve members 205 contacts with a top shoulder portion 211 between the connection duct 61 and the outlet duct 203, and the plate portion 205a-1 of the other valve member contacts with the top shoulder portion 214 between the intermediate duct 66 and the induction duct 201, so that the induction duct 201 is disconnected from the intermediate duct 66 and is only connected to the connection duct 61. Furthermore, the outlet duct 203 is disconnected from the connection duct 61 and is only connected to the intermediate duct 66. As a result, the rotation of the blower 74 causes the air from the opening 60 to be drawn, via the connection duct 61 and the induction duct 201, into the bottom duct 62. At the bottom duct 62, the air is passed through the evaporator 78 and the heater 80. The air conditioned air is delivered to the discharge duct 203 and is directed into the intermediate duct 66 as shown by solid arrows $f_4$ in FIG. 44(A), is directed to the top duct 70, and is discharged from the outlet 72 from the top duct 72. The air discharged from the outlet 72 is directed downwardly from the head to the legs of the passenger, and is drawn into the inlet port 60 as shown by dotted arrows $f_5$ in FIG. 45. As shown in FIGS. 45, the damper 261 at the connection area between the inlet port 260 and the intermediate duct 66 is under a closed so as to prevent the air from being drawn into the duct 66.

Figure 44B:
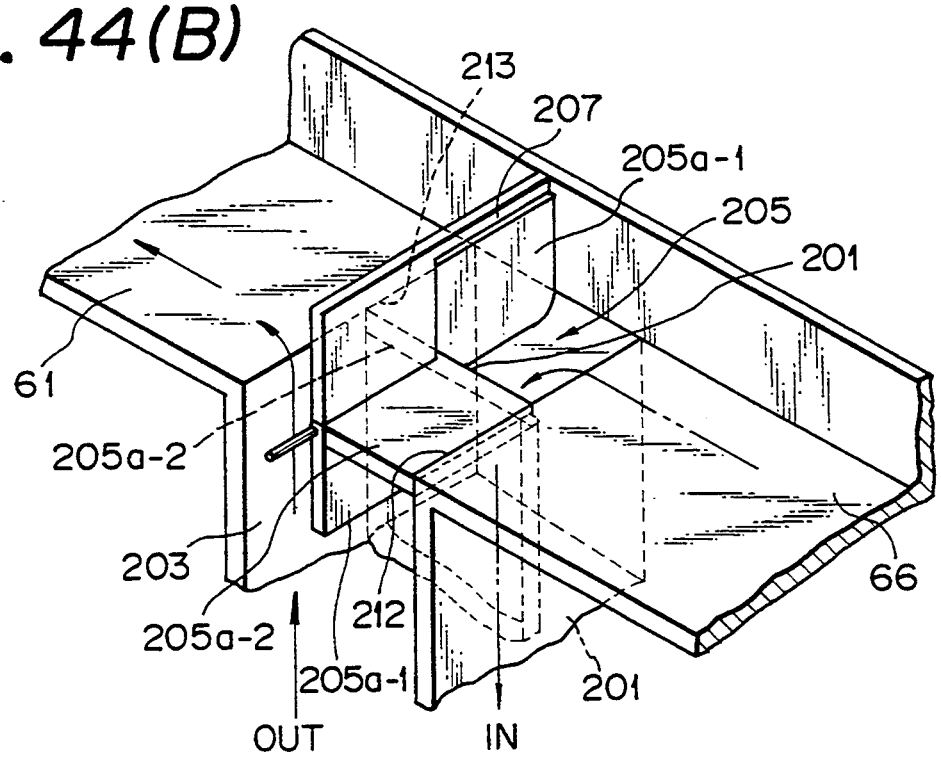

The switching damper 205 can be rotated at an angle of 90 degrees toward the second position as shown in FIG. 44(B), where the plate portion 205a-2 of one the valve members 205 makes contact with a top shoulder portion 212 between the intermediate duct 66 and the inlet duct 203, and the second plate portion 205a-2 of the other valve member makes contact with the top shoulder portion 213 between the connection duct 61 and the induction duct 201, so that the induction duct 201 is disconnected from the connection duct 61 and is only connected to the intermediate duct 66. Furthermore, the outlet duct 203 is disconnected from the intermediate duct 66 and is only connected to the connection duct 61. As a result, the rotation of the blower 74 causes the air from the top opening 72 to be drawn, via the intermediate duct 66 and the induction duct 201, into the bottom duct 62. At the bottom duct 62, the air is passed through the evaporator 78 and the heater 80. The air conditioned air is delivered to the discharge duct 203 and is directed into the connection duct 61 as shown by solid arrows in FIG. 44(B), and is discharged from the bottom opening 60. The air discharged from the bottom opening 60 is directed upwardly from the legs or waist portion to the head portion of the passenger as shown by the solid arrows $f_6$ in FIG. 46, and is drawn again into the top opening 72 as shown by dotted arrows $f_7$ in FIG. 46. In this case, the damper 261 at the connection area between the inlet port 260 and the intermediate duct 66 is opened slightly, so that the upwardly directed air is as shown by a dotted line, drawn also into the suction inlets 260 that are located laterally of the back rest portion 52 of the seat. Such an induction of the air via the openings 260 causes the air flows from the bottom openings 60 to the top opening 72 to be displaced laterally toward the back rest 52. A a result, a desired air conditioning operation can be obtained at the upper half part of the passenger.

The provision of the switching damper 205 can switch the air flow as discharged from the top opening 72 above the head rest and the bottom openings 60 located laterally of the seat portion. Namely, the arrangement of the blower 75, the evaporator 78, the heater core 80 and the air mix damper remains unchanged, while switching the discharge port between the top opening 70 and the bottom openings 60. Advantageously, during a cooling operation, a selection is effected so that the air flow is directed downwardly from the top to the bottom as shown in FIG. 45 for obtaining an effective cooling operation since the cooled air has a tendency to move downward. Contrary to this, when heating, the air flow is selected so that it is directed upwardly as shown in FIG. 46 for obtaining an effective heating operation since hot air has a tendency to move upward.

Figure 47B:
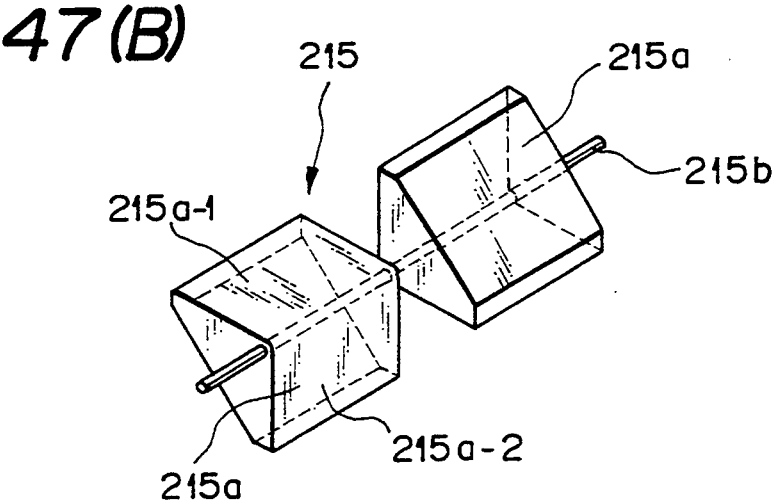
Figure 48B:
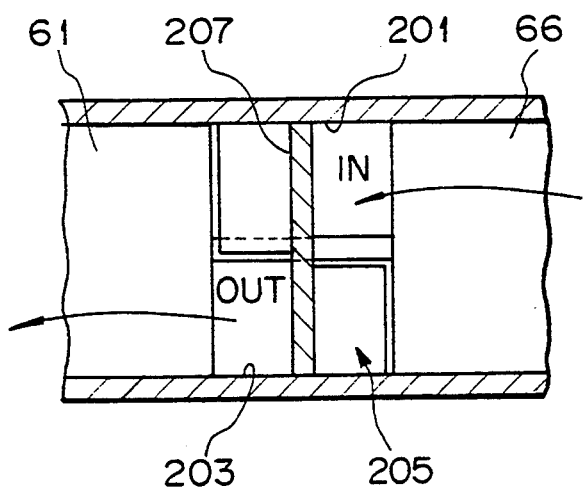

FIG. 47 shows an eighth embodiment. This embodiment differs from the embodiment in FIG. 41 only the construction of the switching damper. The switching damper 215 in this embodiment is constructed from a pair of valve members 215a having a solid body in cross sectional shape of a rectangular triangle each defining planes 215a-1 and 215a-2 that are angularly spaced at an angle of 90 degrees. A valve shaft 215b is connected to the valve members 215a so that they are angularly spaced in their phase at an angle of 180 degrees. The damper 215 is moved between the position in FIG. 48(A) and the position in FIG. 48(B). When the damper is in the position as shown in FIG. 48(A), the air from the connection duct 61 induced by the rotation of the blower 74 is introduced into the induction duct 201, and the air after passing through the air conditioning units 78, 82 and 80 is discharged into, via the outlet duct 203, the intermediate duct 66 connected to the top opening 72 as the outlet port. When the damper 215 is rotated at an angle of 90 degrees to the position as shown in FIG. 48(B), the air from the intermediate duct 66 induced by the rotation of the blower 74 is introduced into the induction duct 201, and the air after passing through the air conditioning units 78, 82 and 80 is discharged into, via the outlet duct 203, the connection duct 61, which is opened to the bottom opening 60 for discharging air therefrom.

Figure 50B:
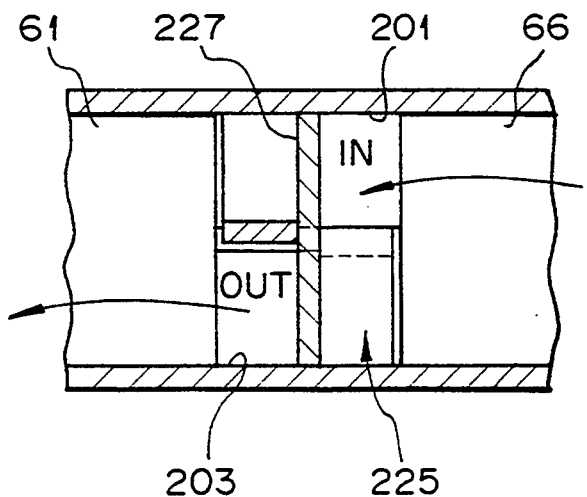

FIG. 49 shows a ninth embodiment, wherein it features a switching damper 225 arranged so that the damper 225 has a central shaft 225b having an axis that extends along the direction of the length of the intermediate duct 66 and the connection duct 61. The construction of the damper 225 itself is similar to that in the seventh embodiment shown in FIG. 42(B). Namely, the switching damper 225 is constructed by a pair of axially spaced valve members 225a, each of which is made of a plate member that is bent to form an angle of 90 degrees. The valve members 225a are arranged so that their angular positions are different at an angle of 180 degrees. Namely, each of the valve members 225 is constructed by a plate portions 225a-1 and 225a-2, so that the plate portions 225a-1 of the valve members 225a forms a first plane, and the plate portions 225a-2 of the valve members 225a forms a second plane that is displaced at an angle of 180 degrees. A partition 227 has an outer shape that corresponds to the inner cross sectional shape of the intermediate duct 66 and the connection duct 61, and a partition 236 between the induction duct 201 and the outlet duct is formed with a cut out portion 236-1 that allows the damper 225 to be rotated as shown by arrows in FIG. 49(A) between a position as shown in FIG. 50(A) and a position as shown in FIG. 50(B).

When the damper 225 is in the position as shown in FIG. 50(A), the air from the connection duct 61 induced by the rotation of the blower 74 is introduced into the induction duct 201, and the air after passing through the air conditioning units 78, 82 and 80 is discharged into, via the outlet duct 203, the intermediate duct 66 connected to the top opening 72 as the outlet port. When the damper 215 is rotated at an angle of 90 degrees to the position as shown in FIG. 50(B), the air from the intermediate duct 66 induced by the rotation of the blower 74 is introduced into the induction duct 201, and the air after passing through the air conditioning units 78, 82 and 80 is discharged into, via the outlet duct 203, the connection duct 61, which is opened to the bottom opening 60 for discharging air therefrom.

Now, a tenth embodiment will be described with reference to FIGS. 51(A). According to this embodiment, a partition plate 236 is arranged between the induction duct 201 and the discharge duct 203. A plate portion 61-1 is an extension of the bottom walls of the second and the connection duct 66 and 61. The partition plate 236 extends up to the plate portion 61-1. The plate portion 61-1 defines a circular opening 238. Along a diameter of the opening, the partition 237 between the second and the connection duct 66 and 61 extends on the plate portion 61-1. A rotary switching damper 235 having a circular disk shape is rotatably arranged in the circular opening 238. The rotary damper 235 has a pair of diametrically opposed cut out portions 235a, each cut out portion extends along one fourth of the periphery of the circle. In other words, between the cut-out portions 235a, a solid portion extends at an angle of 90 degrees. A rotary drive shaft 235b is provided at the axis of the rotation of the damper 235 as the circular disk member, so that the damper 235 is rotated about the axis of the shaft 235b.

Figure 51C:
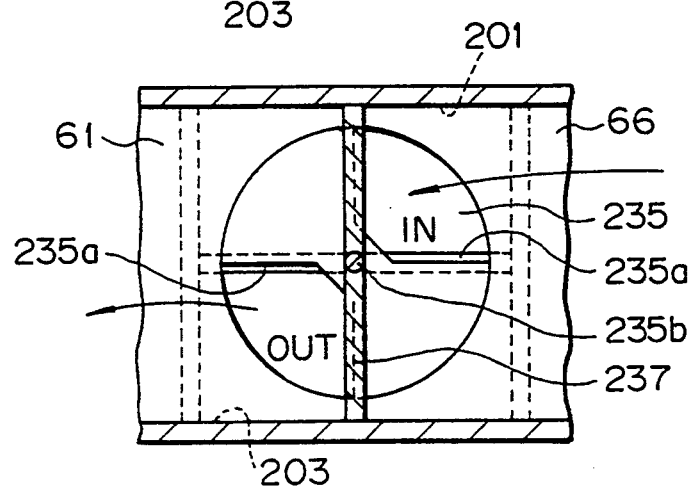

When the rotary damper 235 is located as shown in FIG. 51(B), the connection duct 61 connected to the bottom opening 60 as an inlet is opened to the induction duct 201 for introducing the air as shown by an arrow, while the discharge duct 203 is opened to the intermediate duct 66 connected to the top opening 72 as an outlet for discharging the air as shown by an arrow. A rotation of the rotary damper 235 at an angle of 90 degrees from the position in FIG. 51(B) causes the damper 235 to be situated as shown in FIG. 51(C), where the intermediate duct 66 connected to the top opening 72 as an inlet is connected to the inlet duct 201, while the discharge duct 203 is opened to the connection duct 61 connected to the bottom opening 60 as an outlet.

Figure 53B:
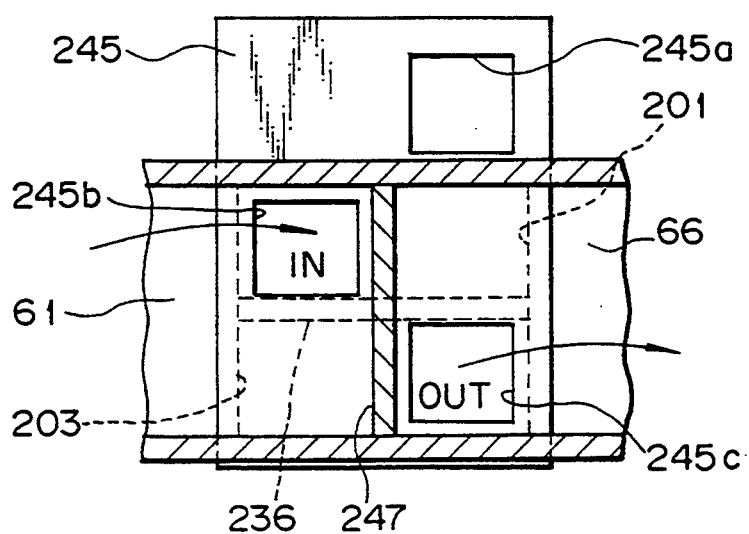

Now, a eleventh embodiment will be explained with reference to FIGS. 52(A) and (B). As shown in FIG. 52(A), a damper 245 is constructed as a plate type slide valve. Namely, the side walls for defining the ducts 61 and 66 have opposite openings 245-1 (only one of which is shown in FIG. 52(A)) through which the damper valve 245 is horizontally slidable. The damper 245 is provided with openings 245a, 245b and 245c of rectangular shape. The openings 245a and 245c are located on one side of the partition 247, while the opening 245b is located on the other side of the partition 247. It should be noted that the width of the openings in the direction of the slide movement of the damper 245 is substantially equal to the inner width of the duct 201 or 203, and the spacing between the openings 245a and 245b, and between the openings 245b and 245c are substantially equal to the thickness of the the partition 236. As a result, the damper 245 can be slidably moved between a position as shown in FIG. 53(A), where the opening 245c is located outwardly, while the opening 245a is connected to the inlet duct 201 and the opening 245b is connected to the discharge duct 203, and a position as shown in FIG. 53(B), where the opening 245a is located outwardly, while the opening 245b is connected to the inlet duct 201 and the opening 245c is connected to the outlet duct 203.

When the damper 245 is located as shown in FIG. 53(A), the first opening 245a on one side of the partition 247 is opened to the induction duct 201 and the second opening 245b on the other side of the partition 247 is opened to the discharge duct 203. As a result, the air in the intermediate duct 66 connected to the top opening 72 is introduced into the induction duct 201, and the air in the discharge duct 203 is discharged into the connection duct 61 connected to the bottom openings 60. Contrary to this, when the damper 245 is located as shown in FIG. 53(B), the second opening 245b on the other side of the partition 247 is opened to the induction duct 201 and the third opening 245c on the one side of the partition 247 is opened to the discharge duct 203. As a result, the air in the connection duct 61 connected to the bottom openings 60 is introduced into the induction duct 201, and the air in the discharge duct 203 is discharged into the intermediate duct 66 connected to the top openings 60.

A twelfth embodiment is shown in FIGS. 54(A) and (B). In this embodiment, a damper plate 255 is provided so that it slides along a direction transverse to the direction where the damper 245 slides in the eleventh embodiment in FIG. 52(A). In FIG. 54(A), the damper plate 255 is arranged so that it slides along the direction as shown by arrows that correspond to the direction where the ducts 61 and 66 extend. As shown in FIG. 54(B), the damper plate 255 forms first, second and third openings 255a, 255b and 255c of rectangular shape. The first and third openings 255a and 255c are located on one side of the boundary wall 236 between the induction duct 201 and the discharge duct 203, and the second opening 255b is located on the other side of the boundary wall 236.

Figure 55B:
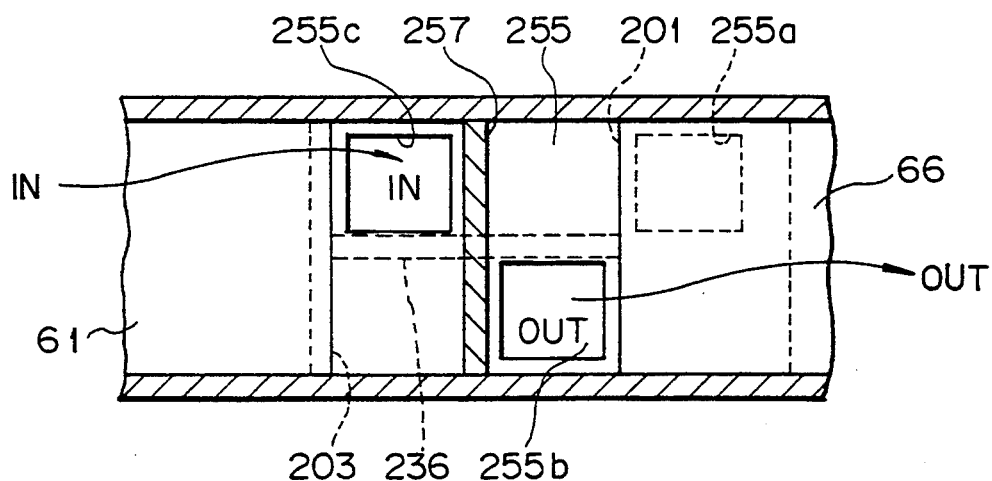

A slide movement applied to the damper 255 causes it to be slidably moved between a position as shown in FIG. 55(A), where the first opening 255a on one side of the boundary wall 236 and on one side of the partition wall is opened to the induction duct 201, and the second opening 255b on the other side of the boundary wall 236 and on the other side of the partition wall 257 is opened to the discharge duct 203, and the position as shown in FIG. 55(B), where the third opening 255c on one side of the boundary wall 236 and on one side of the partition wall is opened to the induction duct 201, and the second opening 255b on the other side of the boundary wall 236 and on one side of the partition wall 257 is opened to the discharge duct 203. The position as shown in FIG. 55(A) allows the induction duct 201 to be connected to the intermediate duct 66, and the discharge duct 203 to be connected to the connection duct 61, so that a flow from the bottom opening 60 to the top opening 72 is created. The position as shown in FIG. 55(B) allows the induction duct 201 to be connected to the connection duct 61, and the discharge duct 203 to be connected to the intermediate duct 66, so that a flow from the top opening 72 to the bottom openings 60 is created.

Figure 57B:
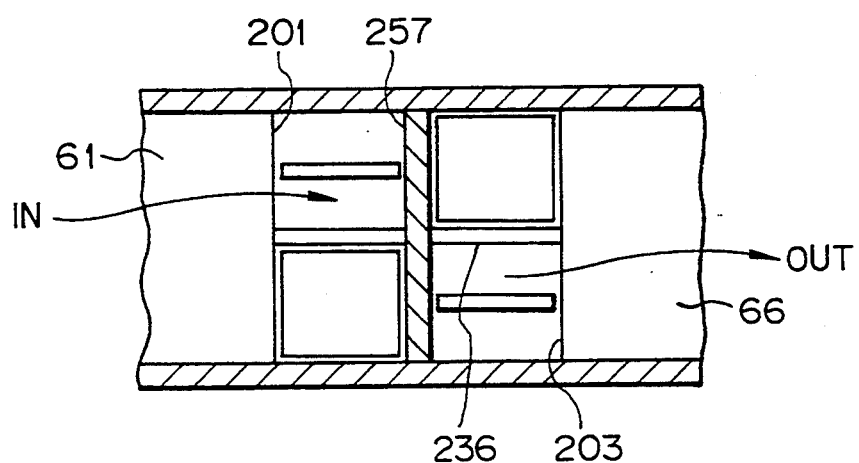

A thirteenth embodiment will be described with reference to FIG. 56(A), wherein a damper 265 is constructed on a pair of damper members 265a arranged parallel in the direction of the extension of the second and connection ducts 66 and 61. Each of the damper members 265a is constructed by a shaft 265b and a pair of axially spaced apart damper plates 265a-1 and 265a-2 fixedly connected to the shaft 265b as shown in FIG. 56(B) so that the plates 265a-1 and 265a-2 are adjacent each other at an angle of 90 degrees. As shown in FIG. 56(A), the damper members 265a, which are parallel, are arranged so that a phase difference of 90 degrees is created between the plate members 256a-1 and 265a-2. Furthermore, plates members 265a-1 are arranged on one side of the partition 257 and the plate members 265a-2 are arranged on the other side of the partition 257. As shown in FIG. 56(B), the shafts 265b are provided at their end gears 262, which are in mutual engagement, and one of the gears 262 engages with a gear 264 that is connected to an electric motor 263. A rotational movement obtained by the electric motor 263 as shown by an arrow causes the shafts 265b to be rotated in different directions as shown by arrows via the gears 264 and 262. As a result, the damper members 265a are moved between a position as shown in FIG. 57(A) and a position as shown in FIG. 57(B). In the position as shown in FIG. 57(A), an induction of air from the intermediate duct 66 to the induction duct 201 occurs, while a discharge of the air from the discharge duct 203 to the connection duct 61 occurs. Contrary to this, in the position as shown in FIG. 57(B), an induction of air from the connection duct 61 to the induction duct 201 occurs, while a discharge of the air from the discharge duct 203 to the intermediate duct 66 occurs.

Now, a fourteenth embodiment will be explained. As shown in FIGS. 58(A) and (B), the intermediate duct 66, the induction duct 201, the connection duct 61 and the discharge duct 203 are, in this order, arranged radially so that adjacent ones are spaced at an angle of 90 degrees. These ducts 66, 201, 61 and 203 are connected to a central cylindrical chamber 271, in which a rotary type damper valve 275a is arranged so that the valve 275a is rotated about an axis of the elongation of the cylindrical chamber 271. The damper valve 275a has a drive shaft 275b connected to the valve 275a, which allows the damper valve to be rotated about the axis. The cylindrical chamber 271 is connected to the respective ends of the ducts 66, 201, 61 and 203, so that openings and wall portions at an angular length of 90 degrees are alternately created along the circumferential direction of the chamber 271. The damper 275 is made from a plate member having a thickness corresponding to that of the ducts 66, 201, 61 and 203, having rounded end surfaces 275a complimentary in shape to shape as that of the wall portions 272, which allows the damper 275 to be slidably rotated with respect to the wall portions 272. As will be clear from the above, a 90 degree rotation applied to the shaft 27b from a motor not shown causes the damper 275 to be moved between positions shown in FIGS. 58(A) and (B).

Figure 58B:
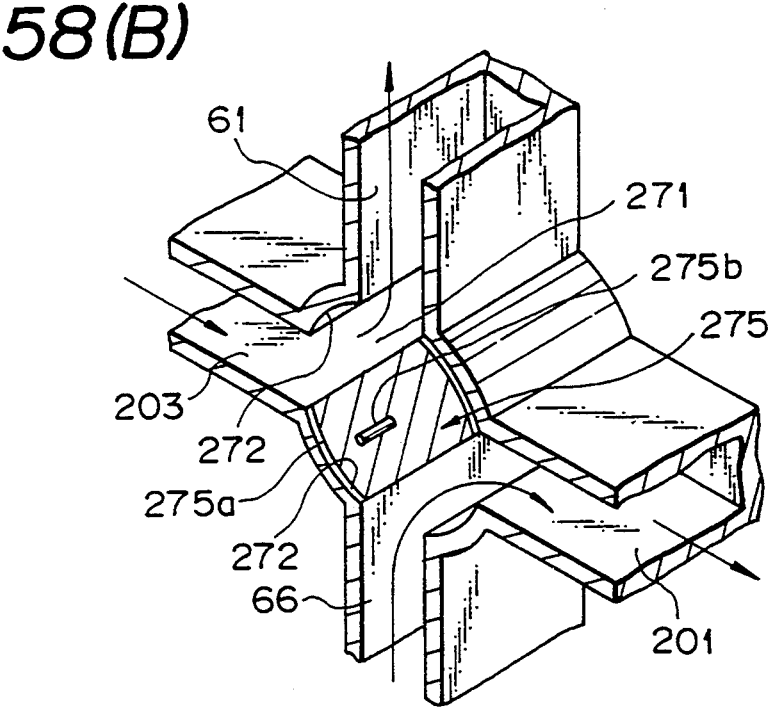

When the damper 275 is located as shown in FIG. 58(A), into the induction duct, the air from the connection duct 61 is drawn and the air in the discharge duct 203 is discharged into the intermediate duct 66. Contrary to this, when the damper 275 is rotated to a position as shown in FIG. 58(B), where, into the induction duct 201, the air from the intermediate duct 60 is drawn and the air in the discharge duct 203 is discharged into the connection duct 61.

A fifteenth embodiment will now be explained. As shown in FIG. 59(A), the intermediate duct 66, the induction duct 201 and the connection duct 61 are, in this order, arranged on a plane so that 90 adjacent ones are spaced at an angle of 90 degrees. The discharge duct 203 extends vertically to the plane on which the ducts 66, 210 and 61 are located. At a location where the ducts 66, 201 and 61, and 203 are connected, an annular opening 281a is created so that it is opened to the discharge duct 203. At a location where the ducts 66, 210 and 61 are connected, angularly spaced walls 282 having mutual spacing of 90 degrees are arranged as extensions of the ducts 66, 201 and 61. As shown in FIG. 59(B), a switching damper 285 is constructed by a bottom plate 285b of semi-circular shape, a top plate 285a extending vertically from the diameter of the bottom plate 285b, and a drive shaft 285c extending transverse to the plane of the bottom plate 285b. As shown in FIG. 59(A), the bottom plate 285b is rotatably slidably arranged in the circular opening 281a arranged between the point where the ducts 66, 201 and 61 are connected, and the discharge duct 203. A not shown rotary power source can obtain a 90 degree rotational movement of the valve 285 between a position as shown in FIGS. 60(A) and (B).

Figure 60B:
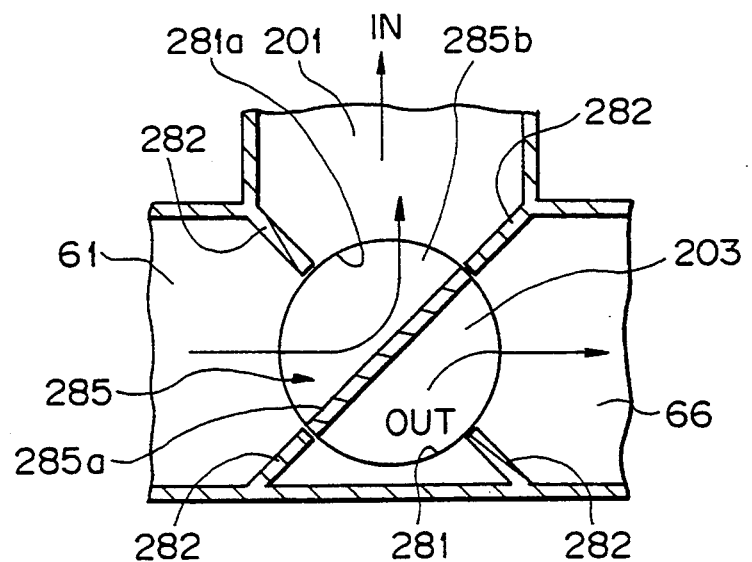

The position as shown in FIG. 60(A) allows the air in the intermediate duct 66 to be drawn into the induction duct 201, and the air in the discharge duct 203 to be discharged into the connection duct 61. When the damper 285 is subjected to a 90 degree rotational movement from the position in FIG. 60(A) to the position shown in FIG. 60(B), the air in the connection duct 61 is drawn into the induction duct 201 and the air in the discharge duct 203 is discharged into the intermediate duct 66.

Now, a sixteenth embodiment will be explained. As shown in FIG. 61, the intermediate duct 66, induction duct 201, connection duct 61 and discharge duct 203 are on a plane having a radial arrangement. The intermediate duct 66 and connection duct 61, and the induction duct 201 and discharge duct 203 are, respectively, diametrically opposite and the adjacent ducts are spaced at an angle of 90 degrees. At a location where the ducts 66, 201, 61 and 203 are connected, a block 295-1 is arranged that defines a circular bore 295-2 that has an axis extending along the direction where the induction duct 201 and the discharge duct 203 extend. Inserted rotatably to the bore 295-2 is a switching damper 295 as a circular body. The damper 295 has a first communication opening 295a as a blind hole that extends axially from one end of the circular tubular body, and a second communication opening 295b as a blind hole that extends axially from the other end of the circular tubular body. The damper 295 has diametrically opposite holes 295-3 and 295-4, which are, respectively, opened to the openings 295a and 295b. These openings 295a and 295b are arranged on a diametrically opposite position of the damper 295. It should be noted that proper seal members (not shown) are provided for ensuring that the ducts 201, 203, 61 and 66 communicate only with the communication openings 295a and 295b.

Figure 62B:
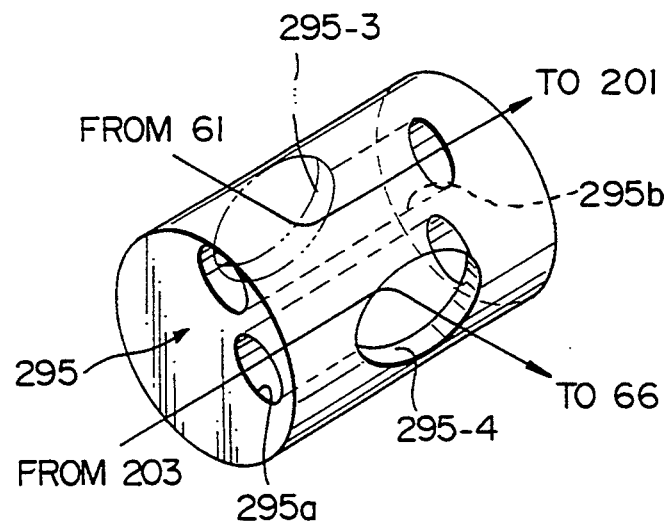

A rotary drive mechanism (not shown) connected to the shaft 295c causes the damper 295 to be rotated 180 degrees between a position shown in FIGS. 62(A) and (B). When the damper 295 is in the position shown in FIG. 62(A), the air in the duct 66 is drawn into the induction duct 201, and the air in the discharge duct 203 is discharged into the connection duct 61. When the damper 295 is rotated 180 degrees to the position in FIG. 62(B), the air in the connection duct 61 is introduced into the suction duct 201 and the air in the discharge duct 203 is discharged into the intermediate duct 66.

Next, a seventeenth embodiment will be explained. As shown in FIG. 63(A), an arrangement of the ducts 61, 66, 201 and 203 are the same as the seventh to thirteenth embodiments. Namely, the ducts 61 and 66 are arranged along a line, while the ducts 201 and 203 are arranged in side by side formation so that the ducts 201 and 203 are transverse to the duct 61 and 66. The bottom walls 66-1 and 61-1 are thickened so that they define diametrically opposite outer recesses 61a and 66a. Furthermore, the partition wall 307 has an inner recess 207-1 as a part of the circle, while the boundary wall 309 between the ducts 201 and 203 has a recess 309-1 as a part of the circle. As a result, between the recess 66a, 61a, 307-1 and 309-1, the damper 305, as the cylindrical solid body, is rotatably and slidably arranged. As shown in FIG. 63(B), the damper 305 forms four communication holes 305a, 305b, 305c and 305 that extend transverse to the longitudinal axis so that they are spaced from the diametric line. A detailed arrangement of the communication holes 305a, 305b, 305c and 305 will now be explained. As shown in FIG. 64(A), as a top view seen from the above in FIG. 63(A), FIG. 64(B) as a side view as seen from an arrow A in FIG. 63(A), and FIG. 64(C) as a cross sectional view taken along the line B—B in FIG. 64(B), the first and second communication holes 305a and 305b are located on one side of the boundary wall 309 near the discharge duct 203, and third and fourth communication holes 305c and 305d are located on the other side of the boundary wall 309 adjacent the discharge duct 201. Furthermore, the first and fourth communication holes 305a and 305d are parallel to each other, and when the holes 305a and 305d are located vertically, they are located astride partition wall 307 as will be seen from FIG. 64(B). The second and third communication holes 305b and 305c are arranged transverse to the first and fourth communication holes 305a and 305d. When the second and third communication holes 305b and 305c are arranged to extend along the vertical direction by rotating the damper 305 for 90 degree from the position shown in FIG. 64(B), it will be easily seen that they are arranged so as to astride the transverse to the first and fourth communication holes 305a. Furthermore, as will be seen from FIGS. 64(B) and (C), when the second and third communication holes 305b and 305c are arranged horizontally, they are blocked by the edge portions 66a and 61a of the intermediate duct 66 and second connection duct 61. Contrary to this, though not shown in the drawing, when the first and fourth communication holes 305a and 305d are arranged horizontally, they are blocked by the the edge portions 66a and 61a of the intermediate duct 66 and second connection duct 61. It should also be noted that suitable seal means are provided at portions where contact occurs between the partition 307, the wall portions 66a and 61a of the second and connection ducts 66 and 61, and the boundary plate 309, which does not allow communication with the ducts 201, 203, 61 and 66 other than via the four communication holes 305a, 305b, 305c and 305d.

The rotary movement at an angle of 90 degrees causes the valve 305 to be moved between a position shown in FIGS. 65(A) and (B). When the valve 305 is in the position in FIG. 65(A), where the first and fourth communication holes 305a and 305c are blocked by the wall portions 61a dn 66a, and the second communication hole 305b is located on one side of the partition wall 307 adjacent the connection duct 61, and third communication holes 305c are located on the other side of the the partition wall 307 adjacent the intermediate duct 66. As a result, the air in the intermediate duct 66 is, via the third communication hole 305c, drawn into the suction duct 201, and the air in the discharge duct 203 is, via the second communication hole 305b, discharged into the connection duct 61. Contrary to this, when the damper 305 is rotated, in a clockwise direction viewed from the arrow A in FIG. 63(A), at an angle of 90 degrees to a position shown in FIG. 65(B), where the second and third communication holes 305b and 305d are blocked by the wall portions 61a dn 66a, and the fourth communication hole 305d is located on one side of the partition wall 307 adjacent the connection duct 61, and first communication holes 305a are located on the other side of the the partition wall 307 adjacent the intermediate duct 66, the air in the connection duct 61 is, via the fourth communication hole 305b, drawn into the suction duct 201, and the air in the discharge duct 203 is, via the first communication hole 305a, discharged into the intermediate duct 66.

An eighteenth embodiment will now be explained. As shown in FIG. 66, two pipe members are arranged concentrically, so that a intermediate duct 66 is arranged inside the inner pipe having a diameter one half of the outer pipe, and the intermediate duct 61 is arranged between the outer and inner pipes. Concentric to the pipes but axially spaced therefrom is a pipe 310 having the same diameter as the outer pipe. A plate 319 of the width of the inner diameter of the pipe 301 extends axially, so that an induction duct 201 is formed on one side of the plate 319 inside the pipe 310, and a discharge duct 301 is formed on the other side of the plate 319 inside the pipe 310. A damper 315 of this embodiment is formed as a circular disk, which defines an inner, fan shaped communication opening 315a that extends about 180 degrees along the circumference of the disk, and an outer fan shaped communication opening 315b that is located diametrically opposite the inner opening 315a and extends for about 180 degrees along the circumference of the disk. Furthermore, the switching damper 315 is provided with a drive shaft 315c that allows the switching damper 315 to be moved at an angle of 180 degrees between a position shown in FIG. 67(A) and a position as shown n FIG. 67(B).

Figure 67B:
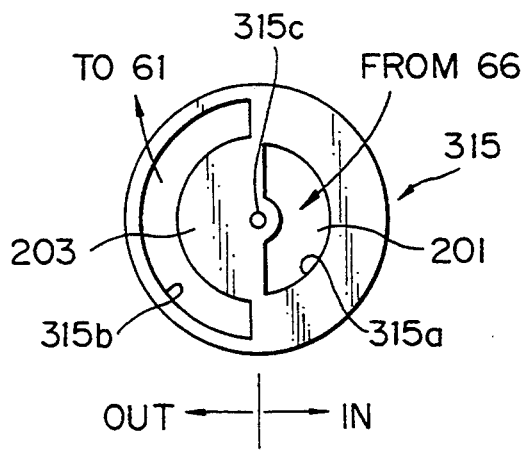

When the damper 315 is located as shown in FIG. 67(A), the air in the connection duct 61 is drawn into the induction duct 201 via the outer, fan shaped opening 315b, and the air in the discharge duct 203 is introduced into the intermediate duct 66 via the inner fan shaped opening 315a. When the damper 315 is located as shown in FIG. 67(B), the air in the intermediate duct 66 is drawn into the induction duct 201 via the inner, fan shaped opening 315a, and the air in the discharge duct 203 is introduced into the connection duct 61 via the outer, fan shaped opening 315b.

Figure 69B:
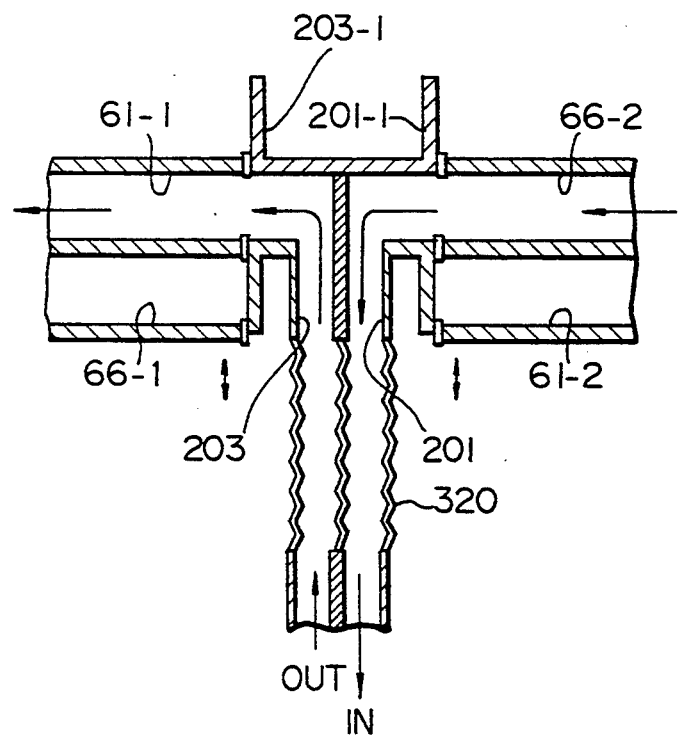

Now, a nineteenth embodiment will be explained where, as shown in FIG. 68, the intermediate duct 66 is divided into two parts 66-1 and 66-2 that extend horizontally in opposite directions, but vertically displaced for the vertical, inner width of the duct, so that the first part 66-1 is located lower than the second part 66-2. Similarly, the intermediate duct 61 is divided into two parts 61-1 and 61-2 that extend horizontally in opposite directions, but vertically displaced for the vertical, inner width of the duct, so that the first part 61-1 is located higher than the second part 61-2. Namely, the first parts 66-2 and 61-2 of the second and connection duct 66 and 61 are arranged in side by side formation, and similarly, the second parts 66-1 and 61-1 of the second and connection duct 66 and 61 are arranged in side by side formation while the arrangement is reversed between the left and right sides in the drawing. The induction duct 201 and the discharge duct 203 extend vertically while maintaining their side by side relationship. The duct 201 and 203 are formed in a body having a pair of horizontally opposite side walls 201-1 and 203-1 defining horizontally opposite openings 201-2 and 203-2. The ducts 201 and 203 are connected, via a connection pipe 320 made as a bellows member, to the inlet side and the outlet side, respectively of the air conditioning unit including the blower 74, evaporator 78, heater 80 and the air mix damper 82. The construction of the slide plates 201-1 and 203-1 and the bellows 320 allow the body defining the intake duct 201 and discharge duct 203 to be vertical moved between a position as shown in FIG. 69(A), where the bottom part 61-2 of the connection duct 61 is connected to the induction duct 201, and the bottom part 66-1 of the intermediate duct 66 is connected to the discharge duct 203, while the top parts 66-2 and 61-1 of the second and connection ducts 66 and 61 are blocked by the plate 201-1 and 203-1, and a position as shown in FIG. 69(B), where the bottom part 66-2 of the intermediate duct 66 is connected to the induction duct 201, and the top part 61-1 of the connection duct 61 is connected to the discharge duct 203, while the bottom parts 66-1 and 61-2 of the second and connection ducts 66 and 61 are blocked by the plates 201-1 and 203-1.

When the position as shown in FIG. 69(A) is obtained, the air in the bottom part 61-2 of the connection duct 61 is drawn into the induction duct 201, and the air in the discharge duct 203 is discharged into the bottom part 66-1 of the intermediate duct 66. When the position as shown in FIG. 69(B) is obtained, the air in the top part 66-2 of the intermediate duct 66 is drawn into the induction duct 201, and the air in the discharge duct 203 is discharged into the top part 61-1 of the connection duct 66.

In the embodiment in FIG. 68, in place of using of the bellows duct 320, the ducts 201 and 203 provided with the fan 74 with the motor 76, evaporator 78, heater 80, and damper 82 can be, as a whole, moved.

Now, a twentieth embodiment will be explained. In FIG. 70, the induction duct is divided into two sections 201-1 and 201-2 between which a discharge duct 203 is arranged. These sections of the ducts 201-1 and 201-2 and the discharge duct 203 are constructed as a unit 335 that is slidable with respect to the bottom flange portions 66-1 and 61-1 of the second and the connection ducts 66 and 61 via seal members 337 in the direction as shown by an arrow A. Furthermore, the sections 201-1 and 201-2 of the induction duct is connected to a duct to the fan 74 via a bellows duct 331, which allows the unit 335 to be laterally moved. The discharge duct 203 is connected via a flexible duct means, such as a bellows shaped duct 333, to the outlet of the bottom duct 62 in which the cooling unit including members 74, 76, 78, 80 and 82 is stored. As a result, the horizontal movement of the unit 335 along the direction as shown by the arrow A is allowed while the discharge duct 203 is connected to the outlet of the bottom duct 62.

Figure 71B:
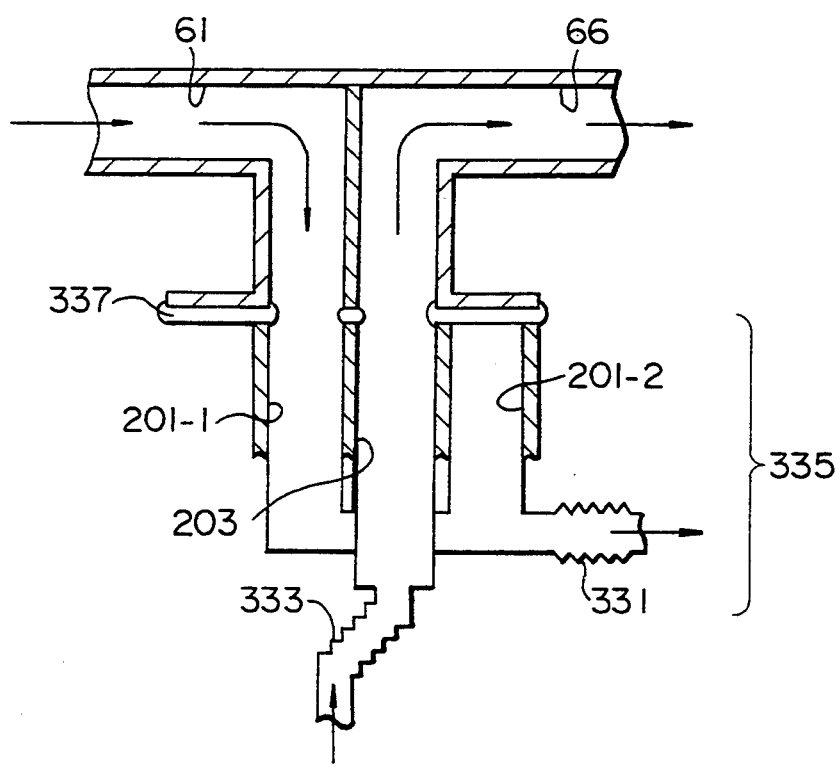

The unit 335 can be horizontally and slidably moved between a position as shown in FIG. 71(A) where the intermediate duct 66 is opened to the induction duct section 201-2, and the connection duct 61 is opened to the discharge duct 203, and a position as shown in FIG. 71(B) where the intermediate duct 66 is opened to the discharge duct 66, and the connection duct 61 is opened to the induction duct section 201-1. When the unit 335 is in the position shown in FIG. 71(A), the air in the intermediate duct 66 is drawn into the induction duct section 201-2, and the air in the discharge duct 203 is discharged into the connection duct 61. By the slide movement of the unit 335 along the arrow B, the unit is moved to the position as shown by FIG. 71(B), where the air in the connection duct 61 is drawn into the induction duct section 201-1, and the air in the discharge duct 203 is discharged into the intermediate duct 66.

It should be noted that in place of the provision of the flexible ducts 331 and 333, the duct unit 335 and the bottom duct 62 together with the cooling unit therein can be simultaneously moved. Furthermore, the second and connection ducts 66 and 61, which are arranged in a straight line, may be slidable along an arrow C in FIG. 70.

A twentieth embodiment will now be explained, which is provided with a construction for removal of smoke of tobacco or some kinds of smells from a seat among a plurality of seats that are not comfortable for other passengers. As shown in FIG. 72, a connection duct 61 branches to the top duct 70 for respective seats having respective outlets. Furthermore, an inlet port 60 is provided for each seat. Furthermore, connection ducts 61 from the inlet ports 60 of the respective seats are combined to a manifold duct 401, which is connected to the bottom duct 62 in which a blower 74 is provided. Branched from the manifold duct 401 is a branch duct 403, and a outside air induction damper 405 is provided at a location where the branch duct 403 branches from the manifold duct 401. The damper 405 is connected to a servo-motor 407 for controlling the degree of the opening of the damper 405. The amount of inner air or outside air is controlled in accordance with the degree of the opening of the damper 405. Ducts 411 are branched from the ducts 61 for the respective seats, and these ducts 411 are combined to a duct 411a that is opened to the atmosphere, and a fan 413 is arranged in the duct 411a. At respective locations where the ducts 411 are branched from the respective connection ducts 61, exhaust switching dampers 415 are mounted, which are connected to respective servo-motors 417 so that the respective dampers 415 are respectively moved as shown by respective arrows.

A sensor 421 is provided for each of the seats that is capable of detecting tobacco smoke issued by a passenger. As shown in FIGS. 73(A) and (B), each sensor 421 is mounted in a location that is slightly inward of each of the induction ducts 60 located on the opposite side of the seat portion 50 of the seat. Furthermore, as shown in FIG. 72, a blower control unit 425 is provided for the exhaust control, so that signals from the sensors 421 are introduced into the unit 425 via the damper control unit 423, so that the degree of the opening of the outside air control damper 405 or the exhaust control dampers 415 and/or the rotational speed of the fan are controlled for controlling the removal of the gas.

Now, the operation of the twenty first embodiment in FIG. 72 will be explained. At the seat where a person is smoking, the sensor issues a signal so that the control unit 423 issues a signal to a corresponding servo motor 417 and the corresponding exhaust switching valve 415 is fully opened so that the corresponding ducts 411 are opened to the corresponding connection duct 61. At the same time, the blower control unit 425 issues a signal for operating the exhaust fan 413, so that the air including the tobacco smoke drawn via the sucking port 60 is introduced into the discharge duct 411 for removal to the atmosphere. Contrary to this, at the seat where a person is not smoking, the exhaust switching damper 415 fully closes the duct 411, so that the air is, via the connection duct, drawn into the manifold duct 401, and is directed to the bottom duct 62. Furthermore, in this case, the air induced from two seats are exhausted, so that the outside air induction damper 405 is opened slightly for introducing an amount of outside or inside air when it is required.

As described above, in the case that tobacco smoke or an unpleasant aroma is detected at a seat, the exhaust switching damper 415 of the corresponding seat is switched so that the suction duct 61 is connected to the exhaust duct 411 so that the air is discharged outside, which can prevent the other passages from detecting said unpleasant aroma. Furthermore, at the seat where such a discharge of air to the outside does not occur, the air inside the cabin is basically recirculated, which prevents an excessive amount of power from being consumed. The switching of the damper 415 to a position for the discharge of the air to the outside can be effected continuously for a suitable period by a timer means. In place of such continuous control, the damper 415 can be intermittently operated for a predetermined period for obtaining an intermittent air discharge operation to the atmosphere. Furthermore, the damper 415 may have a half opened position, that allows the air flow to be divided into a flow that is exhausted to the outside atmosphere via the duct 411 and a flow that is subjected to the recirculation in the cabin via the bottom duct 62.

In the 21st embodiment shown in FIG. 72, the ducts 411 from the respective seats are combined to a duct 411a in that the common single fan 413 is stored for generating a forced flow of air directed to the outside atmosphere. In place of such a construction, the ducts 411 from the respective seats can be directly opened to the outside atmosphere, and fans 413 are arranged in the respective ducts 411. This latter arrangement is advantageous in that the efficiency in removing the air to the outside atmosphere for the respective seats can be increased.

Figure 76B:
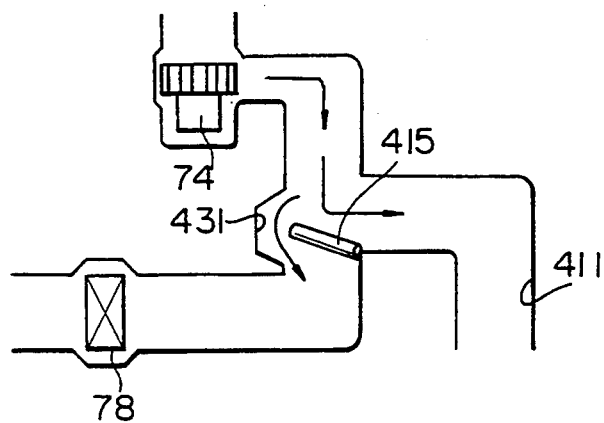

FIG. 75 shows a twenty third embodiment, where an exhaust switching damper 415 is provided at a location between the fan 74 and a evaporator 72 in the bottom duct 62, and a widened portion 431 is provided in the duct 62 at a location where the exhaust switching damper 415 is provided, so that a by-pass passageway can be created for obtaining a flow of the air inside the recirculating system (the intermediate duct 66) when the exhaust switching damper 415 is opened. Namely, when the damper 415 is fully closed as shown in FIG. 76(A), the communication to the exhaust duct 411 does not occur. When the damper 415 is in a partly opened position as shown in FIG. 76(B), a part of the air from the corresponding seat is discharged to the outside atmosphere via the exhaust duct 411, and the remaining air is, via the by-pass passageway created by the widened portion 431, subjected to the inner air recirculation. When the switching damper 415 is fully opened as shown in FIG. 76(C), the air from respective seats can only flow to the exhaust duct 411 for removal to the atmosphere.

Figure 76C:
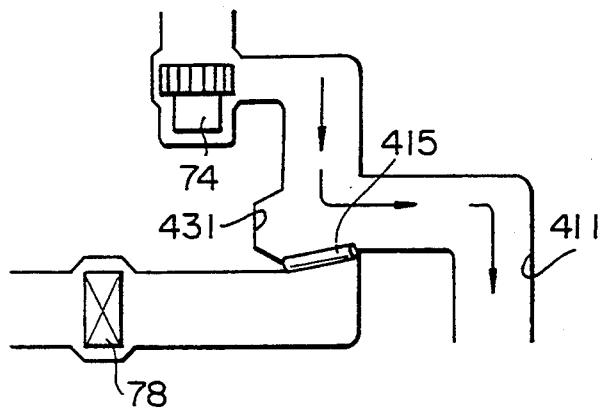

According to this 23rd embodiment, at the seat(s) where a person is smoking, almost all of the air can be exhausted by placing the exhaust switching valve 415 as shown in FIG. 76(B), or all of the air can be exhausted by placing the damper 415 as shown in FIG. 76(C), and, at the seat(s) where the passenger is not smoking, the damper 415 is placed as shown in FIG. 15(A), so that all of the drawn air is subjected to inner recirculation. Such an arrangement of this embodiment can prevent the inner air recirculation amount from being substantially reduced, while maintaining a desired amount of exhaust air to the outside, without a special provision of the opening for the outside and inside air.

According to the 24th embodiment shown in FIG. 77, a means is provided for obtaining a heat exchange between the drawn air and the exhausted air. This embodiment is provided with an exhaust damper 415 located downstream from the evaporator 78 for controlling the flows directed to the intermediate duct 66 and the flows directed to the exhaust duct 411. The bottom duct 62 and the exhaust duct 411 have portions that are arranged in parallel and make contact in a side by side formation and heat exchanging plates 443 are located at these portions. As shown in FIG. 77(B), at these portions, a side wall 443-1 is shared between the ducts 441 and 411, and the heat exchanging plates 443 extend integrally and in parallel formation from the wall to the ducts 441 and 411. In the embodiment shown in FIG. 77(A), when the passenger in the seat is smoking, the switching damper 415 is opened to the exhaust duct 411 and a portion of the air is discharged to the outside. In this case, a heat exchange occurs between the air in the duct 411 and the suction air in the duct 441. When a cooling operation is carried out, the air drawn into the duct 441 via the opening 60 has an increased temperature due to the fact that the air in the duct 441 is from the outlet 72 after being subjected to a heat exchange with the air in the cabin. Contrary to this, the exhaust air in the exhaust duct 411 is air after being cooled at evaporator 78. As a result, because of heat exchange between the air in the duct 441 before the evaporator 78 and the air in the duct 411 after the evaporator 78 an effective use of cooling energy is arranged for reducing power consumption.

In the 25th embodiment in FIG. 78, a first damper 451 for opening or closing the passageway to the evaporator 78 and a second damper 453 for opening or closing the exhaust duct 411, and the first and second dampers 451 and 453 are respectively operated by respective servo-motors 455 and 457 which are operated by a control circuit 423. FIG. 79 illustrates how the dampers 451 and 453 in the embodiment in FIG. 78 operate. When it is determined at step 100, that the air conditioner switch (not shown) is turned ON, the routine proceeds to step 110, where a value C indicating the condition of smoke or bad smell, such as a concentration, detected by the sensor 421 is input. At step 120, it is determined if the detected value C is equal to or lower than a predetermined value C0, that corresponds to a proper value that presents the passenger in other seat(s) from detecting the presence of smoke or a bad smell. When it is determined that the detected value C is equal to or lower than the predetermined value C0, the routine goes to step 130 where the first damper 451 is fully opened and the second damper 453 is fully closed, so that all of the air drawn by the inlet 60 at the seat is introduced into the duct to the evaporator 78 as shown in FIG. 80(A).

When it is determined that the detected value C is larger than the predetermined value C0, the routine proceeds to step 140 where it is determined whether the detected value C is equal to or lower than a predetermined value C1, which is larger than the predetermined value C0. When it is determined that the detected value C is equal to or lower than the predetermined value C1, the routine proceeds to step 150, where the first damper 451 is moved to a partially opened condition (half opened condition), and the second damper 453 is also moved to a partially opened condition (half opened condition). In this case, as shown in FIG. 80(C), the air drawn into the opening 60 from the seat is partially directed to the evaporator 78, and the remaining air as drawn is exhausted to the outside atmosphere. As a result, a gradual ventilation can occur to purify the air in the cabin.

When is determined that the detected value C is larger than the predetermined value C1 at step 140, the routine proceeds to step 160, where the first damper 451 is moved to a fully closed condition, and the second damper 453 is also moved to a fully opened condition. In this case, as shown in FIG. 80(B), all of the air drawn into the opening 60 from the seat is directed to the exhaust duct 411 and to the atmosphere. As a result, the presence of smoke or a bad smell can be minimized In the embodiment in FIG. 78, a signal from the sensor 421 is used at the control circuit 432 for obtaining signals directed to the servo motors 451 and 457 for operating the dampers 451 and 453. In the place of such an automatic operation of the dampers 451 and 453, the dampers can be manually operated.

A 26th embodiment shown in FIG. 81 is an improvement of the 25th embodiment shown in FIG. 78, in that an outside air induction duct 461 is added for introducing the outside air into the duct and to the fan 74, and a damper 463 for controlling the introduction of the air through the duct 461 and a servo motor 465 for controlling the damper 463 are provided. According to the 26th embodiment, when both the discharge damper 451 and the exhaust damper 463 are opened in order to obtain air conditioning while ventilation is carried out, the outside air induction damper 463 is opened for introducing the outside air. In this case, the outside air induction damper 463 and the exhaust damper 453 can have the same degree of opening so that the amount of air introduced via the outside air induction duct 461 and the amount of air exhausted via the exhaust duct 411 is equalized, so that the amount of air directed to the evaporator 78 is unchanged while maintaining the ventilation operation.

A 27th embodiment will now be explained with reference to FIG. 82. This embodiment features the outside air induction damper 463 and the exhaust damper 453 in FIG. 81 being integrated. Namely, an exhaust-outside air induction damper 471 is provided, that has a first portion 471-1 located in the exhaust duct 411 and a second portion 471-2 located in the outside air induction duct 461. The damper 471 is connected to a servo motor 473. Furthermore, a wind speed sensor 475 is provided at the discharge outlet 72 for detection of the speed of the air flow for issuing a signal that is introduced into a blower control unit 425 for controlling the rotational speed of the fan 74. The blower control unit 425 is connected to a flow amount control switch 477 having four positions corresponding to different modes of the amount of air, i.e., Hi (high value mode), Me2 (higher middle value mode), Me2 (lower middle value mode), and Lo (low value mode). The blower control unit 425 and the damper control unit 423 are connected to each other so that signals are transmitted therebetween.

A flow amount control operation of the 27th embodiment in FIG. 82 will now be explained by FIG. 83 when the wind speed sensor 475 is used, and by FIG. 84 when the wind speed control sensor 475 is eliminated. Referring to FIG. 83, when the wind speed sensor 475 is used, when an air conditioner switch is turned ON (yes result at step 200), the routine proceeds to step 210, where a determination of the mode selected by the mode selection switch 477 is carried out. When the high amount mode Hi is selected, the routine proceeds to step 220 where it is determined whether the outside air induction damper 471 is opened. When it is determined that the damper 471 is closed, the routine returns to step 210. When it is determined that the damper 471 is opened, the routine proceeds step 230, where it is determined if the value of the air flow speed V1 detected by the wind speed sensor 475 is equal to a first predetermined value V0Hi, which is a memorized value of discharged air amount that is suitable for an average passenger at the Hi mode determined by a test under the closed damper 471 conditions.

When it is determined that V1 is not equal to V0Hi (no result at step 230), the routine goes to step 240, where it is determined that the discharged air flow speed V1 is larger than the first set value V0Hi. When it is determined that $V1 > V0Hi$, the routine goes to step 250 where the blower 74 is controlled so that the amount of discharged air is lowered to the predetermined value V0Hi. Contrary to this, when it is determined that $V1 < V0Hi$, the routine goes to step 260 where the blower 74 is controlled so that the amount of discharged air is increased to the predetermined value, and returns to step 210. After the execution of step 250 or 260, the routine returns to step 210.

When the mode selected at step 210 is an other mode Me2, Me1 or Lo, the routines proceeds to step 270, 280 or 290, so that a procedure constructed by steps similar to steps 220 to 260 is carried out. Namely, in accordance with the mode Me2, Me1 or Lo as selected, a second set air flow speed V0Me2, a third set air flow speed V0Me1 or fourth air flow speed V0Lo is determined that corresponds to the desired air speed as discharged upon the closed position of the damper 471, and a control similar to steps 230 to 260 is carried out so that the air flow speed as discharged and sensed by the sensor 470 is controlled to the second set air flow speed V0Me2, the third set air flow speed V0Me1 or the fourth air flow speed V0Lo that corresponds to the mode Me2, Me1 or Lo as selected.

Now, a flow amount control operation of the 27th embodiment in FIG. 82 will now be explained when the wind speed sensor 475 is not used with reference to FIG. 84. When an air conditioner switch is tearned ON (yes result at step 300), the routine goes to step 310, where a determination of the mode selected by the mode selection switch 477 is carried out. When the high amount mode Hi is selected, the routine proceeds step 320 where it is determined if the outside air induction damper 471 is opened. When it is determined that the damper 471 is closed, the routine retearns to step 310. When it is determined that the damper 471 is opened, i.e. the outside air induction and the air exhaust are carried out, the routine proceeds step 330, where the control signal is supplied to the fan 74 for obtaining the air flow amount VHi, which corresponds to the first predetermined value V0Hi,and which is suitable for the high speed air flow mode VHi.

When the mode selected at step 310 is an other mode Me2, Me1 or Lo, the routines proceeds step 340, 360, or 380 for determining if the damper 471 is opened. When the damper 471 is closed (No result), the routine returns to step 310. When it is determined that the damper is opened, i.e., both the exhaust operation via the duct 411 and the outside air induction operation via the duct 461 are carried out, the routine proceeds step 350, 370 or 390, where a signal is issued to the fan 74 for obtaining the air flow speed V0Me2, the third set air flow speed V0Me1 or the fourth air flow speed V0Lo, which is for obtaining the same amount of discharged air compared with when the damper 471 is closed.

A 28th embodiment will now be explained with reference to FIG. 85. The 28th embodiment is a modification of the embodiment in FIG. 81 in that the air discharge damper 451 and the exhaust damper 453 are combined to an air conditioning and exhaust damper 481, which is connected to a servo-motor 483 for operating the damper 481. The damper 481 can vary the ratio between the discharged air amount and the exhausted air amount. Furthermore, the air conditioning and exhaust damper 481 and the outside air introducing damper 463 cooperate in such a manner that the amount of air discharged from the exhaust duct 411 and the amount of air introduced from the outside air induction duct 461 are equalized.

A 29th embodiment is described with reference to FIG. 86. This embodiment includes a communication duct 501 having one end branching from the bottom duct 62 at a location upstream from the fan 74 and a second end connected to the bottom duct 62 at a location downstream from the heater core 80, and a switching valve 503 located at the position where the downstream end of the duct 501 is connected to the bottom duct 62. The switching valve 503 moves between a position where the bottom duct 62 is connected to the intermediate duct 66 and a position where the bottom duct 62 is connected to the communication duct 501. This embodiment is further provided with an induction duct 507 that has first ends having an inlet 505 opened to the seat portion 50 and the back rest portion 52, and a second end connected to the bottom duct 62 at a location upstream from the fan 74 and downstream from the position where the bottom duct 62 is connected to the discharge communication duct 501. A damper 509 is located at the position where the induction duct 507 is connected to the bottom duct 62. The damper 509 is moved between a position where the bottom duct 62 is connected to the induction duct 507 and a second position where the bottom duct 62 is connected to the inlet 60. Actuators (not shown) of discharge outlet switching damper 503 and the inlet duct switching damper 509 are together with that of the air mix damper 82 connected to a control box (not shown) including a control circuit (not shown).

Now, an operation of the embodiment in FIG. 86 will be, at first, described with reference to a cooling mode. As shown in FIG. 87(A), at the cooling mode, the induction duct switching damper 503 is located at a position where the communication of the discharge communication duct 501 to the bottom duct 62 is blocked, and the inlet switching damper 509 is located at a position where the communication of the induction duct 507 to the bottom duct 62 is blocked. The rotation of the fan 74 causes the air in the cabin to be drawn, via the bottom inlet 60, into the intermediate duct 62, and to be discharged from the top outlet 72 via the intermediate duct 66. The position of the air mix damper 82 as shown is such that the heater core 80 is fully closed. The degree of opening the air mix damper 82 is, however, controlled in accordance with the requirement for obtaining a desired temperature.

Figure 87B:
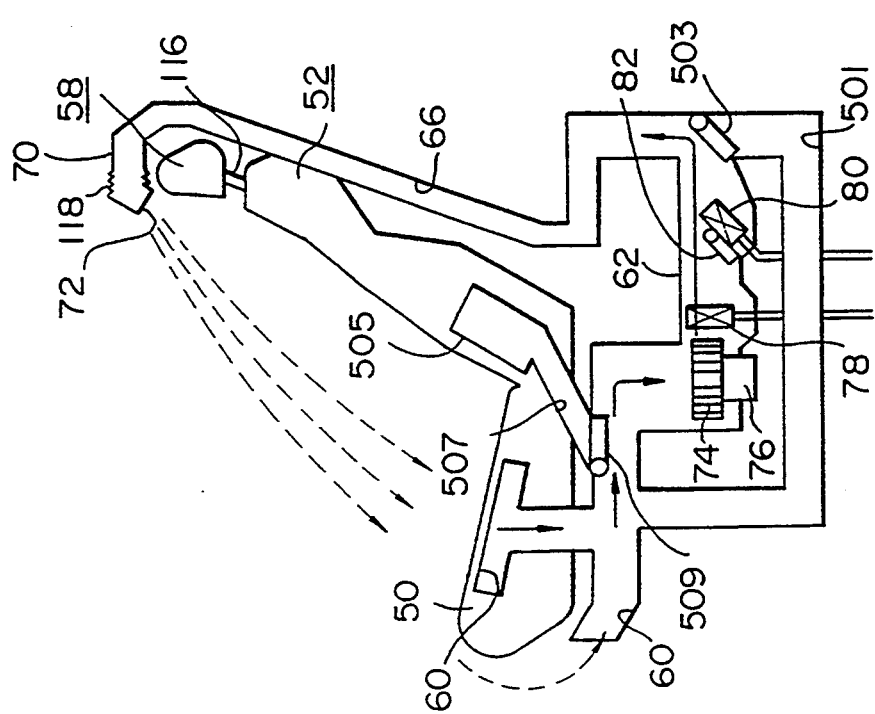

When the induction switching damper 509 is, as shown in FIG. 87(B), moved to a half opened position, both the bilevel-heater inlet 505 and the inlet opening 60 are connected to the bottom duct 62, so that the air discharged from the top outlet 72 is drawn into the bottom duct not only through the inlets 60 located at the leg part of the passenger but also through the inlets 505 located at the waist part of the passenger.

FIG. 88(A) shows when the embodiment in FIG. 86 is under its bi-level mode. In this case, the discharge outlet switching damper 503 is half opened, so that both the intermediate duct 66 and the discharge outlet communication duct 501 are opened to the bottom duct 62. Furthermore, the air mix damper 82 is half opened, so that the air passing the heater core 80 is mainly directed to the outlet communication duct 501 while the air by-passing the heater core 80 is mainly introduced into the intermediate duct 66, although the air flow passing the heater 80 and the air flow by-passing the heater 80 are mixed before being directed to the ducts 66 and 501. Furthermore, the inlet switching duct 509 is located at a position where only the inlet duct 507 is connected to the bottom duct 62.

In this arrangement, the rotation of the fan 74 causes the air to be drawn via the bi-level and heater inlet 505 into the bottom duct 62, and the cooled air passing only through the evaporator 78 is mainly introduced into the intermediate duct 66, and is discharged from the top outlet 72, and the discharged air from the outlet 72 is drawn again via the bi-level and heater inlet 505. Contrary to this, relatively hot air passing not only through the evaporator 78 but also through the heater core 80 is directed mainly to the discharge outlet communication duct 501 and is discharged from the outlets 60 located at the leg area of the passenger, and the discharged air is drawn again via the inlet 505. In short, under this hi-level mode, a cooled air flow is discharged from the top outlet 72 while a warmed up air flow is discharged from the bottom outlets 60, and a so called "head-is-cool-and-leg-is-warm" air conditioning operation can be realized.

FIG. 88(B) shows an operation when the system in FIG. 86 is under the heating mode. In this mode, the discharge outlet switching damper 503 is switched to the position where the bottom duct 62 is connected only to the discharge communication duct 501, the air mix damper 82 is located so that the air passing through the evaporator 78 is directed to the heater core 80, and the inlet switching damper 509 is positioned so that the fist duct 62 is connected only to the inlet duct 507. The rotation of the fan 74 causes the air to be drawn through bi-level and heater inlet 505 into the bottom duct 62 toward the evaporator 78. The air heated at the heater 80 is, via the outlet communication duct 501, directed to the bottom openings 60, and is discharged therefrom, and is received through the bi-level and heater inlet 505.

A 30th embodiment will now be explained with reference to FIG. 89. The embodiment shown in FIG. 89 is a modification of the embodiment shown in FIG. 86 in that a further provision is made regarding the outside air induction duct 510 connected to the bottom duct 62 at a location between the inlet switching damper 509 and the fan 74, and an exhaust duct 512 connected to the bottom duct 62 at a location between the fan 74 and the evaporator 78. An outside air induction damper 511 is arranged at a location where the outside air induction duct 510 is connected to the bottom duct 62. A discharge damper 513 is arranged at a location where the exhaust duct 512 is connected to the bottom duct 62. Actuators of the outside air induction damper 511 and the exhaust damper 512 are, together with the actuators of the discharge outlet switching damper 503, the sucking inlet switching damper 509 and the air mix damper 80, connected to the control circuit in the control box (not shown).

The cooling operation of the embodiment in FIG. 89 is explained. In the cooling mode, as shown in FIG. 90, the discharge outlet switching damper 503 is positioned so that the discharge outlet communication duct 501 is blocked to the bottom duct 62, while the inlet opening switching damper 509 is positioned so that the inlet duct 507 is blocked to the bottom duct 62. Furthermore, outside air induction damper 511 and exhaust damper 513 are fully opened. The rotation of the fan 74 causes the air in the cabin 126 to be drawn via the openings 60 into the bottom duct 62, and causes the outside air to be drawn via the outside air induction duct 510 into the bottom duct 62. The air in the bottom duct 62 is discharged from the top opening 72 via the intermediate duct 66. In FIG. 90, the air mix damper 82 is shown so that it fully closes the heater core 80. However, the degree of the opening of the air mix damper 82 is controlled so that an amount of air from the evaporator 78 is subjected to heating so as to obtain a desired temperature of the air discharged from the outlet 72.

In FIG. 91, the degree of the opening of the outside air induction damper 511 and the exhaust damper 513 are controlled for controlling the amount of outside air introduced as well as the amount of air exhausted. In this case, it is desirable that the dampers 511 and 513 cooperate in such a manner that the same degree of opening is obtained between the dampers 511 and 513. As a result, the amount of outside air introduced and the amount of air exhausted are equalized, which is advantageous because an outside air ventilation operation during the air conditioning operation is obtained without changing the air amount for the air conditioning. Although only a cooling mode operation is explained by FIGS. 90 and 91, a hi-level or heating mode operation can also be obtained while carrying out such a ventilation operation.

A 31st embodiment will be with reference to FIG. 92, which is a modification of FIG. 86 in that, in FIG. 92, the inlet switching damper 509 in FIG. 86 is eliminated. Namely, only a three mode combined induction duct 515 that has an end as a three mode combined inlet 517 is opened to the area where the seat portion 50 is connected to the back rest portion 52 is provided. The discharge outlet communication duct 501 branched from the bottom duct 62 at a position downstream from the heater core 80 is connected to a bottom discharge outlet 519 corresponding to the inlets 60 in FIG. 86.

According to the operation of the embodiment in FIG. 92, the rotation of the fan 74 causes the air to be drawn into the bottom duct 62 via the inlet 517 combined between the three modes, and the air is subjected to a heat exchanging operation at the evaporator 78 and the heater core 80. At the cooling mode, the damper 503 is moved to a position to block the discharge outlet communication duct 501, so that the cooled air is discharged only from the top opening 72. Contrary to this, upon the heating mode, the damper 503 blocks only the intermediate duct 66, which allows only the heated air to be discharged from the bottom discharge outlet 519 located at the area of the legs of the passenger.

Upon a bi-level mode, the switching damper 503 is at a half opened position, so that the bottom duct 62 is connected to both the intermediate duct 66 and the discharge outlet communication duct 501. In this case, a cooled air flow is discharged from the top outlet 72 while a heated air flow is discharged from the leg portion outlets 519, and a so called "head-is-cool-and-leg-is-warm" air conditioning operation can be realized.

A 32nd embodiment will described with reference to FIG. 93. As shown in FIG. 93, according to this embodiment, on one side of the blower fan 74 adjacent the drawing opening 60, a heater core 80 is arranged, and, on the other side of the blower fan adjacent the intermediate duct 66, an evaporator 78 is arranged. Arranged between the blower fan 74 and the heater core 80 is a damper 521 for controlling the flow of air passing the heater core 80. Arranged between the blower fan 74 and the evaporator 78 is a damper 523 for controlling the air flow passing the evaporator 78. The heater flow control damper 521 and evaporator flow control damper 523 are, via respective control cables 525, connected to a control switch box 527. In this embodiment, as shown in FIG. 94, the blower fan 74, the motor 76 for rotating the fan 74, the heater flow control damper 521 and evaporator flow control damper 523 is constructed as a single fan unit. Namely, the bottom duct 62 is formed as a box that is fixedly connected to the housing of the blower 74. The bottom duct 62 has portions extending radially from the housing to respective openings 62-1 4. Each of the radially extending portions have at opposite walls along the axis of the rotation of the blower 74, openings 62-5 between which the damper 521 or 523 is arranged.

An operation of the embodiment in FIG. 92 is as follows. Upon a cooling mode, as shown in FIG. 95(A), the heater flow control damper 521 is lowered and the the evaporator flow control damper 523 is elevated, so that the blower fan 74 is, only at its axial opening, connected to the heater core 80, and the blower fan 74 is, only at its radial opening, connected to the evaporator 78. As a result, the rotation of the fan 74 causes the air to be drawn into the bottom duct 62 via the bottom opening 60. The air is passing through the fan 73 from its axial inlet to the radial outlet, and is passed through the evaporator 78 toward the intermediate duct 66 and to the top opening 72 (FIG. 93) from which the air is discharged into the cabin. An upward movement of the heater flow control damper 521 as shown by an arrow in FIG. 95(C) allows an amount of air passing through the heater 80 to be changed, so that temperature control of the air introduced into the intermediate duct for air conditioning the cabin 126 can be controlled.

Figure 95B:
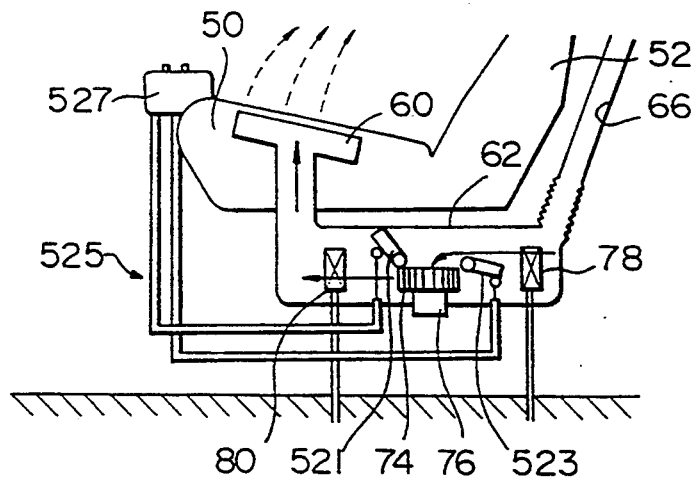
Figure 95C:
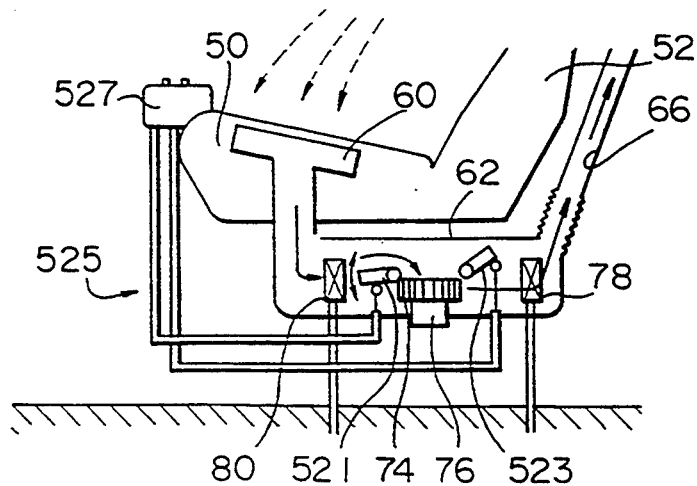

Upon a heating mode shown in FIG. 95(B), the heater flow control damper 521 is elevated and the the evaporator flow control damper 523 is lowered so that the blower fan 74 is, only at its axial inlet, connected to the evaporator 78, and the blower fan 74 is, only at its radial outlets, connected to the heater core 80. As a result, the rotation of the fan 74 causes the air to be drawn into the bottom duct 62 via the intermediate duct 66 opened to the top opening 72 in FIG. 96. The air passing through the evaporator 78 passes through the fan 74 from its axial inlet to the radial outlet, and is passed through the heater core 80 toward the bottom opening 60 at the area of the legs of the passenger, from which the air is discharged into the cabin.

A 33rd embodiment will be explained with reference to FIG. 96. This embodiment differs from the embodiment in FIG. 93 in that a bi-level duct 533 is arranged between the seat portion 50 and the back rest portion 52. The bi-level duct 533 has, at its one end, a drawing port 531, and the other end of the duct 533 is connected to the bottom duct 62 at a location above the blower fan 74 and between the heater flow control damper 521 and the evaporator damper 523.

During the operation of the embodiment in FIG. 96, upon a cooling mode, the heater flow control damper 521 is lowered and the evaporator flow control damper 523 is elevated, so that the blower fan 74 is, only at its axial opening, connected to the heater core 80, and the blower fan 74 is, only at its radial opening, connected to the evaporator 78. As a result, the rotation of the fan 74 causes the air to be drawn into the bottom duct 62 via the bottom opening 60. The air from the opening 60 passes through the heater 80 and the air drawn from the bi-level inlet opening 531 is passed through the fan from its axial inlet to the radial outlet, and is passed through the evaporator 78 toward the intermediate duct 66 and to the top opening 72 (FIG. 93) from which the air is discharged into the cabin.

When, as shown in FIG. 97(B), the heater flow control damper 521 is elevated and the the evaporator flow control damper 523 is lowered, so that the blower fan 74 is, at its axial opening, connected to the evaporator 78 and the bi-level opening 531 and, at its radial opening, only connected to the heater core 80. As a result, the rotation of the fan 74 causes the air to be drawn into the bottom duct 62 from the top opening 72 and the intermediate duct 66 and from the bi-level opening 531. The air from the radial opening of the fan 74 is directed to the heater core 80 and discharged from the opening 60 at the area of the legs of the passenger.

At a bi-level mode as shown in FIG. 97(A), the heater flow control damper 521 is elevated and the the evaporator flow control damper 523 is elevated, so that the blower fan 74 is, at its axial opening, connected to the bi-level inlet 531, and both the heater core 80 and the evaporator 78 are connected to the blower fan 74 at its radial opening. As a result, the rotation of the fan 74 causes the air to be drawn into the bottom duct 62 only via the bi-level inlet 531, and the air from the fan 74 is discharged toward both the heater core 82 and the evaporator 78. As a result, hot air passing through the heater core 80 is discharged from the bottom opening 60 at the area adjacent the legs of the passenger, and the cool air from the evaporator 78 is directed to the intermediate duct 66 and is discharged from the top opening 72 to the cabin. As a result a "head-is-cool-and-leg-is-warm" air conditioning operation can be realized.

FIGS. 98 to 100 shows a modification of the unit structure of the blower 74 and the dampers 521 and 523 in FIG. 94. In Fig. the bottom duct 62 is formed as a tube having a circular cross-sectional shape, in which the blower fan 74 is fixedly arranged. A partition wall 534 is arranged in the bottom duct 62 so that it extends longitudinally along the diameter. The partition wall 534 forms a circular opening to which the top end of the blower 74 is fitted, so that the space inside the bottom duct 62 is divided into two portions S1 to which the axial inlet of the fan 74 is opened and S2 to which the radial opening of the fan 74 is opened. The bottom duct 62 has axially opened ends to which the heater flow control damper 521 and evaporator flow dampers 523 having a circular disk shape are rotatably fitted. The disk shaped damper 521 and 523 have semicircular openings 535. As a result of this construction, the damper 521 and 523 allow selective communication of the spaces S1 and S2 in a manner as explained with reference to FIG. 93, FIG. 99 shows a modification of the unit in FIG. 98. This embodiment in FIG. 99 is for use in the embodiment in FIG. 96 provided with the bi-level mode. The bottom duct 62 having a tubular shape in cross section has at its cylindrical wall an annular raised portion 62-6 that forms the bi-level duct 533 that is opened to the space S1 inside the bottom duct 62.

In FIG. 100, the bottom duct 62 forms a tube having a rectangular cross-sectional shape. The blower fan 74 is arranged inside the duct 62, which has a top wall defining a circular bore 62-7. A hollow cylindrical member 62-8 having a closed top is rotatably fitted to the circular bore 62-7, so that the cylindrical member 62-8 is rotatable around the fan 74. The cylindrical body has axially spaced, diametrically opposite openings 538 and 539 extending along a circumference at an elongation of 180 degrees, so that the opening 538 communicates with the axial inlet of the fan 74 and the opening 539 communicates with the radial outlet of the fan 74. The cylindrical member 62-8 is subjected to a rotational movement at an angle of 180 degrees as shown by an arrow in FIG. 100 between a position where the the axial inlet of the fan 74 communicates with one side of the duct 62 adjacent the evaporator and the radial outlet of the fan 74 communicates with the other side of the duct adjacent the heater core, and a position where the the radial outlet of the fan 74 communicates with one side of the duct 62 and the axial inlet of the fan 74 communicates with the other side of the duct. As a result, flows of air as explained with reference to FIGS. 95(A), (B) and (C) are also realized by the unit construction in FIG. 100.

Now, embodiments where a Peltier element is used as a heat exchange member will be explained. In the 34th embodiment shown in FIG. 101, the element 541 has, on its one side, a plurality of heat absorption fins 543 that contact with the flow of air in the intermediate duct 62, and, on the other side, a plurality of heat emission fins 545 that contact with the flow of a refrigerant in a closed circuit at its lower pressure side. The element 541 constructs a refrigerating cycle together with the compressor 90, the condenser 92, the receiver 94 and the expansion valve 96. A heat exchange operation between the air and the refrigerant is obtained at the element 541 for cooling the air in the bottom duct 62.

In a 35th embodiment in FIG. 102, Peltier switches 549 are provided for connecting the element 541 with a battery 547 for switching the polarity. The heat emission fins 545 are arranged to contact with engine cooling water pipe 101 connected to the cooling water duct recirculation line 99 for the internal combustion engine 98. A pump 551 is arranged in the cooling water pipe 101 for obtaining a forced flow of engine cooling water in the pipe 101. A flow control valve 104 is arranged in the line 101 for controlling a ratio of the amount of the cooling water introduced into a heater 80 and the amount of engine cooling water to the heat emission fins 545.

The heater 80 is arranged on a by-pass line 101′ connected to the engine cooling water line 101. The heater 80 is arranged in an outside air induction duct 553 so that a heat exchange is obtained between the air in the duct and the engine cooling water in the heater core 80. The duct 553 has an end opened to the atmosphere, a second end 557 opened to the cabin and a third end opened to the atmosphere. A damper 559 is arranged for controlling the flow of the air into the duct 557 to the cabin.

When the system is under a cooling mode, the Peltier switches 549 are turned ON so that the heat absorption fins 543 can function as a heat absorber, and the flow control valve 104 is closed so that a recirculation of the engine cooling water is obtained between the heater 80 and the heat emission fins 545. As a result, cooling of the air drawn into the bottom duct 62 occurs by the heat exchange with the outside air via the heat absorption fins 543, heat emission fins 545, engine cooling water and the heater 80.

When the system is under a heating mode, the Peltier switches 549 are switched to the change polarity of the element 541 so that the heat absorption fins 543 can function as a heat emitter, and the flow control valve 104 is opened so that a recirculation of the engine cooling water is obtained mainly between the radiator 100 and the engine 98. As a result, the high temperature engine cooling water heats the drawn air in the duct 62 via the heat fins 545 and 543.

In the 36th embodiment shown in FIG. 103, a conduit 563 is provided in which a heat exchanger 561 is for Peltier heat emission. A refrigerant is recirculated in the conduit 563 and a pump 565 is arranged on the conduit 563 for a positive recirculation of the refrigerant in the conduit 563. A Peltier element 541 is provided with, similar to the embodiment in FIG. 102, fins 543 that make contact with the flow of air in the bottom duct 62 and fins 545 that make contact with the refrigerant in the conduit 563. The heat exchanger 561 is shown to be arranged in front of an engine cooling fan 98a operated by the engine 98 in a tubular shroud 98b so that heat emission from the heat exchanger 561 is effected by the flow of air generated by the rotation of the engine cooling fan 98a. Alternatively, as shown by a dotted line in FIG. 103, an independent fan 567 for Peltier emission can be provided in front of the heat exchanger for generating a forced flow of air.

In this embodiment in FIG. 103, a control of the heat emission is effected by controlling the rotational speed of the pump 565 by, for example, varying the voltage level applied to the pump 565. In the case where the fan 567 is provided, the rotational speed of the fan 567 can be controlled in a similar way.

In place of the heat exchange of the air with the engine cooling water or refrigerant via Peltier element 541 in the above embodiments in FIGS. 101 to 103, outside air can be directly used for carrying out the heat exchange operation as shown in the 37th embodiments in FIGS. 104(A) and (B). In the embodiment shown in FIG. 104(A), the Peltier element 541 is located at the floor plate 571 of the cabin 126 so that the heat absorption fins 543 are located in the bottom duct 62, and the heat emission fins 545 are located so as to contact the outside air 573. In the embodiment shown in FIG. 10(B), the Peltier element 541 is arranged along the top wall 106 of the cabin so that the heat absorption fins 543 is located in the top duct 62, and the heat emission fins 545 are projected outwardly from the top wall 106 to contact the outside air 573.

FIG. 105, which shows a 38th embodiment of the present invention, basically corresponds to the embodiment in FIG. 1 but is different therefrom in that an intermediate duct 66 extends separately from the back rest 52 to a top duct 70 at the ceiling of the cabin 126, and in that a short circuit (SS) duct 581 is branched from the location where the intermediate duct 66 is connected to the bottom duct 62. The SS duct 581 extends horizontally through the back rest 52 to open as an outlet 583 at a location around the waist portion of the passenger. A damper 585 is located at a position where the duct 66 and 581 are connected for controlling a ratio between the amount of air directed to the intermediate duct 66 and the amount of air directed to the duct 581.

As shown in FIG. 105, the top duct 70 extends along the ceiling 106 to the outlet 72 open downwardly toward the cabin 126 at a circular recess 589 provided at the ceiling 106. A deflector plate 587 is arranged slightly downward from the outlet 72 to face therewith. The flow of the air as discharged from the outlet 72 collides with the deflector plate 587 laterally, and is directed downward without substantial lateral dispersion by contacting with circular wall 589'.

The rotation of the fan 74 causes the air to be drawn via the bottom inlets 60, and is passed through the evaporator 78 and the heater core 80. The air flow is, at the damper 585, divided in to a flow directed to the intermediate duct 66 and the short circuit duct 581. The air introduced into the intermediate duct 66 is discharged into the cabin from the top outlet 72 downwardly via the head portion to the leg portion of the passenger. The air introduced into the SS duct 581 is discharged to the cabin via the outlet 583 downwardly from the waist portion to the leg portion of the passenger.

From the view point of automobile construction there is a problem in that most of the solar radiation directed to the waist portion and leg portion of the passenger, and the air flow from the top opening 72 spaced from the waist or leg portion is difficult to effectively cool. Furthermore, hot air as generated by the solar radiation can be elevated from the leg portion to the head portion due to the effect of heat convection, resulting in an increase in the cooling load. According to the embodiment shown in FIG. 105, the air flow from the outlet 583 connected to the short circuit duct 581 can effectively reduce the temperature increase due to solar radiation since the discharge outlet 583 is located near the inlet opening 60, thereby resulting in a reduction in the air conditioning load. Such a reduction in the air conditioning load by provision of the short circuit duct 581 can increase the cooling ability by the cooled air from the top discharge outlet 72, resulting in the elimination of the power as required by the total air conditioning system. Furthermore, a more comfortable temperature distribution in the cabin around the passenger can be obtained.

In the embodiment in FIG. 105, the SS duct 581 is branched from the bottom duct 62 at a location downward from the heater core 80. The SS duct 581 may, however, be branched from the bottom duct 62 at a location between the blower fan 74 and the evaporator 78 as shown in FIG. 106. In this case, the air from the SS discharge outlet 583 is merely subjected to recirculation, and all of the air cooled at the evaporator 78 is directed, via the intermediate duct 66 and the top duct 70, to the top outlet 72 to be discharged therefrom. A damper 585' controls the flow to the SS duct 581.

As shown in FIG. 107(A), an air flow discharged from the SS outlet 583 may cause turbulence to be generated in the air discharged from the top outlet 72, which prevents the air flow from being drawn into the inlets 60 located laterally from the seat portion 50. In order to obviate this problem, a front inlet 590 may be arranged at the front side of the seat portion 50, so that both air flows discharged from the top outlet 72 are drawn by the inlet 590. In this case, it is advantageous for the air from the SS outlet 583 to be discharged in the direction from the outside to the inside of the leg portion of the passenger. As shown in FIG. 107(B), the front inlet 590 may be provided as an elongated slit formed in the seat 50 at a portion adjacent along the front edge thereof.

The 39th embodiment will now be explained with reference to FIG. 108, where the vehicle is provided with seats, each of which has its own air conditioning device incorporated in a single refrigerating cycle. In FIG. 108, the seats are provided with respective air conditioning units, the construction of each of which is substantially the same as explained with reference to FIG. 1. Therefore, a detailed explanation of the units will be omitted by using the same numbers for parts performing the same functions, but characters a, b, c and d are respectively appended from the respective reference numerals for indicating that the parts belong to units of respective seats. In the embodiment in FIG. 108, the reference numeral 74a and 78a indicate the blower fan and the evaporator, respectively, for the driver's seat.

The embodiment shown in FIG. 108 is provided with a refrigerating cycle that is substantially the same as that in the first embodiment in FIG. 1, but the compressor 90 is a variable volume type capable of controlling its volume. The compressor 90 is connected, in series, to evaporators 78a, 78b, 78c and 78d for the respective seats. An electrical system of the embodiment in FIG. 108 will now be explained. A temperature setter 601 is arranged on a dash board adjacent the steering wheel 112; said setter 601 issues setting signals in accordance with cooling requirements directed to a control circuit 603. The control circuit 603 is connected to a clutch controller 605 for ON-OFF control of the electromagnetic clutch 90-1 of the clutch 90, and is connected to a compressor volume controller 607 for obtaining a switching operation of the volumes of the compressor 90. The compressor 90 is a mechanism for controlling its volume, such as a swash plate (90-3). The controller 607 controls the inclination of the swash plate 90-3 with respect to its axis of rotation so that the output volume can be changed, for example, between 50% ability operation and 100% ability operation, under an ON-OFF control basis or continuous control basis.

The blower fans 74a, 74b, 74c and 74d for the respective seats are connected to respective flow amount switching controllers 611a, 611b, 611c and 611d. A discriminator 613 is connected to the switching controllers 611a, 611b, 611c and 611d for determination of the number of ON-OFF operations of the fan switch. A pressure sensor 609 is arranged in the refrigerant recirculating line at the inlet side of the compressor 90 for detecting the pressure of the refrigerant at its low pressure side.

In the embodiment in FIG. 108, it is preferable that the evaporator 78a for the driver's seat be arranged in the refrigerant recirculation line just after the expansion valve 96 a when a aperation cooling at the driver's seat is required as a priority. Namely, the series arrangement of the evaporators can cause the heat exchanging ability to be substantially exhausted by the heat exchange at the first evaporator in the series.

FIG. 109 is a flow chart illustrating how the cooling ability control of the embodiment in FIG. 110 is carried out. When the air conditioner switch is turned ON (yes determination at step 400), the routine proceeds step 410 to input the value of the pressure t of the refrigerant at the inlet side of the compressor 90 sensed by the pressure sensor 609. At step 420, it is determined whether the pressure t is larger than a predetermined value $t_r$, which corresponds to the lowest limit pressure. When it is determined that $t > t_r$, the routine proceeds to step 430 where, from the value of the ON-OFF number of the fan switch introduced from the discriminator 613, it is determined if the fan switch(s) is (are) turned ON. When it is determined that the fan switch(s) is (are) turned ON, the routine proceeds to step 440 where the electromagnetic clutch 90 is turned ON, and to step 450 where the value of the pressure t of the refrigerant is equal to or smaller than a predetermined value $t_0$, which is a reference pressure determined in accordance with the room temperature setting by the setter 601a. When it is determined that $t \leq t_0$, the routine proceeds to step 460 where the compressor volume controller 607 issues a signal for moving the swash plate 90-3 to an upright position, which causes the amount of refrigerant forced out from the compressor 90 to be reduced. When it is determined that $t > t_0$, the routine proceeds to step 470 where the compressor volume controller 607 issues a signal for moving its swash plate 90-3 to an inclined position, which causes the amount of refrigerant forced out from the compressor 90 to increase. Such a feed back control at steps 450, 460 and 470 allows the pressure t to be controlled to a target pressure $t_0$, and returns to step 410.

When it is determined that $t \leq t_0$ at step 420 or any one of the fan switches is not turned ON, the routine proceeds to step 480, where the electromagnetic clutch 90 is turned OFF, and returns to step 410.

The embodiment in FIGS. 108 and 109 realize that a switching of the volume of the compressor 90 is obtained in accordance with a desired cooling ability which is determined in accordance with operating conditions of the blower fans 74a, 74b, 74c and 74d at the respective seats.

A 40th embodiment in FIG. 110 will now be explained. The embodiment in FIG. 110 features in addition to the construction in FIG. 108, by-pass passageways 97a, 97b, 97c and 97d that are connected to the refrigerating circuit 97 for by-passing the evaporator 78a, 78b, 78c, and 78d, respectively. Throttle valves 621a, 621b, 621c and 621d are provided in the by-pass passageways 97a, 97b, 97c and 97d, respectively. Throttle controllers 622a, 622b, 622c and 622d are connected to the throttle valves 621a, 621b, 621c and 621d, respectively for controlling the degree of the opening of the valves 621a, 621b, 621c and 621d, respectively. Furthermore, temperature setters 601a, 601b, 601c and 601d are provided for the seats, respectively. Discharged air temperature sensors 623a, 623b, 623c and 623d are arranged downstream from the evaporators 78a, 78b, 78c and 78d, respectively, of the seats. Signals from the temperature setters 601a, 601b, 601c and 601d, and the temperature sensors 623a, 623b, 623c and 623d are introduced into discriminators 625a, 625b, 625c and 625d, respectively for the set temperature and the detected temperature.

Now, the operation of the embodiment in FIG. 110 will be described with reference to a flowchart shown by FIGS. 111 to 113. At step 500, it is determined whether the air conditioning switch is turned ON. When it is determined that the air conditioning switch is ON, the routine goes to step 510 to input the value of the pressure t of the refrigerant at the inlet side of the compressor 90 sensed by the pressure sensor 609. At step 520, it is determined if the pressure t is larger than the predetermined permissible lowest value $t_r$. When it is determined that $t > t_r$, the routine goes to step 530 where, from the value of the ON-OFF number of the fan switch introduced from the discriminator 613, it is determined if at least one fan switch is turned ON. When it is determined that at least one fan switch is turned ON, the routine goes to step 540 where the clutch 91-1 is turned ON, and to step 550 where a channel selection is done between four channels corresponding to orifice control routines for the respective seats. These channel routines may be effected in a parallel manner or sequential manner. When the first seat channel is selected, the routine goes to step 560 where it is determined whether the first fan switch is turned ON. When it is determined that the first fan switch is ON, the routine goes to step 570 where it is determined that the discharged cool air temperature $i_1$ sensed by the sensor 623a is larger than the target temperature value $i_{10}$. When it is determined that $i_1 > i_{10}$, the routine goes to step 580 where a signal is issued to the orifice controller 622a to close the corresponding throttle valve 621a so as to increase the amount of refrigerant introduced into the evaporator 78a for the first seat. At step 590, it is determined whether the orifice 621a attains a fully closed position. When a yes result is obtained at step 590, the routine goes to step 600 where a first seat full close flag $m_1$ is set to "1". When it is determined at step 590 that the orifice 621a is not fully closed, the routine goes to step 610 where the value of the first seat full close flag $m_1$ is set to "0". The value $m_1$ is used at step 620 to calculate a full close determination value SCL as a sum of the full close flag between all of the seat, that is to say, $SCL = m_1 + m_2 + m_3 + m_4$.

When it is determined that $i_1 \leq i_{10}$ at step 570, the routine goes to step 650 where a signal is issued to the orifice controller 622a to open the corresponding throttle valve 621a and decrease the amount of refrigerant introduced into the evaporator 78a for the first seat. At step 660, it is determined whether the orifice 621a attains a fully opened position. When the fully opened position is obtained, the routine goes to step 670 where a first seat full open flag $n_1$ is set to "1". When it is determined at step 660 that the orifice 621a is not fully opened, the routine goes to step 680 where the value of the first seat full close flag $n_1$ is set to "0". The value $n_1$ is used at step 690 to calculate a full open determination value SOP as a sum of the full open flag between all of the seats, that is to say, $SOP = n_1 + n_2 + n_3 + n_4$.

When it is determined that the first fan switch is OFF at step 560, the routine goes to step 730 where the throttle valve 521a for the first seat is fully opened for by-passing the refrigerant through the evaporator 78a of the first seat.

FIG. 113 shows a routine executed when the second channel for the second seat throttle control is selected at step 550. When the second seat channel is executed, the routine goes to step 800 where it is determined whether the second fan switch is turned ON. When it is determined that the second fan switch is ON, the routine goes to step 810 where it is determined that the discharged cool air temperature $i_2$ sensed by the sensor 623b is larger than the target temperature value $i_{20}$. When it is determined that $i_2 > i_{20}$, the routine goes to step 820 where a signal is issued to the orifice controller 622b to close the corresponding throttle valve 621b and increase the amount of refrigerant introduced into the evaporator 78b for the second seat. At step 830, it is determined whether the orifice 621b attains a fully closed position. When a yes result is obtained at step 830, the routine goes to step 840 where a first seat full close flag $m_2$ is set to "1". When it is determined at step 830 that the orifice 621b is not fully closed, the routine goes step 850 where the value of the second seat full close flag $m_2$ is set to "0". The value $m_2$ is used at step 620 in FIG. 112 to calculate a full close determination value SCL as already explained.

When it is determined that $i_2 \leq i_{20}$ at step 810, the routine goes to step 860 where a signal is issued to the orifice controller 622b to open the corresponding throttle valve 621b and decrease the amount of refrigerant introduced into the evaporator 78b for the second seat. At step 870, it is determined whether the orifice 621b attains a fully opened position. When the fully opened position is obtained, the routine goes to step 880 where a second seat full open flag $n_2$ is set to "1". When it is determined at step 870 that the orifice 621b is not fully opened, the routine goes to step 890 where the value of the first seat full close flag $n_2$ is set to "0". The value $n_2$ is used at step 690 to calculate a full open determination value SOP in step 690 in FIG. 112 as already explained.

When it is determined that the second fan switch is OFF at step 800, the routine goes to step 900 where the throttle valve 521b for the second seat is fully opened for by-passing the refrigerant through the evaporator 78b of the second seat.

The steps taken when the third or fourth channel for the third or fourth seat throttle control is selected at step 550 are substantially the same for that when the first or second channel is selected. Thus, full open flag $m_3$ and $m_4$, and full close flag $n_3$ and $n_4$ for the third and fourth seats are calculated for calculating the full close determination value SCL at step 620, and for calculating the full open determination value SOP at step 690.

After the full close determination value SCL is calculated at step 620 in FIG. 112, the routine goes to step 630 where it is determined if the value of the SCL is not equal to 0, i.e., at least one of the throttle valves 621a, 621b, 621c and 621d is fully closed. When it is determined that SCL is not equal to 0, the routine goes to step 640 where the compressor volume controller 607 issues a signal for moving its swash plate 90-3 to an inclined position, which causes the amount of refrigerant forced out from the compressor 90 to increase. When it is determined that SCL is equal to 0, i.e., all of the throttle valves 621a, 621b, 621c and 621d are more or less opened, the routine 640 is by-passed.

After the full open determination value SOP is calculated at step 690 in FIG. 112, the routine goes to step 700 where it is determined if the value of the SOP is not equal to 0, i.e., at least one of the throttle valves 621a, 621b, 621c and 621d is fully opened. When it is determined that SOP is not equal to 0, i.e., at least one throttle valve is fully opened, the routine goes to step 710 where the compressor volume controller 607 issues a signal for moving its swash plate 90-3 to an upright position, which causes the amount of refrigerant forced out from the compressor 90 to decrease. When it is determined that SCL is equal to 0, i.e., all of the throttle valves 621a, 621b, 621c and 621d are more or less closed, the routine 710 is by-passed.

When it is determined that $t > t_r$ at step 520 or any one of the fan switches is not turned ON, at step 530 the routine goes to step 720, where the electromagnetic clutch 90 is turned OFF, and returns to step 510.

As explained above, according to the embodiment shown in FIGS. 110 to 113, the temperature of the air as discharged is compared with the target temperature to control the amount of refrigerant used, and the volume control of the compressor 90 is done in accordance with the cooling ability as required from the total refrigerating cycle, which can increase power consumption efficiency.

Now, a 41st embodiment will be explained with reference to FIG. 114. In this embodiment, as shown in FIG. 114, the evaporators 78a, 78b, 78c and 78d are connected in parallel to the refrigerant recirculation line 97, and expansion valves 96a, 86b, 96c ad 96d are arranged upstream from the respective evaporators 78a, 78b, 78c and 78d in the flow of the refrigerant. Furthermore, throttle valves 621a, 621b, 621c and 621d are arranged downstream from the respective evaporators 78a, 78b, 78c and 78d in the direction of the flow of the refrigerant. The throttle controllers 622a, 622b, 622c and 622d control the degree of the opening of the throttle valves 621a, 621b, 621c and 621d in such a manner that values of pressure at the evaporators 78a, 78b, 78c and 78d in relation to the degree of the opening of the expansion valves 96a, 96b, 96c and 96d, respectively, are controlled to the target values set by the temperature setters 601a, 601b, 601c and 601d. The constructions other than the above are the same as that in FIG. 110.

Now, the operation of the embodiment of the construction in FIG. 114 will be explained with reference to a flow chart in FIGS. 115 and 116. Steps 1000 to 1070 in FIG. 115 are equal to steps 500 to 570 in FIG. 111 in the 40th embodiment, and therefore a detailed explanation has been omitted.

Under the condition of the first fan 74a (yes result at step 1060), when it is determined that the air temperature $i_1$ as detected is larger than the target temperature $i_{10}$, the routine goes to step 1080, where the corresponding throttle valve 621a is opened a predetermined degree, which causes the amount of refrigerant directed to the evaporator 78a of the first seat to increase. At step 1090, it is determined whether the throttle valve is fully opened. When it is determined that the throttle valve 621a is fully opened at step 1090, the routine goes to step 1100 to set flag N1. When it is determined that the throttle valve 621a is not fully open at step 1090, the routine goes to step 1110 to reset flag N1. When the second to fourth channels are processed at the step 1050, similar steps like steps 1060 to 1110 are passed for determining the values of flags N2, N3 and N4, and at step 1120, a full open determination value SOP is calculated at step 1120 as a sum of N1, N2, N3 and N4. At step 1130, it is determined whether the value of SOP is equal to zero. When the value of SOP is not equal to zero, i.e., at least one of the orifices 621a, 621b, 621c and 621d is fully opened, this means that a higher cooling ability is required. Thus, the routine goes to step 1140 where at the swash plate 90-3 is inclined thereby increasing the amount of the refrigerant. When the value of SOP is equal to zero, i.e., there is no fully opened orifice, the step 1140 for controlling the inclination of the swash plate is by-passed.

When it is determined that the air temperature $i_1$ as detected is equal to or lower than the target temperature $i_{10}$ at step 1070 in FIG. 115, the routine goes to step 1150, where the corresponding throttle valve 621a is closed a predetermined degree, which causes the amount of refrigerant directed to the evaporator 78a of the first seat to decrease. At step 1160, it is determined if the throttle valve is fully closed. When it is determined that the throttle valve 621a is fully closed at step 1160, the routine goes to step 1170 to set flag M1. When it is determined that the throttle valve 621a is not fully closed at step 1160, the routine goes to step 1180 to reset flag M1. When the second to fourth channels are processed at the step 1050, similar steps like steps 1150 to 1180 are passed for determining the values of flags M2, M3 and M4, and at step 1190, a full close determination value SCL is calculated at step 1190 as a sum of M1, M2, M3 and M4. At step 1210, it is determined whether the value of SCL is equal to zero. When the value of SCL is not equal to zero, i.e., at least one of the orifices 621a, 621b, 621c and 621d is fully closed, this means that the cooling ability is small. Thus, the routine goes to step 1210 whereat the swash plate 90-3 is raised up thereby decreasing the amount of refrigerant. When the value of SCL is equal to zero, i.e., there is no fully closed orifice, the step 1210 for controlling the inclination of the swash plate is by-passed.

As is clear from above, even when the evaporators 78a, 78b, 78c and 78d are connected in parallel, the volume control of the compressor 90 can be executed in accordance with the total requirement of the refrigerating cycle.

The 42nd embodiment in FIG. 117 will be explained. In place of the provision of the bottom, intermediate and top ducts 62, 66 and 70 in the previous embodiment, only the bottom duct 62 and the top ducts 70, which are separated from each other, are provided, and the intermediate duct is eliminated. The bottom duct 62 has a first end as an inlet port 60 opened to the cabin at locations laterally of the seat portion 50, and a second end 560 opened at the area of the cabin at the back side of the back rest 52. A fan 653 is arranged in the duct 62 so that an air flow is created, which is drawn into the duct 62 from the port 60 and is discharged into the cabin via the outlet 650 for recirculation in the cabin 126. The top duct 70 is arranged along the ceiling 106 so that it has a first end as the discharge outlet 72 opened downwardly toward the cabin 126, and a second end as an air inlet 655 opened to the cabin at a location rearward of the head rest of the seat 58. A blower fan 74 is located in the top duct 70 for drawing the air recirculated in the cabin 126 into the duct 70 via the inlet 655. Arranged in the duct 70 downstream from the blower fan 74 is an evaporator 78 that is arranged in a refrigerating line, similar to the previous embodiment but omitted in FIG. 117 for the sake of simplicity.

As a modification of the embodiment in FIG. 118, when the vehicle is provided with a center pillar 657 at the side of the cabin, the outlet 650 of the bottom duct 62 can be arranged along the center pillar 657 at its bottom portion, and the inlet 655 can be arranged along the center pillar 657 at its top portion.

FIGS. 119(A), (B), (C) and (D) show various shapes of the bottom duct 62. Namely, the bottom duct 62 may be formed as a nozzle as shown in FIG. 119(A) or (B) defining a throttled outlet 650. Furthermore, the bottom duct 62 may, as shown in FIG. 119(C), be a circular shaped tube to which an inlet duct 62-8 from a fan (not shown) connected to the the inlet duct 62-8 is opened tangentially to the space inside the duct 62, so that a swirl movement of the air is created in the tube, which is discharged to the cabin as shown by arrows in FIG. 119(C). FIG. 119(D) shows a duct that is made as a double tube structure having an outer tube and an inner tube. The inlet duct 62-8 opened to the space formed between the inner and outer tubes so that a swirl flow of the air is obtained. These arrangements in FIGS. 119(A) to (D) can provide a possible flow of air from the outlet 650 strongly oriented toward the inlet 655 (FIG. 117) at the top of the cabin 112. Furthermore, the inlet 655 (FIG. 117) at the top of the cabin has a large width for effectively receiving the flow of the air from the bottom outlet 650, the air flow of which is somewhat widened before it reaches the top inlet 655.

In an embodiment shown in FIG. 120, the bottom duct 62 extends inside the back rest portion 52 so that it forms an outlet end 650 opened to the cabin at a location laterally of the shoulder portion of the passenger for discharging a flow of air for recirculation. This arrangement can decrease the distance between the outlet 650 of the bottom duct 62 and the inlet 657 of the top duct 70 arranged at the ceiling of the cabin, which allows the air from the outlet 650 to be effectively received by the inlet 655 of the top duct 70. Furthermore, as shown in FIG. 121(A), the outlet 650 for recirculation of the air can be opened at the top of the back rest portion 52, or the outlet 650 can be opened at the side of the back rest portion 52 at a location adjacent to the top thereof.

The operation of the 42nd embodiment shown in FIG. 117 is as follows. The energization of the fan switch and air conditioner switch (not shown) by a sitting person causes the blower fan 74 and the recirculation fan 653 to rotate, so that the air in the cabin is drawn into the top duct 70 via the inlet 655, which is subjected to a heat exchange with the refrigerant at the evaporator 78, and which is discharged into the cabin via the outlet 72, which is directed downward from the head portion to the leg portion of the passenger. The air after air conditioning the limitted area around a seat is drawn into the bottom duct 62 via the inlet 60 because of the rotation of the recirculation fan 653 in the duct 62. Such a flow of air is shown by dotted arrows $f_8$ in FIG. 117, which is subjected to a so called "zone air conditioning" for air conditioning the area only adjacent to the seat. The air drawn into the bottom duct 62 is discharged upward from the outlet 650 at the location rearward from the back rest 52. The air discharged from the outlet 650 moves upward while mixed with the air inside the cabin 126 and is again drawn into the inlet 655. This embodiment can locally cool the area adjacent the passenger and the low temperature air that air condition is the passenger is recirculated so that it is easily received by the top duct 655, thereby resulting in an increase in heat exchange efficiency. Contrary to this, in the prior art, air for air conditioning is discharged to the entire portion of the cabin for convection thereat, causing the temperature of the air to unnecessarily increase, and causing the heat exchange efficiency to be reduced when the drawn air is subjected to the heat exchanging process at the refrigerating cycle.

A 43rd embodiment shown in FIG. 122 includes, in addition to the construction of the 42 embodiment in FIG. 117, a heater core 80 arranged downstream from the evaporator 78, and an air mix damper 82 arranged between the evaporator 78 and the heater core 80. Similar to the previous embodiments, the heater core 80 is connected to the engine cooling water recirculating line for receiving the engine cooling water from the engine.

A 44th embodiment will then be explained with reference to FIGS. 123 and 124. According to this embodiment, the inlets 60 are arranged at both sides of each of the front seats so as to open upwardly (only one of such inlets 60 for each of the front seats is shown in FIG. 123), and at the lower sides of the rear seats at two separate locations. Such inlets 60 for the rear seats may be provided at the back sides of the respective back rest portions of the front seats. These inlets 60 at the front and rear seats are combined to a single bottom duct 62 in which an axial flow fan 663 is arranged so that the air drawn into the bottom duct 62 is discharged from the outlet 650 for recirculation as shown by an arrow $f_9$ in FIG. 124.

A top duct 70 on the ceiling is formed as a flattened circular box shape having an inlet 655 at its bottom wall opposite the recirculation outlet 650, and radially extending four ducts defining the outlet 72, which are circumferentially spaced at an angle of 90 degrees to each other (FIG. 123). These outlets 72 are directed at the two front and two rear seats, respectively. An annular shaped evaporator 78 is arranged around the blower fan 74.

Almost all of the air discharged from the recirculation outlet 650 of the bottom duct 62 are is drawn by the inlet 655 of the top duct 70 located to face the outlet 650. The air as drawn is directed, via the annular shaped evaporator 78, to the circumferentially spaced outlets 72, and is discharged into the cabin from the outlets 72 as shown by arrows $f_{10}$. The discharged air from the outlet 72 is directed downwardly from the head portion to the leg portion of the sitting person, and is drawn by the respective inlets 60 due to the drawing power by the axial flow fan 663. Thus, the embodiment in FIG. 124 allows the areas around the plurality of seats to be locally cooled, irrespective of the fact that only single pairs of recirculation outlets 650 and the top inlet 655 is utilized.

This embodiment in FIG. 124 is explained as it is used mainly or cooling. However, a similar system can be used for heating the cabin, as shown in the 45th embodiment in FIG. 125. In this embodiment, the blower fan 74 is arranged in the bottom duct 62 that forms a recirculation inlet 650 on one end and a bottom outlet 60 on the other end. The rotation of the blower fan 74 causes the air in the cabin 126 to be drawn into the bottom duct 62 via the recirculation inlet 650 as shown by dotted arrow $f_{11}$, and the drawn air is discharged into the cabin from the bottom outlet 60 as shown by dotted arrows $f_{12}$. Arranged in the bottom duct 62 in the direction of the air flow is the evaporator 78, aid mix damper 80 and the heater core 80, downstream of which the blower fan 74 is arranged.

The top duct 70 is attached at the ceiling of the cabin 126, and a recirculating fan 653 is arranged in the duct 70 for drawing the air from the cabin via the top inlet 72 and for discharging the air from the top opening 655 so that the air flow therefrom is directed downward toward the recirculation inlet 650 of the bottom, bottom duct 62. The 45th embodiment in FIG. 125 operates as follows. When the fan switch and air conditioner switch (not shown) are made ON, the rotation of the blower fan 74 and the recirculation fan 653 is generated. The rotation of the blower fan 74 causes the air in the cabin 126 to be drawn into the bottom duct 62 via the inlet 650, to be subjected to a heat exchange at the evaporator 78 and the heater core 80, and to be discharged from the bottom outlet 60. The discharged air from the outlet 60 is directed upward from the leg portion to the head portion of the sitting person as shown by dotted arrows. The air as discharged upward is drawn into the top duct 70 via the top inlet 72 due to the rotation of the recirculation fan 653. A zone air conditioning operation can also be obtained in this embodiment wherein only the area adjacent the seat is subjected to air conditioning. The air drawn into the top duct 70 is discharged downward from the top outlet 655 as shown by a dotted arrow $f_{13}$ along the back side of the back rest 52. The discharged air is, while being mixed with the air in the cabin, drawn again into the bottom duct 62 via the recirculation inlet 650.

The 45th embodiment in FIG. 125 allows the area around the sitting person to be locally air conditioned, so that a change in the temperature of the air after air conditioning is decreased, and is subjected to recirculation via the recirculation inlet 650 for the following air conditioning cycle. Namely, convection along the entire space of the cabin in the prior art, which causes the air temperature to unnecessarily change, is prevented, causing the air conditioning efficiency to increase, resulting in a reduction of the necessary time to obtain a desired condition.

A 46th embodiment will be explained with reference to FIG. 126. In this embodiment, in place of heater core 80 arranged in the bottom duct 62 for obtaining temperature control of the air in the embodiment in FIG. 1, a Peltier element 701 is arranged downstream from the evaporator 78 as shown in FIG. 126. The Peltier element 701 has heat emission fins 703 located in the intermediate duct 62 and heat absorption fins 705 located so as to contact directly with the outside air. Connected to the Peltier element 701 is an electric power supply 707 capable of changing the voltage level applied to the Peltier element 701 while its polarity can be desirably reversible. The other construction is the same as that in the first embodiment, and therefore is omitted.

Figure 127B:
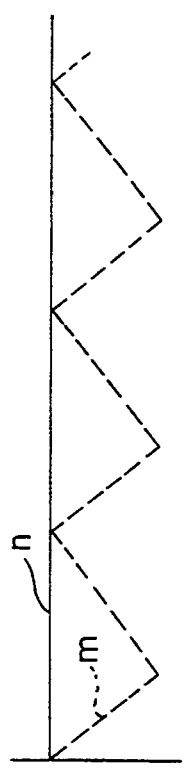
Figure 127C:
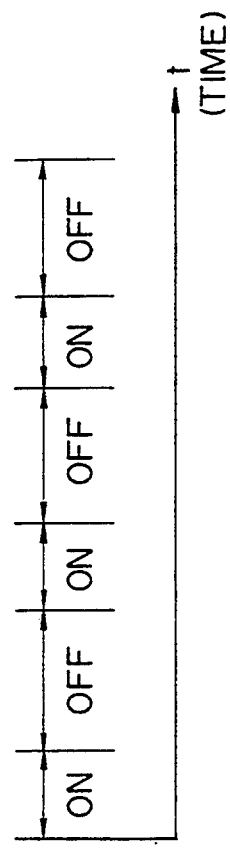

According to the 46th embodiment in FIG. 126, the level and the polarity of the electric current as applied to the Peltier element 701 is controlled so that the heat discharge fins 703 can emit heat for heating the air in the duct 62 after passing through the evaporator 78. The change in the polarity of the electric current as applied to the Peltier element 701 can cause the fins 703 to absorb heat from the air in the duct 62, so that the air after passing through the evaporator 78 is additionally cooled. The temperature of the air after the evaporator 78 is usually changed as shown by a dotted line m in FIG. 127(B) in accordance with the ON or OFF condition of the compressor as shown in FIG. 127(C). Namely, the ON condition of the Peltier element 701 causes the temperature after the evaporator to be reduced, while the OFF condition of the Peltier element 701 causes the temperature after the evaporator to be increased. According to the embodiment in FIG. 126, the voltage level applied thereto is changed as shown in FIG. 127(A) in such a manner a the change in the discharged air temperature from the evaporator as shown by the line m is cancelled. Namely, when the compressor 90, is ON the voltage level applied to the Peltier element 701 is continuously increased, while, when OFF the voltage level applied to the Peltier element 701 is continuously decreased, so that a substantially constant air temperature after making contact with the Peltier element 701 is obtained as shown by a solid line n in FIG. 127(B), which can provide a passenger comfortable air conditioning.

FIG. 128 is a 47th embodiment, with a feed back control loop for obtaining temperature control of the Peltier element 701. A first temperature sensor 711 is arranged directly downstream from the evaporator and a second air temperature sensor 713 is arranged in the top duct 70 at a location adjacent the outlet 72. These temperature sensors 711 and 713 are connected to a control circuit 717. A temperature setter 715 is also connected to the control circuit 717. The control circuit 717 is connected to a voltage controller 719 for controlling a voltage level at the Peltier element 701, which receives a control signal from the control circuit 717. A clutch controller 721 is provided for controlling the clutch for connecting the rotation of the internal combustion engine 98 to the compressor 90. The control circuit 717 issues a signal to the clutch controller 721.

An operation of the control circuit 717 in FIG. 129 will be explained. At step 1300, it is determined if the air conditioning switch is turned ON. When the air conditioning switch is ON (yes result at step 1300), the routine goes to step 1310 where the set temperature $t_0$ from the setter 715 and the temperature $t_1$ of the air as detected by the sensor 711 or 713 are input. At step 1320, the set value to and the detected value $t_1$ are compared. When it is determined that the detected temperature $t_1$ is larger than the set temperature $t_0$, the routine goes to step 1330, where the voltage controller 719 is operated so that the voltage as applied to the Peltier element 701 is decreased, and the routine goes back to step 1310. When it is determined that the detected temperature $t_1$ is lower than the set temperature $t_0$, the routine goes to step 1340, where the voltage controller 719 is operated so that the voltage as applied to the Peltier element 701 is increased, and the routine goes back to step 1310. When it is determined that the detected temperature $t_1$ is equal to the set temperature $t_0$, both steps 1330 and 1340 are by-passed for maintaining the voltage level as applied to the Peltier element 701.

In place of the comparison of the set temperature $t_0$ and the detected temperature $t_1$ at step 1320, it is determined whether the clutch for connecting the compressor 90 with the engine 98 is ON or OFF. When the clutch is disengaged (OFF condition), the voltage level applied to the Peltier element 701 is decreased, contrary and, when the clutch is engaged (ON condition), the voltage level applied to the Peltier element 701 is increased.

FIGS. 130 to 132 show other embodiments, where the Peltier element 701 is also utilized. In the 48th embodiment shown in FIG. 130, the Peltier element 701 has heat emission fins 703 arranged in the bottom duct 62 in a parallel manner with respect to the evaporator 78. An air mix damper 730 is arranged for controlling the ratio of the amount of air directed to the evaporator 78 and the amount of air directed to the heat emission fins 703 of the Peltier element 701. The degree of the opening of the air mix damper can change the ratio for controlling the temperature of the air issued from the top opening 72 via the second and top ducts 66 and 70.

FIG. 131 shows a 49th embodiment, wherein the Peltier element 701 is entirely arranged in the bottom duct 62 so that a first passageway of the air to the evaporator 78 and a second passageway by-passing the evaporator 78 are created. A air mix damper 730 is arranged between the fan 74 and the Peltier element 701 so that a ratio of the amount of air directed to the first passageway and the amount of air directed to the second passageway is controlled. The Peltier element 701 includes heat absorbing fins 703 arranged in the first passageway to the evaporator 78 and heat emission fins 705 arranged in the passageway by-passing the evaporator 78. The degree of the opening of the air mix damper 730 is controlled so that a desired temperature of the discharged air is obtained.

FIG. 132 shows a 50th embodiment wherein a Peltier element 701 is provided so that the by-pass passageway for by-passing the evaporator 78 in the bottom duct 62 is fully closed by the Peltier element 701. The peltier element 701 is provided with heat absorption fins located in the upstream side of the evaporator 78 and heat emission fins 703 located in the downstream side of the evaporator 78. Furthermore, the polarity of the electric voltage applied to the Peltier element 701 is switched between a condition where the fins 703 function to emit heat thereby increasing the temperature of the air from the evaporator 78 to a desired degree, and a position where the fins 703 can function to absorb heat for further decreasing the temperature of the air from the evaporator 78 to a desired temperature.

FIG. 133 shows a 51st embodiment, which includes a positive temperature coefficient (PTC) heater 740 arranged in the intermediate duct 62 at the position located downstream from the evaporator 78. The PTC heater 740 is connected to an electric power supply 741-1 provided with a device 741-2 for varying the voltage of the electric current applied to the PTC heater 740.

In the 52nd embodiment in FIG. 134, an air mix damper 745 is arranged between the evaporator 78 and the fan 74 so that a first passageway of the air from the fan 74 to the evaporator 78 and a second passageway by-passing the evaporator 78 are created. The air mix damper 745 can control the ratio of the air amount directed to the evaporator 78 to the amount of air by-passing the evaporator 78, which are mixed at a location downstream from the evaporator 78 to obtain a desired temperature of the discharged air.

In a 53rd embodiment shown in FIG. 135, a sub-cooler 750 is arranged downstream from the evaporator 78 in the bottom duct 62. The sub-cooler 750 is located in the refrigerating line 97 in series at a location downstream from the expansion valve 96. An air mix damper 751 is arranged in front of the sub-cooler 750 for controlling the ratio of the amount of air from the evaporator 78 directed to the sub-cooler 750 and the amount of air from the evaporator 78 by-passing the sub-cooler 750. The degree of the opening of the air mix damper 751 can be controlled to obtain a desired temperature of the air discharged into the cabin. It should be noted that, in place of the sub-cooler 750, a sub-condenser is provided, in the refrigerating line 97 located between the condenser 92 and the gas-liquid separator 94.

In the 46th to 53rd embodiments in FIGS. 131 to 135, in place of the engine cooling water as a heating source, a relatively small volume heating source, such as the Peltier element 701, PTC heater element 740, and sub-cooler 750 are used for controlling the temperature of the air discharged. These embodiments are based on the zone (air curtain type) air conditioning principle, where a relatively small range of temperature of the air as controlled, such as ±5° C. is sufficient, which can be fully afforded by the small heat generating source such as the Peltier element 701.

FIG. 136 is directed to the 54th embodiment, where a plurality of seats are provided with them own air conditioning systems, and sitting sensors are provided for obtaining an automating ON-OFF control of the respective air conditioning systems. The embodiment is basically the same as that in the first embodiment in FIG. 1, a detailed explanation is omitted by using the same reference numerals to the parts functioning in the same manner as that in FIG. 1, except that the parts for the front seat are appended by a, while the parts for the rear seat are appended by b. This is the same as the following embodiments. Finally, the evaporators 78 and 78b for the respective seats are arranged in parallel formation in the refrigerating cycle 97.

Sitting sensors 761a and 761b are arranged for the seat portions 50a and 50b, respectively for detecting when a passenger takes the respective seats. FIG. 137 shows an example of the sitting sensor 761 as the sitting sensors 761a and 761b in FIG. 136. The sensor 761 includes a stress collecting plate 763 that is mounted on a bottom frame 51 of the seat. The plate 763 is embedded in the cushion material 53 and covered by upholstery 49. When a passenger sets on the seating portion 50, the stress collecting plate 763 is forced by a force directed downward, thereby triggering the sensor 761. As shown in FIG. 136, the sensors 761a and 761b may be arranged at the top of the seat portions 50a and 50b.

As shown in FIG. 136, these sitting sensors 761a and 761b are connected to amplifiers 803a and 803b, respectively for receiving the respective signals therefrom. The blower fans 74a and 74b of the respective seats are connected to the respective fan ON-OFF controllers 805a and 805b, supplied by respective fan voltage controllers 807a and 807b. The fan ON-OFF controllers 805a and 805b issue signals for controlling the fans 74a and 74b, respectively, between ON and OFF positions. Furthermore, the fan voltage controllers 807a and 807b control the voltage level applied to the fan motors 76a and 76b, for controlling the respective air flow amount. The amplifiers 803a and 803b are connected to a controller 810 that issues a signal to an electromagnetic clutch ON-OFF controller 811 for obtaining an ON-OFF control of an electromagnetic clutch 813 for connecting the compressor 90 with a crankshaft (not shown) of an internal combustion engine.

An outline of the operation of the 54th embodiment in FIG. 136 will be explained with reference to flow charts in FIG. 138 and 139. In FIG. 138, at step 1400, it is determined whether the sitting sensors 761a and/or 761b are turned ON. When it is determined that the sitting sensors 761a and/or 761b are turned ON, the routine goes to step 1410, where it is determined if the fan switch(s) of the respective fan switch is turned ON. When it is determined that the fan switch of the respective seat is turned ON, the routine goes to step 1420 where the fan 74a and/or 74b of the seat is operated. When it is determined that the sitting sensors 761a and/or 761b are turned OFF, or when the fan switch of the respective seat is turned OFF, the routine goes to step 1430 where the fan 74a and/or 74b of the seat is stopped.

FIG. 139 shows how the electromagnetic clutch 813 is operated. At step 1450, conditions of all of the sitting sensors 761a and 761b are input, and, at step 1460, where it is determined that at least one of the sitting sensors 761a and 761b is turned ON. When, it is determined that at least one sitting sensors 761a and 761b is turned ON, the routine goes to step 1470, where a signal is issued from the controller 810 to the clutch ON-OFF controller 811 to engage the clutch 813 thereby allowing a rotational movement from the engine to be applied to the compressor 90. When, it is determined that both sensors 761a and 761b are turned OFF, the routine goes to step 1480, where a signal is issued from the controller 810 to the clutch ON-OFF controller 811 to disengage the clutch 813 thereby preventing the rotational movement from the engine from being applied to the compressor 90.

A 55th embodiment will now be explained with reference to FIG. 140. In this embodiment, similar to the embodiment in FIG. 136, the evaporators 78a and 78b are arranged parallel to the refrigerant recirculating line 97. In addition to this, on the conduits to the evaporators 78a and 78b, flow control electromagnetic valves 820a and 820b, respectively, are arranged. The electromagnetic valves 820a and 820b are connected to controllers 821a and 821b, respectively, which are connected to the controller 810 so that the degree of the opening of the valves can be varied. A mode change over switch 823 between an automatic and manually operated mode is connected to the controller 810. Other constructions are the same as that in FIG. 136, and therefore a more detailed explanation is omitted while the same numbers are used for parts functioning in the same way.

The operation of the 55th embodiment in FIG. 140 will be explained with reference to a flowchart in FIG.

141. When it is determined that the air conditioning switch is made on at step 1500, the routine goes to step 1510, where it is determined that the change over switch 823 is automatic mode. When it is determined that it is now under the automatic mode, the routine goes to step 1520, where it is determined that at least one of the sitting sensors 761a and 761b is turned ON. When, it is determined that at least one of the sitting sensors 761a and 761b is turned ON, the routine goes to step 1530, where signals issued from the main controller 810 to the electromagnetic valves 820a and/or 820b of the seat(s) to open it if the sitting switch(s) 761a and/or 761b is turned ON, and a signal is issued from the controller 810 to the clutch ON-OFF controller 811 to engage the clutch 813 thereby allowing a rotational movement from the engine to be applied to the compressor 90. When, it is determined that both of the sitting sensors 761a and 761b are turned OFF, the routine goes to step 1540, where signals issued from the main controller 810 to the electromagnetic valves 820a and 820b of all the seats to shut-off same, and a signal is issued from the controller 810 to the clutch ON-OFF controller 811 to disengage the clutch 813 thereby stopping transmission of a rotational movement from the engine to the compressor 90.

A 56th embodiment is shown in FIG. 142. Similar to the 54th embodiment in FIG. 136, sitting sensors 761a and 761b that are connected to fan ON-OFF control amplifiers 803a and 803b, are provided for the respective seats, respectively and are connected to fan ON-OFF switches 805a and 805b, respectively, which are connected to fan voltage level controllers 807a and 807b, respectively. The fan ON-OFF control amplifiers 803a and 830b issue signals directed to the fan ON-OFF switches 805a and 805b, respectively, for controlling the operation of the blower fans 74a and 74b, respectively, and their air flow discharge amount. In this embodiment, the evaporators 78a and 78b for the respective seats are arranged in series in the refrigerant recirculating line 97.

A temperature setter 830 and pressure sensor 831 for sensing the pressure at the refrigerant recirculation line 97 at its lower pressure side are connected to the controller 833. The controller is connected to the volume varying device 835 for controlling the output volume of the compressor by controlling the inclination of its swash plate (not shown).

The operation of the 56th embodiment in FIG. 142 is, as far as the control of the blower fans 74a and 74b are concerned, similar to the 54th embodiment in FIG. 138. Namely, the fan blowers 74a and 74b are operated when the respective sitting sensors 761a and 761b are turned ON and when the respective fan switches (not shown) are turned ON. The fan blowers 74a and 74b are not operated when the respective sitting sensors 761a and 761b are turned OFF, and when the respective fan switches (not shown) are turned OFF even if the respective sitting sensors 761a and 761b are turned ON.

A volume control of the compressor 90 is explained by a reference to the flowchart in FIG. 143. At step 1600, a set temperature $t_0$ by the setter 830 and the detected temperature $t_1$ by the sensor 831 is input. At step 1610 it is determined whether the detected temperature is smaller than the target temperature $t_0$. When it is determined that $t_1 \leq t_0$, the routine goes to step 1620 where the compressor volume controller 607 issues a signal for moving its swash plate to an upright position, which reduces the amount of refrigerant forced out from the compressor 90. When it is determined that $t > t_0$, the routine goes to step 1630 where the volume varying device 835 issues a signal for moving its swash plate to an inclined position, which causes the amount of the refrigerant forced out from the compressor 90 to increase.

A 57th embodiment will now be explained with reference to FIG. 144. This embodiment is similar to the 56th embodiment in FIG. 142, in place of the pressure sensor 831, temperature sensors 850a and 850b are arranged in the bottom ducts 62 at a location downstream from the evaporators 78a and 78b, respectively. These temperature sensors 850a and 850b are connected to the temperature signal treatment circuits 851a and 851b, respectively, which are connected to an average temperature calculating circuit 853. Other constructions are substantially the same as that in the 56th embodiment in FIG. 140.

An operation of the 57th embodiment will now be explained. The operation of the blower fans 74a and 74b, and the operation of the electromagnetic clutch 90 are the same as that in the 54th embodiment in FIGS. 138 and 139. Namely, the respective fan blowers 74a and 74b are operated when the respective sitting sensors 761a and 761b are turned ON and when the respective fan switches (not shown) are turned ON. The fan blowers 74a and 74b are not operated when the respective sitting sensors 761a and 761b are turned OFF, and when the respective fan switches (not shown) are turned OFF even if the respective sitting sensors 761a and 761b are turned ON. The electromagnetic clutch 90 is engaged when at least one of the sitting sensors 761a and 761b is turned ON, and the electromagnetic clutch 90 is disengaged when all of the sitting sensors 761a and 761b are turned OFF.

The volume control of the compressor 90 in the 57th embodiment in FIG. 144 will be explained with reference to flowcharts in FIG. 145 and 146. At step 1700, values of the temperature detected by the sensors 850a and 850b are input. At step 1710, it is determined whether the sitting sensors 761a and 761b are turned ON. When the sitting sensor 761a and 761b are turned ON, an output of the detected value of the temperature by the respective sensors 850a and 850b are permitted. Contrary to this, when the sitting sensors 761a and 761b are turned OFF, an output of the detected value of the temperature by the respective sensors 850a and 850b are prohibited. FIG. 146 shows a routine for controlling the inclination of the swash plate 90-3 of the compressor 90. At step 1750, a temperature signals issued at step 1720 in FIG. 145 are input. At step an average temperature $t_2$ is calculated from the signals. At step 1770 it is determined if the average temperature $t_2$ is smaller than the target temperature $t_0$. When it is determined that $t_2 < t_0$, the routine goes to step 1790 where the volume varying device 835 issues a signal for moving its swash plate to an upright position, which causes the an amount of refrigerant forced out from the compressor 90 to be decreased. When it is determined that $t_2 \geq t_0$, the routine goes to step 1780 where the compressor volume controller 607 issues a signal for moving its swash plate to an inclined position, which causes an amount of refrigerant forced out from the compressor 90 to be increased.

While embodiments are described with reference to attached drawings, many modifications and changes can be made by those skilled in this art without departing from the scope and spirit of the present invention.

We claim:

1. A system for temperature conditioning air within a vehicle cabin in which at least one seat is provided, said seat having a seat portion for enabling a person to sit thereon, said air conditioning system comprising:
   a first duct having a first opening being opened to the cabin at a location adjacent said seat portion of the seat;
   a second duct having a second opening being opened to the cabin at a location higher than the location at which the first opening is provided;
   a third duct for connecting the first and second ducts to one another;
   means for creating a forced flow of air between said first and second openings in such a manner that the forced flow of air is discharged downward from the second opening and received by the first opening;
   means arranged in said third duct for causing a heat exchange between the forced flow of air, after it is received by said first opening, with an air conditioning medium so as to lower the temperature of the air in said third duct; and
   a short cut duct having one end opened adjacent to the first opening and a second end connected to the third duct so that a portion of the cooled air in the third duct, which would otherwise be directed to the second opening, is diverted to the short cut duct and discharged from said one end.

2. A system for temperature conditioning air within a vehicle cabin in which at least one seat is provided, said seat having a seat portion for enabling a person to sit thereon, said air conditioning system comprising:
   a first duct having a first opening being opened to the cabin at a location adjacent said seat portion of the seat;
   a second duct having a second opening being opened to the cabin at a location higher than the location at which the first opening is provided;
   means for creating a forced flow of air between said first and second openings in such a manner that the forced flow of air is discharged from one of the first and second openings and received by the other, said first and second openings generally facing one another so that said forced flow of air generally travels in a direct path without substantial lateral dispersion from said one of the first and second openings to the other so as to be concentrated about a general vicinity of said seat; and
   means for controlling the temperature of said forced flow of air concentrated about said general vicinity of said seat.

3. A system according to claim 2, wherein said seat is provided with a back rest portion and head rest portion, and wherein said first opening is located laterally of said seat portion, and said second opening is located above the head rest portion so as to be opened generally towards the head of a person sitting on the seat.

4. A system according to claim 1, wherein said seat is provided with a back rest portion and head rest portion, and wherein said first opening is located laterally of said seat portion, and said second opening is located laterally of a top end of the back rest portion of the seat so as to be opened to the shoulder portion of a person sitting on the seat.

5. A system according to claim 1, wherein said seat is provided with a back rest portion and head rest portion, and wherein said first opening is located laterally of said seat portion, and said second opening is located laterally of a bottom end of the back rest portion so as to be opened to the waist portion of a person sitting on the seat.

6. A system according to claim 1, wherein said seat is provided with a back rest portion and head rest portion, and wherein said second duct is provided with second openings that are opened at both sides of said seat portion so as to be opened to the thigh portion of a person sitting on the seat.

7. A system according to claim 1, wherein said duct defining one of the openings for discharging the air is provided with restricting means for controlling the flow therefrom adjacent the opening.

8. A system according to claim 7, wherein said restricting means comprises a punched plate arranged substantially transverse to the flow of the air discharged.

9. A system according to claim 7, wherein said restricting means comprises a plurality of louvers extending transversely to the flow of the discharged air.

10. A system according to claim 7, wherein said restricting means comprises a deflector plate extending transversely to the flow of the discharged air.

11. A system according to claim 1, wherein said opening for discharging the air is constructed by an outer opening portion, and a plurality of fine holes having a circular shape are arranged inwardly of said outer opening portion, so that an air curtain formed by the air flow from the outer opening portion is created around the flows from the fine holes.

12. A system according to claim 11, wherein said opening for discharging the air is provided at a ceiling of the cabin.

13. A system for temperature conditioning air within a vehicle cabin in which at least one seat is provided, said seat having a seat portion for enabling a person to sit thereon, said air conditioning system comprising:
   a first duct having a first opening being opened to the cabin at a location adjacent said seat portion of the seat;
   a second duct having a second opening being opened to the cabin at a location higher than the location at which the first opening is provided;
   a third duct for connecting the first and second ducts with one another;
   means for creating a forced flow of air between said first and second openings in such a manner that the forced flow of air is discharged from one of the first and second openings and received by the other, said first and second openings generally facing one another so that said forced flow of air generally travels in a direct path without substantial lateral dispersion from said one of the first and second openings to the other so as to be concentrated about a general vicinity of said seat; and
   means for controlling the temperature of said forced flow of air concentrated about said general vicinity of said seat.

14. A system according to claim 13, wherein the first duct has a portion extending from the first opening toward the temperature controlling means, said third duct has a portion extending away from the temperature controlling means, and said portions of said first and third ducts are arranged such that a heat exchange takes place between respective streams of air passing therethrough.

15. A system for temperature conditioning air within a vehicle cabin in which at least one seat is provided, said seat having a seat portion for enabling a person to sit thereon, said air conditioning system comprising:
- a first duct having a first opening being opened to the cabin at a location adjacent said seat portion of the seat;
- a second duct having a second opening being opened to the cabin at a location higher than the location at which the first opening is provided;
- means for creating a forced flow of air between said first and second openings in such a manner that the forced flow of air is discharged from one of the first and second openings and received by the other, said first and second openings generally facing one another so that said forced flow of air generally travels in a direct path without substantial lateral dispersion from said one of the first and second openings to the other so as to be concentrated about a general vicinity of said seat; and
- an evaporator for decreasing the temperature of the air after it is received by said other of said first and second openings by creating a heat exchange with said air and a refrigerant.

16. A system according to claim 15, further comprising a heater arranged downstream from the evaporator, and an air mix damper between the evaporator and the heater for controlling a ratio of the amount passing through the heater and the amount of air by-passing the heater.

17. A system according to claim 15, further comprising a sub-cooler arranged in the refrigerating line downstream from the evaporator.

18. A system for temperature conditioning air within a vehicle cabin in which at least one seat is provided, said seat having a seat portion for enabling a person to sit thereon, said air conditioning system comprising:
- a first duct having a first opening being opened to the cabin at a location adjacent said seat portion of the seat;
- a second duct having a second opening being opened to the cabin at a location higher than the location at which the first opening is provided;
- a blower for creating a forced flow of air between said first and second openings so that the air is discharged from one of the first and second openings and received by the other, said first and second openings generally facing one another so that said forced flow of air generally travels in a direct path without substantial lateral dispersion from said one of the first and second openings to the other so as to be concentrated about a general vicinity of said seat; and
- a heat exchange apparatus for controlling the temperature of said forced flow of air.

19. The system as claimed in claim 18, wherein said heat exchange apparatus comprises an evaporator.

20. The system as claimed in claim 19, wherein said heat exchange apparatus comprises an air mix damper.

21. The system as claimed in claim 20, wherein said heat exchange apparatus comprises a heater core.

22. The system as claimed in claim 21, wherein said heat exchange apparatus comprises a compressor, a condenser, a receiver, and an expansion valve.

* * * * *